United States Patent

Ootsuka et al.

[19]

[11] Patent Number: 5,933,686
[45] Date of Patent: *Aug. 3, 1999

[54] IMAGE PROCESSING UNIT HAVING RESERVE FUNCTION

[75] Inventors: Hiroshi Ootsuka; Tatsuji Nozawa, both of Toyokawa; Yoshiharu Kurozasa, Yokohama; Akinori Yoshida, Nishio; Kenichi Morita, Toyohashi; Haisheng Liang, Takatsuki; Jiro Goto, Toyokawa, all of Japan

[73] Assignee: Minolta Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/775,043

[22] Filed: Dec. 30, 1996

[30] Foreign Application Priority Data

Dec. 31, 1995 [JP] Japan .................................. 7-353035
Dec. 31, 1995 [JP] Japan .................................. 7-353715
Dec. 31, 1995 [JP] Japan .................................. 7-354150
Jan. 6, 1996 [JP] Japan .................................. 8-017202

[51] Int. Cl.⁶ .................................................. G03G 21/14
[52] U.S. Cl. .............................. 399/87; 399/23; 358/296; 358/437
[58] Field of Search .................................. 399/87, 81, 83, 399/24; 358/296, 437

[56] References Cited

U.S. PATENT DOCUMENTS

| | | | |
|---|---|---|---|
| 4,273,439 | 6/1981 | Markham et al. | 399/87 |
| 4,511,243 | 4/1985 | Smith | 355/14 |
| 4,711,556 | 12/1987 | Abuyama | 399/87 |
| 4,731,672 | 3/1988 | Sugishima et al. | 358/296 |
| 4,816,864 | 3/1989 | Tanaka et al. | 355/14 R |
| 4,907,031 | 3/1990 | Kawatsura et al. | 399/87 |
| 4,956,667 | 9/1990 | Gartner | 399/87 |
| 5,040,019 | 8/1991 | Ito | 355/50 |
| 5,095,342 | 3/1992 | Farrell et al. . | |
| 5,095,369 | 3/1992 | Ortiz et al. | 358/296 |
| 5,130,750 | 7/1992 | Rabb . | |
| 5,152,001 | 9/1992 | Hanamoto | 399/87 |
| 5,159,395 | 10/1992 | Farrell et al. | 271/291 X |
| 5,184,185 | 2/1993 | Rasmussen et al. | 271/286 X |
| 5,206,735 | 4/1993 | Gauronski et al. | 358/296 |
| 5,245,368 | 9/1993 | Farrell et al. | 358/401 |
| 5,287,194 | 2/1994 | Lobiondo | 358/296 |
| 5,363,175 | 11/1994 | Matysek . | |
| 5,452,068 | 9/1995 | Farrell . | |
| 5,504,568 | 4/1996 | Saraswat . | |
| 5,528,375 | 6/1996 | Wegeng et al. | 358/296 |
| 5,557,367 | 9/1996 | Yang et al. . | |
| 5,587,799 | 12/1996 | Kawamura et al. | 358/296 |

FOREIGN PATENT DOCUMENTS

| | | |
|---|---|---|
| 4-31874 | 2/1992 | Japan . |
| 5-75772 | 3/1993 | Japan . |
| 6-6507 | 1/1994 | Japan . |
| 6-35255 | 2/1994 | Japan . |
| 6-268781 | 9/1994 | Japan . |
| 6-340151 | 12/1994 | Japan . |
| 7-76155 | 3/1995 | Japan . |
| 7-154576 | 6/1995 | Japan . |
| 7-254952 | 10/1995 | Japan . |
| 7-312681 | 11/1995 | Japan . |

*Primary Examiner*—R. L. Moses
*Attorney, Agent, or Firm*—McDermott, Will & Emery

[57] ABSTRACT

An image processing unit comprises a memory for storing original image data and a print start time therefor, and a reserve print function of reading the original image data from the memory and printing the same at the print start time. The image processing unit further has a monitor for monitoring consumed times for an interruption copy, paper supply and the like, an operator for inputting print data and a desired print end time, a computing element for operating a required time for a print operation on the basis of the print data, and a setter for setting a print start time for each original on the basis of the operating situation of the image processing unit and the required and desired end times for each original for avoiding overlapping of print operations for respective originals.

38 Claims, 90 Drawing Sheets

FIG.21a

| CONDITION | K2 | K6 |
|---|---|---|
| SIZE A3 | 1.2 | 1.3 |
| A4 | 1 | 1 |
| A5 | 1.2 | 1.1 |
| B4 | 1.2 | 1.2 |
| B5 | 1.2 | 1.1 |

FIG.21b

| CONDITION | K3 |
|---|---|
| DUPLEX COPY | 1.5 |
| SIMPLEX COPY | 1 |
| 2 IN 1 COPY | 1.5 |
| 4 IN 1 COPY | 2.5 |
| COMPOSITE COPY | 4 |

FIG.21c

| CONDITION | K4 |
|---|---|
| 0.5 MAGNIFICATIONS | 1.2 |
| 0.6 MAGNIFICATIONS | 1.1 |
| 0.7 MAGNIFICATIONS | 1.1 |
| 0.8 MAGNIFICATIONS | 1.1 |
| 0.9 MAGNIFICATIONS | 1.1 |
| 1.0 MAGNIFICATIONS | 1 |

FIG.21d

| K1=NUMBER OF SCANNING TIMES | K6=NUMBER OF PAPERS | |
|---|---|---|
| a1=0.05 | a3=0.05 | a5=0.03 | a7=0.07 |
| a2=0.04 | a4=0.02 | a6=0.07 | |

FIG.22a

| TIME | IR1 | IR2 | IR3 | IR4 | IR5 | ---- | ---- |
|---|---|---|---|---|---|---|---|
|  | I1 | I2 | I3 | I4 | I5 | ---- | ---- |

FIG.22b

| TRAY NO. | MAXIMUM NUMBER OF FED PAPERS | COUNTER | | | USE MODE | |
|---|---|---|---|---|---|---|
| | | 1/DAY | 2/DAY | 3/DAY | NUMBER OF RESERVATIONS/ MONTH | NUMBER OF INTERRUPTIONS/ MONTH |
| 1 | 2500 | 15 | 45 | 90 | 900 | 25 |
| 2 | 2000 | 10 | 5 | 20 | 50 | 50 |
| 3 | 2500 | 20 | 40 | 60 | 300 | 100 |
| 4 | 3000 | 100 | 100 | 250 | 500 | 700 |

FIG.23
LOOK-UP TABLE T4
| PRIORITY | ① EARLY DEADLINE |
| --- | --- |
| | ② LONG PROCESSING TIME |
| | ③ DETERMING FROM ID DATA |
| | ④ DETERMINE AT RANDOM |
FIG.24
(a) TIME DATA OF JOBS ARRANGED IN ORDER OF ASCENDING PRIORITIES
| JOB | PROCESSING TIME | DEADLINE | PRIORITIES |
| --- | --- | --- | --- |
| A | H(A) | D(A) | 1 |
| B | H(B) | D(B) | 2 |
| C | H(C) | D(C) | 3 |
| D | H(D) | D(D) | 4 |
| E | H(E) | D(E) | 5 |
(b) TIME TABLE CREATED ALONG SCHEDULE
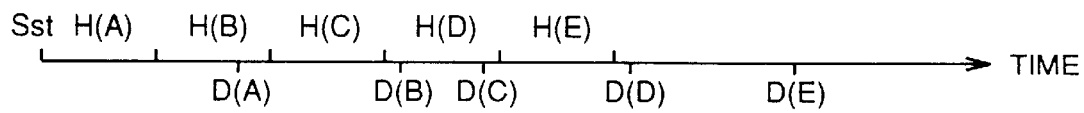
(c) TIME TABLE CREATED WITH INSERTION OF INTERRUPTION TIME AND TROUBLE
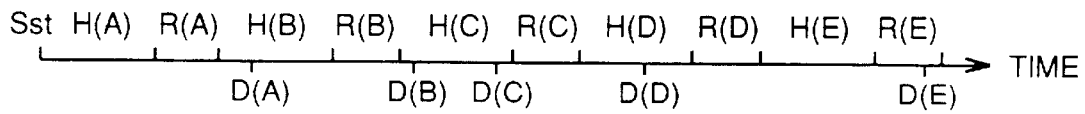

FIG.25

(a) IR,TR DATA→CALCULATION OF R(N) (N=1,2,···)

IRh:IR DATA/UNIT TIME      TRh : TR DATA/UNIT TIME

IRh:IR/OPERATING TIME

TRh:TR/OPERATING TIME $$R(N) = H(N) \times \frac{IRh + TRh}{1(TIME) - (IRh + TRh)}$$

(N=A,B,C,···)

(b) CORRECTION OF TIME TABLE

OBTAIN MAXIMUM VALUE OF a SATISFYING $D(D) - Sst > H(A) + H(B) + H(C) + H(D) + a \{R(A) + R(B) + R(C)\}$

INCREASE VALUE R(D) TO MAKE TOTAL OF R(N) UNCHANGED $R(D) \rightarrow R(D) + (1-a) \{R(A) + R(B) + R(C)\} = R(D)'$ (c) CORRECTED TIME TABLE

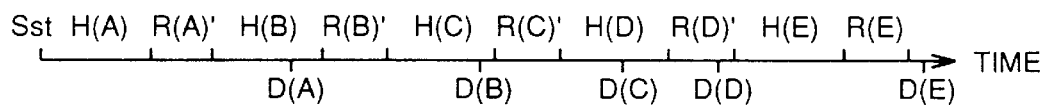

Sst  H(A)  R(A)'  H(B)  R(B)'  H(C)  R(C)'  H(D)  R(D)'  H(E)  R(E)  → TIME
            D(A)          D(B)          D(C)          D(D)          D(E)

```
┌─────────────────────────────────────────────────┐
│  ┌─────────┐                                    │
│  │ RESERVE │                                    │
│  └─────────┘                                    │
│                                                 │
│     ID      s t u w                             │
│   ─────────────────────────────────             │
│     SET COPY END TIME      16:00                │
│   ─────────────────────────────────             │
│     COPY START TIME        16:30                │
│   ─────────────────────────────────             │
│     COPY END TIME          16:40                │
│                                                 │
│                                                 │
│     COPY END DELAYED 40 MIN.                    │
│                                                 │
└─────────────────────────────────────────────────┘
```

```
┌─────────────────────────────────────────────────┐
│            ┌──────────────────┐                 │
│            │ RESERVE          │                 │
│            │ PRIORITY COPY    │                 │
│            └──────────────────┘                 │
│                                                 │
│     ID      a b c d                             │
│   ─────────────────────────────────             │
│     COPY START TIME          12:00              │
│   ─────────────────────────────────             │
│     SCHEDULED COPY END TIME  12:15              │
│                                                 │
│                                                 │
│                                                 │
│     COPY STARTED AFTER END OF RESERVED COPY     │
│     PUSH START KEY                              │
└─────────────────────────────────────────────────┘
```

FIG.77

[S1409,S1411 · FIG.41/YES AT S1391 · FIG.40]    91

RESERVE PRIORITY COPY

ID    a b c d

NOW COPIABLE:PUSH START KEY

RESERVE PRIORITY COPY

ID    a b c d

COPY START TIME          12:00

SCHEDULED COPY END TIME  12:15

PRINTING

```
┌─────────────────────────────────────────────────────────────┐
│  ┌─────────┐                                                │
│  │ RESERVE │                                                │
│  └─────────┘                                                │
│                                                             │
│      ID     a b c d                                         │
│     ─────────────────────────────────────────               │
│      SET COPY END TIME        12:00                         │
│     ─────────────────────────────────────────               │
│      COPY START TIME          12:00                         │
│     ─────────────────────────────────────────               │
│      COPY END TIME            12:15                         │
│                                                             │
│                                                             │
│      SELECT RESERVE PRIORITY COPY FOR COPY OVER 10 MIN.     │
└─────────────────────────────────────────────────────────────┘
```

```
┌─────────────────────────────────────────────────────────────┐
│  ┌─────────┐                                                │
│  │ RESERVE │                                                │
│  └─────────┘                                                │
│                                                             │
│      ID     a b c d                                         │
│     ─────────────────────────────────────────               │
│                                                             │
│                                                             │
│                                                             │
│                                                             │
│      OVERRESERVATION:PUSH RESERVE MODE SWITCH AND           │
│      MAKE GENERAL COPY                                      │
└─────────────────────────────────────────────────────────────┘
```

FIG.81

```
                                                    91
┌─────────────────────────────────────────────────┐
│ ┌─────────┐                                     │
│ │ RESERVE │                                     │
│ └─────────┘                                     │
│                                                 │
│   END TIME              00 : 00                 │
│                                                 │
│   ORIGINAL SIZE         A3 · B4 · A4 · B5       │
│                                                 │
│   COPY SIZE             A3 · B4 · A4 · B5       │
│                                                 │
│   NUMBER OF ORIGINALS   00                      │
│                                                 │
│   NUMBER OF COPIES      00                      │
│                                                 │
│   I · D                 a b c d e f g           │
│                         ─────────────           │
│                                                 │
└─────────────────────────────────────────────────┘
```

FIG.82

[GENERAL STANDBY]  [S1331 · FIG.37]                    91

```
┌─────────────────────────────────────────────────┐
│ ┌─────────┐  ┌──────────────┐                 1 │
│ │ RESERVE │  │ RESERVE      │                   │
│ └─────────┘  │ PRIORITY COPY│                   │
│              └──────────────┘                   │
│                                                 │
│                                                 │
│                                                 │
│                                                 │
│                                                 │
│                                                 │
│                                                 │
│   SELECT RESERVE PRIORITY COPY FOR COPY OVER 10 MIN. │
└─────────────────────────────────────────────────┘
```

FIG.83

[PRINTING IN RESERVE PRIORITY MODE]    91

RESERVE PRIORITY COPY    1 4

ID    a b c d

COPY START TIME    12:00

SCHEDULED COPY END TIME    12:15

PRINTING

FIG.84

[SET NUMBER OF COPIES IN STATE OF FIG.83]    91

RESERVE PRIORITY COPY    5

PRINTING

RESERVATIONS
1 4

SELECT RESERVE PRIORITY COPY FOR COPY OVER 10 MIN.

FIG.85

[START KEY IS PUSHED IN STATE OF FIG.84]   91

```
┌─────────────────────────────────────────────┐
│         ┌──────────────┐                  5 │
│         │   RESERVE    │                    │
│         │ PRIORITY COPY│                    │
│         └──────────────┘                    │
│                                             │
│                              ┌─RESERVATIONS─┐│
│      ┌────────┐ ┌────────────┐│             ││
│      │PRINTING│ │INTERRUPTION││    1 0      ││
│      └────────┘ └────────────┘└─────────────┘│
│                                             │
│   SELECT RESERVE PRIORITY COPY FOR COPY OVER 10 MIN. │
└─────────────────────────────────────────────┘
```

FIG.86

[ORIGINAL COPY PROGRESSES FROM STATE OF FIG.85]   91

```
┌─────────────────────────────────────────────┐
│         ┌──────────────┐                  3 │
│         │   RESERVE    │                    │
│         │ PRIORITY COPY│                    │
│         └──────────────┘                    │
│                                             │
│                                             │
│                              ┌─RESERVATIONS─┐│
│      ┌────────┐ ┌────────────┐│             ││
│      │PRINTING│ │INTERRUPTION││    1 0      ││
│      └────────┘ └────────────┘└─────────────┘│
│   SELECT RESERVE PRIORITY COPY FOR COPY OVER 10 MIN. │
└─────────────────────────────────────────────┘
```

FIG.87

[PRINT RESTART IN RESERVE PRIORITY MODE FOLLOWING FIG.86] [S167 · FIG.31]   91

RESERVE PRIORITY COPY          1 0

ID     a b c d

COPY START TIME          12:00

SCHEDULED COPY END TIME    12:20

PRINTING

FIG.88

[S551,S553 · FIG.33] [TROUBLE IN PRINTING OF RESERVED COPY]   91

RESERVE

ID     a b c d e f g h

SET COPY END TIME      12:00

COPY START TIME        11:40

TROUBLE

FIG.89

[S577 · FIG.33] [AFTER RELEASE FROM TROUBLE]  91

RESERVE

| ID | a b c d e f g h | |
|---|---|---|
| SET COPY END TIME | 12:00 | |
| NUMBER OF REMAINING ORIGINALS | | 15 |
| NUMBER OF REMAINING COPIES | | 10 |
| SCHEDULED END TIME | 12:15 | |

SELECT GENERAL COPY FOR COPY OVER 10 MIN.

FIG.90

[CREATED MANAGEMENT REPORT]

| I · D | a b c d e f g |
|---|---|
| SET END TIME | 95" 1/20  12 : 00 |
| END TIME | 95" 1/20  11 : 59 |
| ORIGINAL SIZE | A3 · A4 |
| COPY SIZE | A3 · B4 · A4 |
| NUMBER OF ORIGINALS | 20 |
| NUMBER OF COPIES | 10 · 20 |

| RESERVE | | |
|---|---|---|
| ID x y z | | |
| SET COPY END TIME | 16:00 | |
| COPY START TIME | 15:50 | |
| COPY END TIME | 16:00 | COPIER B |
| PRINTING | | |

COPIED IN COPIER B

| RESERVE | | |
|---|---|---|
| ID A B C | | |
| SET COPY END TIME | 16:00 | |
| COPY START TIME | 15:40 | |
| COPY END TIME | 16:00 | COPIER A |
| PRINTING | | |

SELECT RESERVE PRIORITY COPY FOR COPY OVER 10 MIN.

RESERVE

END TIME　　　　　　　12 : 00
ORIGINAL SIZE　　　　A3 · A4
COPY SIZE　　　　　　A3 · B4 · A4
NUMBER OF ORIGINALS　20
NUMBER OF COPIES　　10 · 20

TROUBLE

NOT ENDED ON SCHEDULE

RESERVE

| ID | a b c d e f g h | | |
|---|---|---|---|
| SET COPY END TIME | 12:00 | | |
| COPY START TIME | 11:55 | | |
| SCHEDULED COPY END TIME | 12:15 | | |

COPY END DELAYED 15 MIN.

RESERVE

ID  a b c d e f g h

SET COPY END TIME         12:00

COPY START TIME           11:55

SCHEDULED COPY END TIME   12:15

PRINTING

SELECT GENERAL COPY FOR COPY OVER 10 MIN.

FIG.96

[INTERRUPTION IN RESERVE MODE]

RESERVE

ID  A B C

SET COPY END TIME   16:00

COPY START TIME     15:40

COPY END TIME       16:00         COPIER A

PRINTING    INTERRUPTION

SELECT RESERVE PRIORITY COPY FOR COPY OVER 10 MIN.

FIG.97

```
┌─────────────────────────────────────────────────┐ 91
│  ┌─────────┐                                    │
│  │ RESERVE │                                    │
│  └─────────┘                                    │
│                                                 │
│     ID     a b c d e f g h                      │
│    ─────────────────────────────────────────    │
│     SET COPY END TIME      12:00                │
│    ─────────────────────────────────────────    │
│     COPY START TIME        11:55                │
│    ─────────────────────────────────────────    │
│     COPY END TIME          12:15    E   COPIER A│
│                                                 │
│                                                 │
│     COPY FOR ID  a b c d e f g h  ENDED         │
│     CONFIRM AND PUSH RELEASE KEY                │
│                                                 │
└─────────────────────────────────────────────────┘
```

FIG.98

```
┌─────────────────────────────────────────────────┐ 91
│  ┌─────────┐                                    │
│  │ RESERVE │                                    │
│  └─────────┘                                    │
│                                                 │
│     ID     i j k l m n                          │
│    ─────────────────────────────────────────    │
│     SET COPY END TIME      13:00                │
│    ─────────────────────────────────────────    │
│     COPY START TIME        12:50                │
│    ─────────────────────────────────────────    │
│     COPY END TIME          13:00    E   COPIER B│
│                                                 │
│                                                 │
│     COPY FOR ID  i j k l m n  ENDED IN COPIER B │
│     CONFIRM AND PUSH RELEASE KEY                │
│                                                 │
└─────────────────────────────────────────────────┘
```

FIG.99

```
                                                              91
┌─────────────────────────────────────────────────────────────┐
│ ┌─────────┐                                                 │
│ │ RESERVE │                                                 │
│ └─────────┘                                                 │
│                                                             │
│      ID      o p q r                                        │
│    ─────────────────────────────────                        │
│      SET COPY END TIME      15:00                           │
│    ─────────────────────────────────                        │
│      COPY START TIME        14:30                           │
│    ─────────────────────────────────                        │
│      COPY END TIME          14:40                           │
│                                                             │
│                                                             │
│      COPY FOR ID  o p q r  RESERVED                         │
│      PUSH RELEASE KEY FOR CONFIRMATION                      │
└─────────────────────────────────────────────────────────────┘
```

FIG.100

MEMORY TABLE

| ID(Ai) | TSP(ai) | TSE(bi) | TSP0(ci) | TAO(di) | TSP1(ei) |
|---|---|---|---|---|---|
| A1 | a1 | b1 | c1 | d1 | e1 |
| A2 | a2 | b2 | c2 | d2 | e2 |
| A3 | a3 | b3 | c3 | d3 | e3 |
| ---- | ---- | ---- | ---- | ---- | ---- |
| AN-1 | aN-1 | bN-1 | cN-1 | dN-1 | eN-1 |
| AN | aN | bN | cN | dN | eN |

FIG.101

| SYMBOL FOR FLAG ETC. (NAME) | FUNCTION ETC. |
|---|---|
| RSVMF (RESERVE MODE FLAG) | INDICATE RESERVE MODE |
| RSVEF (RESERVE END FLAG) | INDICATE COMPLETION OF RESERVE SETTING/ RESET FOLLOWING COMPLETE LOADING OF RESERVED/SET ORIGINAL |
| RSVF (RESERVE FLAG) | INDICATE PRESENCE/ABSENCE OF RESERVED COPY/RESET FOLLOWING COMPLETION OF PRINTING OF ALL RESERVED COPIES |
| TBLF (TROUBLE FLAG) | INDICATE TROUBLE |
| TBLMF (TROUBLE MODE FLAG) | INDICATE COMPLETE COPING WITH TROUBLE/ RESET FOLLOWING COMPLETION OF TBLM PROCESSING |
| PRTF (PRINT FLAG) | INDICATE PRT CONTROL |
| TPCF (TIME PRINT CONTROL FLAG) | INDICATE TIME PRT CONTROL |
| RESERVE PRIOPITY MF (RESERVE PRIORITY MODE FLAG) | INDICATE RESERVE PRIORITY MODE |
| WAITF (WAIT FLAG) | INDICATE NECESSITIY OF WAITING FOR SET ORIGINAL PRINTING IN RESERVE PRIORITY MODE |
| PRIRF (PRINT INTERRUPT FLAG) | INDICATE INTERRUPTION OF PRINT OPERATION FOR RESERVED COPY |
| PRIRMF (PRINT INTERRUPT MODE FLAG) | INDICATE INTERRUPTION OF PRINT OPERATION BY THAT FOR RESERVED COPY |
| ORIGINAL CONTROL F (ORIGINAL CONTROL FLAG) | INDICATE ORIGINAL READ CONTROL |
| ORIGINAL END PROCESSING F (ORIGINAL END PROCESSING FLAG) | INDICATE ORIGINAL END PROCESSING |
| NOF | INDICATE UNPRINTABLE STATE IN OTHER COPIER |

FIG.102

| SYMBOL FOR FLAG ETC. (NAME ETC.) | FUNCTION ETC. |
|---|---|
| CONFIRM F (CONFIRM FLAG) | INDICATE RESERVE CONFIRMATION MODE |
| ADFF (ADF FLAG) | INDICATE PRESENCE OF ORIGINAL ON PRELIMINARY INSERTION PART |
| REPTF (REPRINT FLAG) | INDICATE CREATION OF MANAGEMENT REPORT |
| COMMUNICATION F (COMMUNICATION FLAG) | INDICATE END OF COPIER COMMUNICATION |
| TNW | CURRENT TIME |
| TSE | SET PRINT START TIME FOR RESERVED COPY |
| TAO | REQUIRED PRINT TIME FOR RESERVED COPY |
| TSP | DESIRED(INPUTTED) PRINT END TIME FOR RESERVED COPY |
| TSP0 | UNCHANGED SET PRINT END TIME FOR RESERVED COPY |
| TSP1 | CHANGED SET PRINT TIME FOR RESERVED COPY |
| N | NUMBER OF COPIES |
| NC | SET NUMBER OF COPIES |
| NCR | NUMBER OF REMAINING COPIES |
| M | NUMBER OF ORIGINALS |
| MD | SET NUMBER OF ORIGINALS |
| MDR | NUMBER OF REMAINING ORIGINALS |

FIG.103

| TYPE OF COMMUNICATION (TRANSMISSION→RECEIVING) | TRANSMISSION DATA ETC. |
|---|---|
| PRT COMMUNICATION 1 (CPU1→CPU2) <br><br><br><br><br><br><br> PRT COMMUNICATION 2 (CPU2→CPU1) | ID <br> NUMBER OF COPIES <br> COPY SIZE   PRESENCE/ABSENCE OF SPECIFICATION/SIZE IN PRESENCE <br> COPY CONTROL   START/INTERRUPT/RE-START <br> NUMBER OF ORIGINALS <br> RESET MODE <br> TROUBLE END <br> TYPE OF COMMUNICATION <br> REMAINING OPERATION(NCR) <br> NUMBER OF REMAINING ORIGINALS(MDR) <br> TROUBLE DATA <br> END DATA SET |
| ORIGINAL READ COMMUNICATION (CPU1→CPU3) | TYPE OF COMMUNICATION |
| ORIGINAL COMMUNICATION 2 (CPU3→CPU1) | TYPE OF COMMUNICATION <br> NUMBER OF READ ORIGINALS <br> PRESENCE/ABSENCE OF ORIGINALS |
| COPIER COMMUNICATION 1 (CPU1 OF COPIER A→ CPU1 OF COPIER B) <br><br><br><br> (COPIER A REQUESTER) <br> (COPIER B DESTINATION) | TYPE OF COMMUNICATION <br> OPERATION REQUEST DATA <br> 1-a OR 1-b DATA <br> COPY CONTROL CONTENT <br>   ID <br>   NUMBER OF COPIES <br>   COPY SIZE <br>     PRESENCE/ABSENCE OF SPECIFICATION/SIZE IN PRESENCE <br> END TIME <br> IMAGE OUTPUT MODE DATA |
| COPIER COMMUNICATION 2 (CPU1 OF COPIER B→ CPU1 OF COPIER A) | TYPE OF COMMUNICATION <br> O.K.DATA |
| COMMUNICATION WITH PERSONAL COMPUTER | INDICATE UNCOPIABLE STATE <br> COPY CONTENT <br> SET END TIME | ch
IMAGE PROCESSING UNIT HAVING RESERVE FUNCTION

BACKGROUND OF THE INVENTION

1. Field of the Invention

The present invention relates to an image processing unit having a reserve function, and more particularly it relates to an image processing unit having a function of storing image data in a memory and reading the image data from the memory for printing the same at a printing start time therefor.

2. Description of the Background Art

U.S. Pat. No. 4,816,864 discloses an apparatus having a plurality of paper feed trays capable of feeding papers on a platen respectively for copying originals set on each tray in accordance with copy data specified as to the set originals, and erasing the copy data for the originals when the copy operation is ended for copying originals set on the next tray in accordance with copy data for the originals set on the next tray.

U.S. Pat. No. 5,040,019 discloses an apparatus for accepting an interruption copy instructed during execution of reserved printing and interrupting the reserved printing if the reserved printing can be ended by a set end time therefor while interrupting the interruption copy and re-starting the reserved printing if a determination is made that the reserved printing cannot be ended by the set end time after starting of the interruption copy.

Japanese Patent Laying-Open No. 4-31874 (1992) discloses an apparatus for specifying a reserved time by inputting a password having a time function thereby eliminating concentration to a specific time zone.

Japanese Patent Laying-Open No. 5-75772 (1993) discloses a composite information processing unit for executing a plurality of types of information processing functions in the order of reservations.

In each of digital copying apparatuses which are now on the market, a general copy operation is interrupted when an interruption copy is instructed during the general copy operation, for preferentially accepting the interruption copy.

U.S. Pat. No. 4,511,243 discloses an apparatus for operating an end time for a copy operation on the basis of the number of originals, the number of copies and a required time for the copy operation and displaying the remaining copy operation time.

SUMMARY OF THE INVENTION

An object of the present invention is to attain further handleability in an image processing unit which can reserve printing.

Another object of the present invention is to enable proper execution of reserved processing when a plurality of reservations are made in an image processing unit having a reserve function.

Still another object of the present invention is to enable proper execution of reserved processing when an interruption operation is made in an image processing unit having a reserve function.

A further object of the present invention is to provide an image processing unit having a reserve function, which can cope with users' demands for interruption copies and reserved copies.

A further object of the present invention is to automatically adjust a plurality of reserved copies in an image processing unit having a reserve function.

A further object of the present invention is to reduce users' wait times for improving efficiency of copy operations in an image processing unit having a reserve function.

The aforementioned objects of the present invention are attained by an image processing unit including the following elements: An image processing unit according to an aspect of the present invention has a reserve print function of storing original image data and print start time data for the original image data in a memory and reading the original image data which are associated with print start times from the memory at the print start times, and includes a monitor for monitoring and storing the operating situation of the image processing unit, a data input unit for inputting print data for originals, an end time input unit for inputting desired print end times for the originals, a required time computing element for operating required times for print operations for the originals corresponding to the print data on the basis of the print data, and a scheduler for operating and setting the print start times for the respective originals for preventing overlapping of time zones for the print operations for the respective originals on the basis of the operating situation and the required times and the desired print end times for the respective originals.

The required times for the print operations are operated from inputted print originals and print end times for scheduling the print operations for the originals so that the time zones therefor will not overlap with each other, whereby it is possible to provide an image processing unit which can properly execute reserved processing even if a plurality of reservations are made.

An image processing unit according to another aspect of the present invention has a memory for storing image data, and a function of reading the image data from the memory and printing the same at a set print start time therefor. The image processing unit further has a start input unit for instructing starting of a print operation, a determiner for determining presence/absence of a print operation under execution when an operation input from the start input unit is received, an interrupter for interrupting the print operation under execution and preserving the data at the time of interruption when the determiner determines presence of the print operation under execution, and a controller for starting a print operation of a set original after the data is preserved by the interrupter when the operation input from the start input unit is received and the print operation under execution is present and re-starting the interrupted print operation on the basis of the data preserved by the interrupter after completion of the print operation for the set original.

At the set print start time, the image data is read from the memory for starting printing. If any print operation is currently executed, this print operation is interrupted and its print data is preserved. Thereafter the print operation for the read data is started, and the interrupted print operation is re-started after completion of the print operation for the set original. Consequently, it is possible to provide an image processing unit having a reserve function, which can cope with users' demands for interruption copies and reserved copies.

According to still another aspect of the present invention, an image processing unit has a memory for storing image data, and a function of reading the image data from the memory and printing the same at a set print start time for the image data. The image processing unit further has a data input unit for inputting print data for a set original, a required time computing element for operating a required time for a print operation for the set original on the basis of the print data, an end time computing element for operating a print end time in case of starting the print operation for the set original from the current time on the basis of the required time and setting the same as an operated print end time, a determiner for determining whether or not the operated print end time is before the earliest set print start time for the image data stored in the memory, a start time setter for setting the current time as the set print start time for the set original if the operated print end time is before the earliest set print start time while setting the set print start time at a time after completion of the print operation for the image data having the earliest set print start time if the operated print end time is after the earliest set print start time, and a display for displaying whether the print operation for the set original is started from the current time or after completion of the print operation for the image data stored in the memory in response to the result of the determination.

At the set print start time stored in the memory, the image data is read from the memory for starting printing. On the other hand, the required time for printing the set original is operated on the basis of the print data thereof. The print end time for the original is operated on the basis of the required time. This print end time is compared with the print start time stored in the memory, so that the current time is determined as the print start time for the set original if the end time is earlier than the start time, while the earliest print end time as stored is determined as the print start time for the set original if the end time is later than the start time. If a new reservation is made, this reservation is adjusted with a precedent reserved copy. Consequently, a plurality of reserved copies can be automatically adjusted.

According to a further aspect of the present invention, an image processing system includes first and second digital copying apparatuses which are connected with each other to be capable of bidirectionally transferring image data. Each of the copying apparatuses forming the image processing system has a memory for storing image data and a function of reading the image data from the memory and printing the same at a set print start time for the image data, as well as a required time computing element for operating a required time for a print operation for a target original to be copied on the basis of copy data thereof, an end time computing element for operating a print end time in case of starting the print operation for the target original from the current time on the basis of the required time and setting the same as an operated print end time, a determiner for comparing the operated print end time for the target original with a set print end time and a set print start time for each image data stored in the memory and determining presence/absence of overlapping of a time zone for the print operation for the target original and each time zone for a print operation for each image data stored in the memory, a transmission management unit for transmitting a print request for and the copy data of the target original to the other copying apparatus connected with this copying apparatus when the determiner determines that overlapping is present for transmitting the image data of the target original when print authorization data is received from the other copying apparatus, a receiving management unit for supplying the received copy data to the required time computing element when the print request and the copy data are received from the other copying apparatus and making the end time computing element and the determiner execute processing and transmitting the print authorization data to the other copying apparatus when the determiner determines that no overlapping is present for processing image data received from the other copying apparatus as the image data of the target original, and a controller for executing the print operation for the target original when the determiner determines that no overlapping is present.

The image processing system includes the first and second digital copying apparatuses. Each digital copying apparatus reads the image data from the memory and starts printing at the set print start time stored in the memory. On the other hand, a required print time for a set original is operated on the basis of print data thereof. A print end time for the original is operated on the basis of the required time. This print end time is compared with the print start time stored in the memory, so that overlapping of print operations for the respective image data in the respective copying apparatuses is detected. The other copying apparatus is inquired of whether or not a print operation is possible if any overlapping is present, and if the print operation is possible, image data of a newly set original is transferred to the other copying apparatus so that the print operation is executed. If print times overlap with each other in the respective copying apparatuses, newly inputted image data is transferred to the other copying apparatus and processed, whereby the user's wait time is reduced and efficiency of the copy operations is improved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 21a to 21d are explanatory diagrams showing examples of a look-up table $T_1$;

FIGS. 22a and 22b are explanatory diagrams showing examples of look-up tables $T_2$ and $T_3$;

FIG. 23 is an explanatory diagram showing an example of a look-up table $T_4$;

FIG. 24 is an explanatory diagram showing a procedure of creating a time table;

FIG. 25 is an explanatory diagram showing a time table correction system;

FIG. 75 is an explanatory diagram showing an exemplary display on a liquid crystal panel 291;

FIG. 76 is an explanatory diagram showing another exemplary display on the liquid crystal panel 291;

FIG. 77 is an explanatory diagram showing a still another exemplary display on the liquid crystal panel 291;

FIG. 78 is an explanatory diagram showing a further exemplary display on the liquid crystal panel 291;

FIG. 79 is an explanatory diagram showing a further exemplary display on the liquid crystal panel 291;

FIG. 80 is an explanatory diagram showing a further exemplary display on the liquid crystal panel 291;

FIG. 81 is an explanatory diagram showing a further exemplary display on the liquid crystal panel 291;

FIG. 82 is an explanatory diagram showing a further exemplary display on the liquid crystal panel 291;

FIG. 83 is an explanatory diagram showing a further exemplary display on the liquid crystal panel 291;

FIG. 84 is an explanatory diagram showing a further exemplary display on the liquid crystal panel 291;

FIG. 85 is an explanatory diagram showing a further exemplary display on the liquid crystal panel 291;

FIG. 86 is an explanatory diagram showing a further exemplary display on the liquid crystal panel 291;

FIG. 87 is an explanatory diagram showing a further exemplary display on the liquid crystal panel 291;

FIG. 88 is an explanatory diagram showing a further exemplary display on the liquid crystal panel 291;

FIG. 89 is an explanatory diagram showing an exemplary management report;

FIG. 90 is an explanatory diagram showing an exemplary management report;

FIG. 91 is an explanatory diagram showing a further exemplary display on the liquid crystal panel 291;

FIG. 92 is an explanatory diagram showing a further exemplary display on the liquid crystal panel 291;

FIG. 93 is an explanatory diagram showing a further exemplary display on the liquid crystal panel 291;

FIG. 94 is an explanatory diagram showing a further exemplary display on the liquid crystal panel 291;

FIG. 95 is an explanatory diagram showing a further exemplary display on the liquid crystal panel 291;

FIG. 96 is an explanatory diagram showing a further exemplary display on the liquid crystal panel 291;

FIG. 97 is an explanatory diagram showing a further exemplary display on the liquid crystal panel 291;

FIG. 98 is an explanatory diagram showing a further exemplary display on the liquid crystal panel 291;

FIG. 99 is an explanatory diagram showing a further exemplary display on the liquid crystal panel 291;

FIG. 100 is an explanatory diagram showing a memory having registered reserved copies;

FIG. 101 is an explanatory diagram for flags etc. used in the flow charts;

FIG. 102 is an explanatory diagram of flags etc. used in the flow charts; and

FIG. 103 is an explanatory diagram showing types of communication executed in the flow charts and transmission data.

DESCRIPTION OF THE PREFERRED EMBODIMENTS

The inventive apparatus is now described with reference to concrete embodiments.

(1) First Embodiment

1. Outline of Mechanism and Operation

Figure 1:
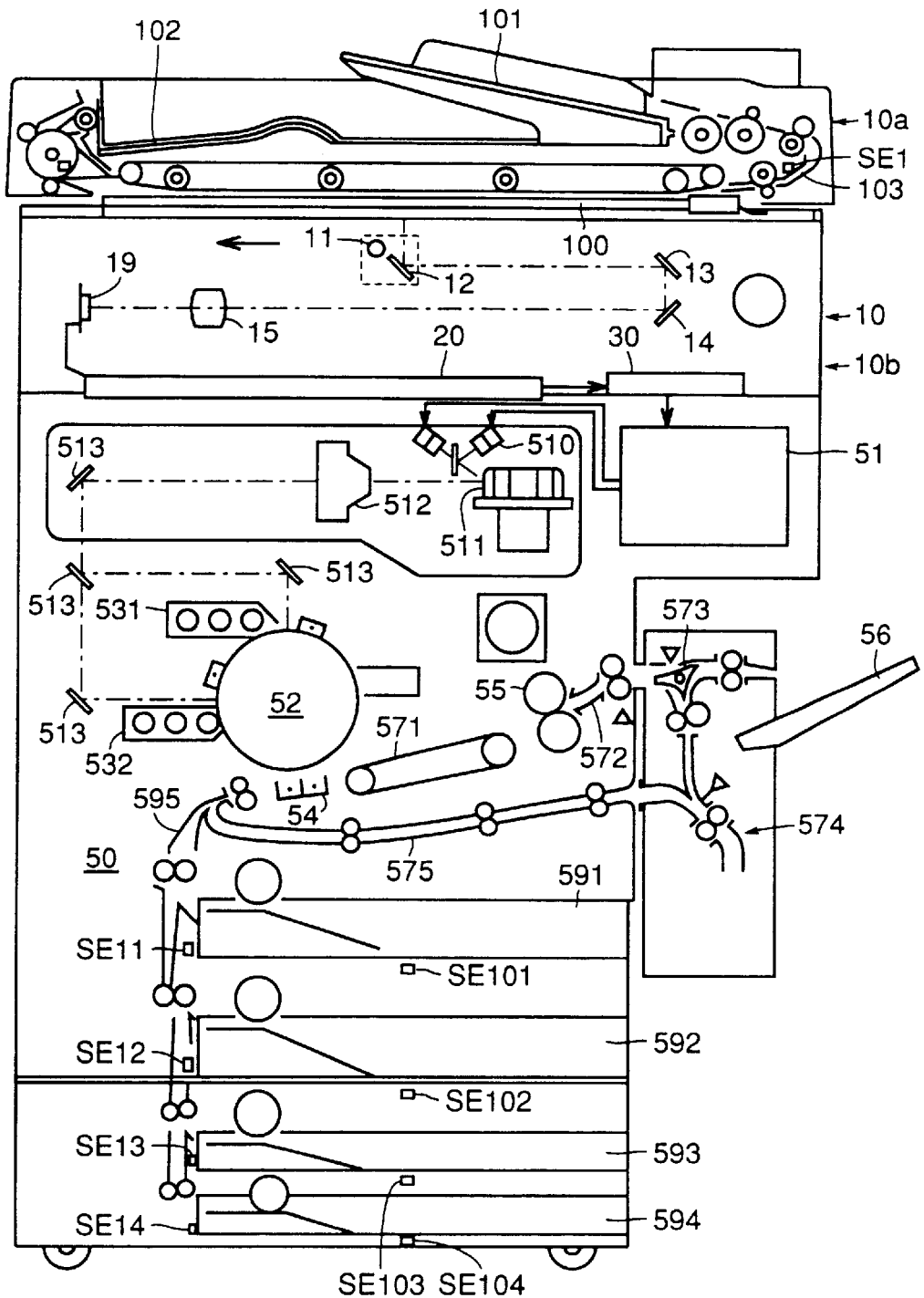
FIG. 1 a model diagram showing the mechanism of a copying apparatus according to a first embodiment of the present invention.

Referring to FIG. 1, a copying apparatus has an original processing part 10 consisting of an original transport part 10a and an original read part 10b, and a printer part 50.

The original transport part 10a is adapted to deliver originals which are set on an original tray 101 one by one to a preliminary insertion part 103 for thereafter transporting each original onto a platen glass member 100 at a prescribed timing and setting the same on an original read position of the platen glass member 100 to downwardly direct the original image surface, while transporting the original along the same direction after reading thereby removing the original from the original read position and discharging the same on a discharge tray 102. If a next original is provided on the preliminary insertion part 103, this original is transported along the same direction at the time of the aforementioned discharge, to be set on the original read position similarly to the above. A sensor SE1 detects the forward end of each original provided on the preliminary insertion part 103. In order to implement the aforementioned operation, the original processing part 10 including the original transport part 10a is provided with an original transport part driving circuit, an original transport part sensor and the like (not shown).

On the other hand, the original read part 10b is adapted to expose/scan each original placed on the platen glass member 100 with an exposure lamp 11 for guiding reflected light to a CCD line image sensor 19 through mirrors 12, 13 and 14 and a lens system 15 and forming an image, processing an image signal photoelectrically converted by the CCD line image sensor 19 in an image processing circuit 20 for forming image data, and storing the same in a memory of a memory unit part 30. In order to implement the aforementioned operations, the original processing part 10 including the original read part 10b is provided with a driving circuit (not shown) and the image processing circuit 20.

The printer part 50 performs operations of forming an electrostatic latent image on a photoreceptor drum 52, developing the electrostatic latent image with toner, transferring the developed toner image onto a paper, fixing the toner image to the paper, feeding the paper to the transfer position, transporting the paper having the transferred toner image to the fixing position, and discharging the same after fixation. In order to implement the aforementioned operations, the printer part 50 is provided with a print circuit 51, various types of sensors, and a driving circuit.

The operation of forming an electrostatic latent image on a surface of the photoreceptor drum 52 is implemented by converting image data read from the memory circuit 30 to a signal for laser driving by the print circuit 51, driving a laser diode 510 with this signal for outputting a laser beam corresponding to the image, and imaging the laser beam on a charged surface of the photoreceptor drum 52 which is rotated/driven through a polygon mirror 511, a lens system 512 and a mirror 513.

The operation of developing the electrostatic latent image with the toner is implemented by sticking the toner stored in either one of developing units 531 and 532 to the electrostatic latent image which is formed on the surface of the rotated/driven photoreceptor drum 52. The operation of transferring the toner image developed on the surface of the photoreceptor drum 52 onto the paper is implemented by attracting the toner image by a transfer charger 54 and transferring the same to the paper fed to the transfer position. The operation of fixing the toner image transferred onto the paper is implemented by transporting the paper having the transferred toner image to a fixing unit 55 by a transport belt 571 and performing image fixation processing by thermo-compression bonding.

The operation of transporting the paper is so performed as to transport the paper which is delivered from any of paper feed trays 591, 592, 593 and 594 through a transport path 595, feed the same to the transfer position between the photoreceptor drum 52 and the transfer charger 54, transport the same to the fixing unit 55 by the transport belt 571 after the transfer operation, and discharge the same to a discharge tray 56 provided in the exterior of the apparatus through a discharge path 572 after fixation. The paper having the fixed image may be fed into a re-feed mechanism 574 by switching a switching pawl 573, to be re-fed to the transfer position through a re-feed path 575. Sensors (not shown) are provided in the vicinity of the transport path 595, the re-feed path 575 and the like, in order to detect a jam trouble or the like.

Figure 3:
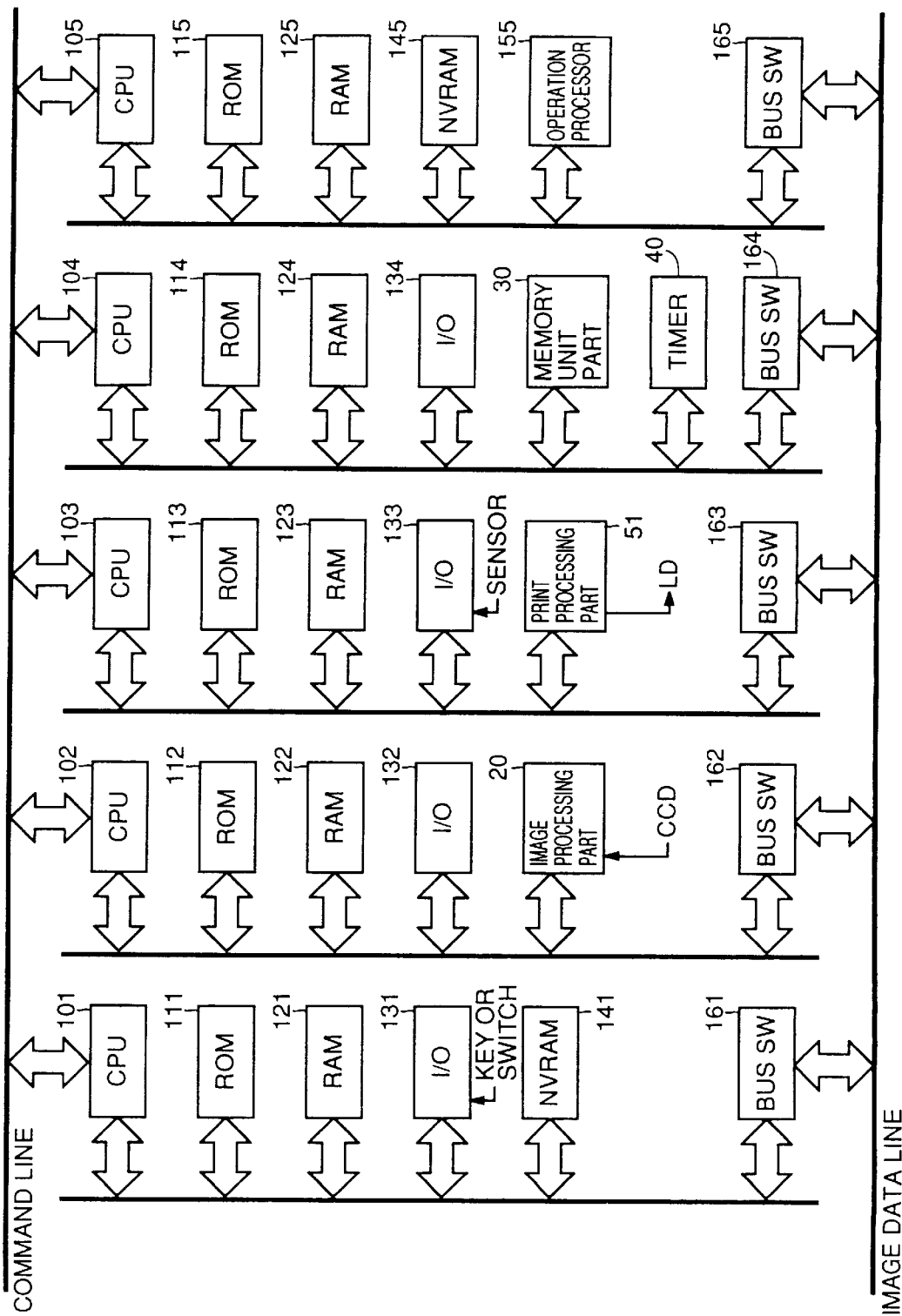
FIG. 3 is a block diagram showing the structure of a control circuit of the copying apparatus shown in FIG. 1.

Paper sensors SE11, SE12, SE13 and SE14 provided on paper feed ports of the paper feed trays 591, 592, 593 and 594 detect presence/absence of papers on the paper feed trays 591, 592, 593 and 594 respectively, and input the results in a CPU 103 through an I/O 133 shown in FIG. 3. On the other hand, weight sensors SE101, SE102, SE103 and SE104 provided under the paper feed trays 591, 592, 593 and 594 detect the weights of the papers stored in the paper feed trays 591, 592, 593, and 594 respectively, and input the results in the CPU 103 through the I/O 133 shown in FIG. 3.

2. Structure of Control Circuit

Figure 2:
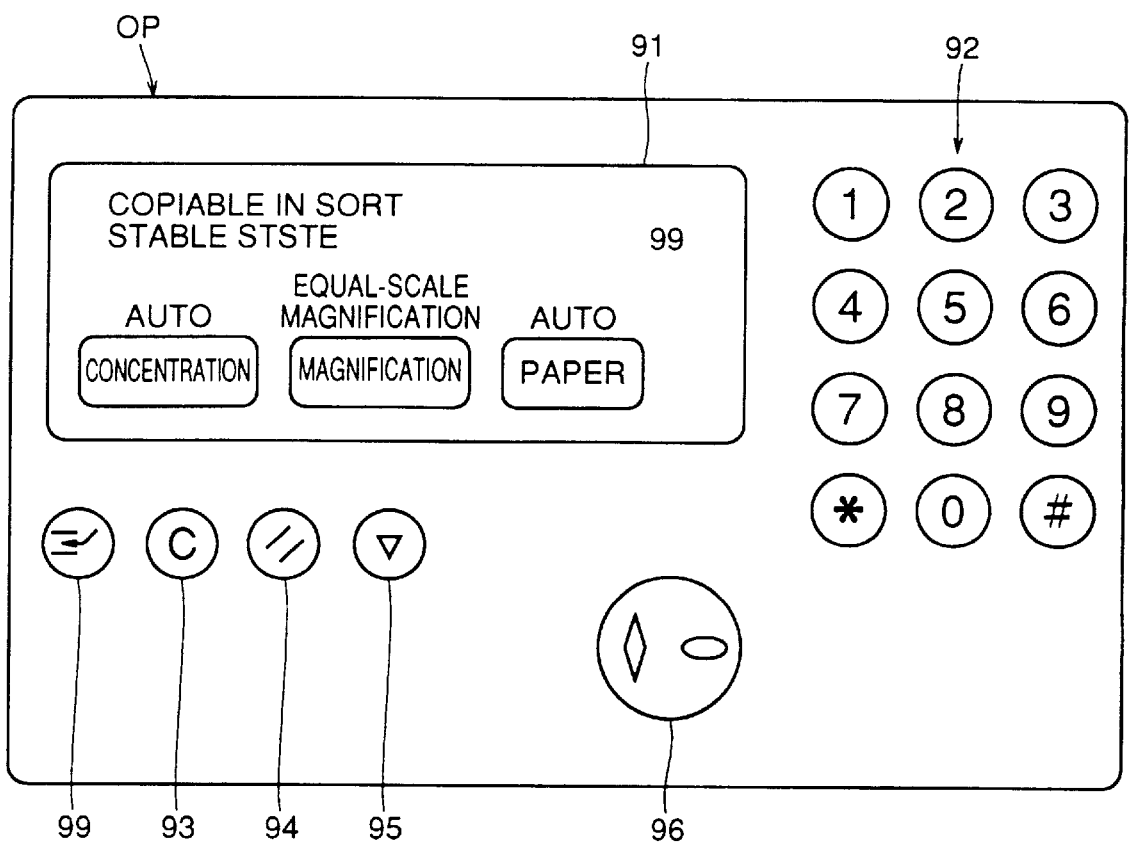
FIG. 2 is an explanatory diagram showing an operation panel of the copying apparatus shown in FIG. 1.
Figure 4:
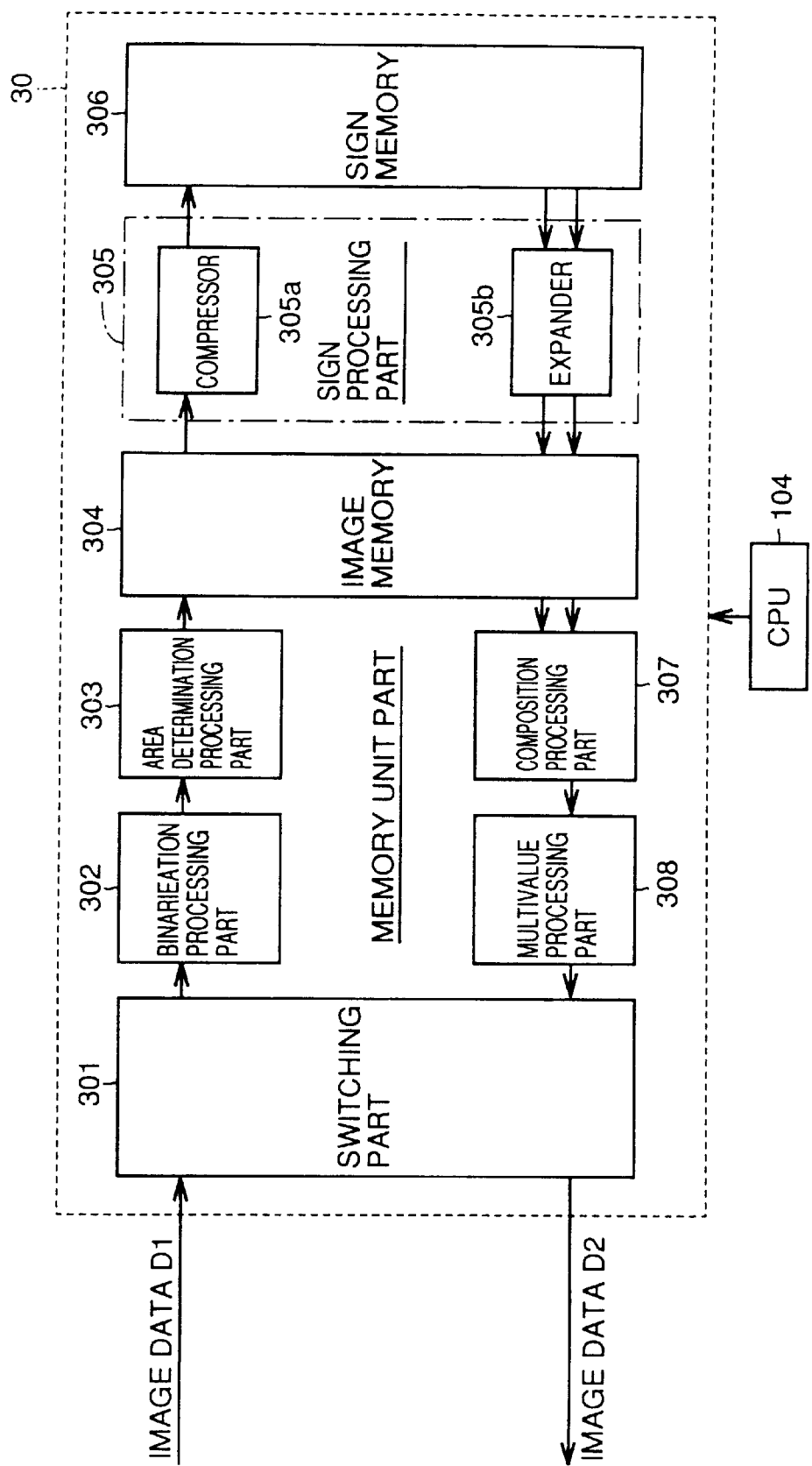
FIG. 4 is a block diagram showing the structure of a memory unit part 30 shown in FIG. 3.

FIG. 2 shows an operation panel OP of this copying apparatus. FIG. 3 shows the overall structure of the control circuit for the copying apparatus according to this embodiment, and FIG. 4 shows the circuit structure of the memory unit part 30 shown in FIG. 4.

As shown in FIG. 2, the operation panel OP is provided thereon with a ten-key pad 92 for inputting numerics such as the number of copies, the copying magnification and the like, a clear key 93 for returning the numerics or the like to standard values, a panel reset key 94 for returning set values set in the copying apparatus to standard values, a stop key 95 for inputting stoppage of the operation, a start key 96 for inputting starting of the operation, an interruption key 99 for interrupting a copy operation or a preserved print operation for performing another copy operation or entering a scheduling mode, and a liquid crystal panel 91 for displaying a message, a touch panel switch or the like.

Figure 7:
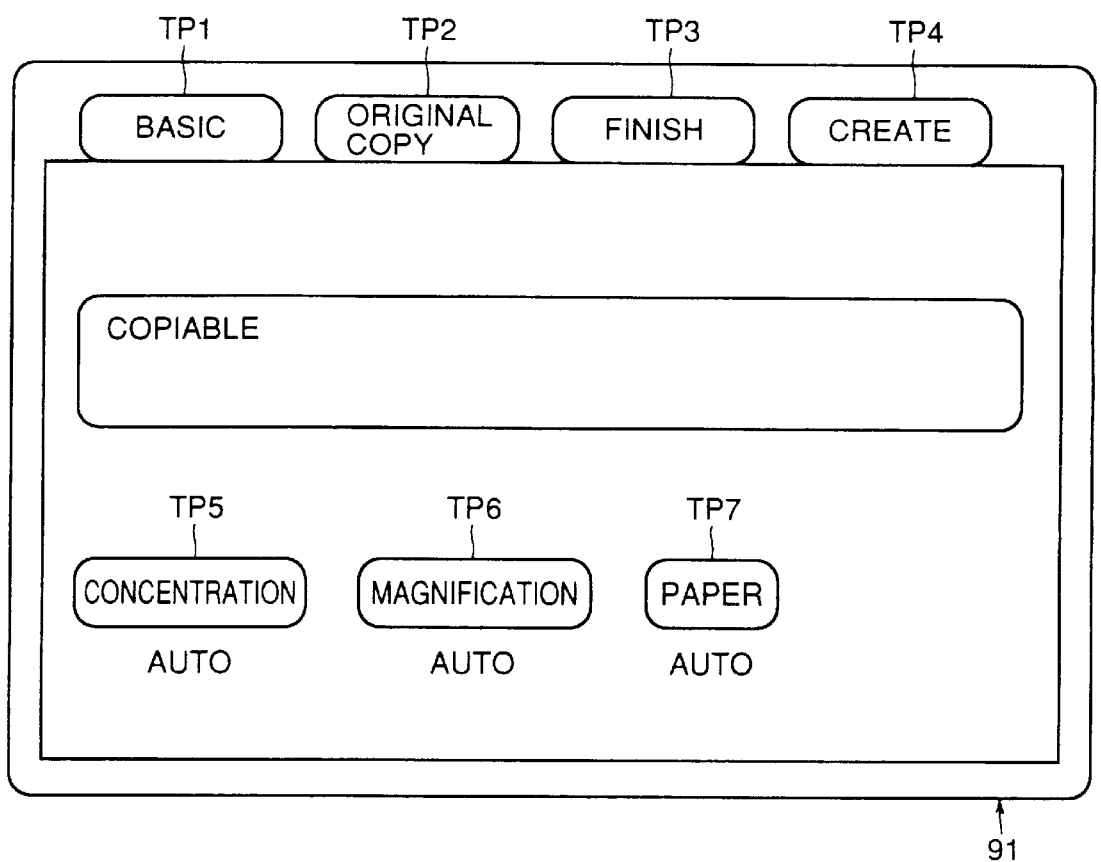
FIG. 7 is an explanatory diagram showing switches etc. displayed on a liquid crystal panel 91 of the operation panel shown in FIG. 2.

The liquid crystal panel 91 displays a basic switch TP1, an original copy switch TP2, a finish switch TP3, a create switch TP4, a concentration switch TP5, a magnification switch TP6 and a paper switch TP7 in response to the mode, as shown in FIG. 7. The liquid crystal panel 91 also displays information as to the operating states of the copying apparatus such as the exposure level, the copying magnification and the recording paper size, various types of abnormal states of the copying apparatus such as occurrence of a jam, a service man call and a paper empty state, specification of the concentration, the copying magnification and the copy operation for the recording paper, and the like. The copying apparatus may be switched to a scheduling mode for inputting information as to reservations, reservation change, addition, elimination and the like.

As shown in FIG. 3, the control circuit for the copying apparatus is formed by five CPUs 101 to 105. The CPUs 101 to 105 are connected with ROMs 111 to 115 storing programs respectively, RAMs 121 to 125 serving as working areas and the like respectively. The CPUs 101 to 105 are interconnected with each other on a command line, for exchanging necessary command information. Image data are inputted/outputted through an image data line. In such input/output, blocks which are controlled by the CPUs 101 to 105 respectively are connected to the image data line through bus switches 161 to 165 respectively.

The CPU 101 is adapted to accept inputs from the operation keys 92 to 96 and 99 of the operation panel OP and the touch panel switches TP1 to TP7 of the liquid crystal panel 91, for controlling the display on the liquid crystal panel 91. Therefore, an I/O 131 provided in the block of the CPU 101 is connected with the respective key switches of the operation panel OP, an LED and the liquid crystal panel 91. An NVRAM 141 provided in the block of the CPU 101 stores initial mode setting for the operation panel OP, a total counter and item counters.

The CPU 102 controls the original processing part 10 and the image processing part 20. Therefore, an I/O 132 provided in the block of the CPU 102 is connected with a driving circuit for a scanner motor for moving the exposure lamp 11 and the reflecting mirrors 12, 13 and 14 of the original read part 10b in a subscanning direction. An image signal from the CCD 19 is inputted in the image processing part 20, subjected to prescribed processing, and converted to image data. The image data converted by the image processing part 20 is transferred to the memory unit part 30 provided in the block of the CPU 104.

The image processing part 20 is formed by well-known image processing circuits such as an A-D converter, a shading correction circuit, a variable power circuit, a picture quality correction circuit and the like. The image signal inputted from the CCD 19 is A-D converted and quantized into 8-bit image data every pixel, subjected to shading correction, variable power processing, picture quality correction and the like, and outputted to the memory unit part 30 as the image data.

The CPU 103 controls the printer part 50. Therefore, an I/O 133 provided in the block of the CPU 103 is connected with a main motor for driving various types of members provided in the printer part 50 and driving circuits for various types of clutches. The I/O 133 is supplied with detection signals from various types of sensors such as the paper sensors SE11 to SE14 for detecting presence/absence of papers in the paper feed trays 591 to 594, the weight sensors SE101 to SE104 for detecting the weights of the papers in the paper feed trays 591 to 594 and the like which are arranged in the printer part 50. The print processing part (print circuit) 51 provided in the block of the CPU 103 is connected with a driving circuit for the laser diode 510.

The CPU 104 performs overall timing adjustment of the control circuit and processing of setting operation modes. The CPU 104 also controls the memory unit part 30. Namely, the CPU 104 stores read image data D1 in an image memory 304 and a sign memory 306, and reads image data D2 in a print operation for outputting the same to the print processing part (print circuit) 51.

As shown in FIG. 4, the memory unit part 30 is formed by a switching part 301, a binarization processing part 302 for creating binary data on the basis of parameters set by the CPU 104, an area determination processing part 303 for determining areas of respective images in case of composing the images, the multi-port image memory 304 of 400 dpi having a capacity for the A4 size, a sign processing part 305 having a compressor 305a and an expander 305b which can operate independently of each other, the multi-port sign memory 306, a composition processing part 307, and a multivalue processing part 308.

The CPU 105 performs scheduling in a scheduling mode. Thus, the block of the CPU 105 is provided therein with an operation processor 155 for operating scheduling, the RAM 125 for preserving reserved data, an NVRAM 145 for preserving look-up tables $T_2$ and $T_3$ described later, and the ROM 115 storing look-up tables $T_1$ and $T_4$ described later.

3. Outline of Copy Operation Control

Figure 5:
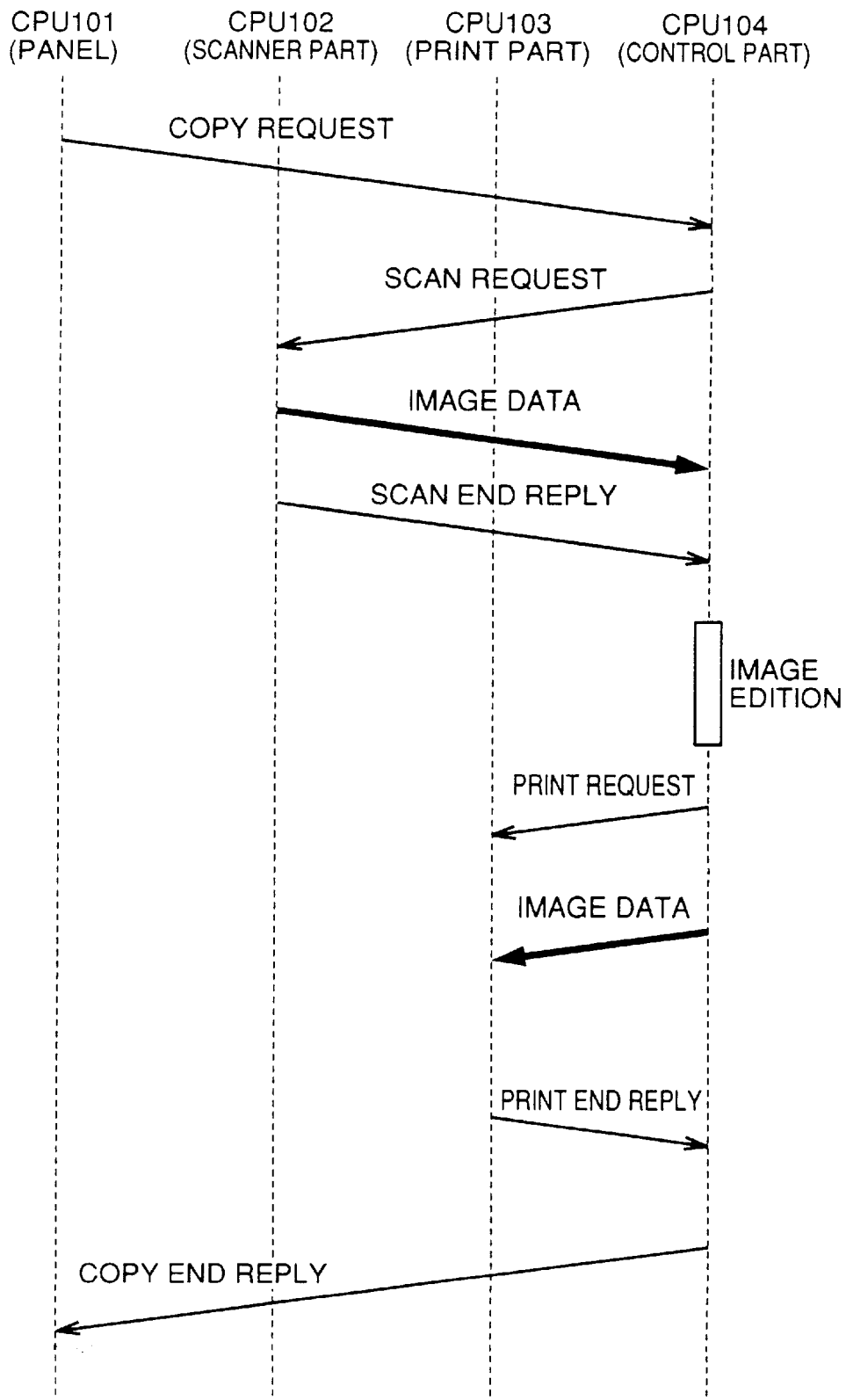
FIG. 5 is an explanatory diagram showing transition of processing by each CPU as to a copy sequence executed by each CPU of the control circuit shown in FIG. 3.

With reference to FIG. 5, commands such as requests and replies transmitted/received between the CPUs 101 to 104, data flows and the like in copy operation control are described. Description as to unimportant requests and replies is omitted. In the copy operation mode, image data read by the original read part 10b and created by the image processing part 20 is temporarily written in the image memory 304, compressed and stored in the sign memory 306, and thereafter data-converted in the memory unit part 30.

When the start key 96 is pushed down, the CPU 101 issues a copy request command to the CPU 104. In response to this, the CPU 104 issues a scan request command to the CPU 102. Thus, the CPU 102 starts scanning, and performs image processing in response to the set image processing mode when reaching an original image area. The CPU 102 outputs the processed image data to the memory unit part 30. The image memory 304 stores this image data.

The CPU 104 further compresses the image data stored in the image memory 304 for converting the same to sign data, and stores the data in the sign memory 306.

When the original image is completely read, the CPU 102 issues a scan end reply command to the CPU 104. In response to this, the CPU 104 performs image edition. When this image edition is ended, the CPU 104 issues a print request command to the CPU 103. The CPU 104 further outputs the image data to the print processing part 51. The print processing part (print circuit) 51 converts the image data to print data, thereby executing a print operation.

When the print operation is ended, the CPU 103 issues a print end reply command, to clear the memory and end the operation. Thereafter the CPU 104 outputs a copy end reply command to the CPU 101.

Thus, the copy operation is controlled.

4. Outline of Control in Each CPU

With reference to FIGS. 6 and 8 to 10, the outline of control in each CPU is now described.

4-1. CPU 101

Figure 6:
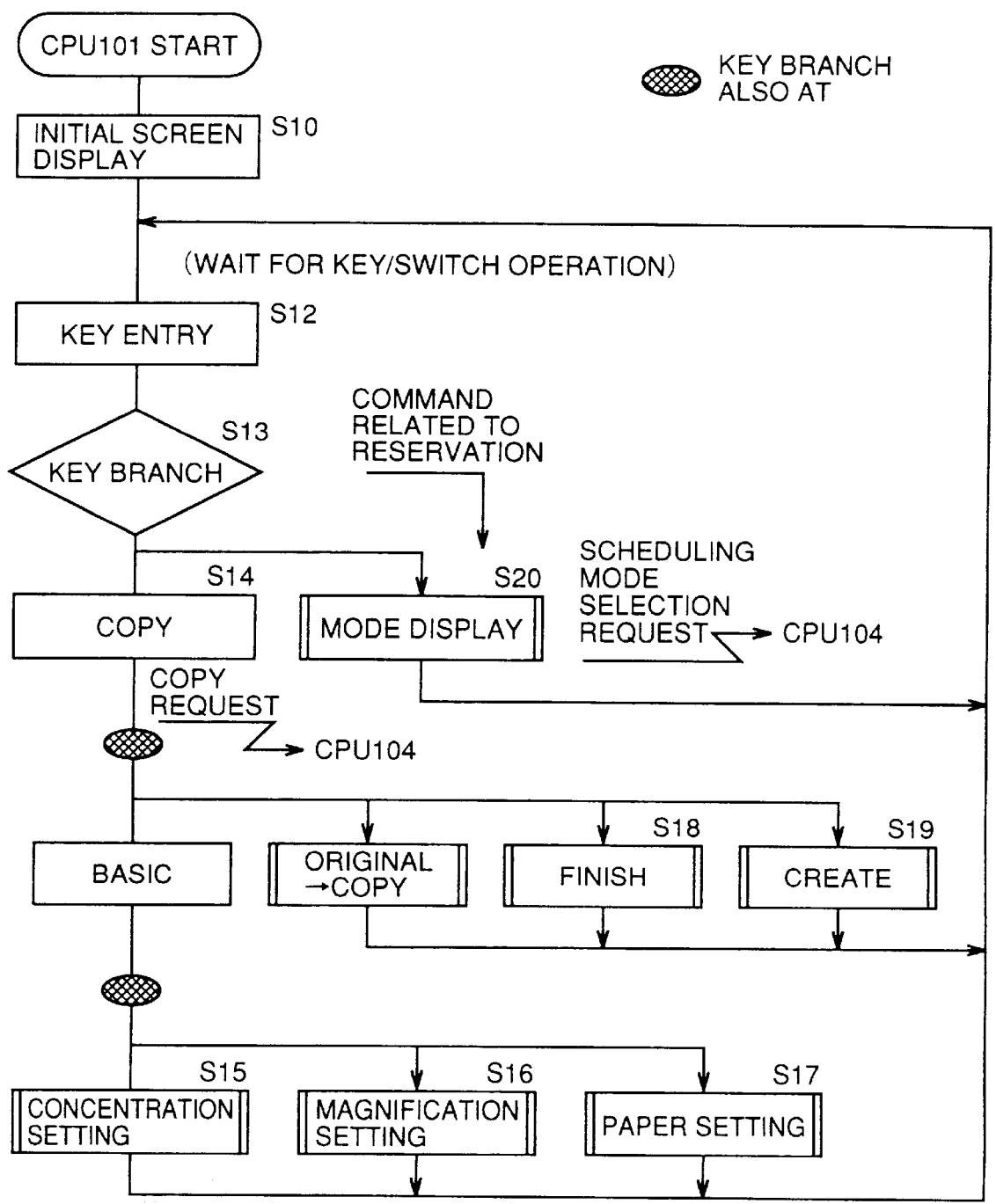
FIG. 6 a flow chart showing processing executed in a CPU 101 shown in FIG. 3.

FIG. 6 shows the processing in the CPU 101 for controlling the operation panel.

In a copy display routine, an initial screen (refer to FIG. 7) for copying is loaded from the NVRAM 141 and displayed on the liquid crystal panel 91 (S10). Thus, the process enters a waiting state for inputs from the touch panel switches TP1 to TP7 of the liquid crystal panel 91 and the operation keys 92 to 96 and 99.

When an input is made by any of the touch panel switches TP1 to TP7 of the liquid crystal panel 91 and the operation keys 92 to 96 and 99, the operated key or switch is detected and the process branches to a display mode corresponding to the result of the detection. When the finish switch TP3 is pushed down on a basic screen for copying, for example, the process branches to a finish routine (S18). If the concentration set key TP5 is pushed down, on the other hand, the process is shifted to a concentration set routine (S15) to enter a wait state for an input of concentration setting. Various set operations are performed in the concentration set routine (S15), a magnification set routine (S16), a paper set routine (S17) and the like.

When the start key 96 is pushed down, the process enters a copy routine (S14) to transmit a copy request command to the CPU 104. When a key or a switch related to a reservation is operated, on the other hand, the process enters a scheduling mode, i.e., is shifted to a mode display routine (S20). Thus, the CPU 101 transmits a selection request command for the scheduling mode to the CPU 104.

4-2. CPU 104

Figure 8:
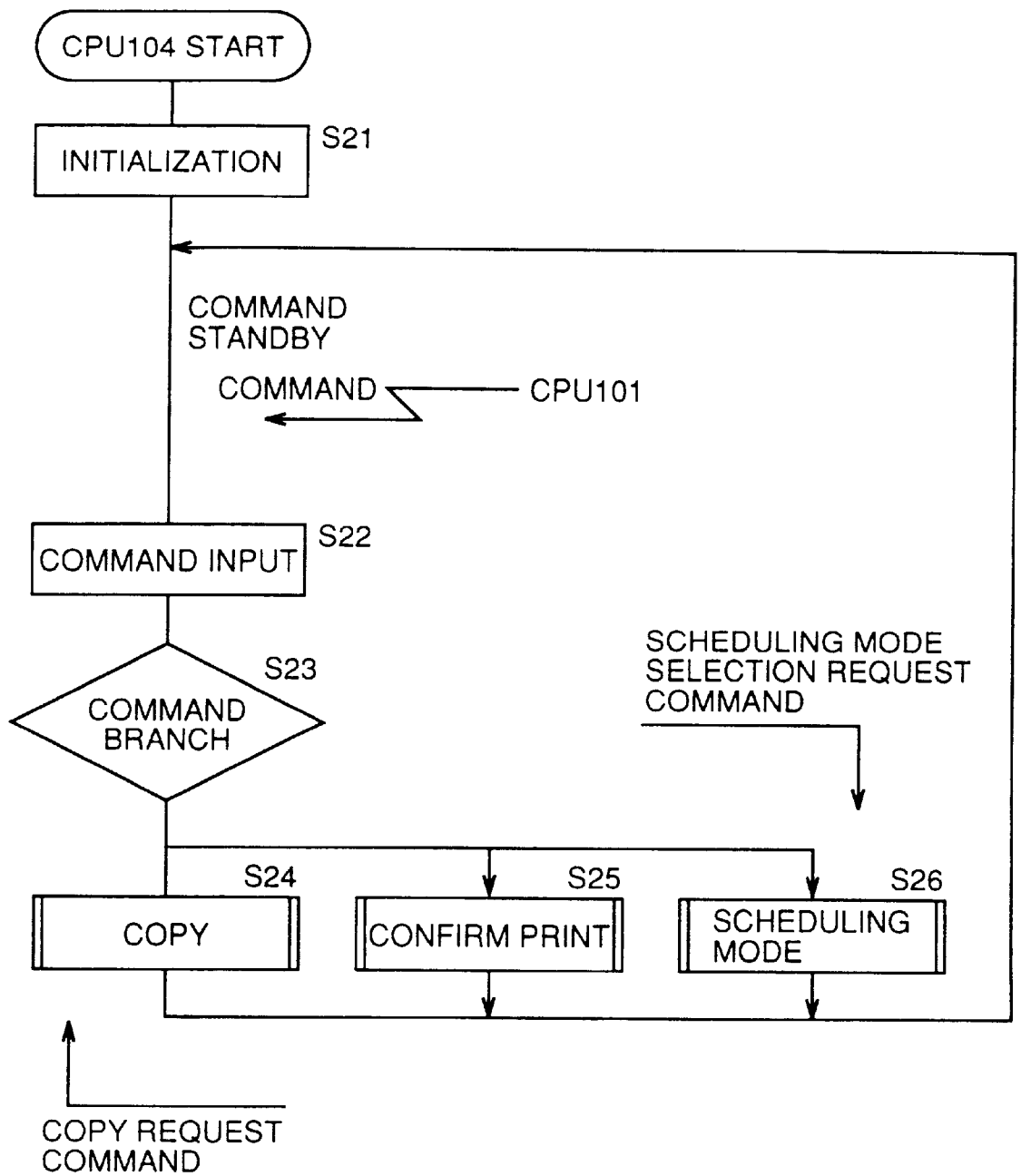
FIG. 8 is a flow chart showing processing executed in a CPU 104 shown in FIG. 3.

FIG. 8 shows the processing in the CPU 104 for controlling the overall timings.

When power is supplied, initialization is made by the program registered in the ROM 114, and the process enters a wait state for a command from the CPU 101.

When a command is inputted, the process branches to processing corresponding to the inputted command. When a copy request command is inputted, for example, the process enters copy control processing (S24). If a selection request command for the aforementioned scheduling mode is inputted, on the other hand, the process enters a scheduling mode (S26) for setting or changing print data related to a reserved copy in correspondence to the input thereof, so that the CPU 105 thereafter performs a scheduling operation etc. This scheduling mode is described later.

4-3. CPU 102

Figure 9:
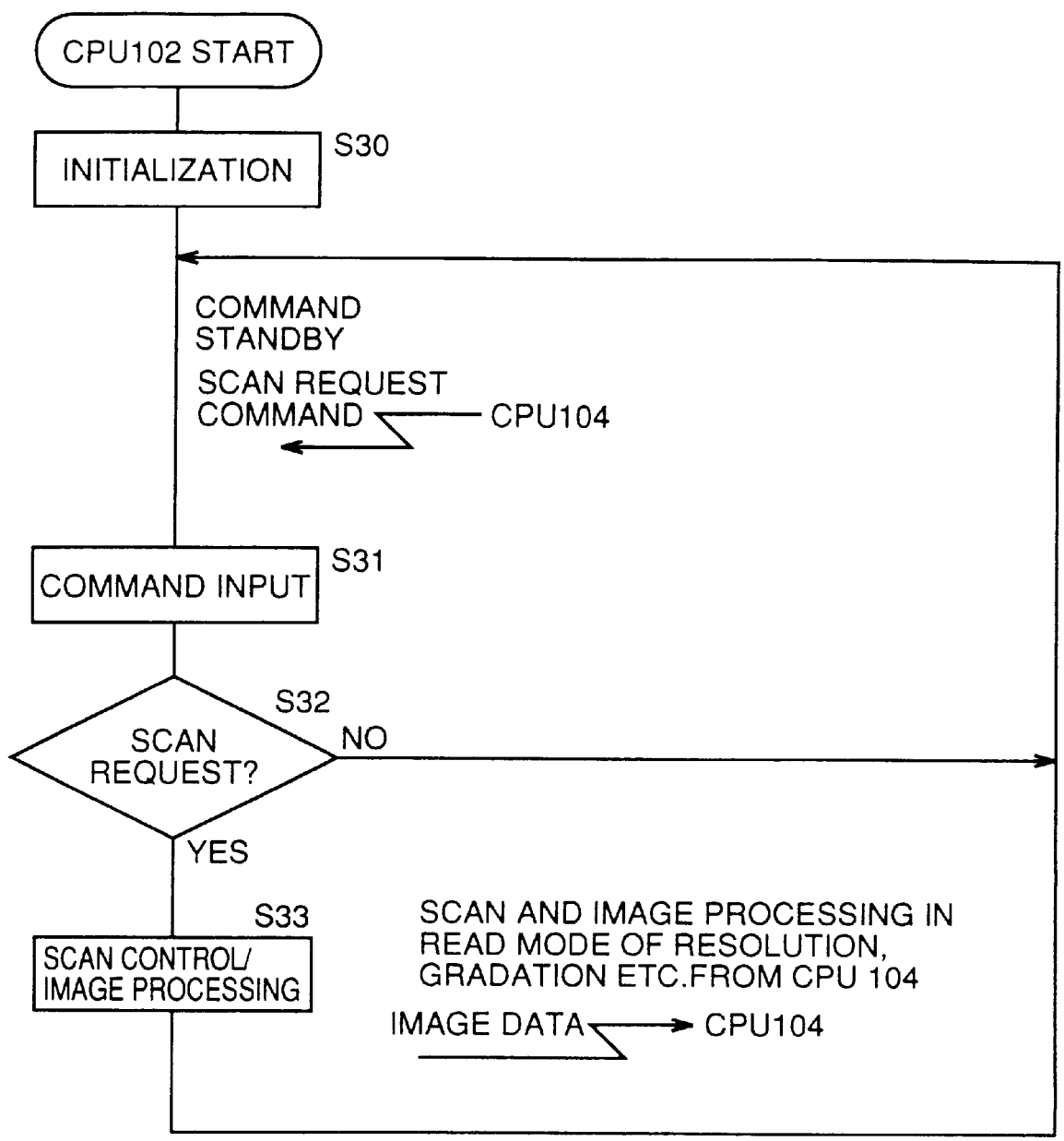
FIG. 9 is a flow chart showing processing executed in a CPU 102 shown in FIG. 3.

FIG. 9 shows the processing in the CPU 102 for controlling the original processing part 10 consisting of the original transport part 10*a* and the original read part 10*b*. Description is omitted as to the control of the original transport part 10*a*.

When power is supplied, initialization is made by the program registered in the ROM 112 (S30), and the process enters a wait state for a command from the CPU 104.

When a command is inputted from the CPU 104 (S31) and a scan request is detected (YES at S32), the process enters a scan control/image processing routine (S33). In the scan control/image processing routine (S33), original scanning and image processing are performed in an image read mode responsive to resolution, gradation etc. inputted along with the scan request from the CPU 104, so that image data thereby formed is transmitted to the CPU 104.

4-4. CPU 103

Figure 10:
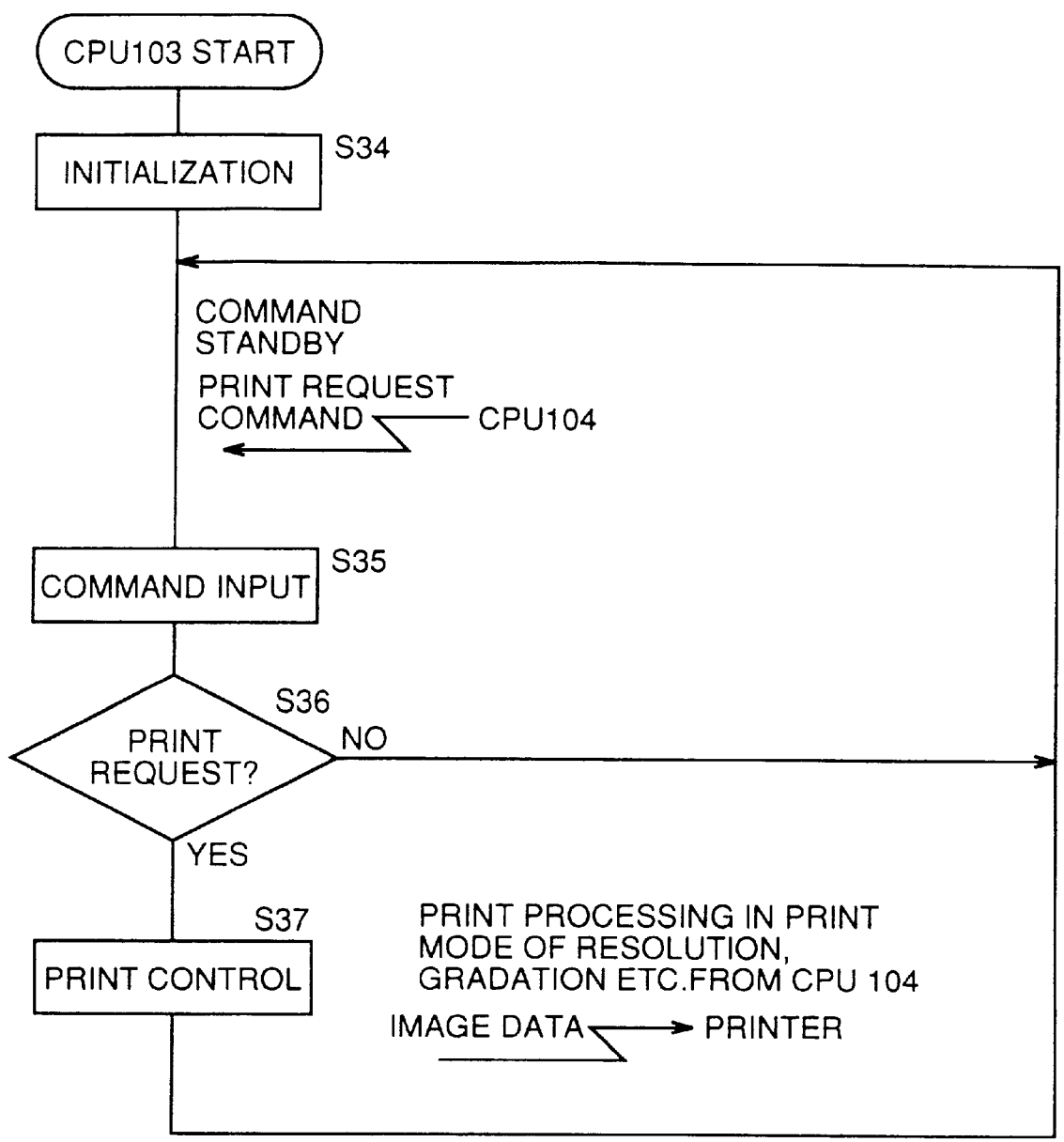
FIG. 10 is a flow chart showing processing executed in a CPU 103 shown in FIG. 3.

FIG. 10 shows the processing in the CPU 103 for controlling the printer part 50.

When power is supplied, initialization is made by the program registered in the ROM 113, and the process enters a wait state for a command from the CPU 104.

When a command is inputted from the CPU 104 (S35) and a print request is detected (YES at S36), the process enters a print control routine (S37). In the print control routine (S37), print processing is performed in a print mode responsive to resolution, gradation etc. inputted along with the print request from the CPU 104, so that created print data is transmitted to the print processing part 51. Thus, a print operation is performed.

5. Scheduling Mode

With reference to FIGS. 11 to 16, the scheduling mode is now described.

In the scheduling mode, execution of a print operation can be reserved while specifying the deadline (print end time) in relation to an original to be printed. Namely, it is possible to reserve a print operation to be executed in a time zone for performing no general copy operation so that prints can be obtained by the deadline. Such reservations can be made for a plurality of original groups, and modifications and additions are available. An original read operation is immediately executed after completion of reserve setting and stored in the image memory 304 (sign memory 306), to be read out at the reserved time for a print operation.

When a reservation for a print operation is inputted, a required time for the printing is operated on the basis of data such as the original size, the number of the originals, the print size, the number of printing etc. for the reserved printing and parameters of the apparatus such as an actual required time per print of each size in each parameter and the like, so that the print execution time zone is adjusted not to overlap with a print time zone for an already reserved copy on the basis of the operated required time and the deadline (desired end time), and a time table is created. In this adjustment, an ordinary copy (interruption copy) executed in a non-reserved state, a time required for supplying recording papers and the like are also taken into consideration, to determine whether or not each reserved copy can be printed by the deadline. Further, a consideration is made so that a copy operation (hereinafter referred to as "interruption copy") instructed in a non-reserved state can be performed with no wait time.

5-1. Reserved Data Input

When an operation input related to a reservation is made from the operation panel OP, the CPU 101 transmits a selection request command for the scheduling mode, as described above. Thus, the CPU 104 enters the scheduling mode.

Figure 11:
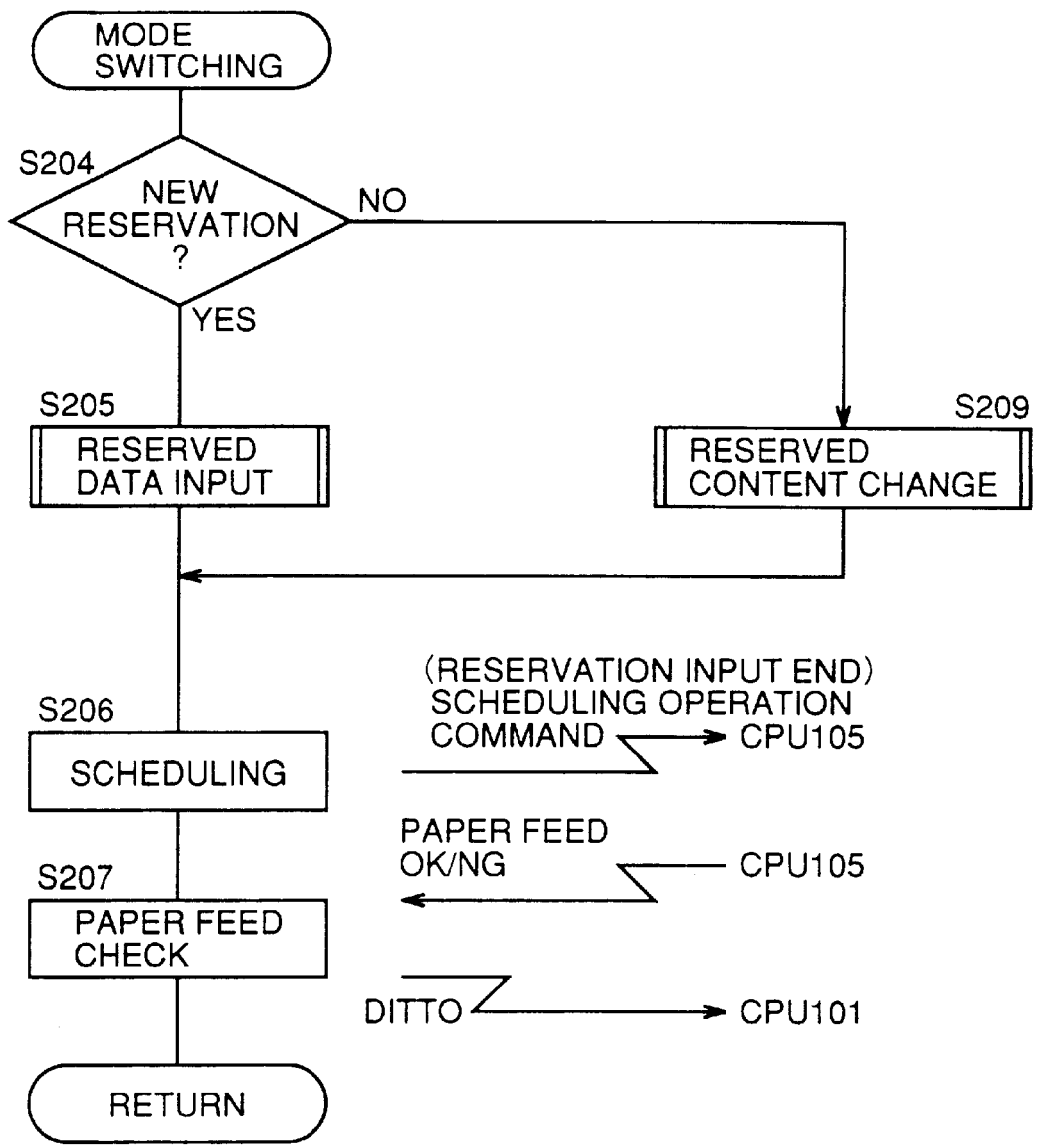
FIG. 11 is a flow chart showing mode switching processing in a scheduling mode executed in the CPU 104 shown in FIG. 3.

In the scheduling mode, the CPU 104 inputs reserved data (S205) if the CPU 101 transmits a command indicating a new input, as shown in FIG. 11. If the inputted command does not indicate a new input, on the other hand, the reserved content is changed (S209).

Figure 12:
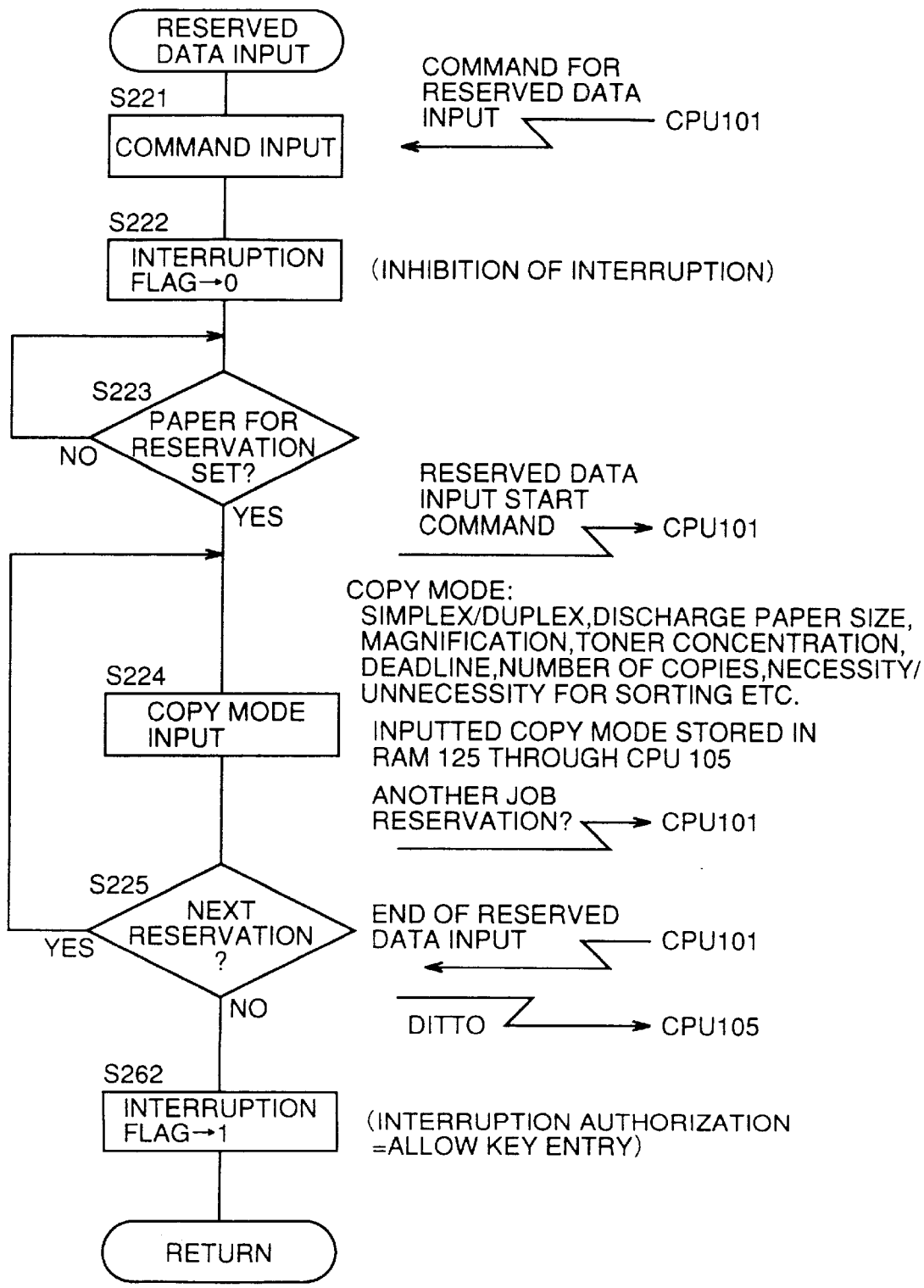
FIG. 12 is a flow chart showing the procedure of reserved data input processing executed in the CPU 104 shown in FIG. 3.

In reserved data input processing, an interruption flag is first reset to zero (S222) to inhibit interruption, as shown in FIG. 12. Then, setting of originals for the reserved copy is waited. When the originals for the reserved copy are set (YES at S223), the process enters an input wait state for a copy mode related to the reserved copy (print data: simplex or duplex copy, the discharge paper size, the printing magnification, the toner concentration, the deadline (desired end time), the number of copies, necessity/unnecessity for sorting etc.). Namely, an input start command for the reserved data is transmitted to the CPU 101. Thus, the CPU 101 makes a display urging the user to input the print data on the liquid crystal panel 91, and transmits the print data inputted from the operation panel OP to the CPU 104. Thus, the print data are inputted and ascertained, so that the ascertained print data are transmitted to the CPU 105 through the command line and stored in the RAM 125 provided in the block of the CPU 105. This processing is repeatedly executed up to completion of the final reservation (S225).

When all reserved data are completely inputted and the CPU 104 is informed of this effect from the operation panel OP through the CPU 101 (YES at S225), the CPU 104 further informs the CPU 105 of this effect, so that the CPU starts a scheduling operation described later. In this scheduling operation, the print data stored in the RAM 125 are employed. The print data for the reserved copy stored in the RAM 125 are read at a print start time for this reserved copy, for controlling the print operation for the reserved copy.

In the CPU 104, the interruption flag is set (S262) when the reserved data are completely inputted, to authorize interruption.

5-2. Change of Reserved Content

Figure 13:
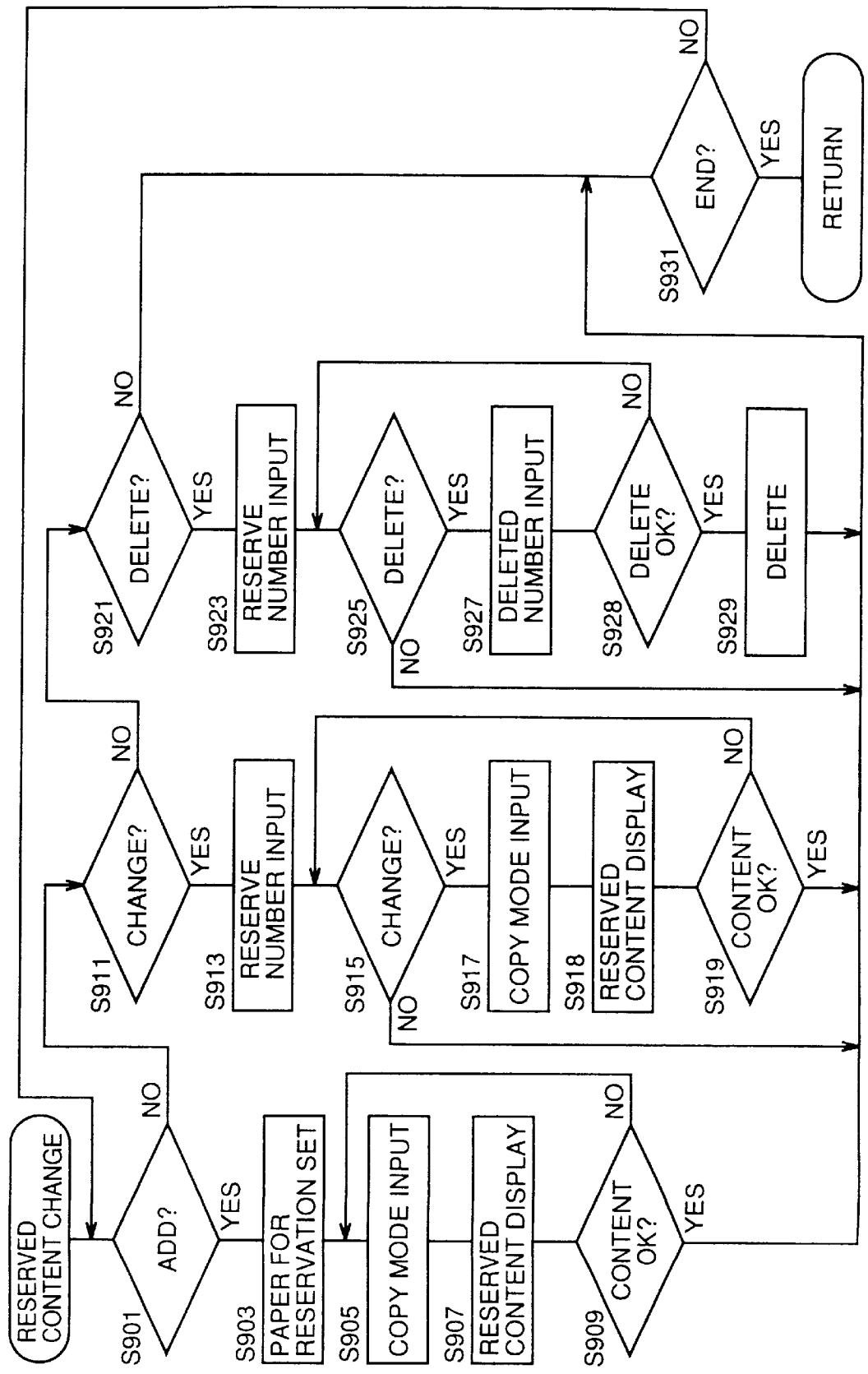
FIG. 13 is a flow chart illustrating the content of reserved content change processing executed in the CPU 104 shown in FIG. 3.

If a command not instructing a new input is transmitted from the CPU 101 before entering the scheduling mode, reserved content change processing (S209) is performed. FIG. 13 shows the reserved content change processing in detail.

If addition of a reservation is selected (YES at S901) in the reserved content change processing as shown in FIG. 13, the liquid crystal panel 91 makes a display for urging the user to make an additional input substantially similarly to the aforementioned case of the reserved data input, while the CPU 101 transmits and set data of a copy mode additionally inputted from the operation panel OP to and in the CPU 104. Further, ascertained print data are updated and stored in an area of the RAM 125 for the reserved copy.

When reservation change is selected (YES at S911), on the other hand, print data of a reserved copy number specified as the target of the change is read from the RAM 125 and displayed on the liquid crystal panel 91 (S913), so that the liquid crystal panel 91 makes a display for urging the user to make a change input with respect to the displayed print data substantially similarly to the aforementioned case of the reserved data input, and print data of a copy mode inputted from the operation panel OP are transmitted from the CPU 101 to the CPU 104 and updated. Print data ascertained after the update are stored in an area of the RAM 125 for the reserved copy.

When elimination of the reservation is selected (YES at S921), print data of the reserved copy number specified as the target of elimination are read from the RAM 125 and displayed on the liquid crystal panel 91 (S923), a display for confirming elimination of the displayed print data is made and thereafter elimination authorization is inputted from the operation panel OP, so that the print data of the reserved copy number are eliminated from the area of the RAM 125 for the reserved copy (S929).

When addition/change/elimination of all reservations is completed and the CPU 104 is informed of this effect from the operation panel OP through the CPU 101 (YES at S931), the CPU 104 further informs the CPU 105 of this effect, whereby the CPU 105 starts the scheduling operation described later. In this scheduling operation, the print data after the addition/change/elimination stored in the RAM 125 are employed. In the CPU 104, the interruption flag is set to authorize interruption when the reserved content change processing is completed, similarly to the aforementioned case of the reserved data input.

5-3. Scheduling Operation

Figure 14:
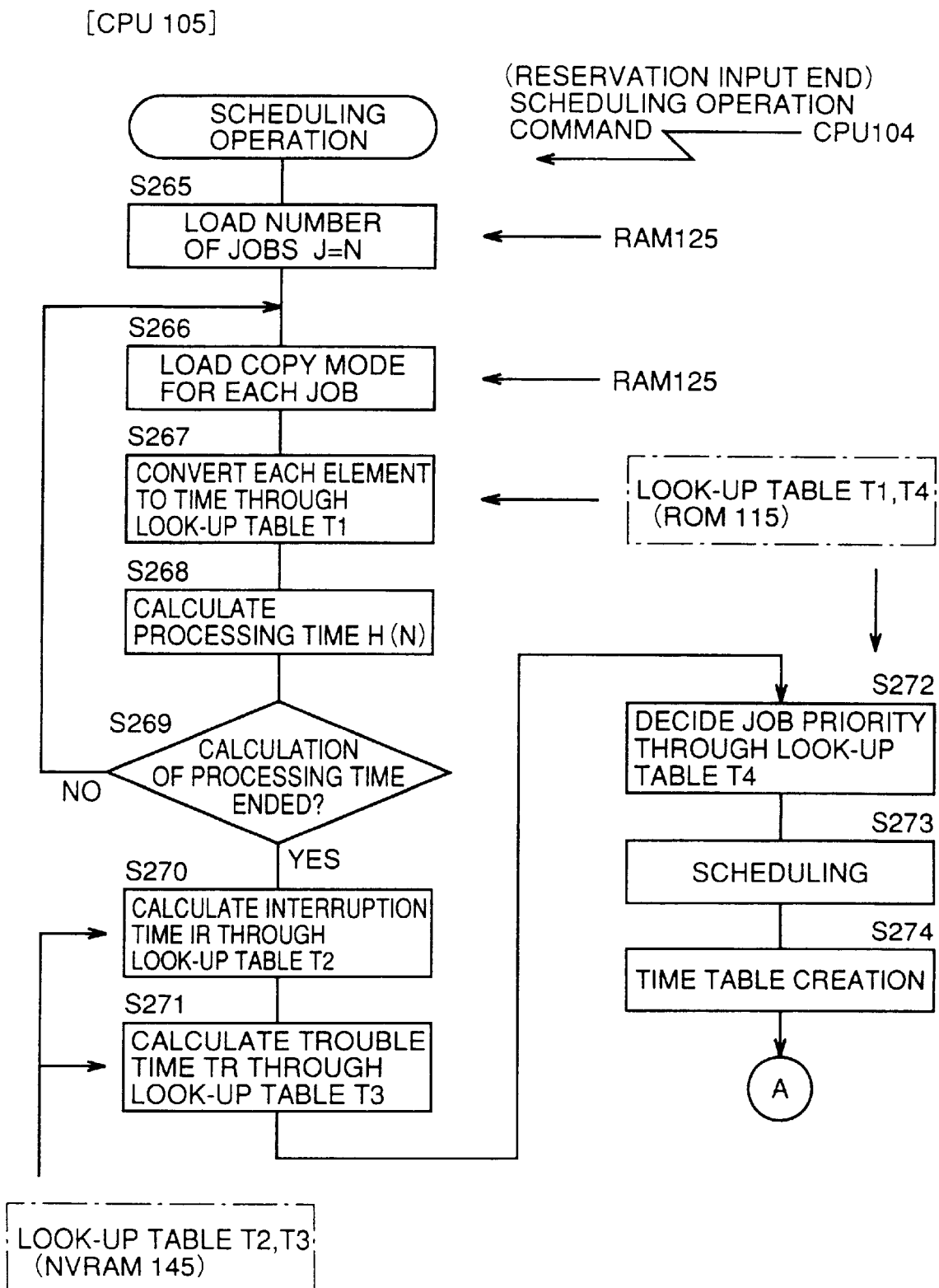
FIG. 14 is a part of a flow chart showing the procedure of a scheduling operation executed in a CPU 105 shown in FIG. 3.
Figure 15:
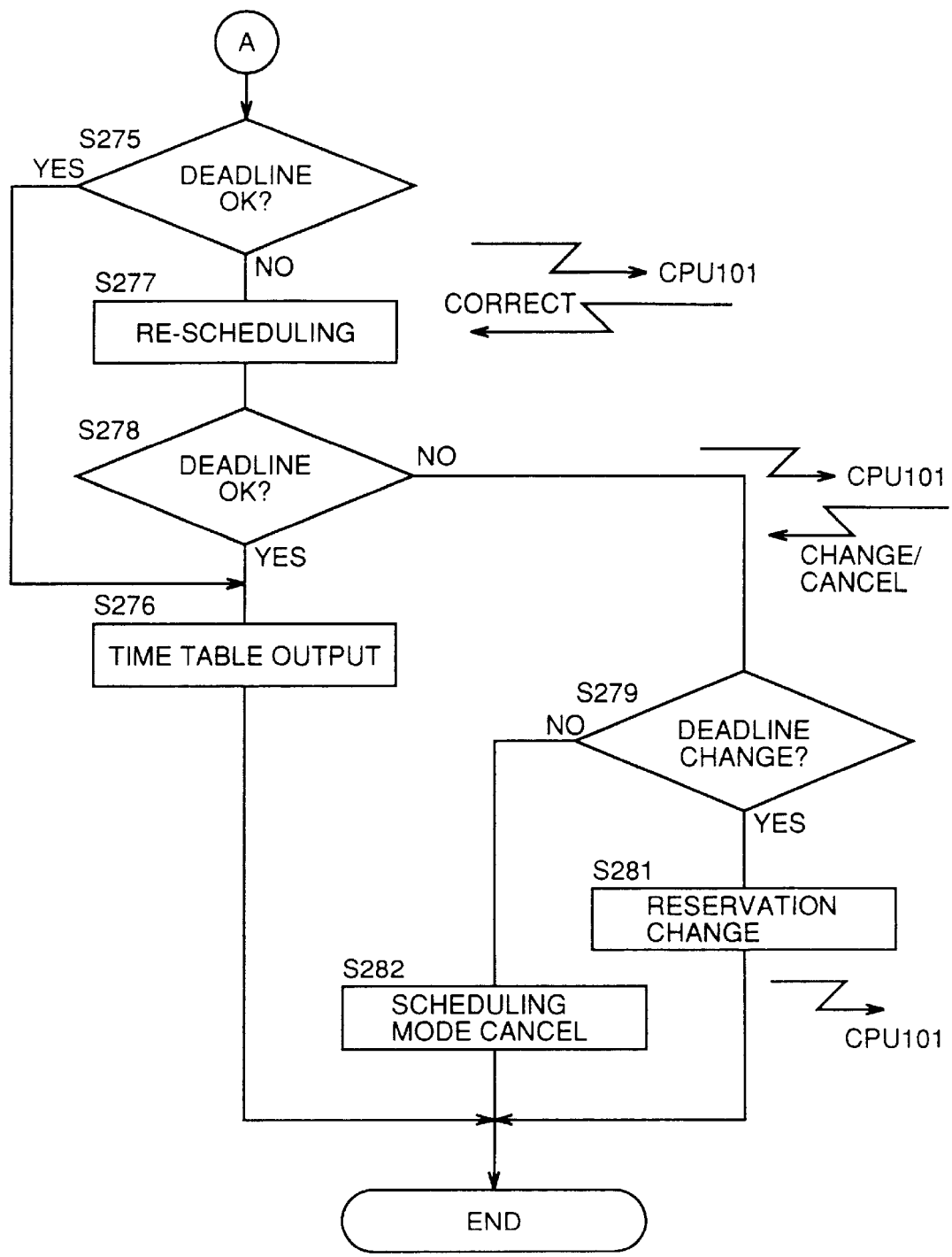
FIG. 15 is the remaining part of the flow chart showing the procedure of the scheduling operation executed in the CPU 105 shown in FIG. 3.

When the input of the reserved data or the addition/change/elimination of the reserved content is completed, the CPU 105 is informed of this effect, so that the scheduling operation thereof is started. FIGS. 14 and 15 show this scheduling operation.

As shown in these figures, a required time H(N) for the print operation for each reserved copy is operated with reference to the look-up table $T_1$ (S265 to S269), thereafter a required time IR for an interruption copy is operated with reference to the look-up table $T_2$ (S270) while a time TR required for supplying recording papers is operated with reference to the look-up table $T_3$ (S271), and priorities are decided with reference to the look-up table $T_4$ (S272), so that scheduling is performed (S273) and a time table is created (S274) on the basis thereof.

In relation to the created time table, a determination is made as to whether or not each reserved copy is ended by the deadline (S275), and if the copy is not ended (NO at S275), re-scheduling is performed (S277). If a determination is made that the copy is ended by the deadline (YES at S275), the data of the time table are transmitted to the CPU 101 and displayed on the liquid crystal panel 91 (S276). After this display, a job processing start command is inputted from the operation panel OP through the CPU 101, thereby ending the scheduling operation.

If a determination is made that any reserved copy is not ended by the deadline even after the re-scheduling (NO at S278), data of this effect is transmitted to the CPU 101 and displayed on the liquid crystal panel 91, for urging the user to change or cancel the reservation. When the user inputs reservation change or cancellation from the operation panel OP in response to this, the CPU 101 transmits data of this effect to the CPU 105 (S279), for changing or canceling the reservation (S281 or S282).

The scheduling operation is performed in the aforementioned manner.

5-3-1. Operation of Required Time H(N) for Reserved Copy

As shown in FIG. 14, the number N of reserved jobs (number of reserved copies) is first read from the RAM 125 and set at a variable J (S265). Then, print data of the respective reserved copies are read from the RAM 125 (S266), while the look-up table $T_1$ is read from the ROM 115. FIG. 21a to 21d show examples of the look-up table $T_1$.

Then, the respective elements of the aforementioned print data are converted into times with reference to the look-up table $T_1$ respectively (S267), and the required times H(N) for print operations for the reserved copies are operated (S268).

Each required time H(N) is operated in the following manner:

Assuming that $H_1$, $H_2$, $H_3$, $H_4$, $H_5$, $H_6$ and $H_7$ represent values obtained by time-converting the number of image input screens (number of scan times), an image input paper size, an output system, an output magnification, a toner concentration, an output paper size and a discharge system respectively, $H_n$ is expressed as follows:

$$H_n = K_n a_n (n=1, 2, \ldots)$$

where $K_n$ represents a coefficient, which is decided through the look-up table $T_1$, and $a_n$ represents a reference time, which is a constant.

Thus, the required time H(N) is operated by totaling n as 1 to n in the following expression:

$$H(N) = 3(K_n a_n)$$

5-3-2. Operation of Required Time IR for Interruption Copy etc

As hereinabove described, the required time IR for an interruption copy is operated with reference to the look-up table $T_2$ (S270). The time TR required for supplying the recording papers is operated with reference to the look-up table $T_3$ (S271). Further, the priorities of the reserved copies are decided with reference to the look-up table $T_4$ shown in FIG. 23 (S272).

Figure 18:
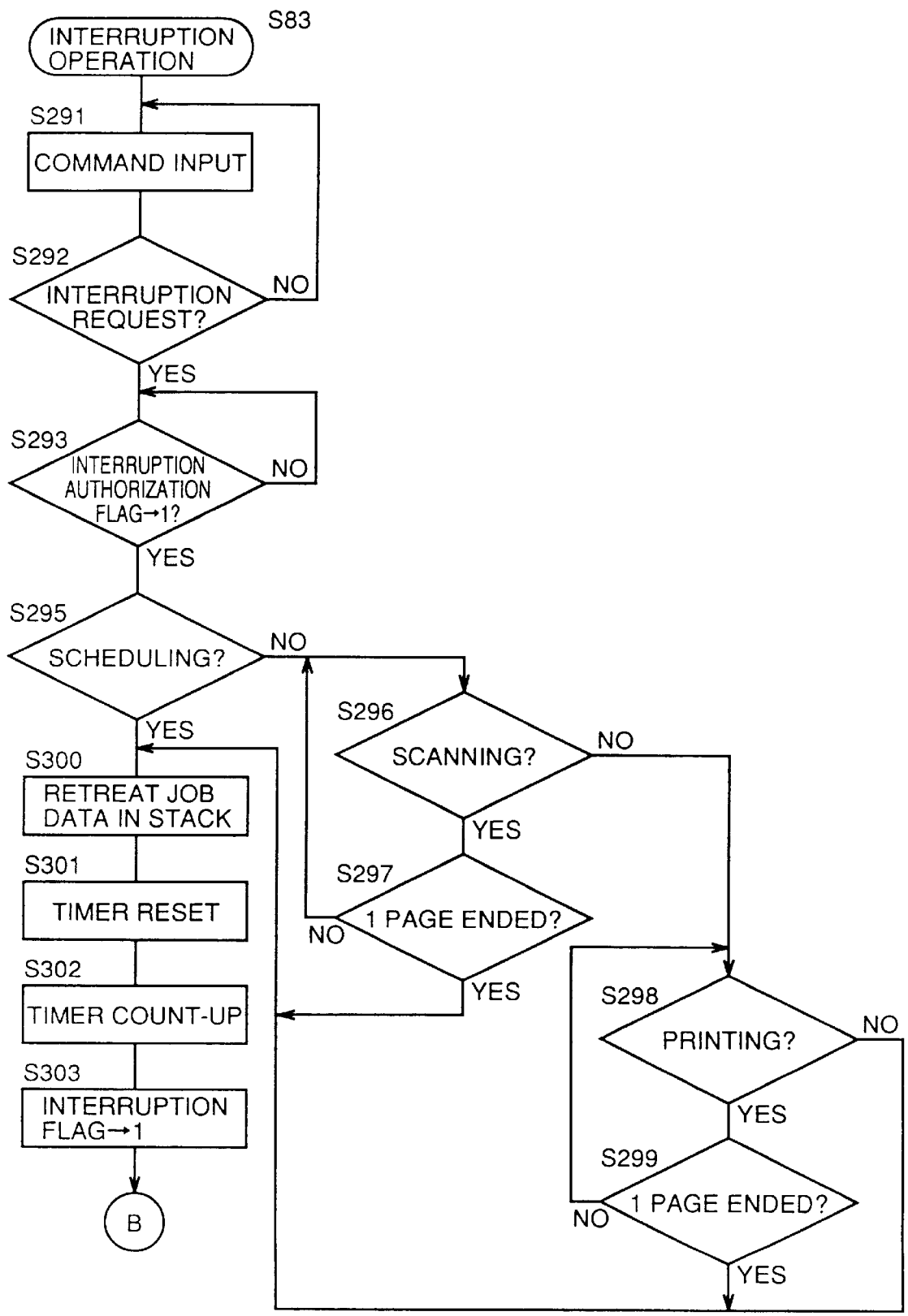
FIG. 18 is a part of a flow chart showing control in an interruption copy operation.
Figure 19:
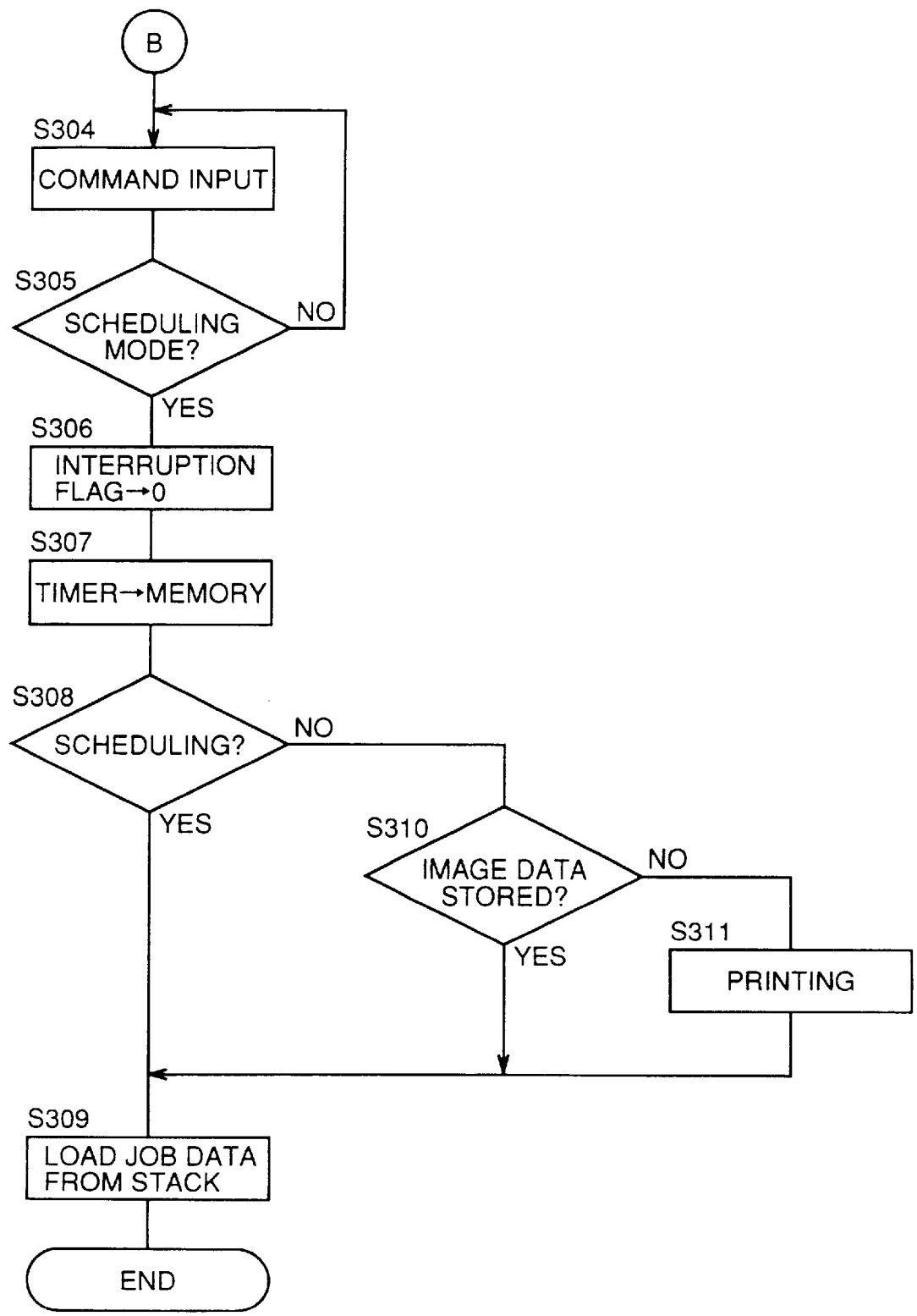
FIG. 19 is the remaining part of the flow chart showing the control in the interruption copy operation.

The required time IR for the interruption copy is counted every occurrence of the interruption copy, so that the NVRAM 145 stores the value (refer to steps S301, S302 and S307 in FIGS. 18 and 19). Similarly, the time TR for supplying the recording papers is counted every supply, so that the NVRAM 145 stores the value (refer to steps S323, S324 and S327 in FIG. 20).

Thus, the NVRAM 145 daily totals the data stored therein, and preserves values $IR_d$ and $TR_d$ by the newest M times. Assuming that D represents the number of operating days of the image processing unit per year inputted by the operator, the number M is expressed as follows:

$$M = D/12$$

The time consumption IR (daily average value of $IR_d$) of daily interruption copies is expressed as follows:

$$IR = \{3(IR_d)\}/M$$

In this expression, the value IR is operated by totaling d as 1 to M. This value IR is daily operated at a constant time, and preserved in the look-up table $T_2$.

Assuming that $X_k$, $X_{dk}$ and $X_d$ represent the number of papers storable in the paper feed trays 591 to 594, a value obtained by counting the number of daily discharged papers in a specified time every paper feed tray, and the total thereof respectively, an average number Cp of daily copies is expressed as follows:

$$Cp = \{3X_d\}/M$$

In this expression, the value Cp is operated by totalling d as 1 to M. Assuming that $TR_k$ (k=1, 2, \ldots) represents the time required for supplying recording papers to each paper feed tray, $TR_k$ is expressed as follows when $Xd_k/X_k$ is not a natural number:

$$TR_k(X_{dk}/X_k+1) \times k_{tr}$$

where $k_{tr}$ represents a single supply time, r represents the number of the trays, and k represents the tray number. If $X_{dk}/X_k$ is not a natural number, on the other hand, the value $TR_k$ is expressed as follows:

$$TR_k = (X_{dk}/X_k) \times k_{tr}$$

Thus, the daily time consumption TR is operated by totaling k as 1 to r in the following expression:

$$TR = 3(TR_k)$$

This value TR is operated with reference to the look-up table $T_3$.

5-3-3. Creation of Time Table

When the data are collected in the aforementioned manner, scheduling is performed (273) for creating the time table (S274).

As shown at (a) in FIG. 24, the reserved copies are retrieved in the order of ascending priorities. Symbols A, B, . . . denote the reserved jobs, symbols H(A), H(B), . . . denote the required times for the respective reserved jobs, symbols D(A), D(B), . . . represent the deadlines for the respective reserved jobs invoked from the RAM 125, and numerals 1, 2, . . . denote the priorities.

As shown at (b) in FIG. 24, the time table is then created by successively arranging the reserved jobs in the order of ascending priorities from a start time $S_{st}$ of scheduling management.

Then, times R(A), R(B), consumed by interruption copies and supply of the recording papers are inserted between the jobs of the aforementioned time table, thereby creating the time table shown at (c) in FIG. 24.

The values R(A), R(B), . . . are operated as shown at (a) in FIG. 25.

As to the values IR and TR read from the NVRAM 145, values IRh and TRh per unit time are calculated as follows:

IRh=IR/operating time
TRh=TR/operating time

On the basis thereof, the aforementioned values R(N) (N=A, B, . . . ) are operated as follows:

$$R(N) = H(N) \times (IRh + TRh)/\{(1-(IRh+TRh)\}$$

Thus, the scheduling is performed (S273), for creating the time table provided with the time consumption with interruption copies and paper supply (S274).

5-3-4. Determination of Deadline and Correction of Time Table

When the time table is created, a determination is made as to whether or not each reserved copy is ended by the deadline (S275), as hereinabove described. If any reserved copy is not ended by the deadline (NO at S275), re-scheduling is performed (S277).

The determination as to the deadline is made by comparing the end time (the right end of each period) of each value H(N) with each deadline D(N) at (c) in FIG. 24 for investigating whether or not the deadline D(N) is earlier than the end time (right end of each period) of the value H(N) (whether or not the former is on the left side of the latter in FIG. 24) as to every value N. For example, the right end of the H(C) period which is the end time of H(C) is later than (on the right side of) the time D(D) at (c) in FIG. 24.

Similarly, the right end of the H(D) period which is the end of H(D) is later than (on the right side of) the time D(D). Thus, the times H(C) and H(D) are determined as too late for the deadlines.

In this case, i.e., when there are slight delays in relation to the deadlines, the time table is corrected. This correction is made by adjusting the lengths of the times R(N).

The times H(C) and H(D) are too late for the deadlines at (c) in FIG. 24, and hence the maximum value of a (0<a<1) satisfying the following mathematical expression shown at (b) in FIG. 25 is obtained:

$$D(D-S_{st} > H(A) + H(B) + H(C) + H(D) + a\{R(A) + R(B) + R(C)\}$$

In order to make the total of the values R(N) unchanged, the values R(D) are lengthened as follows:

$$R(D)\ 6R(D) + (1-a)\{R(A) + R(B) + R(C)\} = R(D)'$$

Thus, the time table is so created that the reserved copies are im time for the deadlines. In this correction, it is to be noted that the degree of change must be suppressed to a certain limit, so that the correction will not deviate from the actual use situation by excessively changing the values R(N). The value a may be set default, or can be inputted by the operator.

If a determination is made that any reserved copy is not ended by the deadline even after the re-scheduling (S277), data on this effect is transmitted to the CPU 101 and displayed on the liquid crystal panel 91 to urge the user to change/cancel the reservation, so that processing is performed in response to a result of selection by the user.

5-4. Paper Feed Simulation

When the scheduling operation is ended, the CPU 105 determines whether or not the paper feed trays 591 to 594 have papers of respective sizes necessary for print operations for predicted reserved copies and those for predicted interruption copies. The wording "predicted" means "predicted to be used on this day", for example. This paper feed simulation is so performed that the papers used for the print operations for the reserved copies managed by the time table and those for the interruption copies are not used up halfway, and hence the wording "predicted" means "predicted to be used in a period when the print operation for each reserved copy is to be automatically executed in operator's absence".

Figure 16:
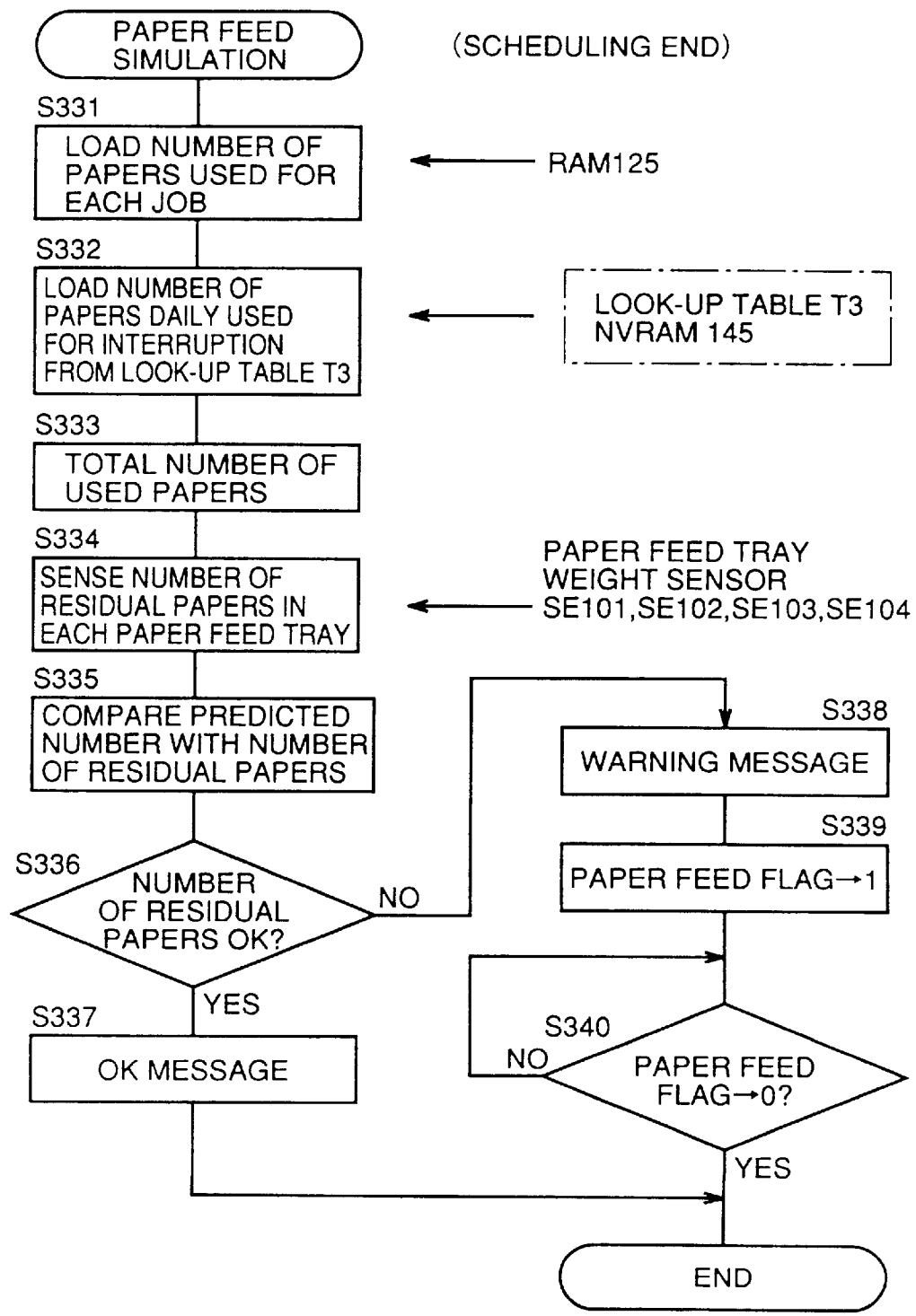
FIG. 16 is a flow chart showing paper feed simulation processing executed in the CPU 105 shown in FIG. 3.

As shown in FIG. 16, data on the number of papers required for print operations for predicted reserved copies is read from the print data of the reserved copies stored in the RAM 125 (S331) in the paper feed simulation. Further, data on the number of papers required for print operations for predicted interruption copies is read from the look-up table $T_3$ of the NVRAM 145 (S332). For example, daily average used number data are read. The look-up table $T_3$ calculates, processes and stores processing times for the respective interruption copies in an interruption operation described later.

A predicted number of used papers is operated on the basis of the data read at the steps S331 and S332 (S333). For example, the number of papers predicted to be used on this day is operated. Further, the numbers of the residual papers in the paper feed trays 591 to 594 are operated on the basis of the detection signals of the weight sensors SE101, SE102, SE103 and SE104 provided under the paper feed trays 591 to 594 respectively (S334). The NVRAM 145 registers data as to the correlation between the weights of the paper feed trays 591 to 594 and the numbers of the residual papers in the paper feed trays 591 to 594, which are read for the operation at the step S334.

Then, the predicted number of used papers of each size is compared with the number of the residual papers in each of the paper feed trays 591 to 594 operated at the step S334 (S335), so that a determination is made as to whether or not paper supply is necessary every paper feed tray (S336).

When a determination is made that no paper supply is necessary at the step S336 (YES at S336), the CPU 105 interrupts the CPU 104 to make the liquid crystal panel 91 display "OK" by the CPU 101. Due to this interruption, the CPU 104 checks the papers and transmits OK data to the CPU 101.

When a determination is made that papers must be fed to any paper feed tray at the step S336 (NO at S336), on the other hand, the CPU 105 sets a paper feed flag (S339) for making a display urging the user to feed papers to the paper feed tray on the liquid crystal panel 91 by the CPU 101 (S338), and thereafter interrupts the CPU 104. Due to this interruption, the CPU 104 checks the papers and transmits NG data urging the user to supply papers to the CPU 101. This interruption is repeatedly made at prescribed time intervals until papers are set on the paper feed tray, the CPU 104 transmits information on this effect to the CPU 105 and the paper feed flag is reset (YES at S340).

When the paper feed simulation is ended in the aforementioned manner, the process goes out of the scheduling mode (S26 in FIG. 8) for adjusting and setting the print start times for the respective reserved copies and enters a command wait state. In other words, the process enters a scheduling mode for managing execution of the print operations for the reserved copies in accordance with the time table.

5-5. Job Processing

Figure 17:
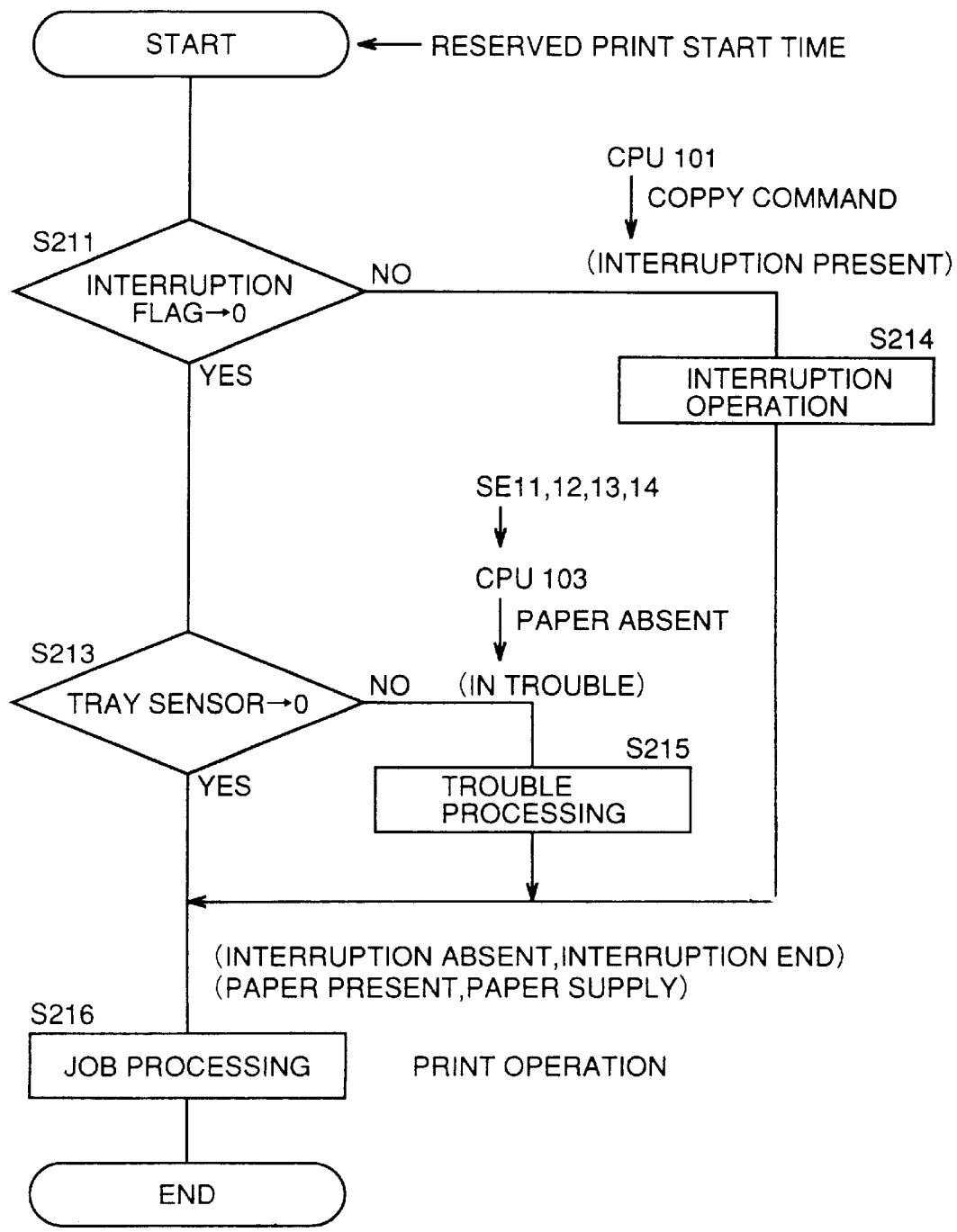
FIG. 17 is a flow chart showing control in a reserved print operation executed in the CPU 104 shown in FIG. 3.

In the scheduling mode for managing the print operations for the reserved copies in accordance with the time table created in the scheduling operation, original image data associated with each print start time is read from the memory unit 30 at the print start time shown by the time table, to be subjected to the print operation (S216 in FIG. 17). This print operation is executed similarly to the aforementioned copy operation sequence, except that its start time is managed by the time table and only the print operation is executed with no original read operation since the image data is already stored.

When the user commands a general copy, i.e., an operation of reading set originals and printing the same in the scheduling mode of managing the print operations for the reserved copies in accordance with the time table, the side managing the scheduling mode processes the general copy as an interruption operation. Namely, processing at a step S214 shown in FIG. 17 is performed. FIGS. 18 and 19 show this processing in detail. The interruption flag is set during this interruption operation (NO at S211), and if any print start time shown by the time table comes in this period, starting of the print operation for the reserved copy is queued until the executed interruption operation is ended and the interruption flag is reset.

Figure 20:
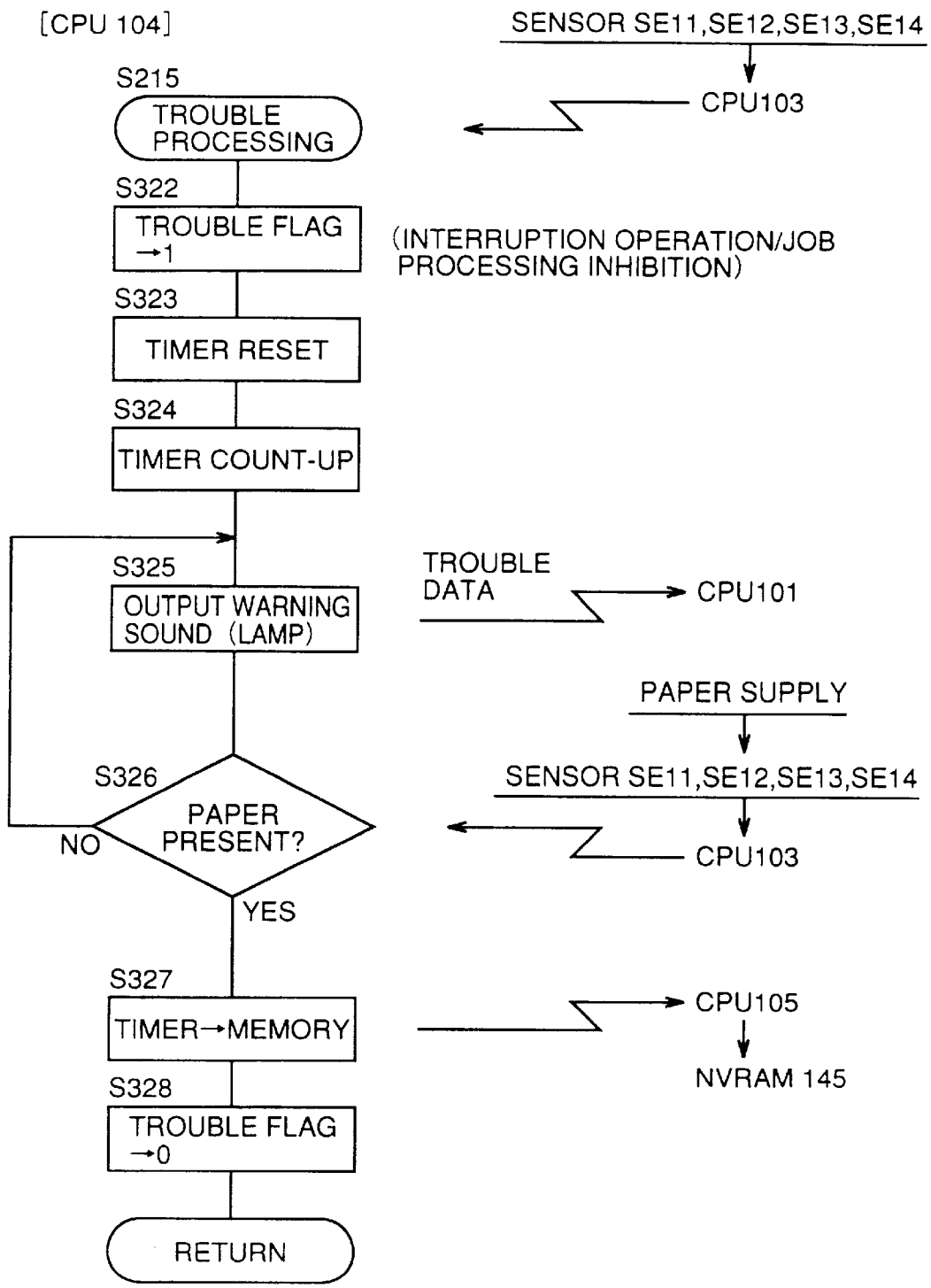
FIG. 20 is a flow chart showing trouble processing executed in the CPU 104 shown in FIG. 3.

If the recording papers are used up and no print operation can be executed in the scheduling mode of managing the print operations for the reserved copies in accordance with the time table, the side managing the scheduling mode processes this state as a trouble. In other words, processing at a step S215 shown in FIG. 17 is performed. FIG. 20 shows this processing in detail. A trouble flag is set during this trouble processing (NO at S213), and if any print start time shown in the time table comes during this period, starting of the reserved print operation is queued until the trouble processing is ended and the trouble flag is reset.

5-5-1. Interruption Operation

When a general copy is inputted from the operation panel OP, the CPU 101 transmits a command on this to the CPU 104 (S291). Thus, the CPU 104 transmits an interruption request to the CPU 105 (YES at S292). Thereafter the process waits until an interruption authorization flag is set by data transmitted from the CPU 105 (S293). This standby takes place when reserved data is inputted.

When the interruption authorization flag has been or is set (YES at S293), a determination is made as to whether the apparatus is currently in a scheduling operation, original scanning or a print operation. When the apparatus is in original scanning or a print operation, end of processing of the current page is waited.

When the apparatus is currently in a scheduling operation (YES at S295), the CPU 105 transfers the content of a register to the CPU 104, which in turn retreats the job data in a stack (S300). When the original scanning or the print operation for the current page is ended (YES at S297 or S299), the CPU 104 retreats the current job data in the stack (S300).

Then, a timer is reset to start a count-up operation (S301 and S2302), and the interruption flag is set (S303). Thus, the aforementioned general copy operation instructed from the operation panel OP is started. This copy operation is executed similarly to the aforementioned copy operation sequence.

When the general copy operation (interruption copy) is ended, the CPU 101 transmits this effect to the CPU 104 by an input from the operation panel OP or a lapse of a prescribed time (S304). Thus, the process returns to the scheduling mode (YES at S305). Namely, the process returns to the mode of managing the print operations for the reserved copies in accordance with the time table.

When the process returns to the scheduling mode, the interruption flag is reset (S306), and the NVRAM 145 stores the count value of the timer starting the counting operation at the step S301. This count value corresponds to the time consumed for the interruption copy, and is employed for operating an average value of interruption operation times in a unit period (average required time for print operations executed in the image processing unit regardless of the reserve print function in a unit period). Namely, the count value is employed for operating data indicating the operating situation of the image processing unit.

Then, the job data retreated in the stack at the step S300 are invoked (S309), and subjected to the operation before the interruption. Namely, the job data are subjected to the original scanning or the print operation to be re-started if the original scanning or the print operation has been made before the interruption. If the scheduling operation has been made before the interruption, on the other hand, the job data are transmitted to the CPU 105, to be subjected to the scheduling operation to be restarted.

The interruption operation is performed in the aforementioned manner.

5-5-2. Trouble Processing

When any of the paper sensors SE14 to SE14 detects that the recording papers are used up in any of the paper feed trays 591 to 594, data on this effect is inputted in the CPU 104. Namely, data on such an effect that a flag related to any of the sensors SE11 to SE14 for the paper feed trays 591 to 594 is set (YES at S213 in FIG. 17). Thus, the CPU 104 starts trouble processing, and sets the trouble flag (S322). Namely, the CPU 104 inhibits the aforementioned interruption operation and job processing (print operations for reserved copies).

When the trouble flag is set, the timer is reset (S323) for starting a count-up operation (S324). Then, the CPU 104 transmits trouble data to the CPU 101, in order to warn the user with a warning sound or a warning display (S325). Thus, the CPU 101 outputs a warning sound from a speaker (not shown) or flashes an LED (not shown) on and off through the I/O 131.

When the user supplies new recording papers to the paper feed tray using up the recording papers and any of the paper sensors SE11 to SE14 detects this, data on this effect is inputted in the CPU 104. Thus (YES at S326), the CPU 104 stops counting of the timer starting the count-up operation at the step S324, and stores the count value in the NVRAM 145 (S327). This count value corresponds to the time consumed for supplying the recording papers this time, and is used for operating an average value (average required time consumed for paper supply in a unit period) of trouble times in the unit period. Namely, this count value is used for operating data indicating the operating situation of the image processing unit.

Thereafter the trouble flag is reset (S328) and the processing of the CPU 104 returns to the address before the starting of this trouble processing.

6. Modification

While the image processing unit previously loads and stores originals for reserved copies in the memory for reading the image data from the memory at each print start time managed by the time table for printing the same in the above embodiment, the present invention is also applicable to an image processing unit having a plurality of original feed trays capable of feeding originals to a platen. In this case, the image processing unit may be so formed as to feed originals from any original feed tray having the originals for a reserved copy at any copy start time managed by a time table for printing the same. The time table is created not through required times for print operations but through required times for copy operations (times obtained by adding required times for original reading to those for print operations).

(2) Second Embodiment

A second embodiment of the present invention is now described with reference to the drawings.

[A] Description of Structure

1. Outline of Mechanism and Operation

The mechanism of a copying apparatus (copier) employed in the second embodiment of the present invention is basically identical to that of the first embodiment, and hence its mechanism diagram and description of portions identical to those of the first embodiment are omitted and only portions different from those of the first embodiment are described.

Figure 28:
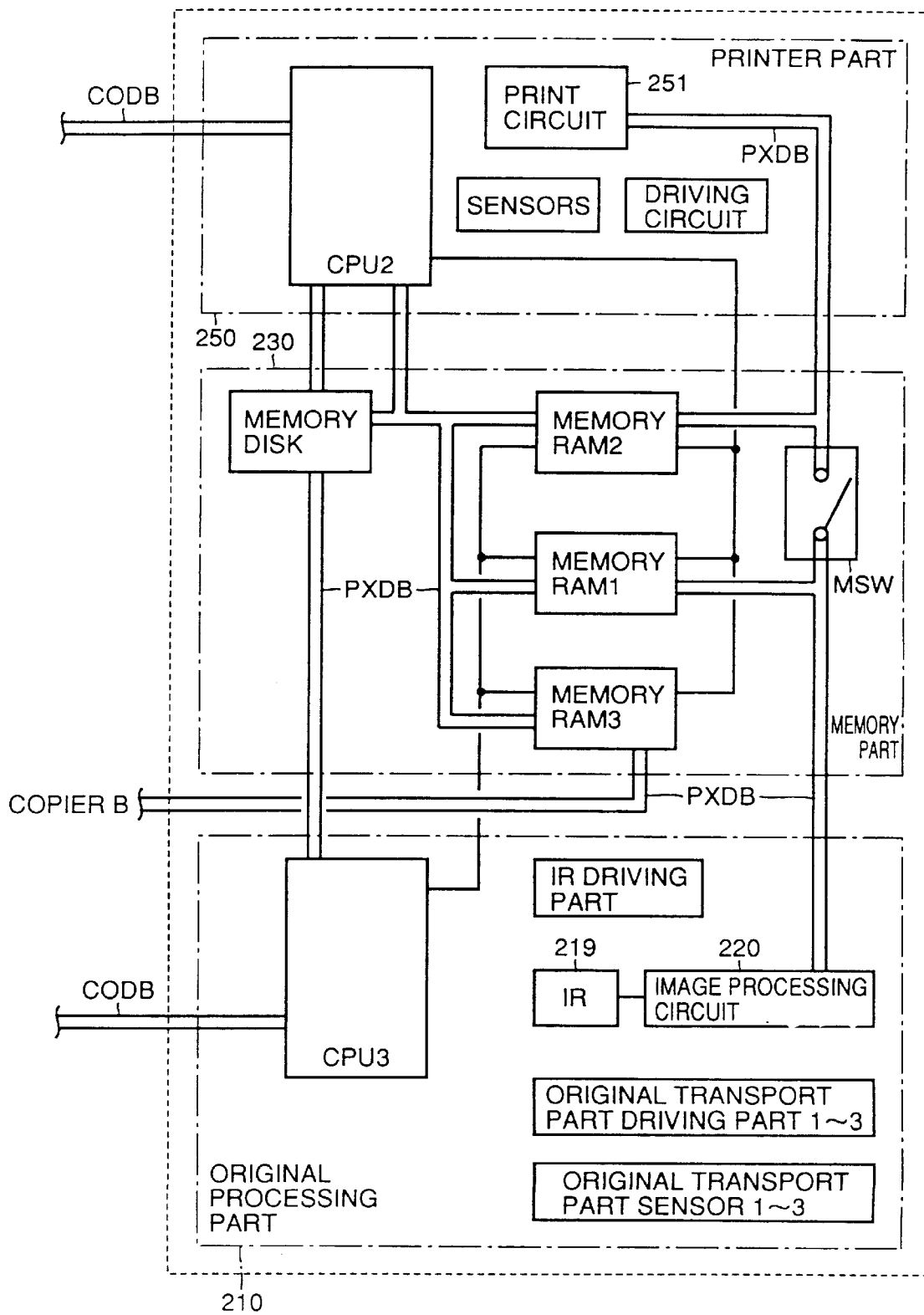
FIG. 28 is a block diagram showing the structures of a printer part 50, a memory part 30 and an original processing part 10 of the copier A in the control circuit shown in FIG. 27.

In the second embodiment, an original processing part 210 including an original transport part 10a is provided with original transport part driving parts 1 to 3, original transport part sensors 1 to 3 and the like, as shown in FIG. 28.

Further, the original processing part 210 including an original read part 10b is provided with an IR driving part and an image processing circuit 220, as shown in FIG. 28.

A printer part 250 is provided with a print circuit 251, various sensors and a driving circuit, as shown in FIG. 28.

2. Structure of Control Circuit

Figure 26:
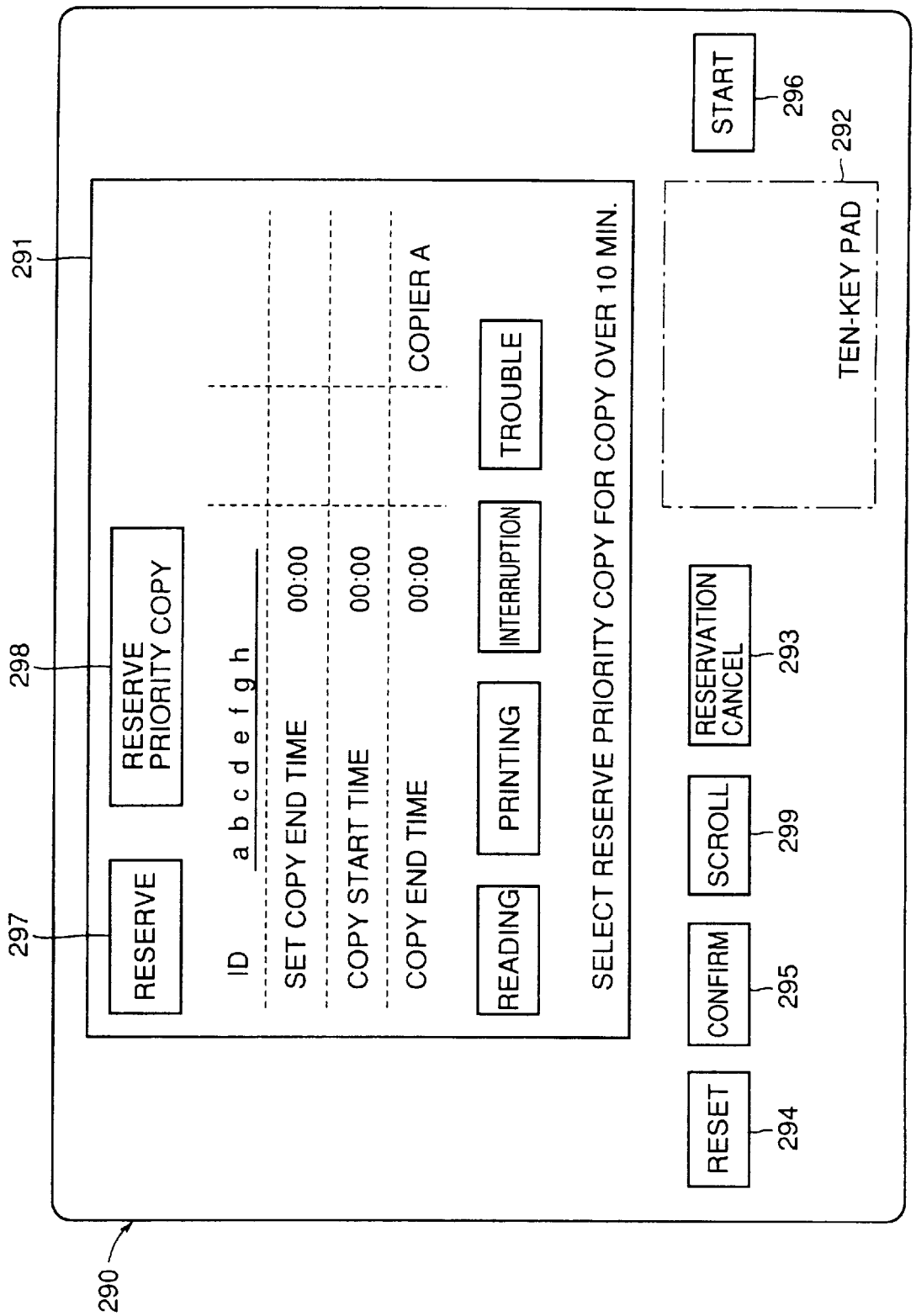
FIG. 26 is an explanatory diagram showing an operation panel of a copying apparatus according to a second embodiment of the present invention.
Figure 27:
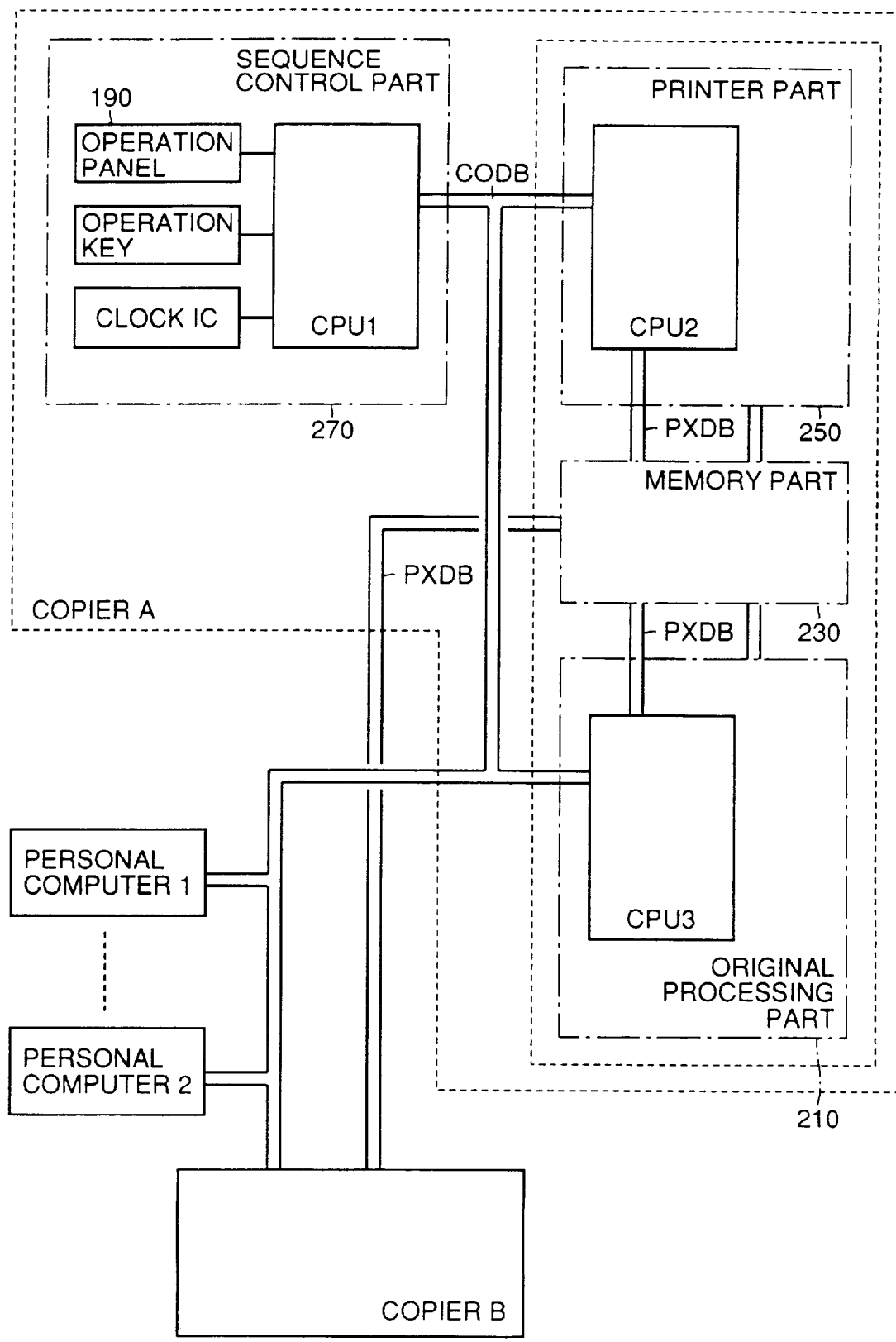
FIG. 27 is a block diagram showing the connection between a control circuit of the copying apparatus (copier A) according to the second embodiment and various apparatuses (copier B etc.) connected with the copying

FIG. 27 shows the overall structure of a circuit for controlling a system according to the second embodiment, and FIG. 28 shows the circuit structure in a broken line frame in FIG. 27. FIG. 26 shows an operation panel 290 of a copier (copier A or B) forming this system. Items displayed on a liquid crystal panel 291 provided in the operation panel 290 are illustratively displayed.

As shown in FIG. 27, this system is structured by connecting a plurality of copiers (copiers A and B in FIG. 27) with a plurality of personal computers. The copiers are connected with each other by a control bus CODB as well as an image data bus PXDB. The copiers and the personal computers, and the personal computers themselves are connected with each other by the control bus CODB.

Each copier has three CPUs (CPU1 to CPU3) and a memory part 230. The CPU1 forms a sequence control part 270. Thus, the CPU1 and the CPU2 are connected with each other through the control bus CODB. The CPU1 is also connected with that of the other copier and the personal computers through the control bus CODB. The CPU1 is further connected with the operation panel 290, operation keys on the operation panel 290, and a clock IC.

The CPU2 is a controller of the printer part 250. The CPU2 is connected with a memory disk, a RAM1, a RAM2 and a RAM3 through the image data bus PXDB, to access the memory disk, the RAM1, the RAM2 and the RAM3. The print circuit 251 which is controlled by the CPU2 is connected to the RAM2 through the image data bus PXDB.

The CPU3 is a controller of the original processing part 210. The CPU3 is connected to the memory disk through the image data bus PXDB. The image processing circuit 220 which is controlled by the CPU3 is connected to the RAM1 through the image data bus PXDB, and connectable with the RAM2 through the image data bus PXDB and a bus switch MSW. The CPU3 controls switching of the bus switch MSW. The CPU3 is connected to access the memory disk, the RAM1, the RAM2 and the RAM3.

The memory part 230 has the memory disk, the RAM1, the RAM2 and the RAM3. The memory disk is a mass-storage recording medium, which is employed for storing image data for reserved copies. This memory disk transmits readable/unreadable and writable/unwritable signals to the CPU2 and the CPU3 respectively. The RAM1 to RAM3 are page memories. The RAM1 is employed for loading the image data of the reserved copies and writing the same in the memory disk. The RAM2 is employed for transmitting the image data inputted from the image processing circuit 220 or read from the memory disk to the print circuit 251. The RAM3 is employed for transmitting the image data read from the memory disk to the RAM3 of the other copier.

A reset key 294, a confirm key 295, a scroll key 299, a reservation cancel key 293, a ten-key pad 292 and a start key 296 are arranged on the operation panel 290. The liquid crystal panel 291 is provided on the operation panel 290, to make various types of displays such as reading, printing, interruption and a trouble state, the content of each reserved copy, a message to the user and the like. This liquid crystal panel 291 displays a reserve switch 297 and a reserve priority switch 298.

[B] Description of Operation

With reference to flow charts and exemplary displays on the liquid crystal panel 291, the operations of this system are now described.

0. Outline of Control

This system is formed by a plurality of copying apparatuses (copiers) and a plurality of personal computers, and each copier has three CPUs (the CPU1 to CPU3). These three CPUs execute the processing shown in the flow charts, thereby implementing the operations of this system.

Figure 33:
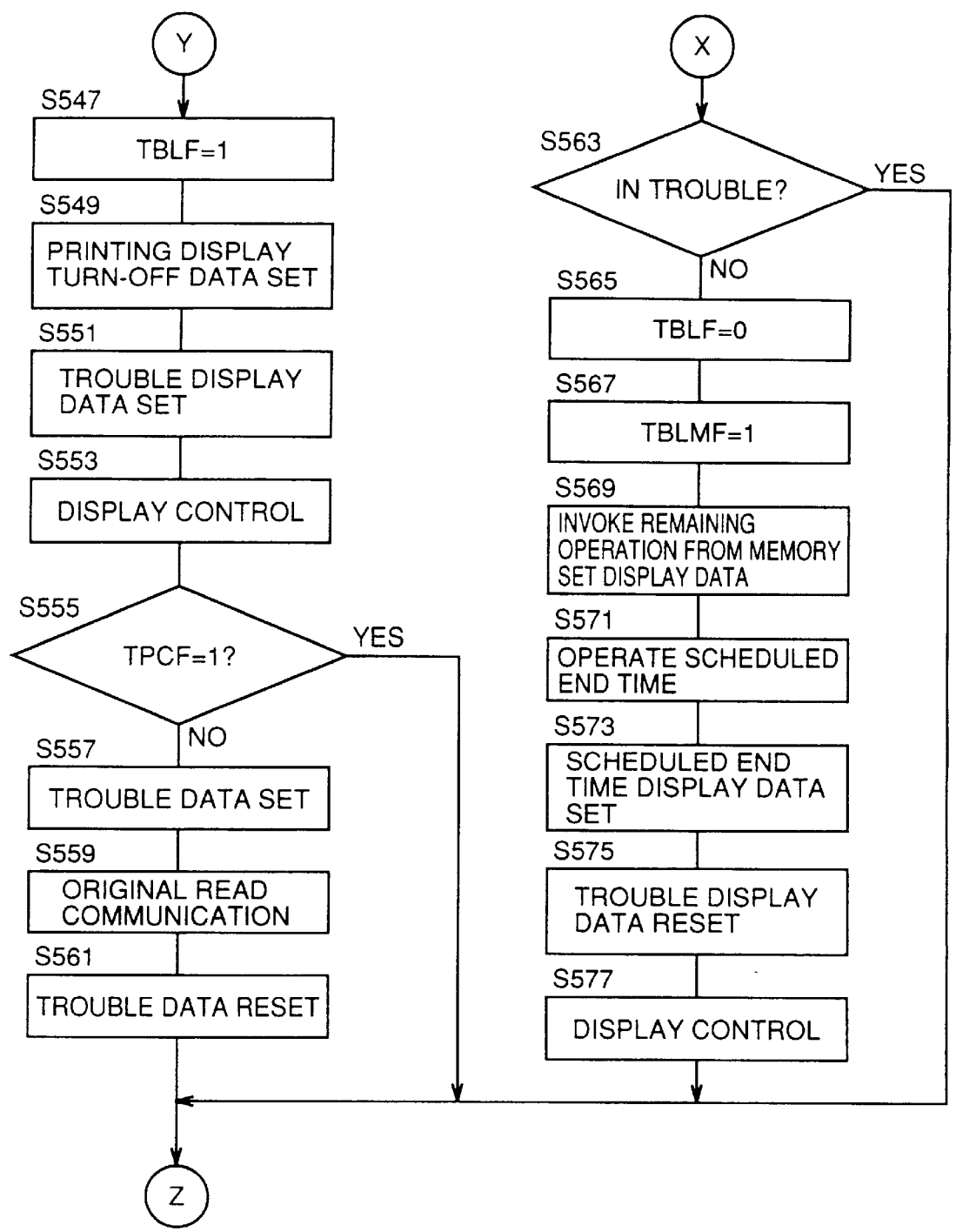
FIG. 33 is the remaining part of the flow chart showing the processing executed in the data communication interruption in the CPU1 of the copying apparatus according to second embodiment.
Figure 34:
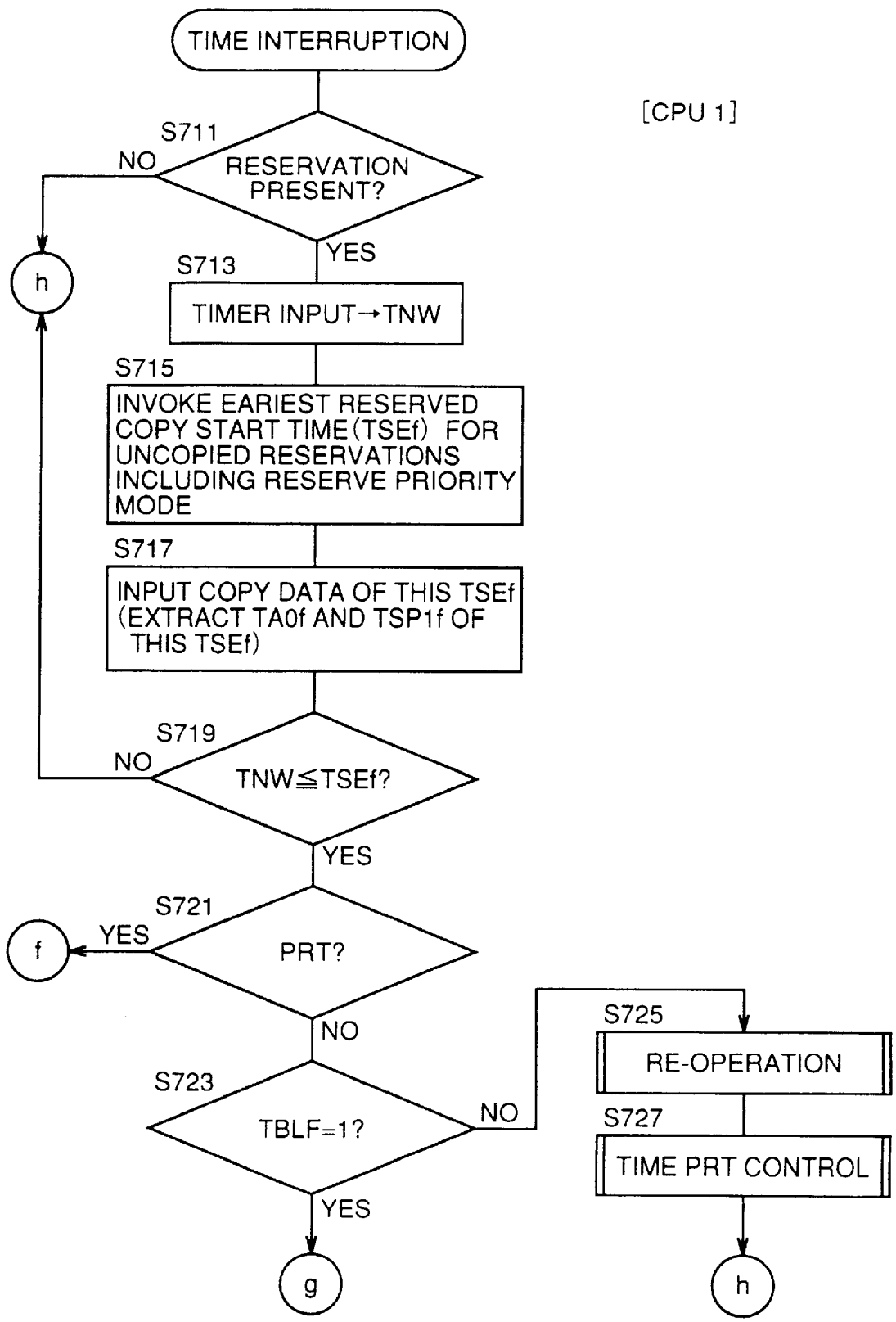
FIG. 34 is a part of a flow chart showing processing executed in time interruption in the CPU1 of the copying apparatus according to the second embodiment.
Figure 35:
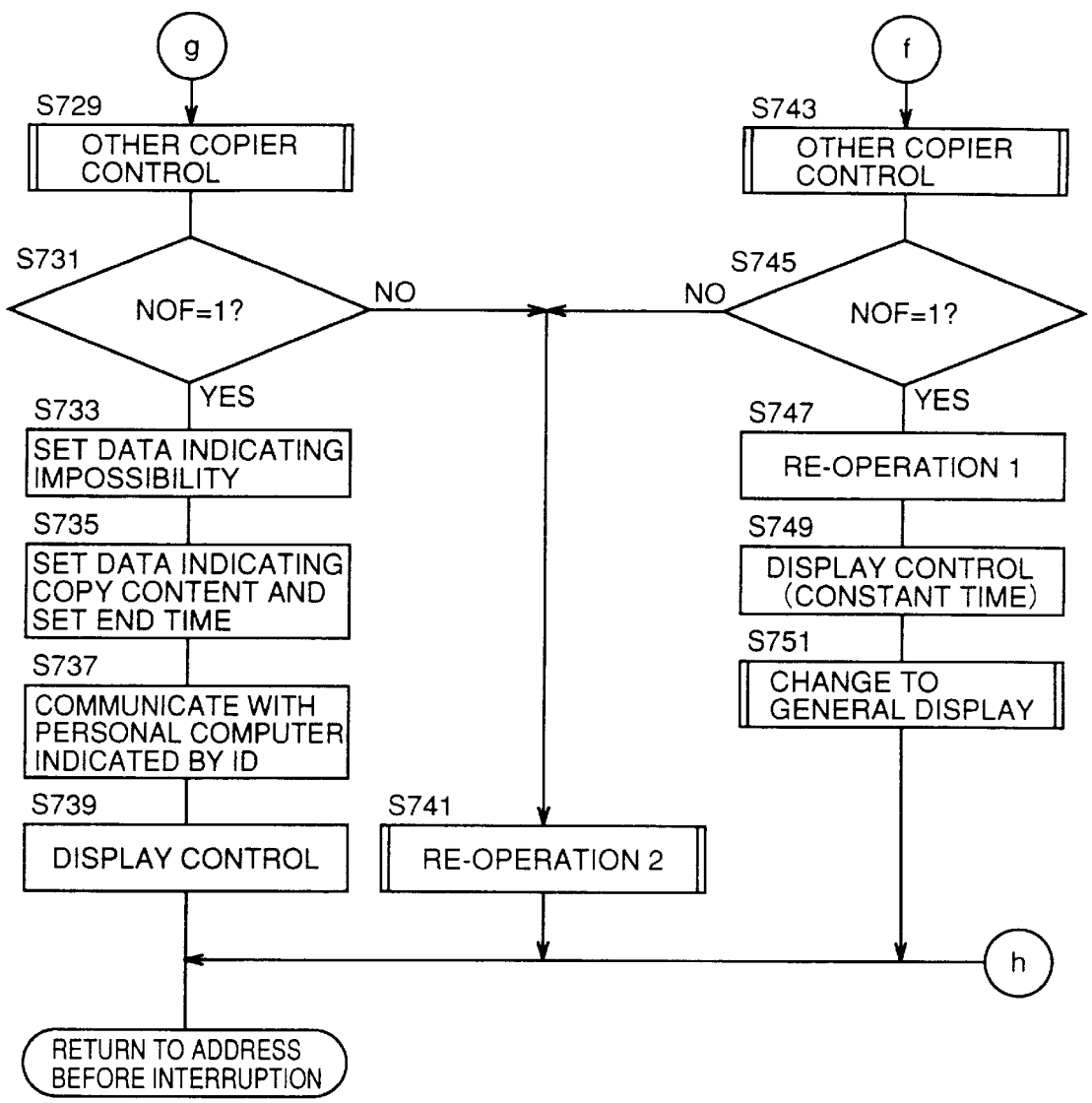
FIG. 35 is the remaining part of the flow chart showing the processing executed in the time interruption in the CPU1 of the copying apparatus according to the second embodiment.
Figure 36:
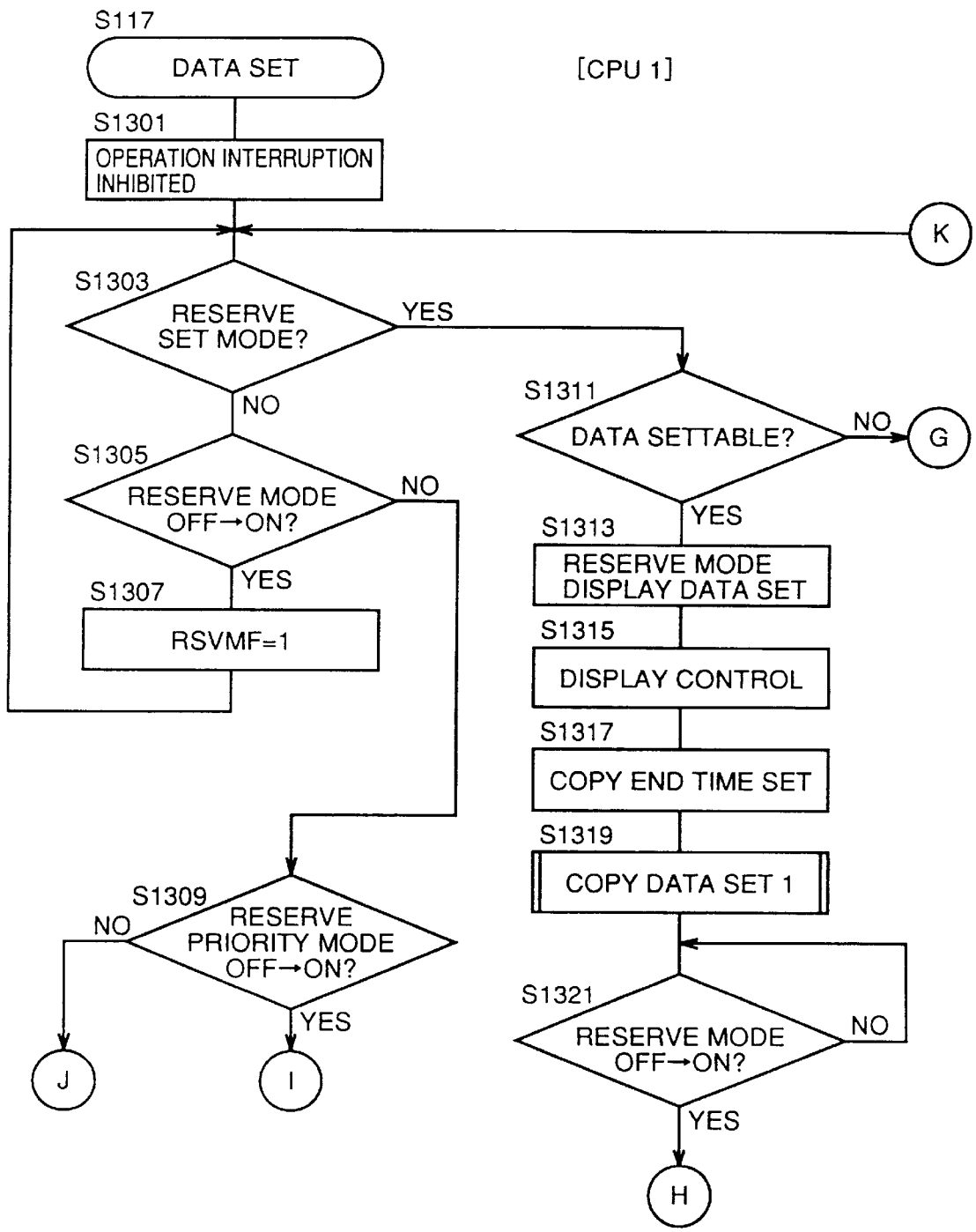
FIG. 36 is a part of a flow chart showing processing in data set processing (S117) shown in FIG. 29.
Figure 37:
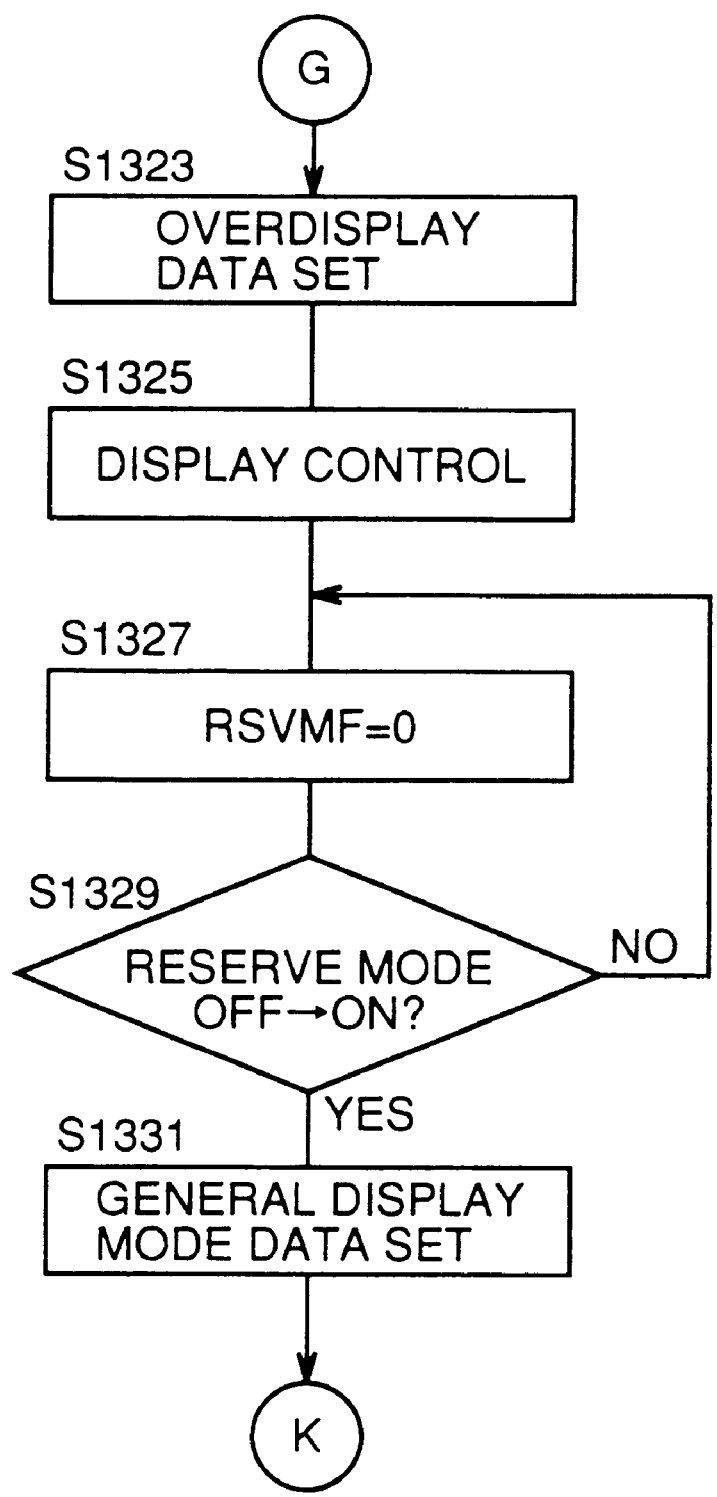
FIG. 37 is another part of the flow chart showing the processing in the data set processing (S117) shown in FIG. 29.
Figure 38:
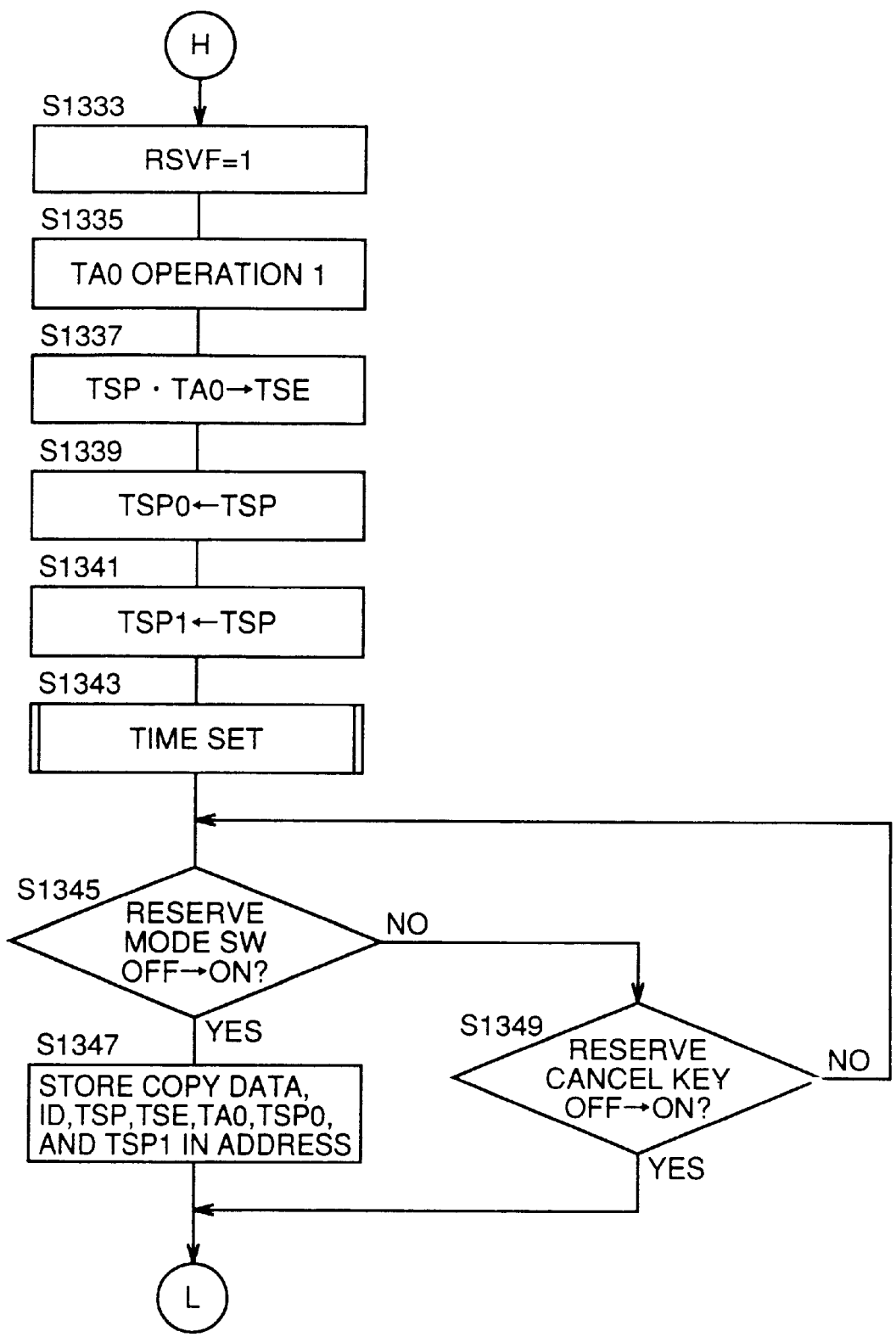
FIG. 38 is still another part of the flow chart showing the processing in the data set processing (S117) shown in FIG. 29.

The CPU1 executes operation interruption processing (FIGS. 29 to 31), data communication interruption processing (FIGS. 32 and 33) and time interruption processing (FIGS. 34 and 35).

Figure 64A:
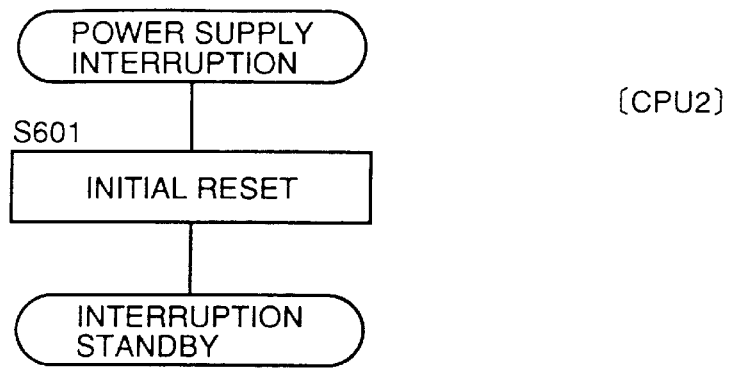
FIGS. 64a and 64b are parts of a flow chart showing processing executed in power supply or PRT communication 1 interruption in a CPU2 of the copying apparatus according to the second embodiment.
Figure 64B:
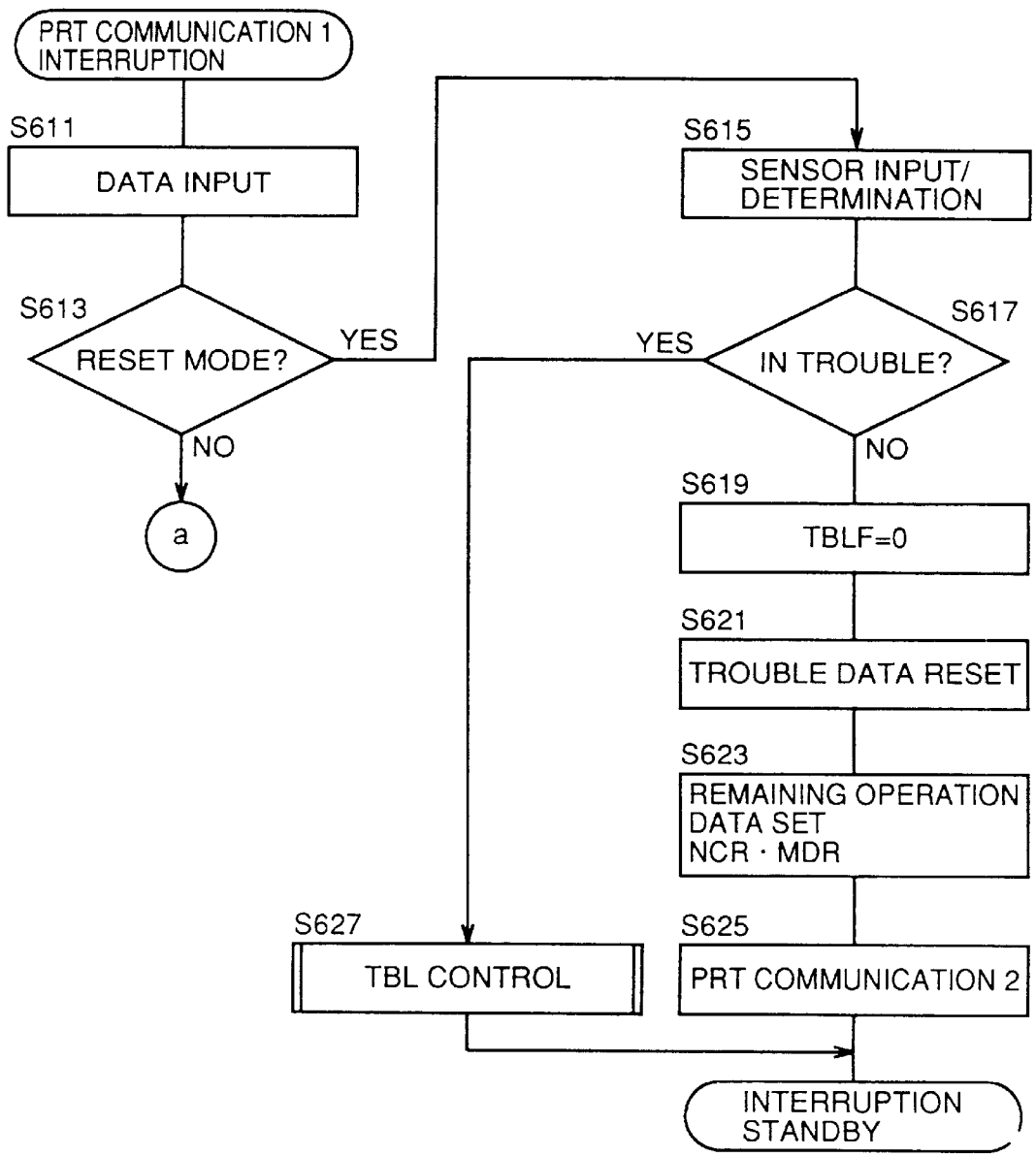
Figure 65:
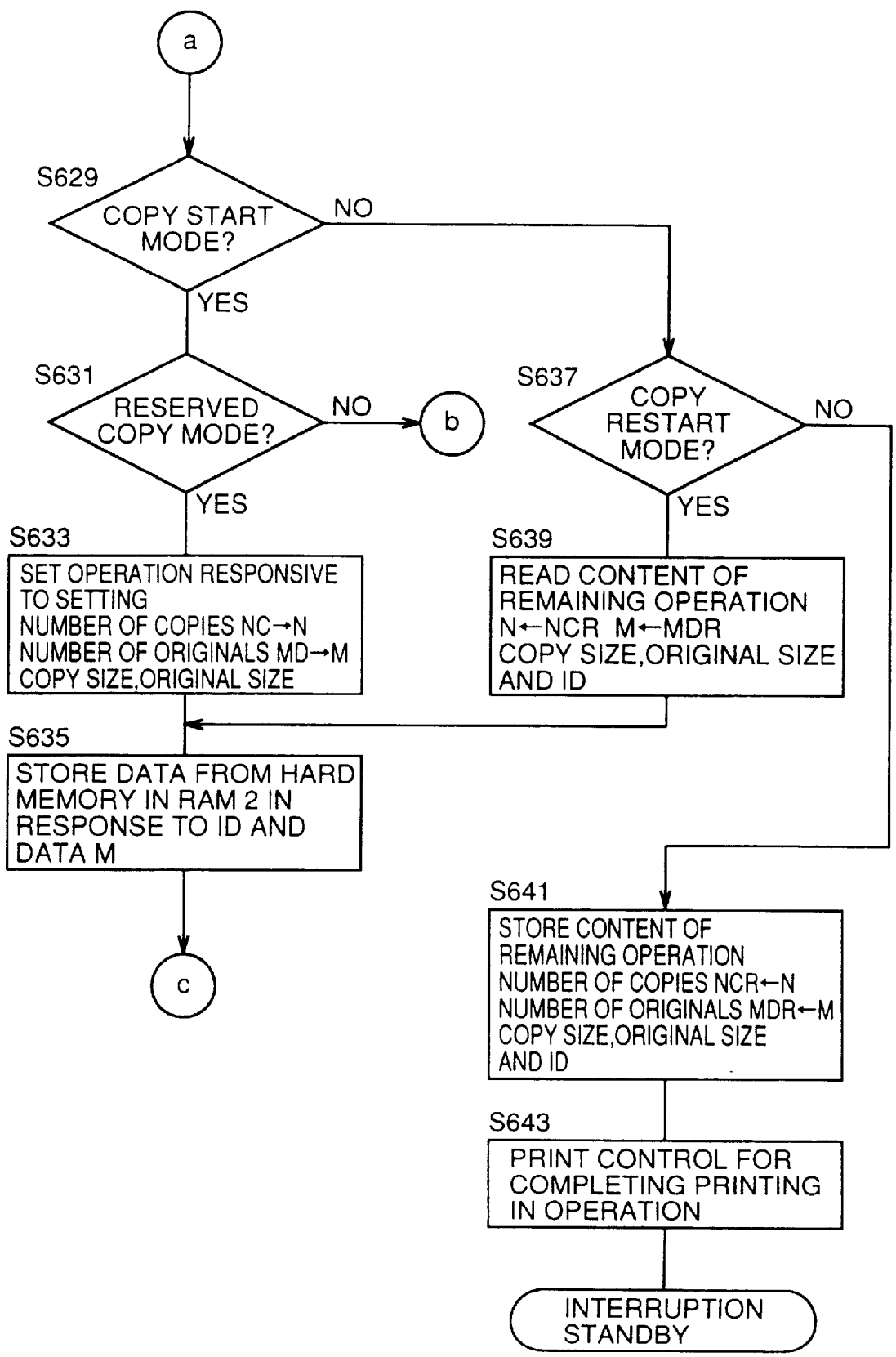
FIG. 65 is still another part of the flow chart showing the processing executed in power supply or PRT communication 1 interruption in the CPU2 of the copying apparatus according to the second embodiment.
Figure 66:
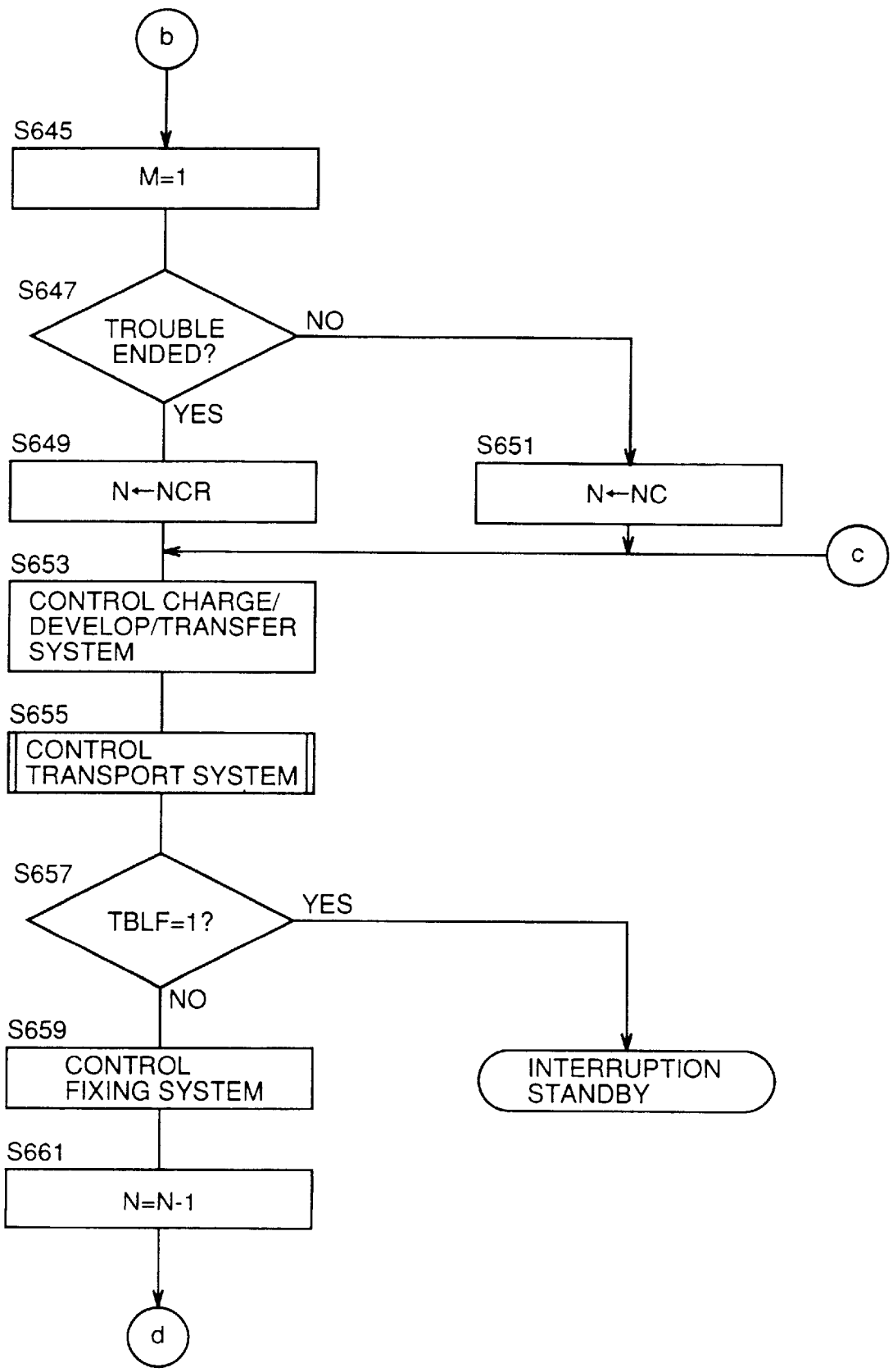
FIG. 66 is a further part of the flow chart showing the processing executed in power supply or PRT communication 1 interruption in the CPU2 of the copying apparatus according to the second embodiment.
Figure 67:
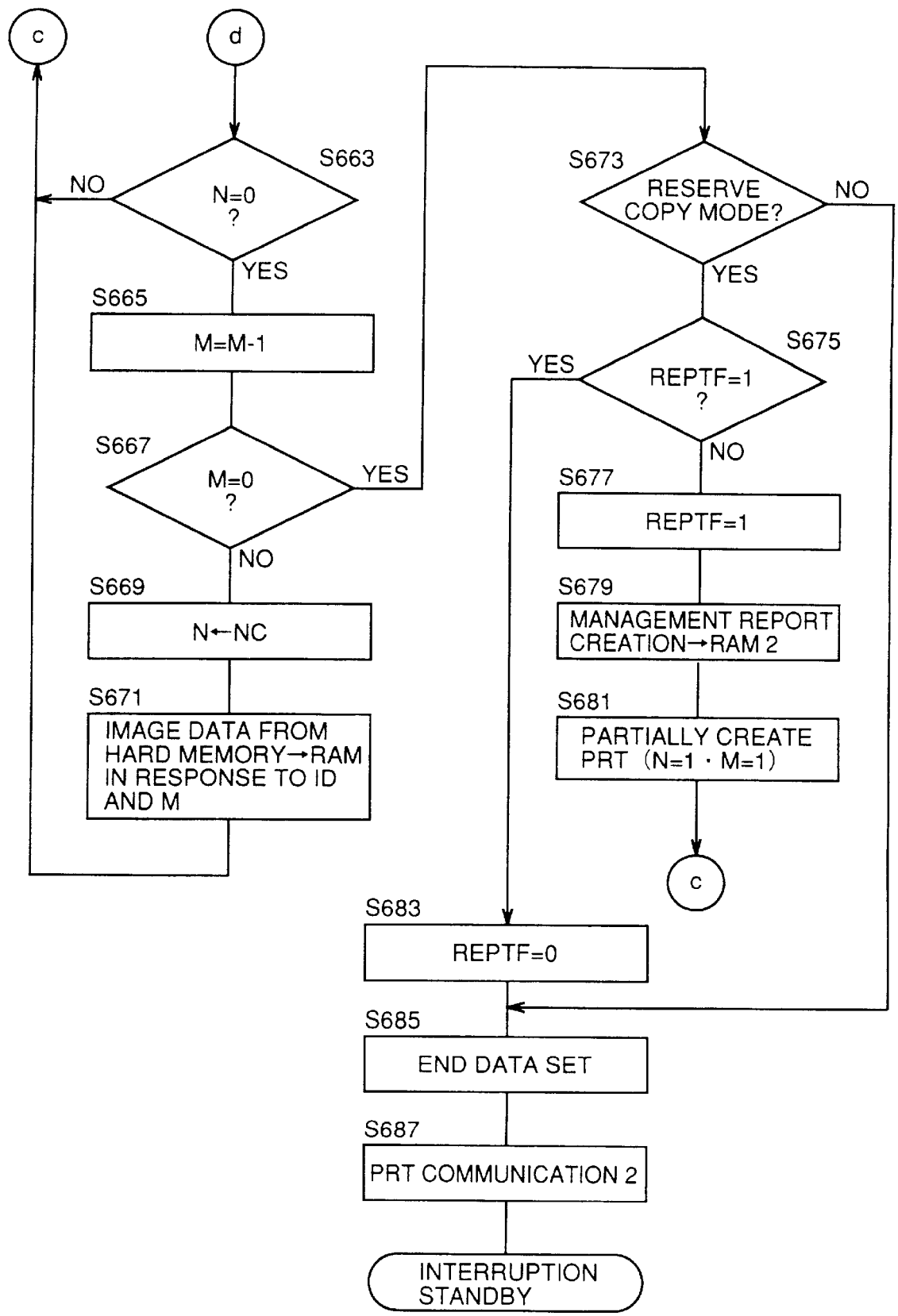
FIG. 67 is the remaining part of the flow chart showing the processing executed in power supply or PRT communication 1 interruption in the CPU2 of the copying apparatus according to the second embodiment.

The CPU2 executes PRT communication 1 interruption processing (FIGS. 64 to 66).

The CPU3 executes original read communication interruption processing (FIGS. 69a to 74).

The operation interruption of the CPU1 is started in response to an operation input from a switch such as the start key 296 shown in FIG. 26.

The data communication interruption is started in response to "PRT communication 2" or "original communication 2" executed in the CPU2 or the CPU3, or "copier communication 1" executed in subroutine processing executed in "time interruption" of the CPU1 of the other copier or "copier communication 1" executed in "data communication interruption" of the CPU1 in the other copier.

The time interruption is started every prescribed time (e.g., 1 minute).

The PRT communication 1 interruption of the CPU2 is started in response to "PRT communication 1" executed in "operation interruption processing (including subroutine processing executed in the operation interruption processing)" of the CPU1.

The original read communication interruption of the CPU3 is started in response to "original read communication" executed in subroutine processing executed in the operation interruption processing of the CPU1.

The following description is formed by respective items of "1. operation interruption processing", "2. data set processing", "3. original read control", "4. PRT control" and "5. other copier control".

In "1. operation interruption processing", processing executed in response to an operation of the start key 296 is described. The original read control and the PRT control invoked in the processing executed in correspondence to the operation of the start key 296 are described in other items in further detail.

In "1. operation interruption processing", further, processing in a reserve confirm mode set by an operation of the confirm key 295 and processing in a reset mode set by an operation of the reset key 294 are also described.

In "2. data set processing", processing of operating a print start time for a copy or the like on the basis of a desired print end time and copy data after an operation of the reserve switch 297 and reserving the same, processing of operating a print start time etc. for the copy after an operation of the reserve priority copy switch 298 on the basis of copy data and reserving the same at need and the like are described. The copy data include the number of originals, the original size, the number of copies and the copy size.

In "3. original read control", original reading and image data storage by control of the CPU3 excuted in response to a command from the CPU1, re-operation of a time by the CPU1 executed on the basis of data transmitted from the CPU3 to the CPU1 after the original reading and the like are described.

In "4. PRT control", a print operation by control of the CPU2 executed in response to a command from the CPU1, processing executed in the CPU1 after a print operation and the like are described.

In "5. other copier control", time interruption started in the CPU1, a print request to the other copier by communication with the other copier executed during time interruption at need, transmission of image data following the request and the like are described.

1. Operation Interruption Processing

Figure 29:
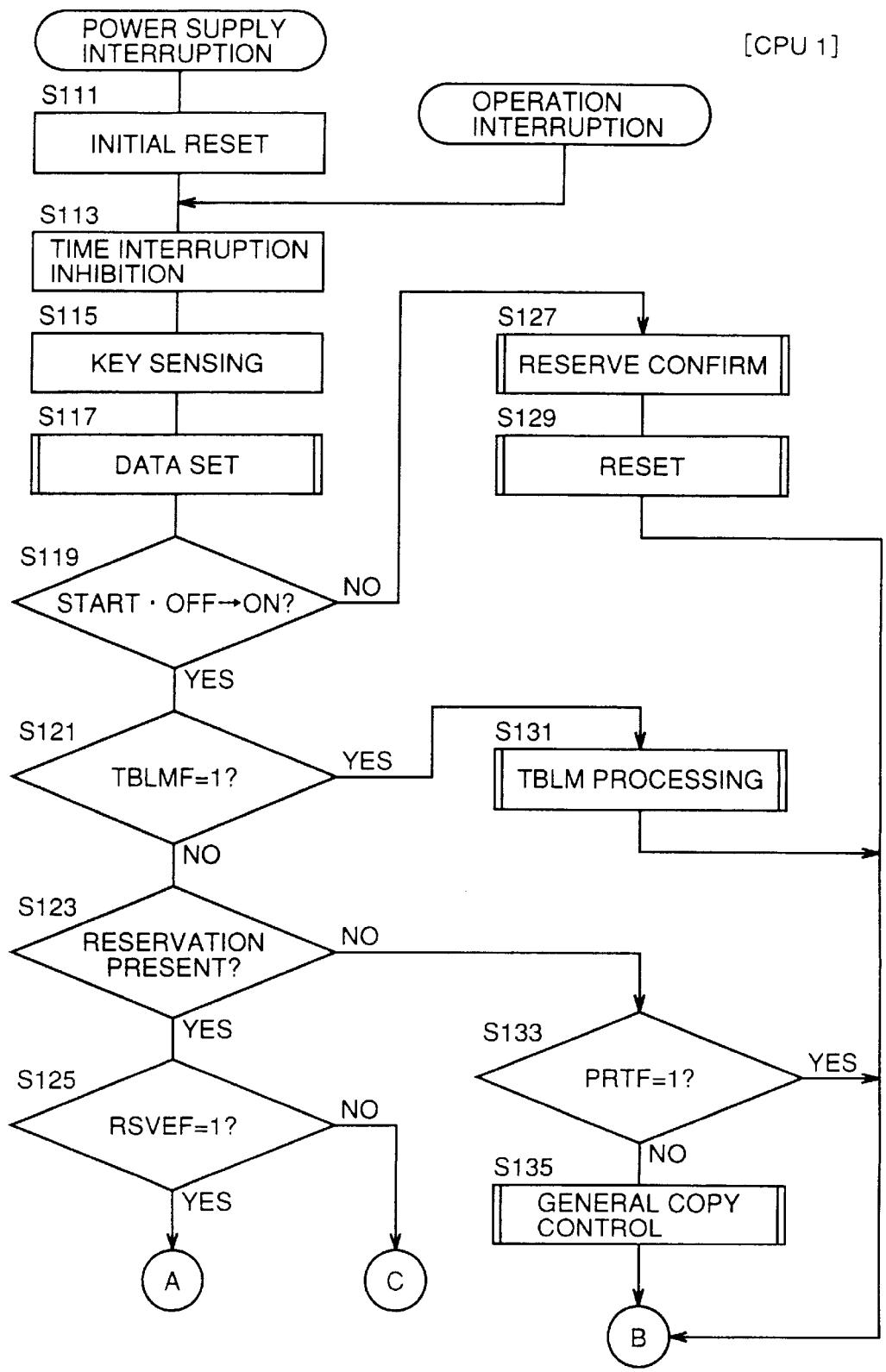
FIG. 29 is a part of a flow chart showing processing executed upon power supply or an operation input in a CPU1 of the copying apparatus according to the second embodiment.
Figure 30:
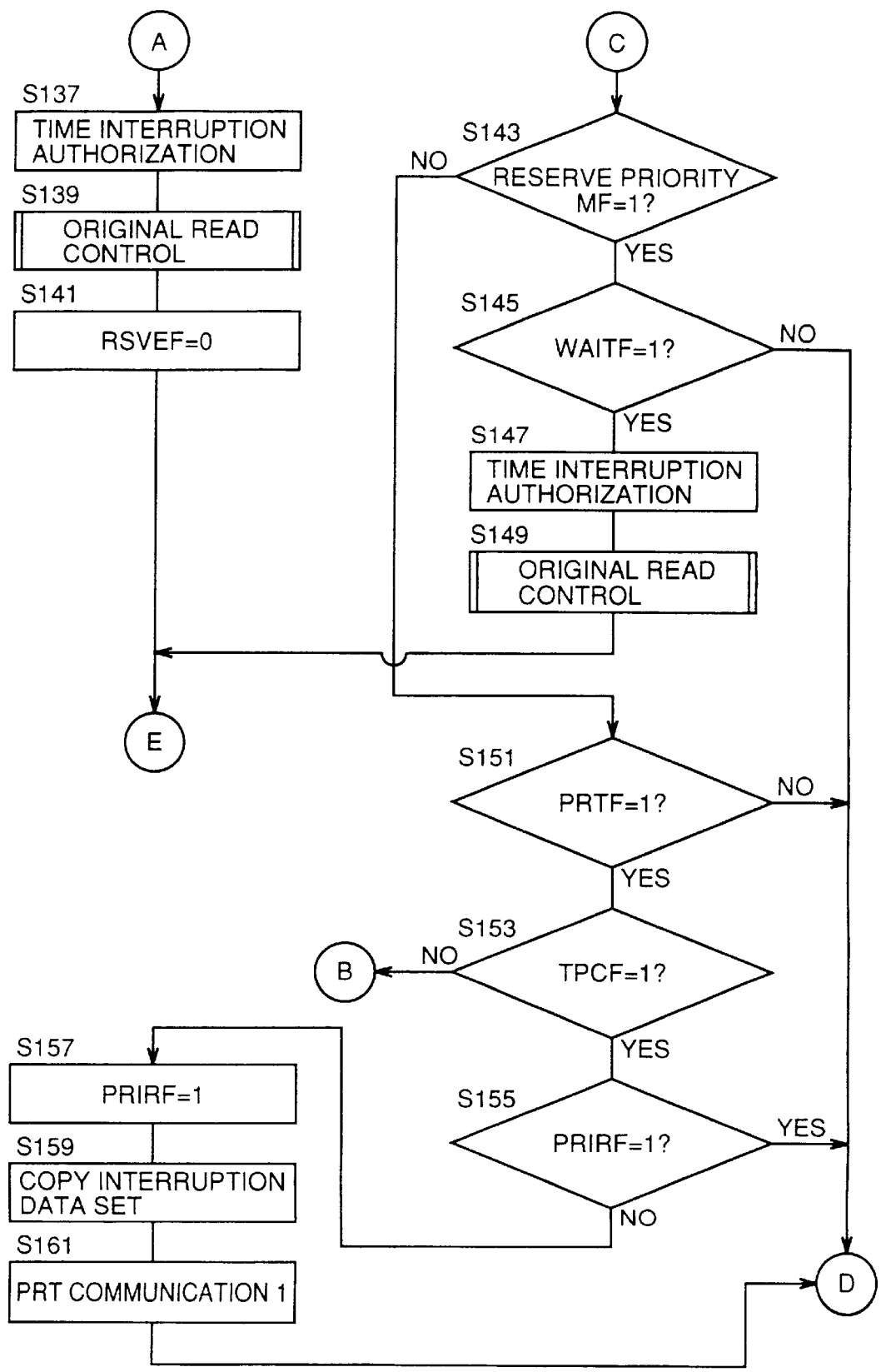
FIG. 30 is another part of the flow chart showing the processing executed upon power supply or an operation input in the CPU1 of the copying apparatus according to the second embodiment.
Figure 31:
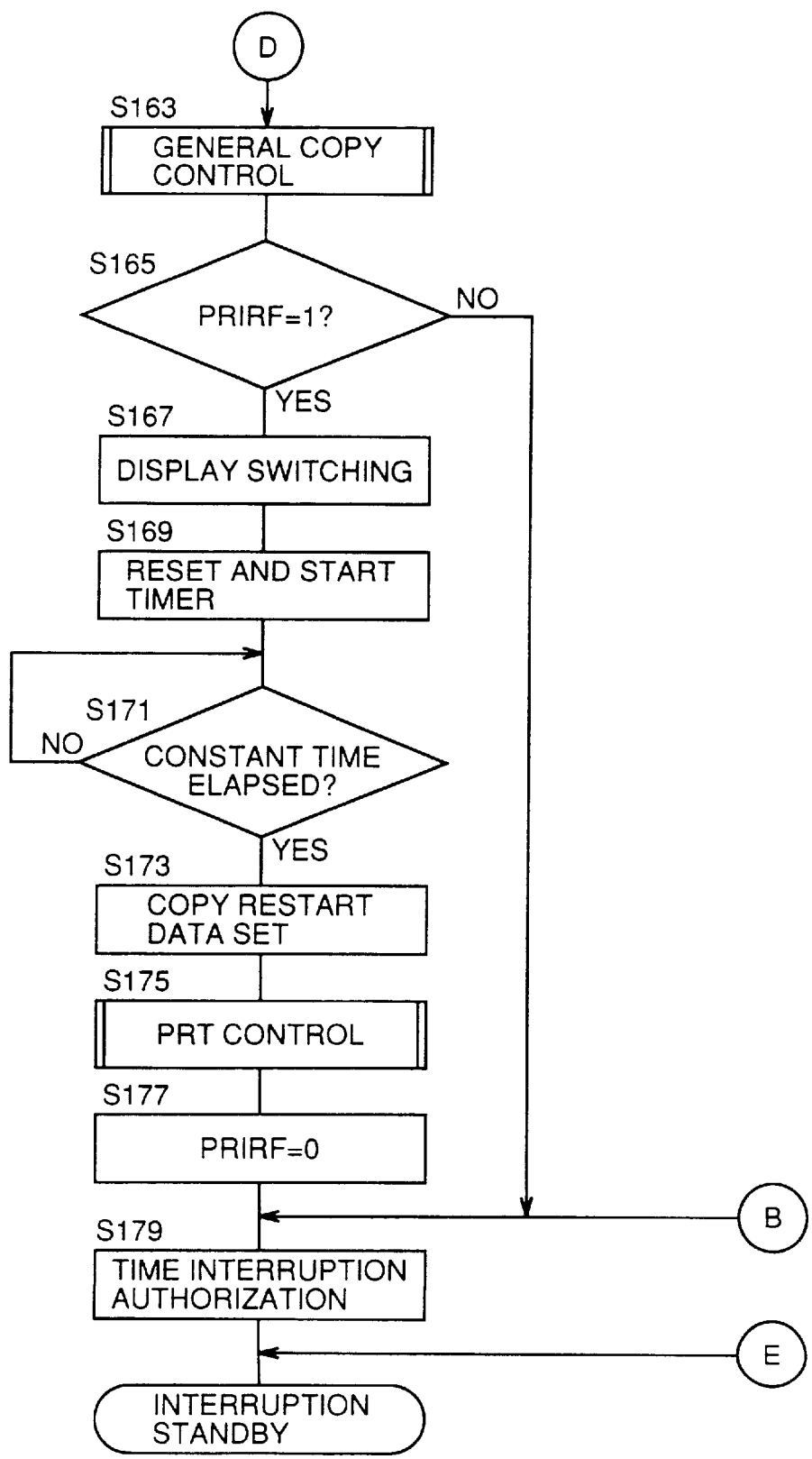
FIG. 31 is the remaining part of the flow chart showing the processing executed upon power supply or an operation input in the CPU1 of the copying apparatus according to the second embodiment.

FIGS. 29 to 31 show the processing executed in the CPU1 in correspondence to power supply and an input operation of any operation key. The processing upon power supply is similar to that in the input operation of the operation keys except that initial resetting is performed (S111), and hence the processing following the input operation of any operation key is hereafter described.

When any operation key shown in FIG. 26 is operated, the operation interruption processing is started. First, time interruption is inhibited (S113). The time interruption processing, which is shown in FIGS. 34 and 35, is started every prescribed time (e.g., 1 minute), for printing a reserved copy etc. The time interruption processing is described later in detail.

Then, the operated switch is detected by key sense processing (S115), for data set processing (S117). The data set processing (S117) is adapted to perform processing of operating a print start time for a copy etc. on the basis of a desired print end time inputted by the user after an operation of the reserve switch 297 and copy data (the number of originals, the original size, the number of copies and the copy size) and reserving the same in a memory table shown in FIG. 100, processing of operating a print start time for a copy on the basis of copy data after an operation of the reserve priority copy switch 298 and reserving the copy at need, or display processing related thereto. This data set processing (S117) is described in the item of "2. data set processing" in detail with reference to FIGS. 36 to 43.

At a step S119, the process branches to a step S121 or S127 in response to the operation switch making the input. Namely, the process advances to the step S121 if the start key 296 has been operated (YES at S119). If a switch other than the start key 296 has been operated (NO at S119), on the other hand, the process advances to the step S127.

1-1. In Case of Branching to Step S121 (Operation of Start Key 296)

Description is now made on the case of branching to the processing following the step S121 in correspondence to an operation of the start key 296. The processing following the step S121 is adapted to perform either "copy operation= original read operation+print operation" or "only original read operation" in response to the state of the apparatus, presence/absence of already reserved copies, a reserved copy or a general copy instructed by an input related to set originals, the operating situation of the image processing unit, whether or not a reserve priority mode for giving priority to a print operation for an already reserved copy is selected and the like. Throughout this specification, the "copy operation" is defined as the "original read operation+ print operation", to be distinguished from the case of only the "original read operation" or only the "print operation".

1-1-1. In Case of Uncompleted Countermeasure to Trouble

Figure 44:
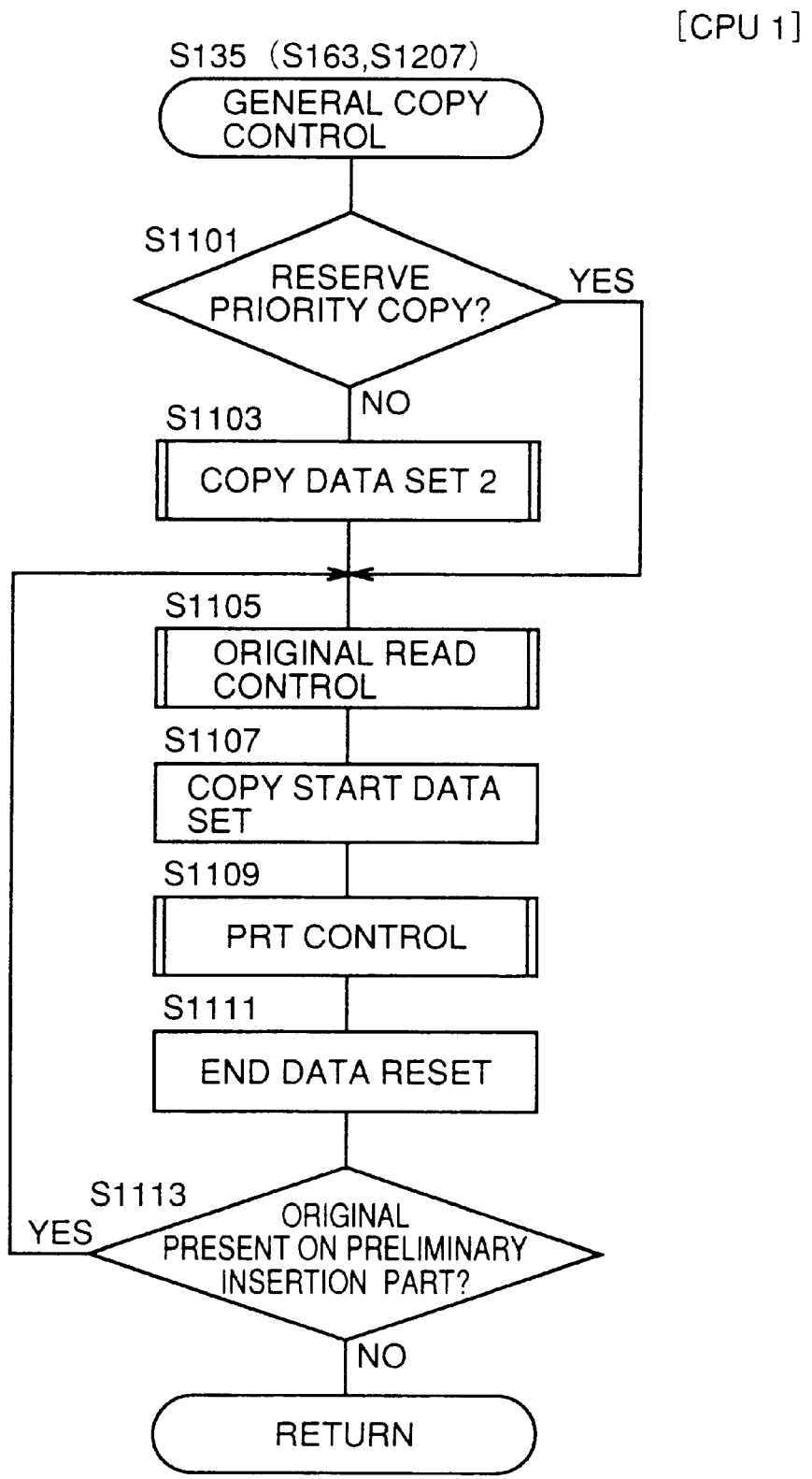
FIG. 44 is a flow chart showing processing executed in general copy processing (S135, S163 or S1207) shown in FIG. 29, 31 or 56.
Figure 56:
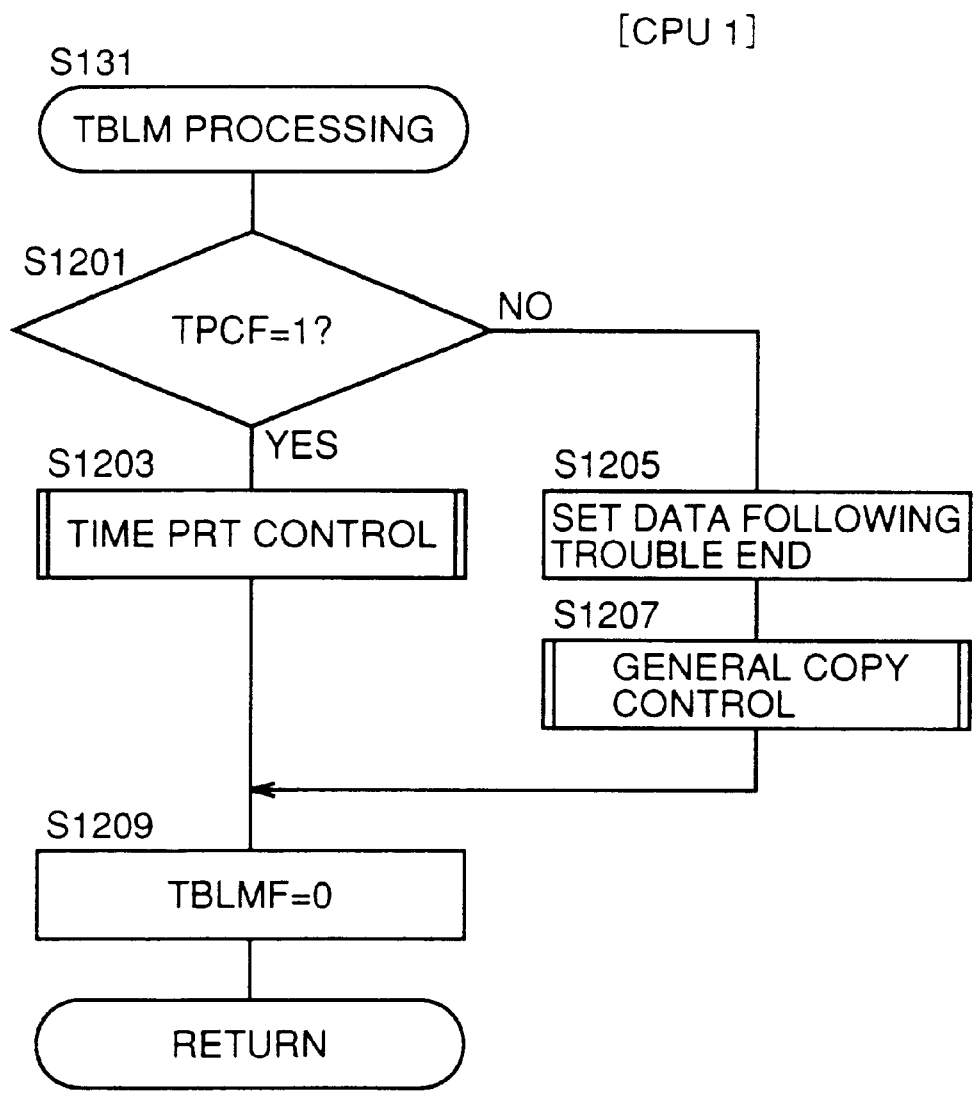
FIG. 56 is a flow chart showing processing executed in TBLM processing (S131) shown in FIG. 29.
Figure 57:
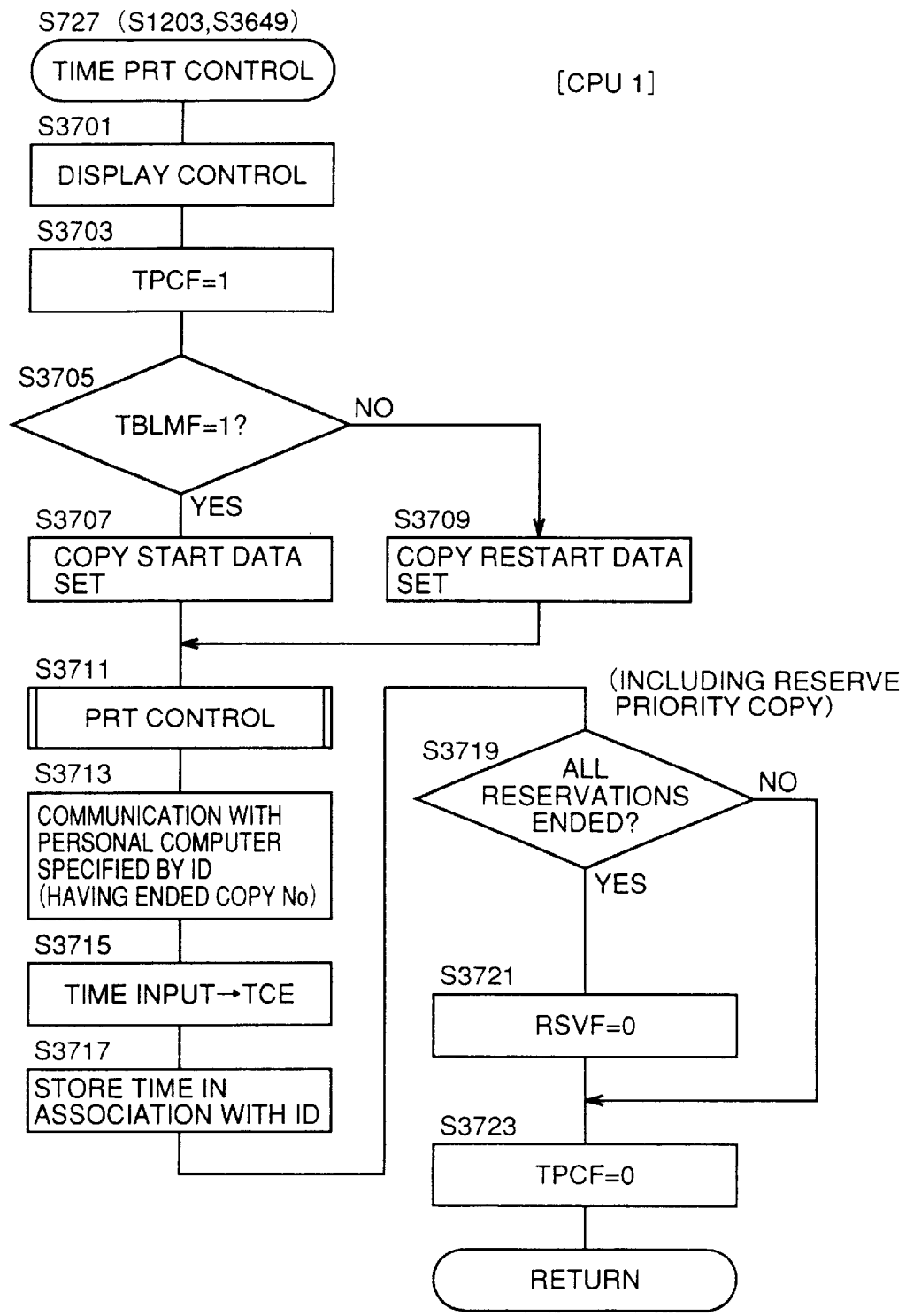
FIG. 57 is a flow chart showing processing executed in time PRT control (S727, S1203 or S3649) shown in FIG. 34, 46 or 59.

When a trouble is caused and a copy operation to be re-started after a countermeasure to the trouble is not yet performed (YES at S121), TBLM processing is performed in response to entry of the start key 296 (S131). FIG. 56 shows the TBLM processing. When a print operation for a reserved copy is controlled (YES at S1201), time PRT control is executed in order to re-start the print operation causing the trouble (S1203). FIG. 57 shows the time PRT control. If a copy operation (original read operation+print operation) is executed (NO at S1201), on the other hand, data following a trouble end is set (S1205) in order to re-start the copy operation causing the trouble from the time of occurrence of the trouble, and general copy control is executed (S1207). FIG. 44 shows the general copy control. After completion of any operation, a trouble mode flag TBLMF is reset for indicating this effect (S1209).

In the aforementioned time PRT control (S1203), data for re-starting the interrupted print operation for the reserved copy from the time of interruption is set (S3709 in FIG. 57), for performing the print operation (S3711). In the aforementioned general copy control (S1207), further, operations for reading the original not yet read at the time of occurrence of the trouble and printing a necessary number of copies from image data not yet printed by the necessary number are performed. These operations are described later in detail. The "data following a trouble end" set at the step S1205 indicate the number NCR of remaining copies and the number MDR of remaining originals in the print operation interrupted by the trouble. The CPU2 transmits these data to the CPU1 by printer communication 2 (S625 in FIG. 64) in trouble resetting, to be incorporated in the CPU1 through data communication interruption (FIGS. 32 and 33) started in the CPU1 in correspondence thereto. The data communication interruption shown in FIGS. 32 and 33, the PRT communication 1 interruption of the CPU2 shown in FIGS. 64 to 68, and processing related to the trouble are described in the item of "4. PRT control" in detail.

1-1-2. In Case of Absence of Already Reserved Copy

If no copy is reserved (NO at S123), a copy operation of the set originals is executed in response to entry of the start key 296 (S135), on condition that the apparatus is not in a print operation. Namely, the general copy control is performed in response to the entry of the start key 296 (S135). After the copy operation is ended, time interruption is authorized (S179), so that the apparatus enters an interruption wait state. Presence/absence of the reserved copy is determined at the step S123 on the basis of a reserve flag RSVF. This reserve flag RSVF is reset (S3721) when print operations of all reserved copies are ended (YES at S3719) as shown in the time PRT control in FIG. 57, for example.

As shown in FIG. 44, the general copy control at the aforementioned step S135 includes original read control (S1105) and PRT control (S1109) for printing an image read by the original read control (S1105), which are repeatedly executed until no original remains in a preliminary insertion part (S1113) for implementing copy operations for set originals. Copy data set 2 processing (S1103) shown in FIG. 44 is adapted to set the number of copies and the copy size. In other words, this processing is adapted to execute only steps S1603 and S1607 in the copy data set 1 processing shown in FIG. 42.

If no reserved copy is present (NO at S123) and the apparatus executes a print operation in the entry of the start key 296 (YES at S133), this print operation is related to the set originals, and hence the entry of the start key 296 is neglected.

1-1-3. In Case of Presence of Already Reserved Copy

If an already reserved unprinted copy is present, the processing branches as follows, in response to whether or not the set originals are reserved, whether or not the reserve priority mode is selected, and whether the copy operation can be immediately performed or priority must be given to the already reserved copy if the reserve priority mode is selected:

1-1-3-1. In Case of Reserving Set Original

Figure 39A:
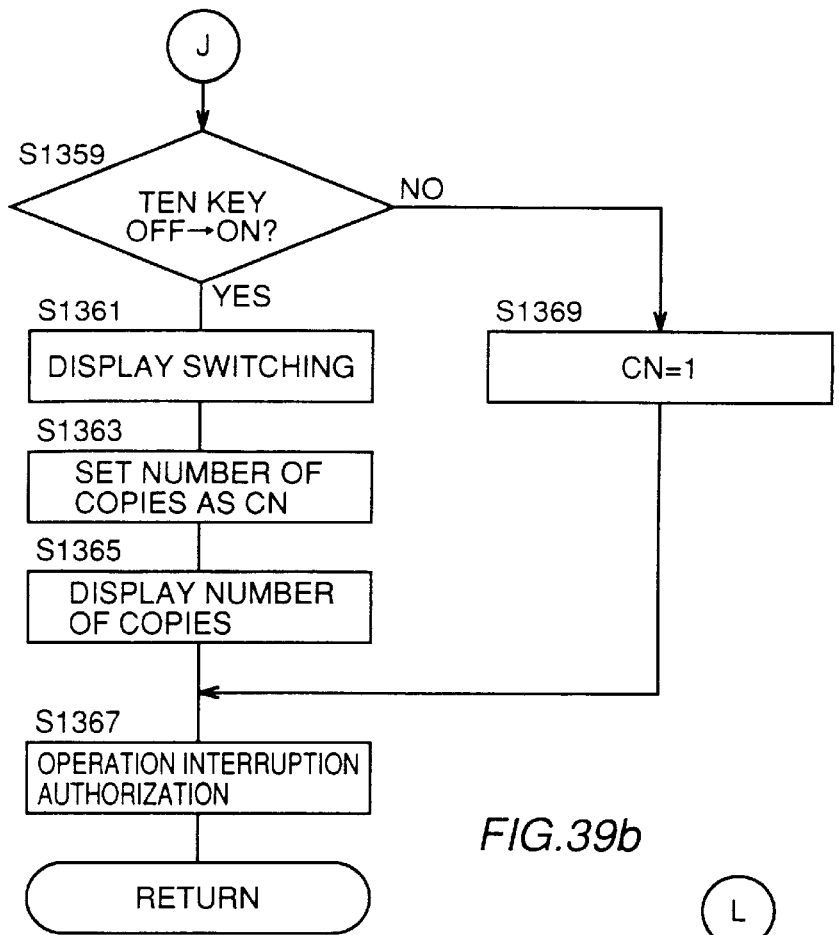
FIGS. 39a and 39b are further parts of the flow chart showing the processing in the data set processing (S117) shown in FIG. 29.
Figure 39B:
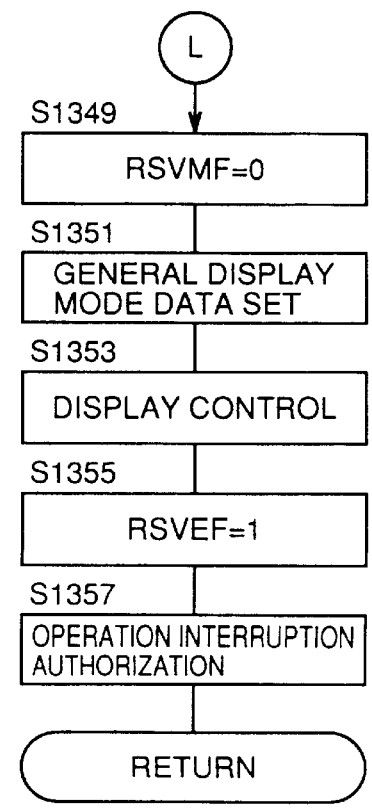
Figure 40:
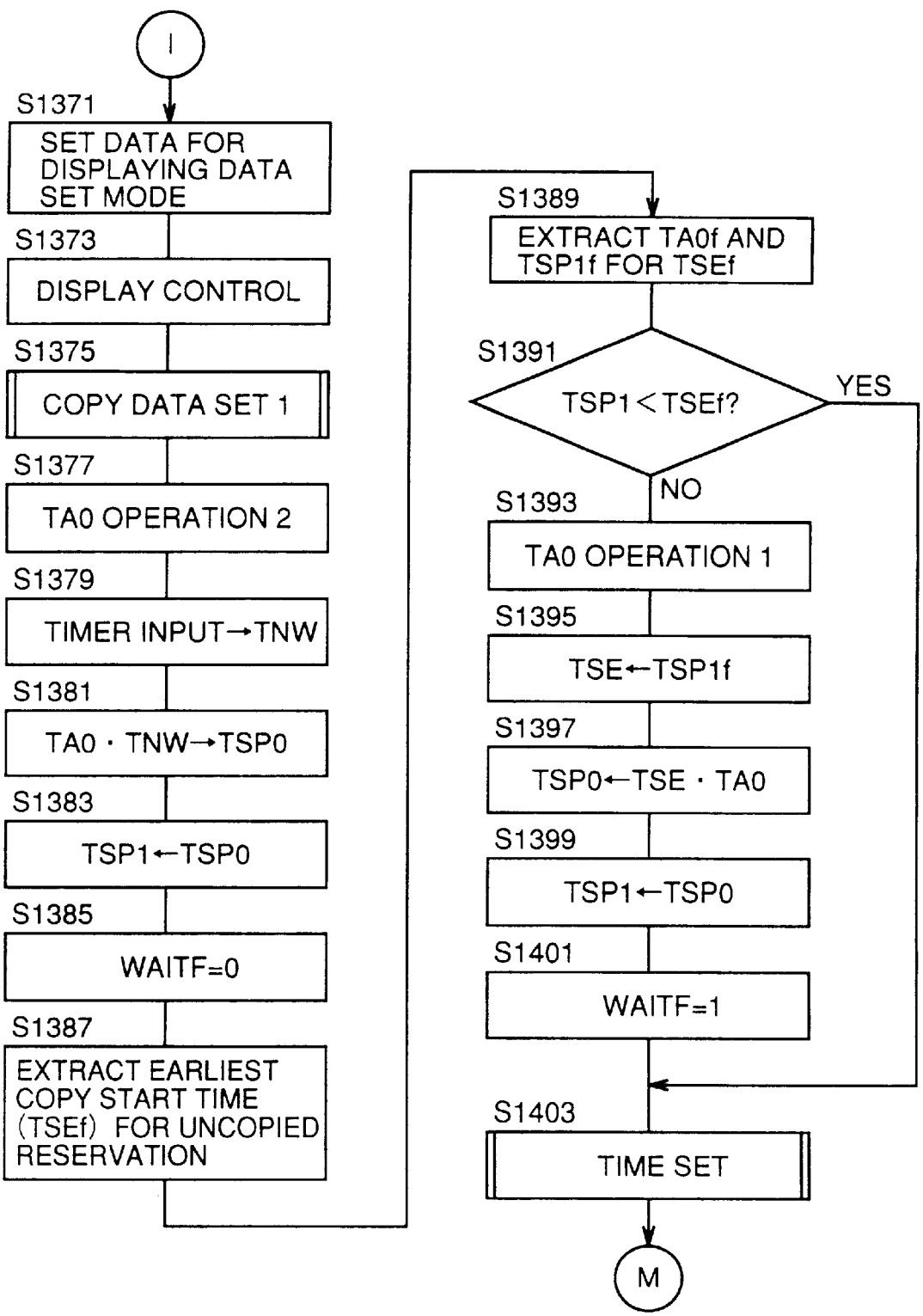
FIG. 40 is a further part of the flow chart showing the processing in the data set processing (S117) shown in FIG. 29.

When set originals are reserved and setting thereof is completed in the data set processing (S117), a reserve end flag RSVEF is set (step S1355 in FIG. 39). Namely, a determination of YES is made at a step S125 when setting of the reserved copy is completed. When an already reserved copy is present (YES at S123) and a reservation is made as to the set originals, therefore, processing at steps S137 to S141 is executed in response to entry of the start key 296.

At the steps S137 to S141, time interruption is authorized (S137), original read control is performed to read the set originals and store the same in a memory disk (S139), and thereafter the reserve end flag RSVEF is reset (S141) so that the process enters an interruption wait state. In the aforementioned original read control (S139), processing of starting the CPU3 for reading the originals and storing the same in the memory disk through the RAM1 etc. is performed. This processing is described in the item of "3. original read control" in detail with reference to FIGS. 45 to 51 and 69a to 74.

1-1-3-2. In Case of Not Reserving Set Original

When an already reserved unprinted copy is present (YES at S123) but entry of the start key 296 is made without setting the set originals for a reserved copy, no reserve end flag RSVEF is set. Therefore, a determination of NO is made at the step S125 and the process advances to processing following a step S143. In the processing following the step S143, the process branches in response to presence/absence of the reserve priority mode, whether or not the print operation for the already reserved copy is hindered if the copy operation (original read operation +print operation) of the set originals is immediately executed, whether or not the print operation is under execution and whether or not the print operation under execution is that for the already reserved copy, for executing processing at steps S147 to S149, at a step S163, or any of steps S157 to S161, the step S163 and steps S167 to S177 in response to the entry of the start key 296.

1-1-3-2-1. In Case of Selecting Reserve Priority Mode

Figure 41:
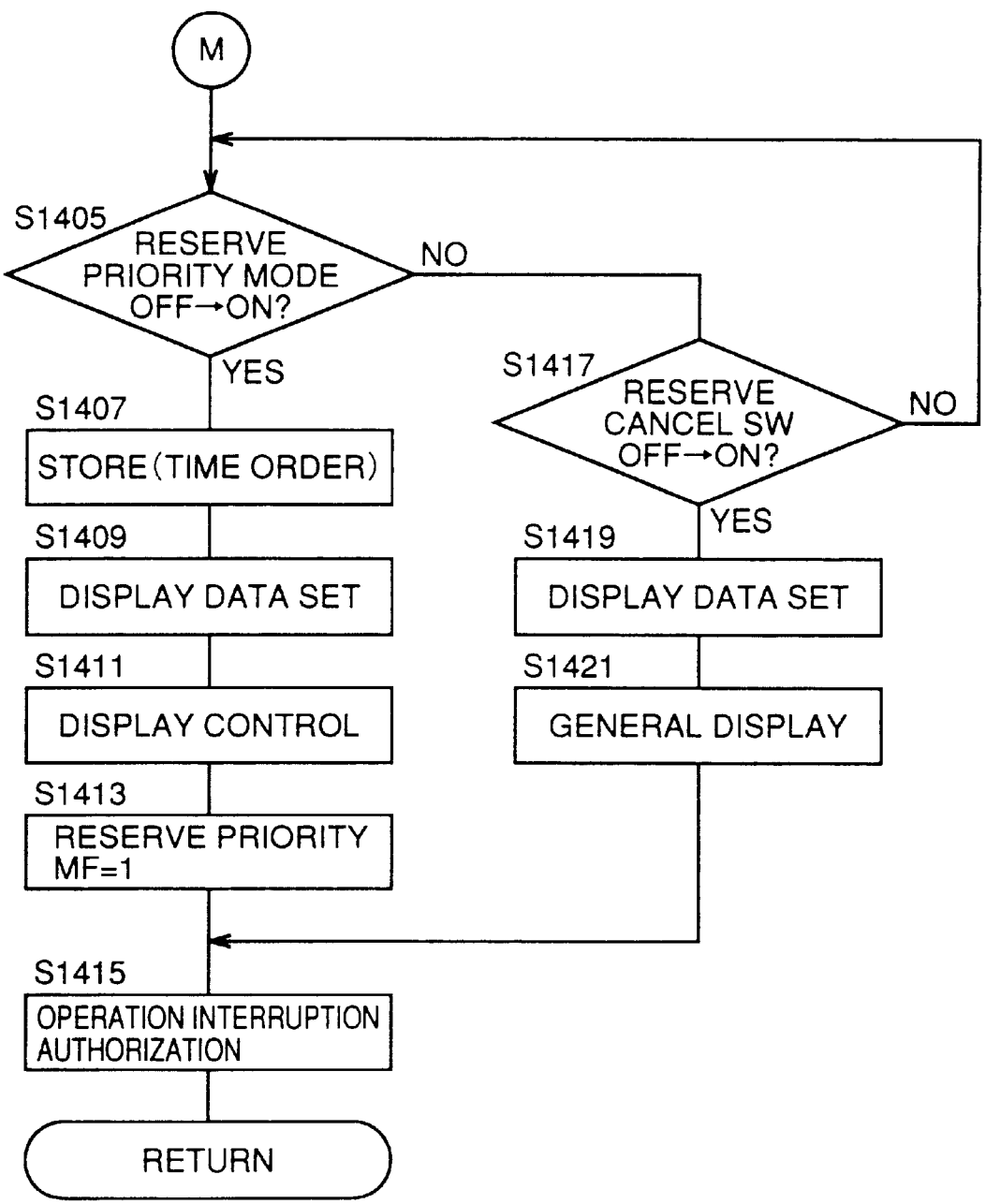
FIG. 41 is the remaining part of the flow chart showing the processing in the data set processing (S117) shown in FIG. 29.

When the reserve priority copy switch 298 is operated, thereafter copy data are set, and the reserve priority copy switch 298 is again operated (YES at S1405 in FIG. 41), the reserve priority mode is selected and a reserve priority mode flag is set (S1413 in FIG. 41).

1-1-3-2-1-1. In Case of Causing No Hindrance in Print Operation for Reserved Copy When the reserve priority mode is selected and data of set originals are inputted, a determination is made as to whether or not the time zone for the print operation for the already reserved copy is influenced in case of immediately executing the copy operation for the set originals (S1391 in FIG. 40). If the print operation for the already reserved copy is hindered as a result (NO at S1391), the print operation for the set originals is set to be executed after completion of the print operation for the already reserved copy (S1393 to S1399). Namely, a wait flag WATF is set (S1401). If the time zone for the print operation for the already reserved copy is not influenced (YES at S1391), on the other hand, no wait flag WAITF is set since no hindrance is caused when the copy operation for the set originals is immediately executed.

When no influence is exerted on the time zone for the print operation for the already reserved copy in case of selecting the reserve priority mode (YES at S143), operating the start key 296 and immediately executing the copy operation for the set originals, therefore, no wait flag WAITF is set (NO at S145), and hence the general copy control at the step S163 is immediately executed. Thus, the set originals are subjected to the copy operation (original read operation+print operation).

The original read control executed in the general copy control at the step S163 is adapted to start the original read communication interruption of the CPU3 for reading the originals and temporarily storing the image data thereof not in the RAM1 but in the RAM2. This processing is described in the item of "3. original read control" in detail with reference to FIGS. 45 to 51 and 69a to 74. The PRT control executed in the general copy control at the step S163 is adapted to perform processing of starting PRT communication 1 interruption of the CPU2 for reading image data from the RAM2 and executing a print operation etc. This processing is described in the item of "4. PRT control" in detail with reference to FIGS. 52 and 53 and 64 to 68.

1-1-3-2-1-2. In Case of Causing Hindrance in Print Operation for Reserved Copy If the time zone for the print operation for the already reserved copy is influenced when the reserve priority mode is selected (YES at S143), the start key 296 is operated and the copy operation for the set originals is immediately executed, the wait flag WAITF is set (YES at S145) and hence time interruption is authorized (S147), original read control (S149) is executed for reading the set originals, and thereafter the process enters an interruption wait state. Namely, only an original read operation for the set originals is executed, and the print operation therefor is performed after completion of the print operation for the already reserved copy. In the original read control at the step S149, processing of starting the original read communication interruption of the CPU3 for reading the originals and storing the image data in the memory disk through the RAM1 is performed, as described in the item of "3. original read control" in detail with reference to FIGS. 45 to 51 and 69a to 74.

1-1-3-2-2. In Case of Not Selecting Reserve Priority Mode

When the set originals are not set for the reserved copy (NO at S125), the reserve priority mode is not selected either (NO at S143) and the start key 296 is operated (YES at S119), the set originals are immediately copied.

1-1-3-2-2-1. In Case of Non-Execution of Print Operation

When the start key 296 is operated while selecting neither the reserved copy nor the reserve priority mode and the print operation for the already reserved copy is not currently executed (NO at S151), the general copy control at the step S163 is immediately executed for performing the copy operation (original read operation+print operation) for the set originals, similarly to the aforementioned "1-1-3-2-1-1. in case of causing no hindrance on print operation of reserved copy".

1-1-3-2-2-2. In Case of Execution of Print Operation

When the start key 296 is operated while selecting neither the reserved copy nor the reserve priority mode, a print operation is currently in execution (YES at S151) and this print operation is that for the already reserved copy (print operation in the time PRT control) (YES at S153), a print interruption flag PRIRF indicating interruption of the print operation for the reserved copy is set (S157), copy interruption data is set (S159), and thereafter PRT communication 1 is performed (S161). Thus, the print operation for the already reserved copy currently in execution is interrupted and PRT communication 1 interruption (FIGS. 64 and 65) of the CPU2 is started so that operation contents to be re-started later (numbers MDR and NCR of the remaining originals and copies) are stored in prescribed addresses (S641 in FIG. 65). As to the print operation currently in execution (print operation included in the print operation for the already reserved copy currently in execution), processing for completing this operation is executed, as shown at a step S643 in FIG. 65.

When the print operation for the already reserved copy in execution is interrupted, the general copy control at the step S163 is then executed, whereby the copy operation (original read operation+print operation) related to the set originals is performed. This general copy control (S163) is adapted to read the set originals for storing image data thereof in the RAM2 while reading the image data from the RAM2 and printing the same, as described in the above item of "1-1-3-2-1-1. in case of causing no hindrance on print operation for reserved copy". This processing is repeatedly executed until no original is present in the preliminary insertion part 103.

When the copy operation by the general copy control (S163) is ended, the processing at the steps S167 to S177 is thereafter executed since the print interruption flag PRIRF is set (YES at S165). First, the display is switched from that indicating the effect that the print operation for the reserved copy is interrupted and the interruption copy operation is executed to that indicating the effect that the interrupted reserved copy is printed (S167). Then, a timer is reset and started (S169), for waiting by a prescribed time (S171), in consideration of addition of an interruption copy. After the waiting by the prescribed time (YES at S171), copy restart data stored at the step S641 in FIG. 65 is set (S173) and PRT control is executed on the basis of this data (S175). In this PRT control, processing of starting PRT communication 1 interruption (FIGS. 64 to 68) of the CPU2, reading image data indicated by the remaining operation content (refer to a step S639 in FIG. 65) from the memory disk to the RAM2 (refer to a step S635 in FIG. 65) and executing a print operation etc. is performed. This processing is described in the item of "4. PRT control" in detail with reference to FIGS. 52 and 53 and 64 to 68.

When the reserved copy restarted after interruption is ended, the print interruption flag PRIRF is reset (S177), time interruption is authorized (S179), and the process enters an interruption wait state.

1-2. In Case of Branching to Step S127

Figure 58:
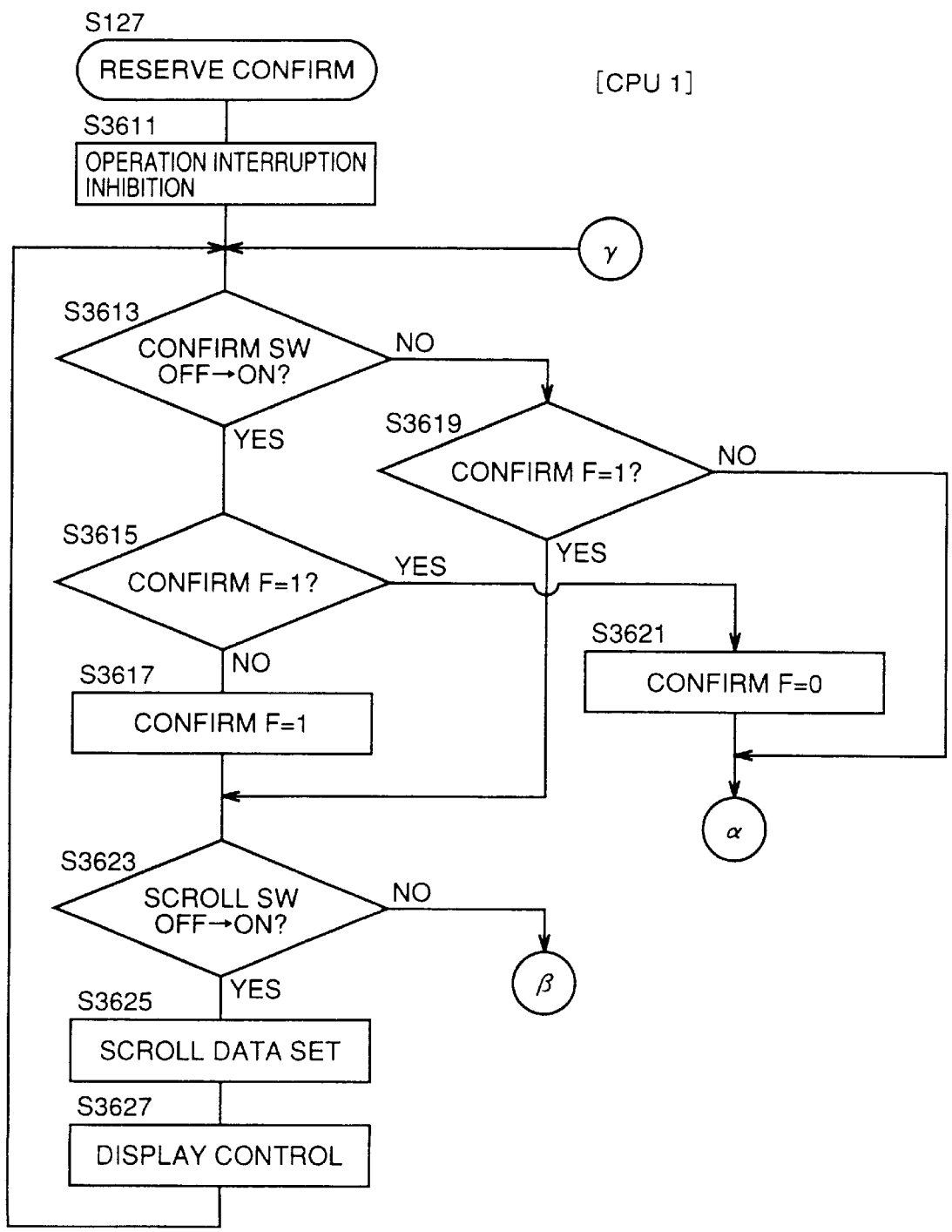
FIG. 58 is a part of a flow chart showing processing executed in reserve confirmation (S127) shown in FIG. 29.
Figure 59:
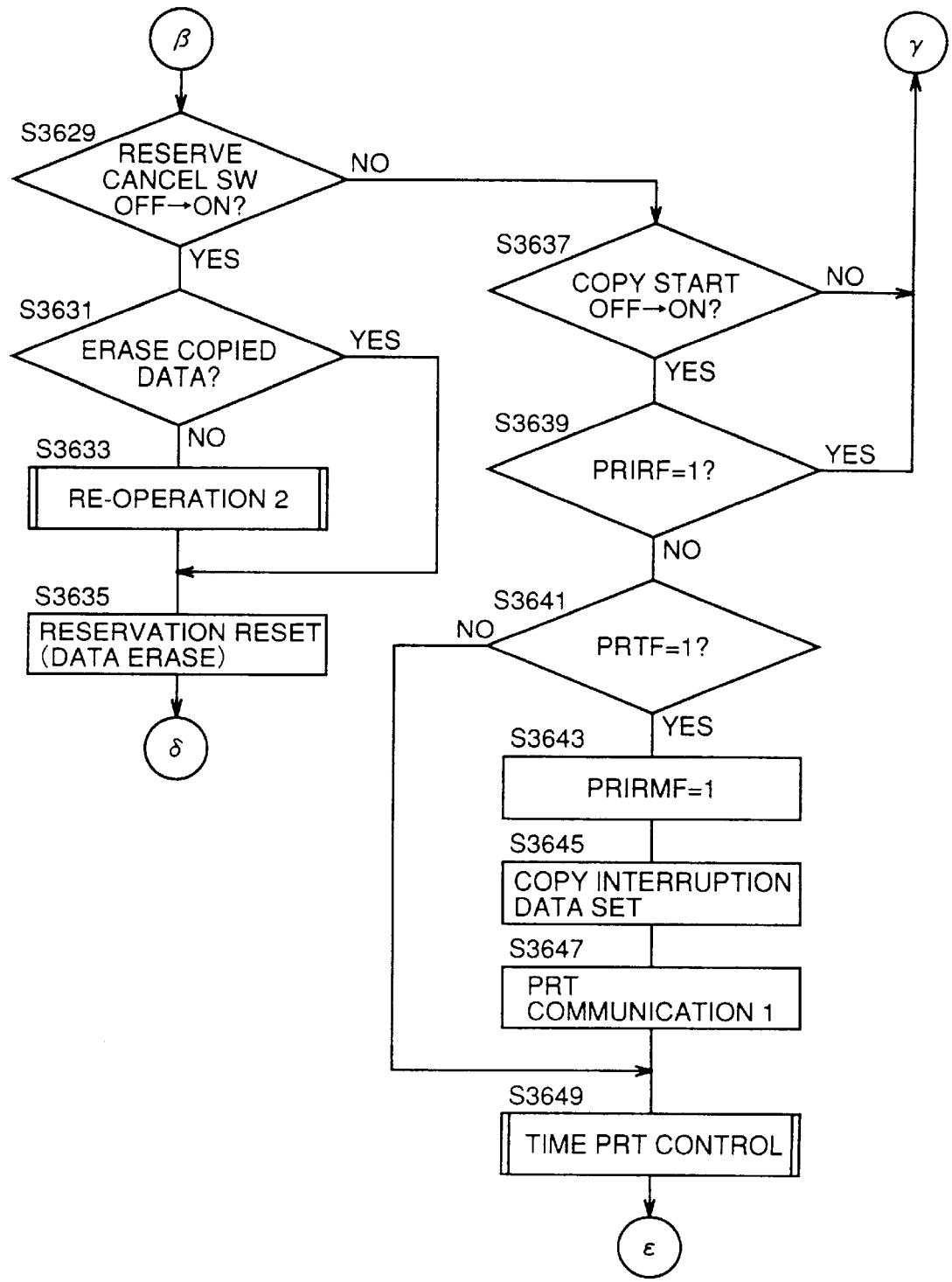
FIG. 59 is another part of the flow chart showing the processing executed in the reserve confirmation (S127) shown in FIG. 29.
Figure 60:
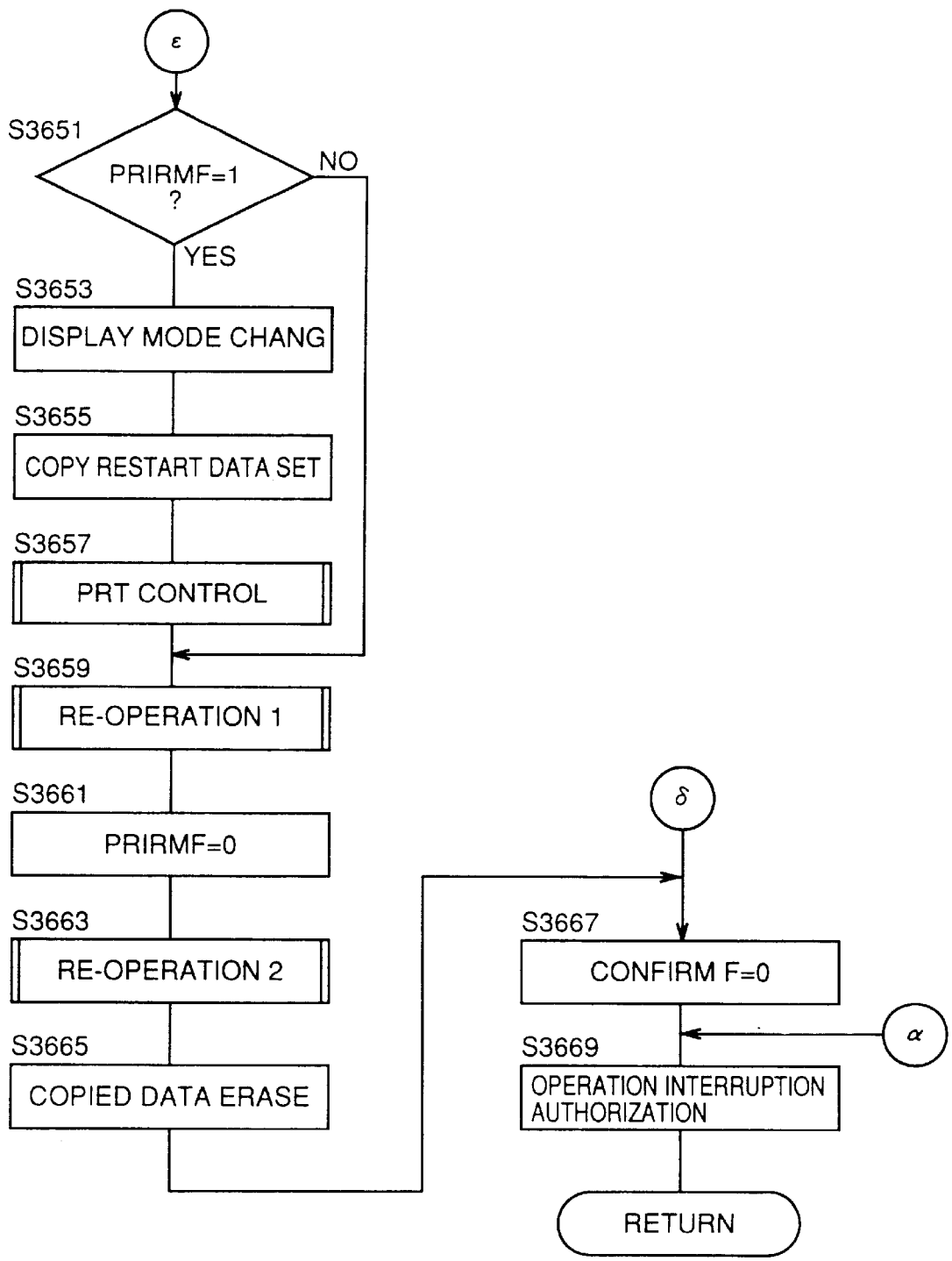
FIG. 60 is the remaining part of the flow chart showing the processing executed in the reserve confirmation (S127) shown in FIG. 29.
Figure 61:
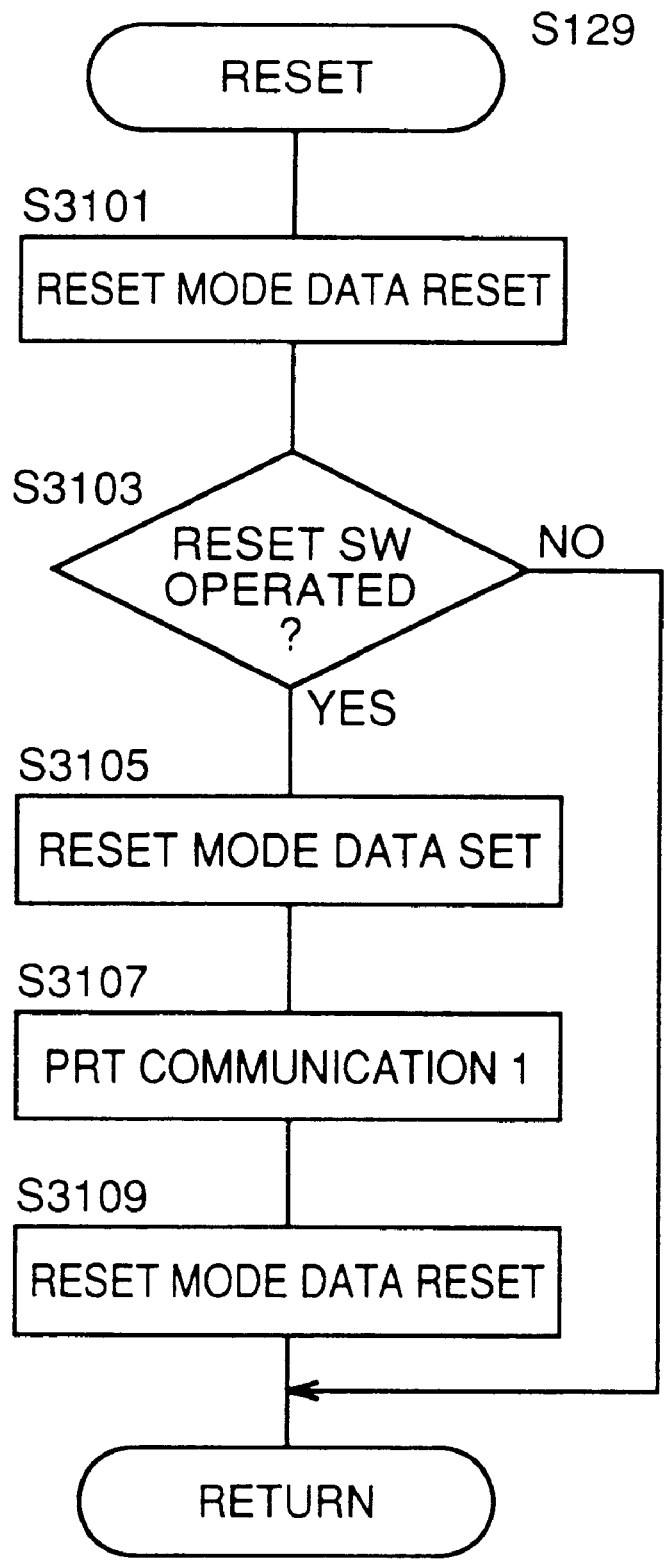
FIG. 61 is a flow chart showing processing executed in resetting (S129) shown in FIG. 29.

When a determination is made on an operation input other than that of the start key 296 at the step S119 (NO at S119), the process advances to processing following a step S127. At the step S127, reserve confirm processing shown in FIGS. 58 to 60 is executed. At a step S129, reset processing shown in FIG. 61 is executed.

1-2-1. Reserve Confirm Processing (FIGS. 58 to 60)

The reserve confirm processing (S127) is executed when an operation input is made from the confirm switch 295 (YES at S3613). When no operation input is made from the confirm switch 295 (NO at S3613), no confirm flag is therefore set (NO at S3619) and an input is made from another operation switch, operation interruption is authorized (S3669), and the process returns. Namely, the process advances to reset processing shown in FIG. 61.

1-2-1-1. Set/Reset of Reserve Confirm Mode

If no confirm flag is set (NO at S3615) when the confirm switch 295 is operated (YES at S3613), the confirm flag is set (S3617) to enter the reserve confirm mode. If the confirm flag is set (YES at S3615) when the confirm switch 295 is operated (YES at S3613), on the other hand, the confirm flag is reset (S3617) to go out of the reserve confirm mode.

1-2-1-2. Scroll

When the scroll switch 299 is operated in the reserve confirm mode (YES at S3619), scroll data is set (S3625) and the display is switched in accordance with the set data (S3627). A screen indicating a desired reserved copy can be invoked on the liquid crystal panel 291 by repeating this scroll operation. In relation to the invoked reserved copy, the processing in FIGS. 59 and 60 is executed. For example, processing of interrupting the print operation for the invoked reserved copy is performed.

1-2-1-3. Cancel of Reservation

If not the scroll switch 299 (NO at S3623) but the reservation cancel switch 293 is operated (YES at S3629) in the reserve confirm mode (YES at S3619), a determination is made as to whether or not the reserved copy invoked on the liquid crystal panel 291 has already been printed, so that re-operation 2 is executed (S3633) if the reserved copy has not yet been printed (NO at S3631). Namely, start and end times for another reserved copy resulting from elimination of the reserved copy displayed on the liquid crystal panel 291 are re-operated, and operation processing for approaching the set end time for the other reserved copy to the desired end time is executed if the end time for the other reserved copy is set at a time later than the desired end time (end time inputted by the user). Thereafter the reservation for the reserved copy displayed on the liquid crystal panel 291 is reset (S3635), the confirm flag is reset (S3667), operation interruption is authorized (S3669), and the process returns. Thus, the reservation can be re-set. The re-operation 2 processing (S3633) is described in the item of "3. original read control" in detail with reference to FIGS. 45 to 51 and 69a to 74.

When a determination is made that the reserved copy displayed on the liquid crystal panel 291 has been printed at the step S3631 (YES at S3631), on the other hand, the re-operation 2 (S3633) is not executed but the data related to the reserved copy displayed on the liquid crystal panel 291 are immediately erased (S3635), the confirm flag is reset (S3667), the operation interruption is authorized (S3669), and the process returns. Namely, printed data are erased in this case and the print operation for the other reserved copy is not influenced, and hence no correction is performed by the re-operation 2.

1-2-1-4. Start Command

If an interruption copy operation (copy operation executed by interrupting the print operation for the already reserved copy: refer to steps S157 to S161 and S163 in FIG. 30) is executed (YES at S3639) when neither the scroll switch 299 (NO at S3623) nor the reserve cancel switch 293 (NO at S3629) but the start key 296 is operated (YES at S3637) in the reserve confirm mode (YES at S3619), the operation of the start key 296 is neglected and the process returns to the step S3613. Namely, priority is given to execution of the currently executed interruption copy operation.

If a print operation which is not an interruption copy operation is executed in the above, i.e., a print operation is executed (YES at S3641) with no setting of the print interruption flag PRIRF (NO at S3639), a print interruption mode flag PRIRMF indicating interruption of the print operation for the already reserved copy resulting from the interruption print is set (S3643), copy interruption data indicating the effect that the print operation in execution is interrupted (S3644), and PRT communication 1 is executed (S3647). Thus, the PRT communication 1 interruption (FIGS. 64 to 68) of the CPU2 is started, so that data on the contents of the print operation to be restarted later (the numbers MDR and NCR of the remaining originals and copies in the print operation theretofore executed) are stored as shown at the step S641 in FIG. 65 and the processing for completing the currently executed print operation (that included in the currently executed print operation) is executed as shown at the step S643.

Then, time PRT control is executed (S3649). If no print operation is executed at the step S3641 (NO at S3641), the steps S3643 to S3647 are skipped, so that the time PRT control (S3649) is immediately executed. Due to this time PRT control (S3649), the interruption print operation for the reserved copy invoked on the liquid crystal panel 291 is implemented.

As shown in FIG. 57, display control is first performed (S3701), to display the interruption printing of the reserved copy. Then, a time print control flag TPCF is set to indicate the time PRT control (S3703). Then, the trouble mode flag TBLM is determined (S3705). Namely, a determination is made as to whether or not this is time PRT control executed after trouble recovery. Since this is not the time PRT control executed after trouble recovery (NO at S3705), the process advances to a step S3707, for setting copy start data (S3707). If time PRT control is executed after trouble recovery, on the other hand, copy restart data is set (S3709).

Figure 52:
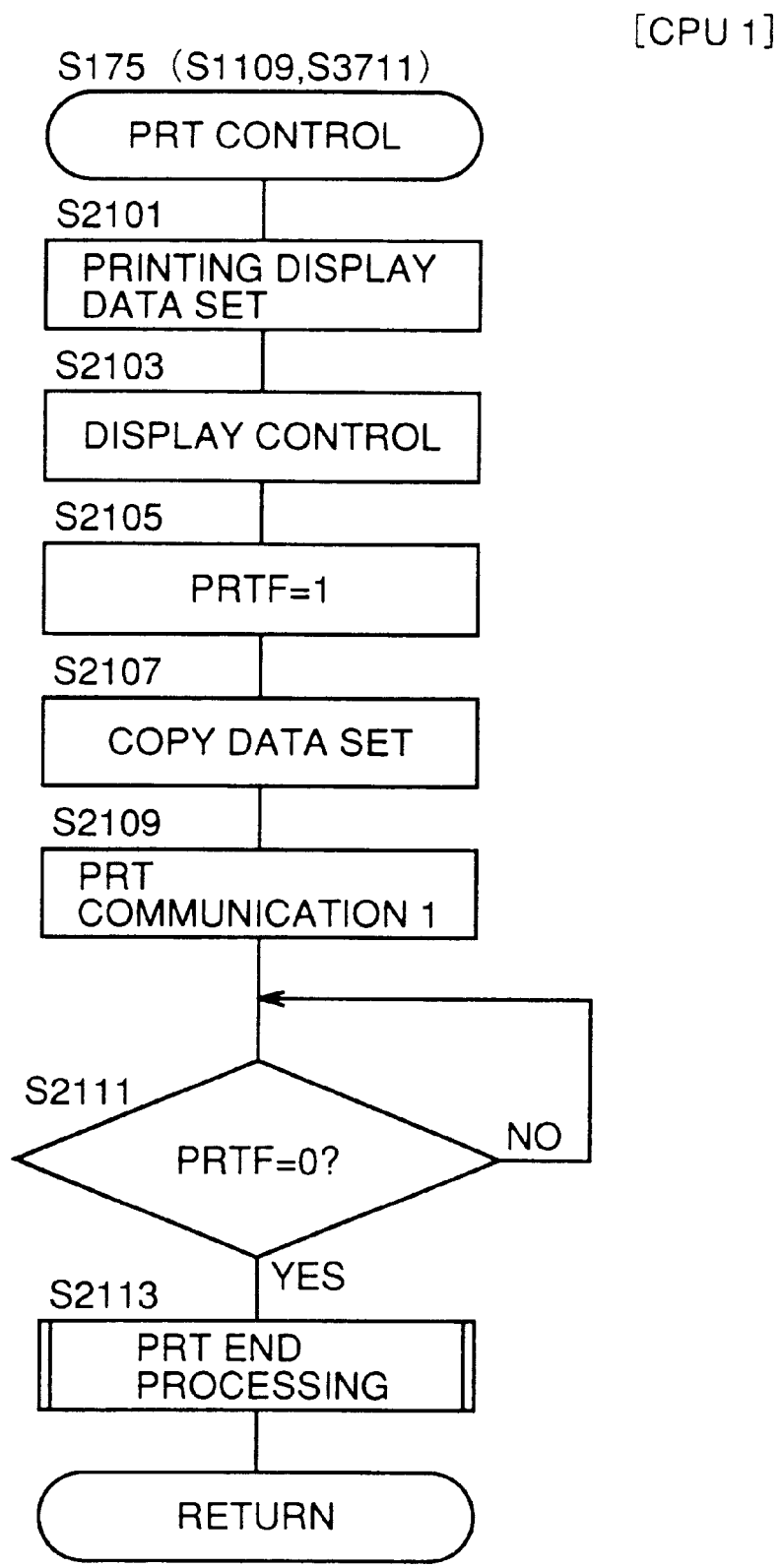
FIG. 52 is a flow chart showing processing executed in PRT control (S175, S1109, S3657 or S3711) shown in FIG. 31, 44, 57 or 60.

Then, PRT control is executed (S3701). Namely, a display is made to indicate the print operation (S2101 and S2103), a print flag PRTF indicating the print operation is set (S2105) and copy data are set (S2107), as shown in FIG. 52. The copy data are related to the reserved copy invoked on the liquid crystal panel 291 for the interruption printing.

Then, PRT communication 1 is executed (S2109). Thus, the PRT communication 1 interruption of the CPU2 is started, for executing the processing shown in FIGS. 65 to 68. After the PRT communication 1 (S2109), the CPU1 enters a wait state of waiting for resetting of the print flag PRTF (S2111).

In the CPU2 starting the PRT communication 1 interruption, on the other hand, data transmitted from the CPU1 through the control bus CODB is inputted (S611), to determine whether or not this is a reset mode on the basis of this data (S613). Since this is not a reset mode (NO at S613), the process advances to a step S629. At the step S629, a determination is made as to whether or not this is a copy start mode. In this case, the copy start data is set at the step S3707 of the aforementioned time PRT control and hence the determination at the step S629 is of YES, and the process advances to a step S631. At the step S631, a determination is made as to whether or not this is a reserved copy mode. In this case, the print operation for the reserved copy invoked on the liquid crystal panel 291 is to be executed, and hence the determination at the step S631 becomes YES and the process advances to a step S633.

At the step S633, the copy data including the number NC of copies, the number MD of originals, the copy size and the original size related to the reserved copy invoked on the liquid crystal panel 291 are read, so that the numbers NC and MD of the copies and the originals are set at variables N and M for controlling the numbers of the copies and the originals respectively. Then, the ID for the reserved copy and image data of pages specified by the number M of the originals are read from the memory disk and stored in the RAM2 (S635). Thus, the print operation can be made on the basis of the image data in the RAM2.

Thus, the process advances to processing following a step S653, so that print sequence control including control of charge/develop/transfer systems (S653), control of a transport system (S655) and control of a fixing system (S659) is executed for printing the images. This print sequence control is repeated by decrementing the number M (S665) every time the print sequence for a common image is carried out NC times (YES at S663) and reading image data instructed by the number M and the ID from the memory disk. When this print sequence control is ended in relation to the numbers NC and MD of the set copies and originals (YES at S667), the process goes out of the print sequence and advances to a step S673.

At the step S673, a determination is made as to whether or not this is a reserved copy mode. Since this is a reserved copy mode (YES at S673) as described in relation to the step S631, the process advances to a step S675. At the step S675, a reprint flag REPTF indicating whether or not a management report has been created is determined. In this case, no management report has been created (NO at S675), and hence processing following a step S677 is executed.

Namely, the reprint flag REPTF is first set (S677). Then, data of the management report are created in the RAM2

(S679). Then, "1" is set as the variables N and M for controlling the numbers of the copies and the originals respectively (S681). Thereafter the process advances to the step S653. Thus, a print sequence for printing the management report is executed, to print out the management report illustrated in FIG. 90. This management report also serves as a division for each printed out reserved copy. In general, the user is not beside the apparatus in the print operation for the reserved copy. When a plurality of reserved copies are made, therefore, it may be difficult to sort the prints of the reserved copies in a later stage. However, the printed papers for the reserved copies can be readily sorted by creating the management report.

When a single copy of the management report is printed out, the process goes out of the print sequence since the variables N and M are "1" (YES at S667) as described above, and advances from the step S673 to the step S675. This time the print flag REPTF is set (YES at S675) and hence the process advances to a step S683. Thus, the reprint flag REPTF is reset (S683), data indicating the effect that the print operation is ended (S685), PRT communication 2 is performed (S687) and the process enters an interruption wait state. If this is not a reserved copy mode (NO at S673), on the other hand, no management report is created and the process immediately advances to the processing following the step S685.

Figure 32:
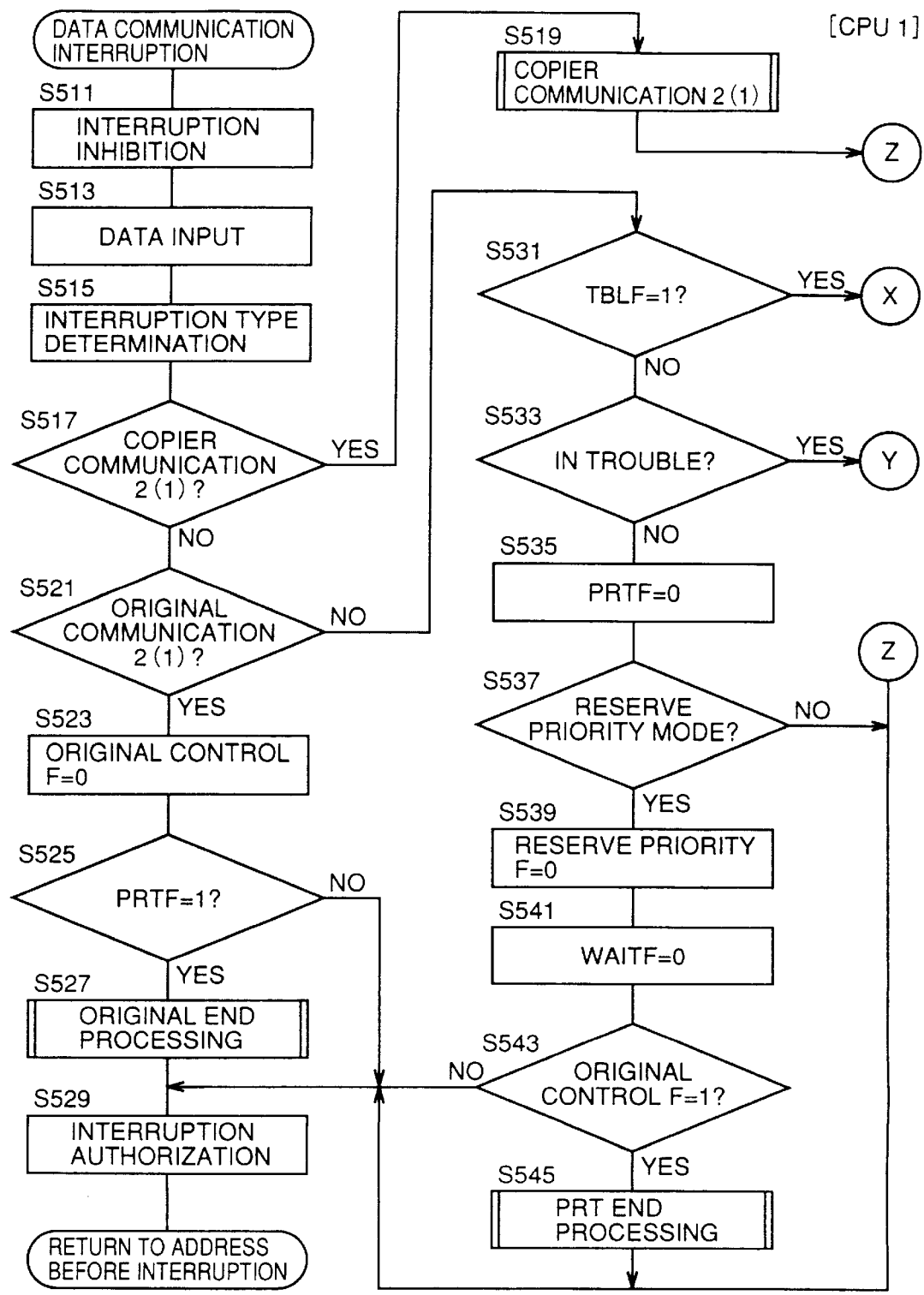
FIG. 32 is a part of a flow chart showing processing executed in data communication interruption in the CPU1 of the copying apparatus according to the second embodiment.

When the PRT communication 2 is performed at the step S687, the CPU1 starts data communication interruption shown in FIGS. 32 and 33. This data communication interruption results from the PRT communication 2, and hence the process progresses as NO at a step S517 6 NO at a step S521, to reach a step S531. This is not interruption resulting from a trouble (NO at S531 and S533), and hence the process advances to a step S535. Thus, the print flag PRTF is reset. Then, the process advances to a step S537, and then advances to a step S529 since this is not a reserve priority mode (NO at S537), and returns to the address before the interruption following authorization of interruption.

In this case, the address before the interruption is the wait state at the step S2111 shown in FIG. 52. Since the print flag PRTF is reset at the step S535 shown in FIG. 32 as described above, the process goes out of the wait state at the step S2111 and advances to a step S2113. At the step S2113, PRT end processing is executed.

Figure 53:
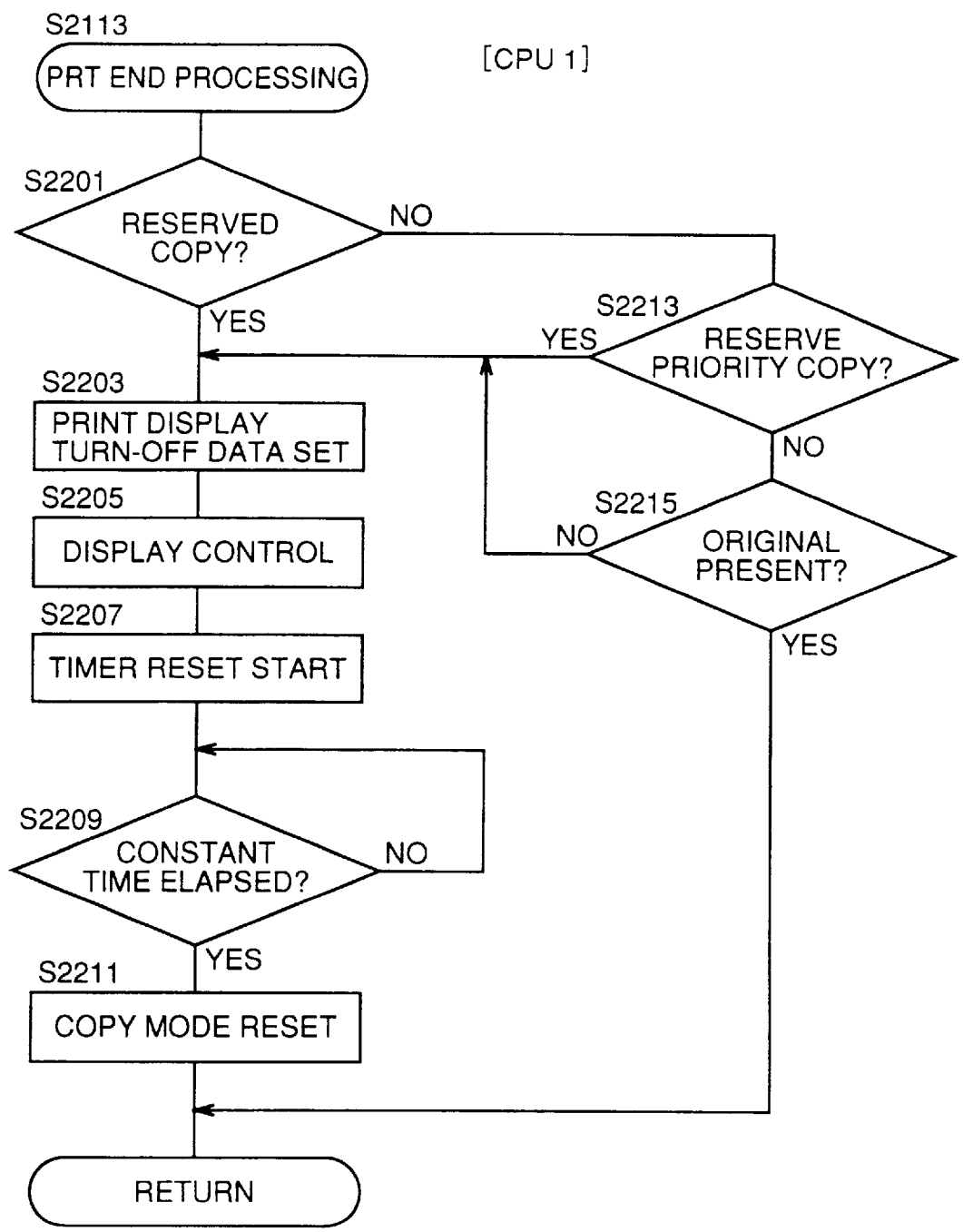
FIG. 53 is a flow chart showing processing executed in PRT end processing (S545 or S2113) shown in FIG. 32 or 52.

FIG. 53 shows the PRT end processing. First, a determination is made as to whether or not this is a reserved copy. In this case, the print operation for the reserved copy is to be executed and hence the determination at a step S2201 become YES. Thus, the process advances to steps S2203 and S2205, to turn off the display "printing" on a portion substantially close to the center of the lower part of the liquid crystal panel 291. Thereafter the timer is started, the copy mode is reset after a lapse of a prescribed time (YES at S2209), and the process returns. Since the PRT end processing invoked at the step S2113 of the PRT control shown in FIG. 52 invoked at the step S3711 of the time PRT control shown in FIG. 57 is ended this time, the process first returns to the end point of the step S2113 shown in FIG. 52 and then returns to the end point of the step S3711 of the time PRT control shown in FIG. 57.

Therefore, the process then advances to a step S3713 shown in FIG. 57. At the step S3713, communication is made with a personal computer specified by the ID. In this case, information on the effect that the interruption print operation for the reserved copy is ended and information specifying the copier (printer) ending the print operation are transmitted to the personal computer.

Then, the current time is inputted from the clock IC and set at TCE (S3715), and stored in a column corresponding to the ID for the reserved copy in the memory table shown in FIG. 100 (S3717). Thereafter a determination is made as to whether or not print operations for all reserved copies are ended with reference to the table shown in FIG. 100 (S3719). This determination can be made on the basis of presence/absence of the data of TCE (not shown in FIG. 100). If the print operations for all reserved copies are ended as a result of the determination at the step S3719 (YES at S3719), the reserve flag RSVF indicating presence/absence of a reserved copy is reset (S3721), the time print control flag TPCF indicating time PRT control is reset (S3723), and the process returns. In this case, the process returns to the end point of the step S3649 shown in FIG. 59.

When the processing of printing the reserved copy displayed on the liquid crystal panel 291 is ended, the print interruption mode flag PRIRMF is determined at a step S3651. Namely, a determination is made as to whether the print operation for the reserved copy executed at the step S3649 has been executed by interrupting a print operation executed at the point of time of the input operation of the start key 296 or in correspondence to an input operation of the start key 296 during execution of no print operation.

If the interruption print operation has been performed by interrupting the executed print operation (YES at S3651), the display indicating the print operation in the interruption mode is switched to that indicating the print operation interrupted by the interruption print operation (S3653), copy restart data is set (S3655), and the interrupted print operation is restarted (S3657).

Then, the delays caused in set start and end times for other reserved copies are corrected by re-operation 1 processing (S3659), and the print interruption mode flag PRIRMF is set (S3661).

Further, re-operation 2 processing is performed (S3663). A space results from the interruption by the print operation for the reserved copy in the original print time zone for the reserved copy as described above, and hence the re-operation 2 processing (S3663) is adapted to make change through this when a changed set end time TSP1 for another unprinted reserved copy can be approached to a desired end time (unchanged set end time TSP0) for this reserved copy.

Then, the data for the interruption copy operation are erased (S3665), the confirm flag is reset (S3667), operation interruption is authorized (S3669), and the process returns. The re-operation 1 processing (S3659) and the re-operation 2 processing (S3663) are described in the item of "3. original read control" in detail with reference to FIGS. 45 to 51 and 69a to 74.

If a determination is made at the step S3651 that the print operation has been executed in correspondence to an input operation of the start key 296 during no execution of the print operation (NO at S3651), on the other hand, the processing at the steps S3653 to S3657 is skipped so that the processing following the step S3659 is immediately executed.

1-2-2. Reset Processing (FIG. 61)

The reset processing (S129) is executed in response to an operation input (YES at S3103) of the reset switch 294. When the reset switch 294 is operated (YES at S3103), reset mode data is set (S3105) and thereafter PRT communication 1 processing (S3107) is executed. Thus, the PRT communication 1 interruption (FIGS. 64 to 68) of the CPU2 is started for setting trouble data (S2351) when the apparatus is in trouble (YES at S617) for performing PRT communication 2 and starting the data communication interruption (FIGS. 32 and 33) of the CPU1 (S2353) and thereafter the printer system is stopped (S2355) by TBL control (S627).

If the apparatus is not in trouble at the step S617 (NO at S617), on the other hand, the trouble flag TBLF and the trouble data are reset (S619 and S621) so that processing (S623) of setting data on the remaining operation contents (the numbers NCR and MDR of the remaining copies and originals) after completion of a trouble countermeasure is executed, and thereafter the data communication interruption (FIGS. 32 and 33) of the CPU1 is started by the printer communication 2 processing (S625).

When the data communication interruption (FIGS. 32 and 33) of the CPU1 is started by the PRT communication 2 processing (S2353) in the aforementioned TBL control (S627), the determination at the step S533 shown in FIG. 32 becomes YES, and processing following a step S547 shown in FIG. 33 is executed.

First, the display "printing" on the liquid crystal panel 291 is turned off and "trouble" is displayed (S549 to S553). If no print operation for a reserved copy is executed (NO at S555), i.e., the print operation causing a trouble is accompanied by an original read operation (NO at S555), trouble data is set (S557) and thereafter original read communication is performed (S559). Due to this original read communication, the original read communication interruption of the CPU3 (refer to FIGS. 69a to 74) is started.

Figure 69A:
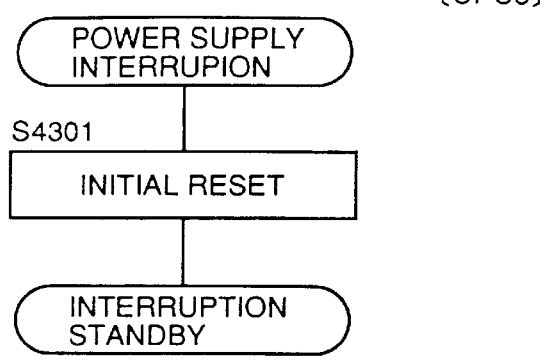
FIGS. 69a and 69b are parts of a flow chart showing processing executed in power supply or original read communication interruption in a CPU3 of the copying apparatus according to the second embodiment.
Figure 69B:
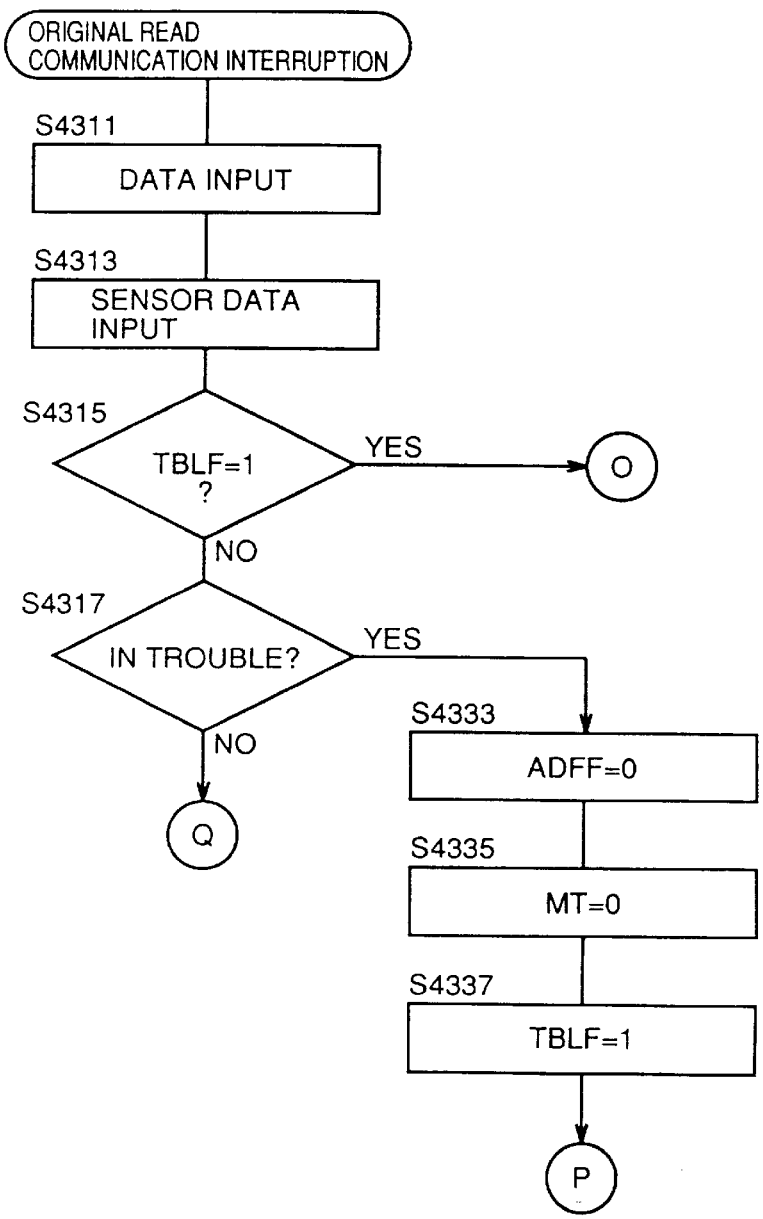

The CPU3 starting the original read communication interruption receives the trouble data from the CPU1, and hence the determination at a step S4317 shown in FIG. 69b becomes YES so that the processing at the steps S333 to S353 is executed. If originals are present in the preliminary insertion part 103, this effect is stored (S4341) while the originals are read and stored in the memory disk through the RAM1 (S4343 to S4351), and thereafter discharged (S4353) so that the process enters an interruption wait state. The original read communication interruption is described in the item of "3. original read control" with reference to FIGS. 45 to 51 and 69a to 74.

2. Data Set Processing (FIGS. 36 to 43)

Figure 42:
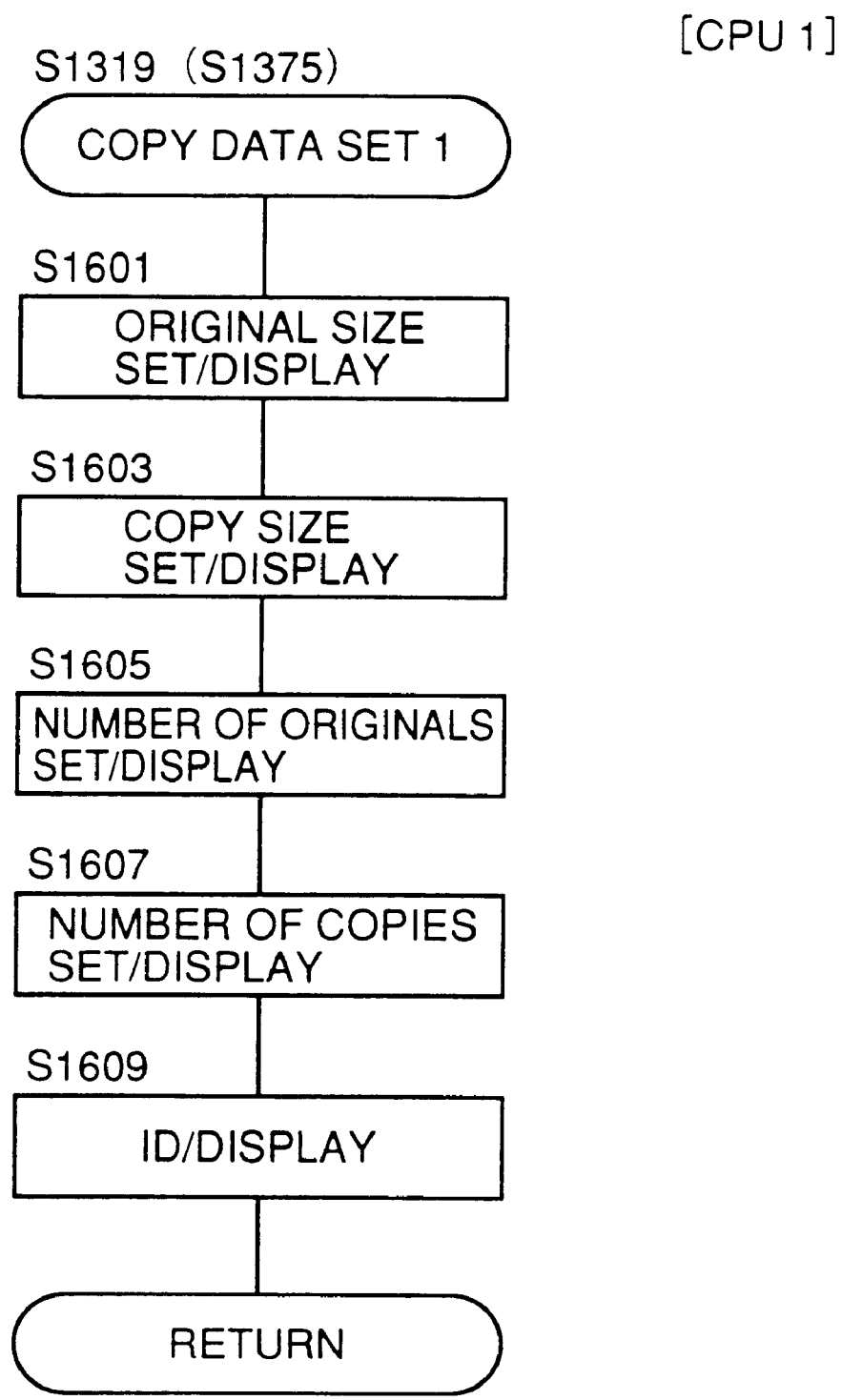
FIG. 42 is a flow chart showing processing executed in copy data set 1 processing (S1319 or S1375) shown in FIG. 36 or 40.
Figure 43:
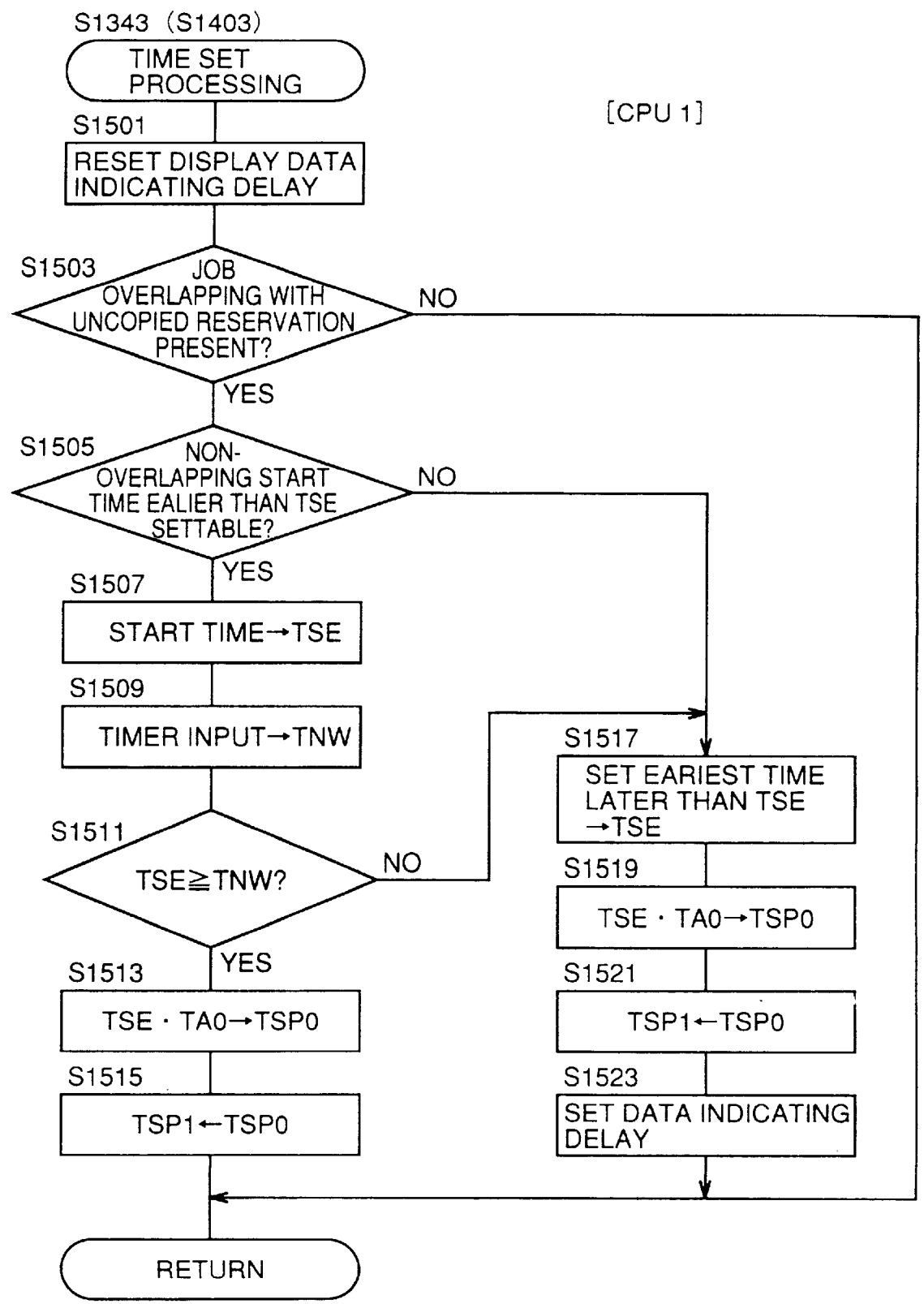
FIG. 43 is a flow chart showing processing executed in time set processing (S1343 or S1403) shown in FIG. 36 or 40.

FIGS. 36 to 41 show the "data set processing" executed at the step S117 of the operation interruption of the CPU1. FIG. 42 shows "copy data set 1 processing" executed at a step S1319 or S1375 shown in FIG. 36 or 40. FIG. 43 shows "time set processing" executed at a step S1343 or S1403 shown in FIG. 38 or 40.

First, operation interruption of this processing is inhibited (S1301).

2-1. Reserve Mode

When the reserve switch 297 is operated (YES at S1305) in a non-reserved mode (NO at S1303), a reserve mode flag RSVMF is set (S1307). Namely, a reserve mode is set.

When the reserve mode is set (YES at S1303), the process advances to a step S1311, to determine whether or not data setting is possible, i.e., whether or not copies have already been reserved up to the upper limit number of reservable copies (S1311).

2-1-1. When New Reserve Setting is Possible

If a new reservation is possible (YES at S1311), a display is made to indicate that the reserve mode is set (S1313 and S1315). Further, processing of urging the user to input a desired end time for the reserved copy and setting the inputted numerical value as the desired end time TSP for this reserved copy (S1317) and copy data set 1 processing of urging the user to input copy data such as the number of originals, the original size, the number of copies, the copy size and the like for setting the inputted numerical values as the copy data of the reserved copy respectively (S1319) are executed.

After the data setting, an operation of the reserve switch 297 is waited (S1321). When the reserve switch 297 is operated (YES at S1321), the reserve flag RSVF indicating setting of the reserved copy is set (S1333). Then, a required print time TAO for the reserved copy is operated on the basis of the data (the number of originals the original size, the number of copies and the copy size) set at the step S1319 (S1335). On the basis of the required time TAO and the desired end time TSP set at the step S1317, a set print start time TSE for the reserved copy is operated (S1337). Further, the desired end time TSP set at the step S1317 is set as an unchanged end time TSPO for the reserved copy (S1339). In addition, the desired end time TSP set at the step S1317 is set as a changed end time TSP1 for the reserved copy (S1341).

Then, time set processing (S1343) is executed.

In the time set processing, data for displaying that the end of the reserved copy is later than the scheduled time is reset (S1501). Then, a determination is made as to whether or not the print start time TSE, the unchanged set end time TSPO and the changed set end time TSP1 operated at the steps S1337 to S1341 respectively overlap with a print time zone for an already reserved unprinted copy (S1503). This determination is made with reference to the memory table shown in FIG. 100.

If the former do not overlap with the latter (NO at S1503), the data set at the steps S1335 to S1341 can be employed as such, and hence the process returns.

If the former overlap with the latter (YES at S1503), on the other hand, the data set at the steps S1335 to S1341 must be changed and hence the process advances to processing following a step S1505. At the step S1505, a determination is made as to whether or not the print operation for the reserved copy set this time overlaps with the print time zone for the already reserved unprinted copy when this print operation is started from a time earlier than the print start time TSE operated at the step S1337. In other words, a determination is made as to whether or not the time earlier than the print start time TSE operated at the step S1337 can be set not to overlap with the print time zone for the already reserved unprinted copy.

If the time can be set in the above manner (YES at S1505), this time is set as the print start time TSE for the copy reserved this time (S1507). Further, the current time is loaded from the clock IC, and substituted for a variable TNW (S1509).

At a step S1511, the aforementioned print start time TSE is compared with the current time TNW. If TSE $ TNW (YES at S1511), the print start time TSE set at the step S1507 is later than the current time TNW and the print operation can be started at this time TSE, and hence the process advances to a step S1513 for operating an unchanged print end time on the basis of the print start time TSE set at the step S1507 and the required time TAO operated at the step S1335, and set as the variable TSPO (S1513). This value is also set as the variable TSP1 indicating the changed print end time (S1515).

If a determination is made at the step S1505 that the time earlier than the print start time TSE operated at the step S1337 cannot be set not to overlap with the print time zone for the already reserved unprinted copy (NO at S1505) or that TSE<TNW at the step S1511 (NO at S1511) and hence the print start time TSE is before the current time TNW and no print operation can be made, the process advances to processing following a step S1517.

In this case, the earliest time which is later than the print start time TSE set at the step S1337 and can be set not to overlap with the print time zone for the already reserved unprinted copy is set as the print start time TSE (S1517). On the basis of the time TSE set at the step S1517 and the required time TAO set at the step S1335, an unchanged print end time is operated and set as the variable TSPO (S1519). This value is also set as the variable TSP1 indicating the changed print end time (S1515). Thereafter display data indicating the effect that the print end for the copy reserved this time is later than the desired end time TSP inputted by the user (S1523). FIG. 75 shows an exemplary display made by this display data. Display control is made at a step S1353 described later.

When the required time TAO for the copy reserved this time is operated and the start time TSE, the unchanged end time TSPO and the changed end time TSP1 are set through the processing at the steps S1335 to S1343, the process enters a wait state for the reserve switch 297 or the reserve cancel key 293.

When an operation input from the reserve switch 297 is detected in the aforementioned wait state (YES at S1345), the desired end time TSP, the set start time TSE, the set unchanged end time TSP0, the operated required time TAO and the set changed end time TSP1 for the set originals are stored in the memory table shown in FIG. 100 along with the ID (S1347). In relation to other already reserved copies, the set end time TSPO is stored to be the earliest. On the basis of the data shown in FIG. 100, overlapping of print time zones in the aforementioned time set processing is retrieved. Referring to FIG. 100, $A_i$, $a_i$, $b_i$, $c_i$, $d_i$ and $e_i$ represent IDs and values TSP, TSE, TSPO, TAO and TSP1 respectively, with $c_i$ representing the time order.

When the data of the reserved copy are stored in the memory table shown in FIG. 100, the process advances to a step S1349. At the step S1349, the reserve mode flag RSVMF is reset. Thus, the process goes out of the reserve mode. Then, display data for a general mode which is not the reserve mode is set (S1351) and a display is made on the basis of the display mode (S1353). FIG. 78 shows a display for printing, and FIG. 79 shows a display for no printing, for example. Referring to FIG. 79, data of the reserved copy printed in the first place among already reserved copies are displayed as the copy data. Thereafter the reserve end flag RSVEF indicating the end of setting of the reserved copy is set (S1355), operation interruption is authorized (S1357), and the process returns.

If an operation input of the reserve cancel key 293 is detected in the wait state at the steps S1345 and S1349 (YES at S1349), on the other hand, the process goes out of the reserve mode without storing the data of the set reserved copy in the memory (S1349) for displaying a general mode, setting the reserve end flag RSVEF and authorizing operation interruption (S1351 to S1357), and returns.

2-1-2. When New Reservation Setting is Impossible

If a determination is made at the step S1311 that no new reserved copy can be made since copies have already been reserved up to the upper limit number of reservable copies (NO at S1311), overdisplay data is set (S1323) and the display is controlled on the basis of the overdisplay data (S1325). Thus, a display shown in FIG. 80 is made on the liquid crystal panel 290.

Thereafter the reserve mode flag RSVMF is reset (S1327), so that the process goes out of the reserve mode and enters a wait state for an operation input of the reserve switch 297. When the reserve switch 297 is operated in this wait state (YES at S1329), data for displaying a general mode is set (S1331), and the process returns to the step S1303. FIG. 82 shows an exemplary display of the general mode.

2-2. Reserve Priority Mode

If the reserve switch 297 is not operated (NO at S1305) but the reserve priority copy switch 298 is operation-inputted (YES at S1309) in a non-reserve mode (NO at S1303), data for displaying a data set mode is set (S1371) for making display control (S1373). This display means that no display is made to urge the user to input a desired end time in the display of the reserve mode. Namely, the operation of the reserve priority copy switch 298 is adapted to instruct the print operation for the originals set this time to cause no hindrance on the print operation for the already reserved copy while printing of the set originals is ended earliest in the range causing no hindrance, and hence no desired end time for these originals may be inputted and a display eliminating the column of the desired end time from the display of the reserve mode is made.

After the display control at the step S1373, copy data set 1 processing (S1375) is executed for urging the user to input copy data such as the number of originals, the original size, the number of copies and the copy size and setting the inputted numerical values as the copy data of the reserve priority copy respectively.

On the basis of the data (the number of originals, the original size, the number of copies and the copy size) set at the step S1375, a required time TAO for the copy operation (original read operation and print operation) for the reserved copy is operated (S1377). While the required time for the print operation for the reserved copy is operated at the aforementioned step S1335, the required time TAO for the copy operation is operated by adding the required time for the original read operation to that for the print operation is operated at this step S1377. When the originals set this time are printed in advance of the already reserved copy, the original read operation is also performed at the same time (refer to the step S163 shown in FIG. 31 after YES and NO at the steps S143 and S145 in FIG. 30).

When the required time TAO for the copy operation for the originals set this time is operated, the current time is loaded from the clock IC and substituted for TNW (S1379), so that an unchanged end time TSPO for the copy operation for the set originals is operated on the basis of the current time TNW and the required time TAO operated at the step S1377 (S1381), and this time is set at the variable TSP1 as a changed end time for the set originals (S1383).

At a step S1385, the wait flag WAITF is reset. At a step S1387, a reserved copy having the earliest set start time TSE is extracted from already reserved unprinted copies, and this start time TSE is set as a variable TSEf. Further, the required time and the changed end time for this reserved copy are set as variables TAOf and TSP1f respectively (S1389). This retrieval is made on the basis of the data shown in FIG. 100.

Then, the changed desired end time TSP1 operated for the set originals is compared with the earliest start time TSEf (S1391).

If the set end time TSP1 is later than the earliest start time TSEf for the reserved copy (NO at S1391), the print operation for the set originals must be brought into a wait state until the copy operation for the reserved copy is ended, and hence the processing at the steps S1393 to S1399 is performed and thereafter the wait flag WAITF is set (S1401). Thus, only the original read operation for the set originals is executed as described in the item of "1. operation interruption" (YES at the steps S143 and 145; refer to the steps S147 and S149 in FIG. 30).

At the steps S1393 to S1399, processing of operating the required time TAO for only the print operation related to the set originals (S1393), processing of setting the print end time TSP1f for the earliest reserved copy as the print start time TSE for the set originals (S1395), processing of operating the unchanged print end time TSPO for the set originals from the print start time TSE set at the step S1395 and the required time TAO operated at the step S1393 (S1397), and processing of setting the unchanged print end time TSPO operated at the step S1397 as the changed print end time tSP1 for the set originals (S1399) are executed respectively.

When the data of the set originals are set in the aforementioned manner, time set processing at a step S1403 is executed. This time set processing (S1403) is similar to the aforementioned time set processing (S1343). Namely, a determination is made as to whether or not the time zone for the print operation set at the steps S1393 to S1399 in relation to the set originals overlaps with that for the already reserved copy, and re-operation is made if the time zones overlap with each other.

If the determination at the step S1391 is of NO, on the other hand, the steps S1393 to S1401 are skipped so that the time set processing at the step S1403 is immediately executed. In this time set processing (S1403), a determination is made as to whether or not the time zone for the copy operation (simultaneously performed original read and print operations) set at the steps S1377 to S1383 in relation to the set originals overlaps with that for the already reserved copy, and re-operation is made if the time zones overlap with each other.

When the data of the set originals are set in the aforementioned manner, the process enters an input wait state for the reserve priority copy switch 298 (S1405) or the reserve cancel key 293 (S1417).

When an operation input from the reserve priority copy switch 298 is detected in the aforementioned wait state (YES at S1405), the desired end time TSP, the set start time TSE, the set unchanged end time TSPO, the operated required time TAO and the set changed end time TSP1 for the set originals are stored in the memory table shown in FIG. 100 along with the ID (S1407). In relation to other already reserved copies, the set end time TSPO is stored to be the earliest.

Further, a display related to the set originals is made (S1409 and S1411). If the print operation for the set originals is performed after completion of that for the already reserved copy (NO at S1391; refer to S1393 to S1401 and S1403), for example, a display shown in FIG. 76 is made. If the copy operation for the set originals is immediately performed (YES at S1391; refer to S1403), on the other hand, a display shown in FIG. 77 is made. The reserve priority mode flag is set (S1413), operation interruption is authorized (S1415), and the process returns.

If the reserve cancel key 293 is operated in the aforementioned wait state (YES at S1417), on the other hand, general display data are set (S1419) and displayed (S1421).

2-3. In Case of Operation of Ten-Key Pad etc

If neither the reserve switch 297 (NO at S1305) not the reserve priority copy switch 298 (NO at S1309) is operation-inputted in the non-reserve mode (NO at S1303), the process advances to a step S1359. If the ten-key pad 292 is operated (YES at S1359) at the step S1359, for example, the operation-inputted numerical value is set as the number CN of copies for the set originals (S1363), and the display is switched from that shown in FIG. 83 to that in FIG. 84 (S1361 and S1365). If the print operation for the reserved copy is currently executed, the number of remaining copies ("14" in FIG. 83) for the currently executed print operation for the reserved copy displayed on the right upper corner of the liquid crystal panel 291 is moved into a reserve frame on the right lower corner, while the numerical value ("5" in FIG. 84) inputted through the ten-key pad 292 as the number of the copies for the set originals is displayed on the right upper corner. Thereafter operation interruption is authorized (S1367), and the process returns.

If the ten-key pad 292 is not operated at the step S1359 (NO at S1359), on the other hand, "1" is set as the number NC of copies for the set originals (S1369), operation interruption is authorized (S1367), and the process returns.

2-4. Operation of Apparatus as Viewed from User

The operation of the apparatus as viewed from the user is now described with reference to FIGS. 82 to 87.

When no print operation is performed, the display shown in FIG. 82 is made, for example. When the apparatus is in a print operation, on the other hand, the display "printing" shown at the lower center in FIG. 83 is added to the display shown in FIG. 82.

When the user operates the reserve priority copy switch 298, this switch 298 is reverse-displayed as shown in FIG. 83, while the reserve switch 297 is erased. When the user inputs data of set originals such as the number of copies in this state, the inputted number (that for the set originals) is displayed on the right upper corner as "5" in FIG. 84, while the number of remaining copies ("14" in FIG. 83) which has been displayed on the upper right corner is moved into the reserve frame on the right lower corner.

When the user operates the start key 296, the print operation for the reserved copy in execution is interrupted, so that the copy operation for the set originals is executed. This copy operation is for an interruption copy, and hence a display "interruption" is made in the vicinity of the lower center of the liquid crystal panel 291, as shown in FIG. 85. The number of the remaining copies is reduced to "10" in FIG. 85, to indicate that the print operation for the reserved copy progresses by four in the period between the state shown in FIG. 84 and the operation of the start key 296.

Following progress of the copy operation for the set originals, the number "5" of the remaining copies shown in FIG. 85 is reduced to "3" in FIG. 86. On the other hand, the number of copies for the reserved copy remains at "10" in FIGS. 85 and 86, since the print operation therefor is interrupted.

When the interruption copy for the set originals is ended, the print operation for the reserved copy is re-started and the display is switched to that shown in FIG. 87. This display switching is performed by the processing at the step S167 in FIG. 31.

Referring to FIGS. 75 to 81, 88, 89, 91 and 99, the numbers shown on the right upper corner in FIGS. 82 to 87 are omitted.

3. Original Read Control 3-1. In Case of Executing Original Read Control

The original read control is executed in the following cases:

(a) In Case of Absence of Already Reserved Copy:

A copy operation (parallel original read and print operations) is immediately performed in correspondence to an operation of the start key 296. The original read operation included in this copy operation is implemented by "original read control (S1105 in FIG. 44)" included in processing described as "general copy control (S135)" in FIG. 29.

(b) In Case of Presence of Already Reserved Copy:

(b-1) In Case of Setting Set Originals for Reserved Copy

When the start key 296 is operated after setting of a reserved copy is completed, an original read operation is immediately performed. This original read operation is implemented by processing described as "original read control (S139)" in FIG. 30.

(b-2) In Case of Selecting Reserve Priority Copy:

When a copy operation (parallel original read and print operations) for set originals can be ended before starting of printing of the earliest already reserved copy (NO at S145 in FIG. 30), the copy operation is immediately performed in response to an operation of the start key 296. The original read operation included in this copy operation is implemented by "original read control (S1105 in FIG. 44)" included in processing described as "general copy control (S163)" in FIG. 31.

When the copy operation for the set originals cannot be ended before starting of printing of the earliest already reserved copy (YES at S145 in FIG. 30), an original read operation is immediately performed in response to an operation of the start key 296. This original read operation is implemented by processing described as "original read control (S149)" in FIG. 30.

(c) After Trouble Recovery:

When the start key 296 is operated after trouble recovery, a copy operation is performed on condition that the apparatus is not in print control for a reserved copy (NO at S1201 in FIG. 56). An original read operation included in this copy operation is implemented by "boriginal read control (S1105 in FIG. 44)" included in processing described as "general copy control (S1207)" in FIG. 56.

3-2. Process of Original Read Control 3-2-1. Processing in CPU1

Figure 45:
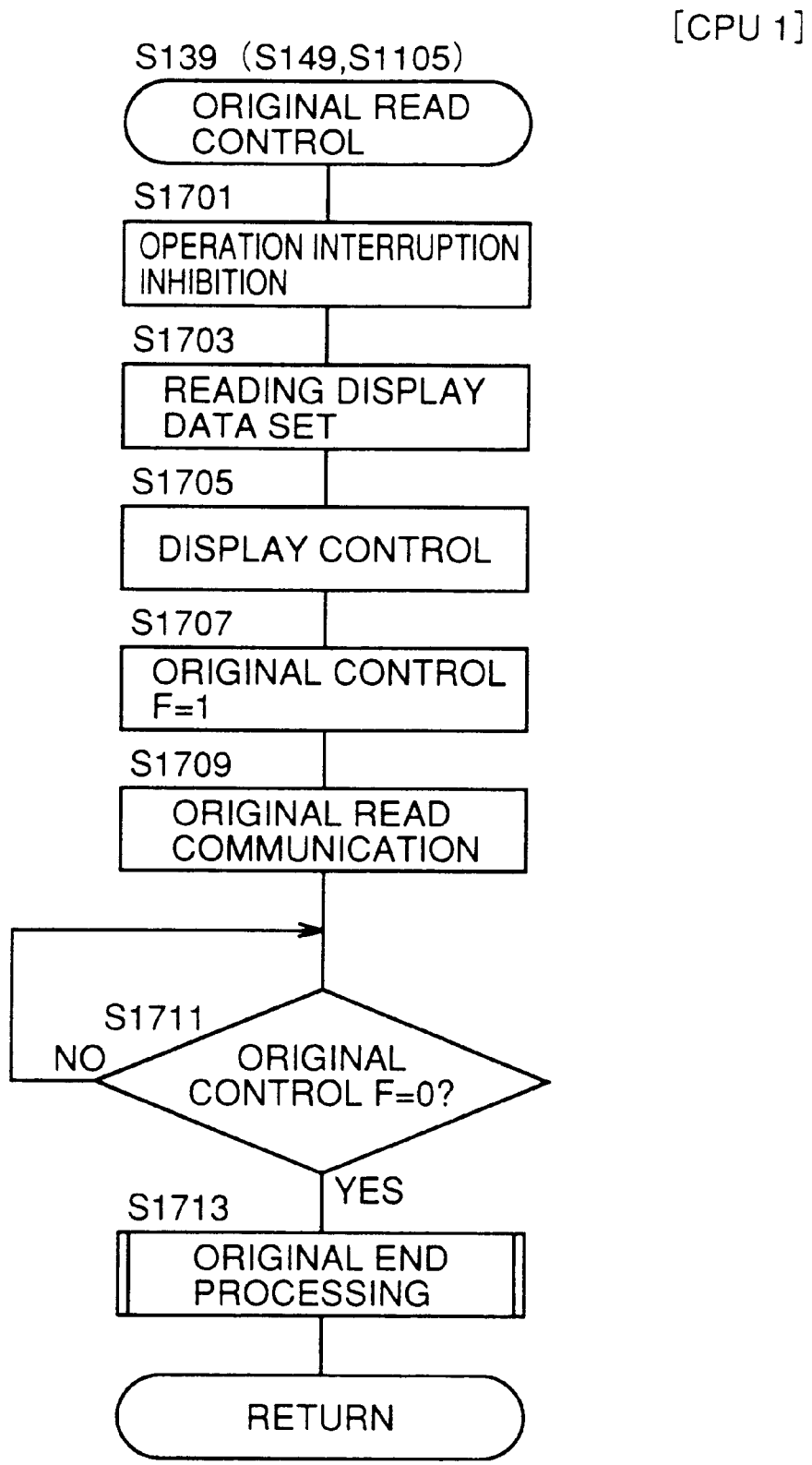
FIG. 45 is a flow chart showing processing executed in original read control (S139, S149 or S1105) shown in FIG. 30 or 44.

When the original read control is started, operation interruption is first inhibited (S1701), as shown in FIG. 45. Then, display data indicating original reading is set (S1703), to make a display of "reading" (S1705). Further, an original control flag is set for indicating execution of the original read control (S1707).

Then, original read communication (original communication 1) is performed (S1709). Due to this original communication 1 (S1709), original read communication interruption shown in FIGS. 69a to 74 is started in the CPU3. On the other hand, the CPU1 enters a wait state for resetting of the original control flag (S1711).

3-2-2. Processing in CPU3

Description is now made with reference to FIGS. 69a to 74.

First, data indicating the cause for the interruption is inputted from the CPU1 through the control bus CODB (S4311). Further, data of a sensor arranged on each portion of an original processing part controlled by the CPU3 is inputted (S4313).

It is assumed here that the trouble flag TBLF is reset (NO at S4315) and no trouble is detected (NO at S4317).

First, "original presence data", "ADF flag" and "number M of originals" are initialized (S4355 to S4359). Then, the sensor data is inputted (S4361), and presence/absence of originals on the preliminary insertion part 103 is determined on the basis of the data (S4363). It is assumed that originals are present on the preliminary insertion part 103 at the beginning.

If originals are present on the preliminary insertion part 103 (YES at S4563), the ADF flag indicating this presence is set (S4365) and the originals on the preliminary insertion part 103 are moved to a prescribed position (S4367). If any original is present on the platen 100 and a next original is present on the original tray 101, it is assumed that these originals are discharged from the platen 100 and transported into the preliminary insertion part 103 respectively due to the move processing at the step S4367.

When the originals are moved to the prescribed position on the platen 100 by the processing at the step S4367, the process branches to a step S4375 or S4377 in response to whether or not this is a reserved copy (S4373). The term "reserved copy" in the processing of the CPU3 indicates a case of executing only an original read operation in advance and executing a print operation later. Namely, this corresponds to "only the original read operation" in the processing of the CPU1. On the other hand, the term "non-reserved copy" indicates a case of executing original read and print operations in parallel with each other. Namely, this corresponds to "copy operation =original read operation+print operation" in the processing of the CPU1.

(a) In Case of Reserved Copy:

In case of a reserved copy (YES at S4373), the image reader 19 reads the originals on the platen 100 so that the originals are processed in the image processing circuit 220 and the image data are stored in the RAM1 through the image data bus PXDB (S4375). After this storage in the RAM1, a variable M indicating the actual number of originals is incremented (S4383).

Then, the process enters a wait state until recording in the memory disk is enabled (S4387), and when recording is enabled (YES at S4387), the image data stored in the RAM1 at the step S4375 are recorded in an address of the memory disk specified by the ID and the number M of originals for the reserved copy (S4389).

Then, the ADF flag is determined (S4391). If the ADF flag is set, i.e., if originals are present on the preliminary insertion part 103 (YES at S4391), the process returns to the step S4361. Thus, processing identical to the above is executed. Namely, the originals present on the preliminary insertion part 103 are set on the platen 100 and loaded, so that the image data thereof are stored in the RAM1 and thereafter recorded in the memory disk.

The aforementioned processing is repeated until no original is present on the preliminary insertion part 103, i.e., until loading of the last original and writing in the disk memory are completed. When the loading of the last original and the writing in the memory disk are ended, the determination at the step S4363 becomes "NO" due to absence of originals on the preliminary insertion part 103. Thus, the process advances to a step S4369, while the ADF flag is set in this case (YES at S4369) and hence the originals are discharged at a step S4371 and thereafter the process advances to a step S4403, for performing original communication 2. Thereafter the CPU3 enters a wait state. Due to the original communication 2 (S4403), data communication interruption (FIGS. 32 and 33) is started in the CPU1.

Thus, the data communication interruption of the CPU1 is started after all originals are loaded and the image data are recorded in the memory disk in the case of the reserved copy.

(b) In Case of Non-Reserved Copy:

When a non-reserved copy is determined at the step S4373 (NO at S4373), the process branches to the step S4377. Namely, the image reader 19 reads the originals on the platen 100, so that the image data are processed in the image processing circuit 220 and thereafter stored in the RAM2 through the image data bus PXDB (S4379). The image data bus PXDB connecting the RAM2 with the image processing circuit 220 is connected by turning on the data bus switch MSW before the storage in the RAM2 (S4377), and cut off again by turning off the data bus switch MSW after the storage in the RAM2 (S4381). After the image data are stored in the RAM2, the variable M indicating the actual number of originals is incremented (S4383).

Then, the process advances to a step S4393, for inputting the sensor data. On the basis of this data, presence/absence of originals on the preliminary insertion part 103 is determined (S4395). If originals are present on the preliminary insertion part 103 (YES at S4395), the effect of the presence of the originals is set (S4401) so that this data is transmitted to the CPU1 by original communication 2 (S4303) and thereafter the CPU3 enters an interruption wait state. Due to the original communication 2 (S4403), the data communication interruption (FIGS. 32 and 33) is started in the CPU1.

If the ADF flag is set (YES at S4397) when absence of originals on the preliminary insertion part 103 is determined at the step S4395 (NO at S4395), the originals are discharged (S4399) and thereafter original communication 2 (S4403) is performed. If no ADF flag is set (NO at S4397), the original communication 2 is immediately performed (S4403). Thereafter the CPU3 enters an interruption wait state. Due to the original communication 2 (S4403), the data communication interruption (FIGS. 32 and 33) is started in the CPU1. 3-2-3. Processing in CPU1

Description is now made with reference to FIGS. 32 and 33.

First, any interruption is inhibited (S511). Then, data is inputted (S513). Since this interruption processing is started by the CPU3, data transmitted from the CPU3 through the control bus CODB is inputted (S513). This data is of the value M indicating the actual number of originals, or indicates the effect that originals are present (in case of performing the original communication 2 (S4403) after execution of the step S4401).

Then, the type of this interruption is determined (S515). Since this interruption is started by the original communication 2 processing of the CPU3, the determinations at the steps S517 and S521 become NO and YES respectively. Thus, the process advances to a step S523, for resetting the original control flag.

Then, the print flag PRTF is determined (S525). If the print flag PRTF is set, i.e., in case of print control (YES at S525), original end processing (S527) is performed and thereafter interruption is authorized (S529) so that the process returns to the address before the interruption. The address before the interruption is the wait state at the step S1711 in FIG. 45 since the original communication interruption of the CPU3 is started by the original read communication at the step S1709 in FIG. 45 and this data communication interruption is started by the original communication 2 (S4403) of the CPU3 shown in FIG. 74. If no print flag PRTF is set at the step S525, on the other hand, the process directly advances to the step S529 so that interruption is authorized, and returns to the address before the interruption.

Thus, the process returns to the processing in FIG. 45. Description is now described with reference to FIGS. 45 to 51.

The original control flag is reset at the step S523 as described above, whereby the determination at the step S1711 becomes YES and original end processing is executed (S1713).

In the original end processing (S1713), processing time operation (S1801) is executed, then a display is made to indicate that original reading is ended (S1803 and S1805), and thereafter operation interruption is authorized (S1807) so that the process returns to the original read control.

Figure 47:
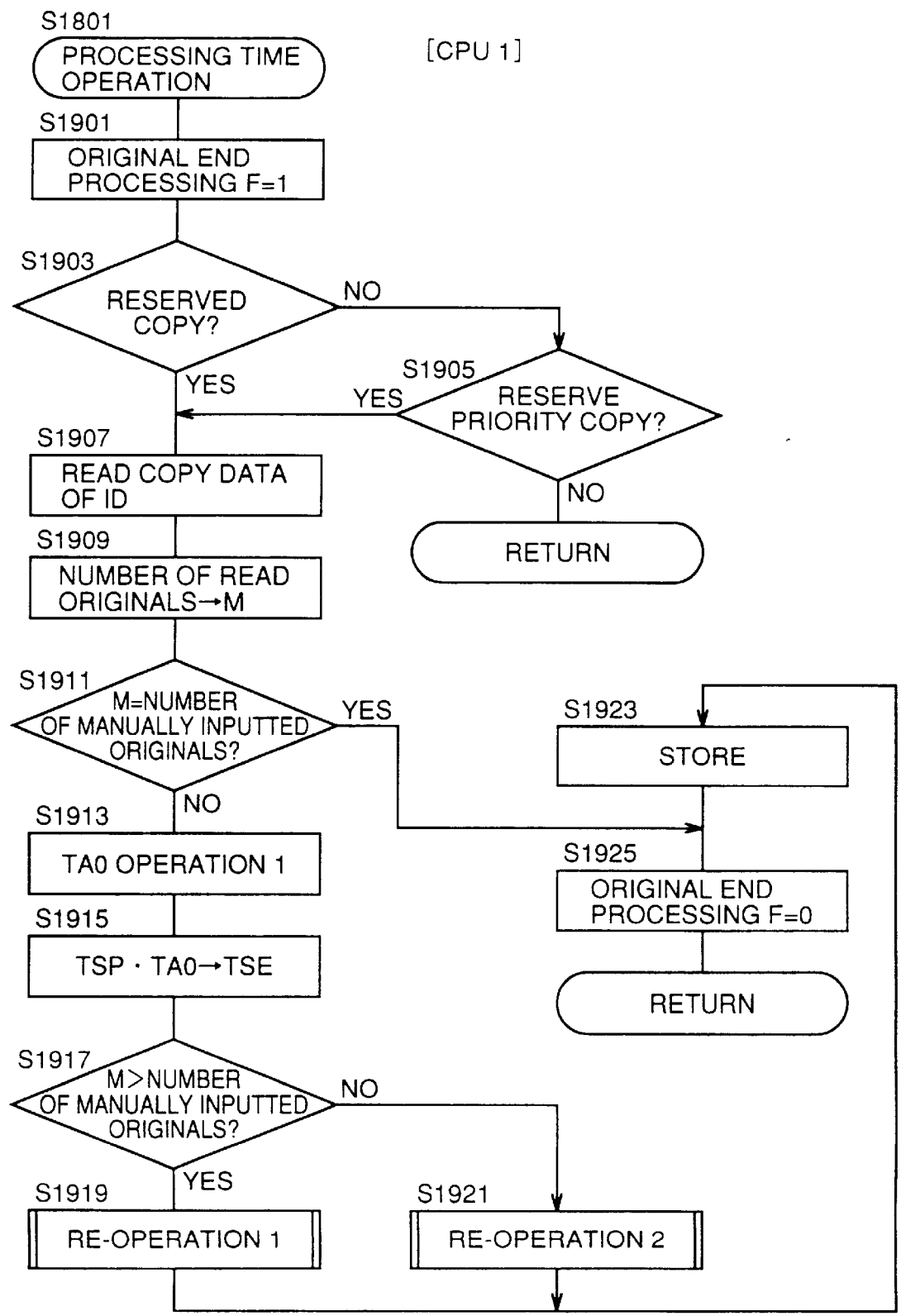
FIG. 47 is a flow chart showing processing executed in processing time operation (S1801) shown in FIG. 46.

FIG. 47 shows the processing time operation processing (S1801).

3-3. Processing Time Operation Processing

In the processing time operation processing (S1801), the number of originals set by the user is compared with the actual number of originals counted during the original read control (refer to the steps S4359 and S4383 shown in FIGS. 72 and 73 respectively), and if these numbers mismatch with each other, data on the print start time for the reserved copy etc. are re-operated, not to influence on the required print time for the reserved copy started later.

First, an original end processing flag indicating the original end processing is set (S1901). Then, a determination is made as to whether or not only an original read operation is previously executed so that a print operation is started later (S1903 and S1905). If no original read operation is previously executed (NO at S1903 and S1905), start time data etc. may not be re-operated and hence the process returns to the original end processing shown in FIG. 46. Thus, a display indicating the end of the original reading is made (S1803 and S1805) as described above and operation interruption is authorized (S1807), so that the process returns to the original read control in FIG. 45 and further to processing invoking this original read control.

When a determination is made that the executed original read control is adapted to previously execute only the original read operation for starting the print operation later (YES at S1903 or S1905), on the other hand, set data (including set data of the number of originals) of the reserved copy for which the original read control has been executed are read from the memory table shown in FIG. 100 (S1907) while the number of originals counted in the original read control is substituted for the variable M (S1909), so that the numbers of originals are compared with each other (S1911).

Figure 46:
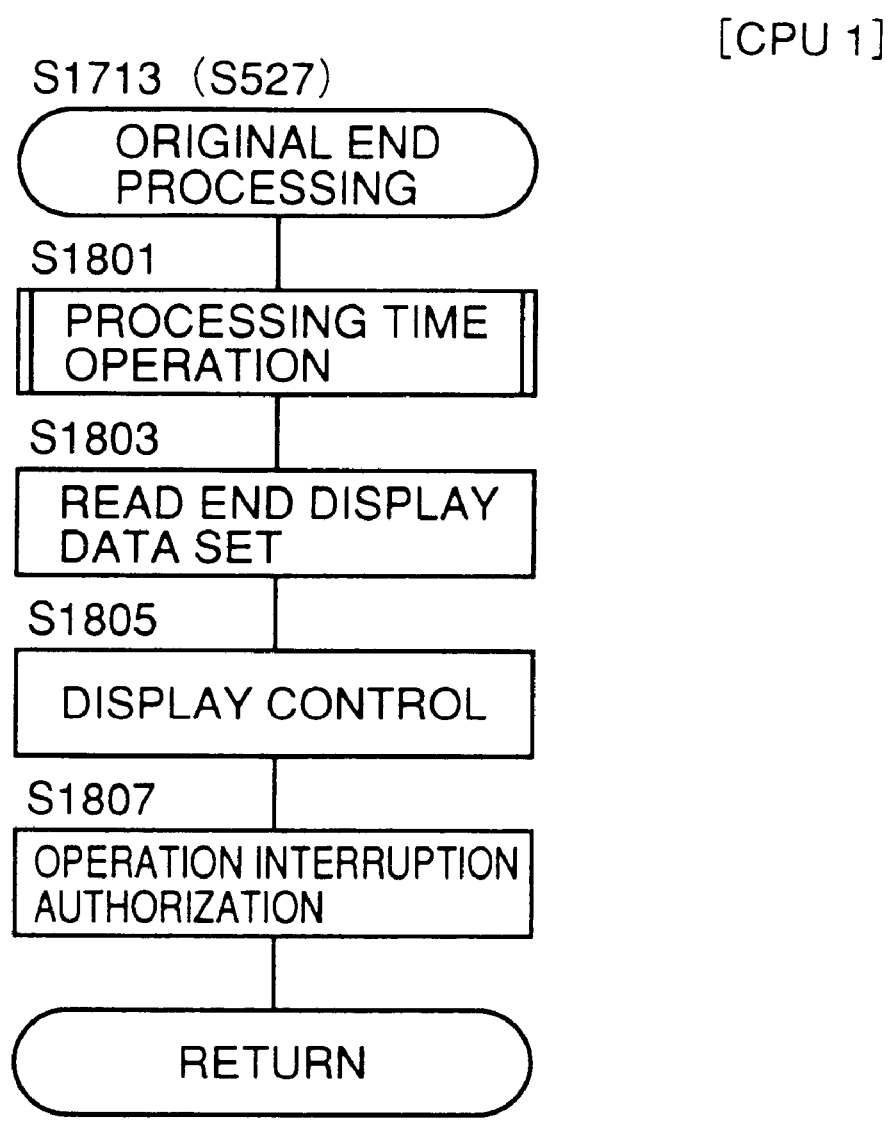
FIG. 46 is a flow chart showing processing executed in original end processing (S1713) shown in FIG. 45.

If the numbers of originals match with each other (YES at S1911), no print start time etc. may be re-operated and hence the original end processing flag is reset (S1925) and the process returns to the original end processing in FIG. 46. Thus, a display indicating the end of the original reading is made (S1803 and S1805) as described above, operation interruption is authorized (S1807), and the process returns to the original read control shown in FIG. 45 and further to the processing invoking the original read control.

If the numbers mismatch with each other at the step S1911 (NO at S1911), on the other hand, the required print time TAO for the reserved copy is operated with data of the number of originals counted in the original communication interruption processing of the CPU3 (FIGS. 69a to 74) and transmitted to the CPU1 by the original communication 2 processing (S4403 in FIG. 74), and the set print start time for the reserved copy is operated on the basis of the required time TAO and the desired print end time TSP set by the user and set as the variable TSE (Sl915).

Then, the actual number of originals counted by the CPU3 is compared with the number of originals set by the user (S1917).

Figure 48:
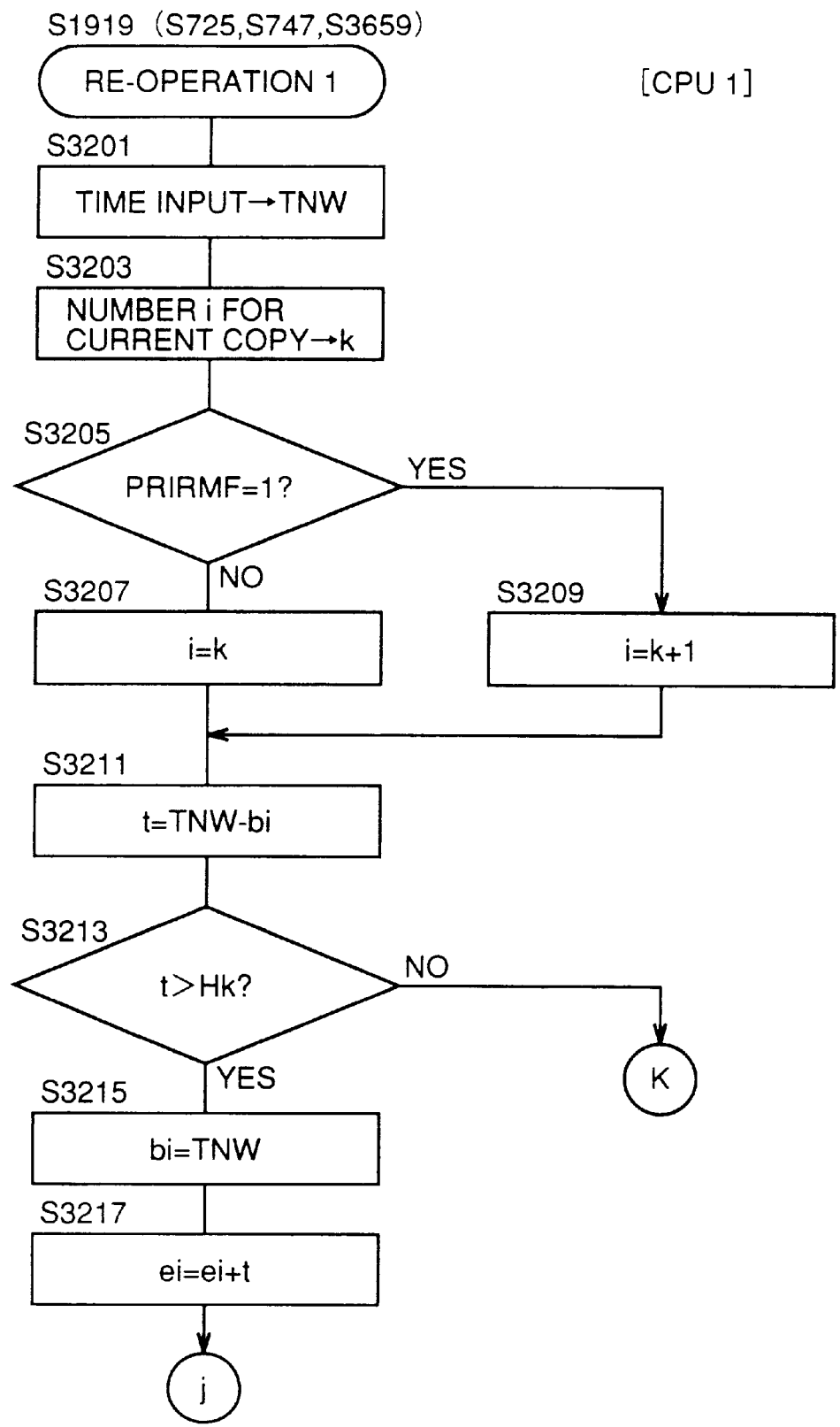
FIG. 48 is a part of a flow chart showing processing executed in re-operation 1 (S1919, S725, S747 or S3659) shown in FIG. 34, 35, 47 or 60.
Figure 49:
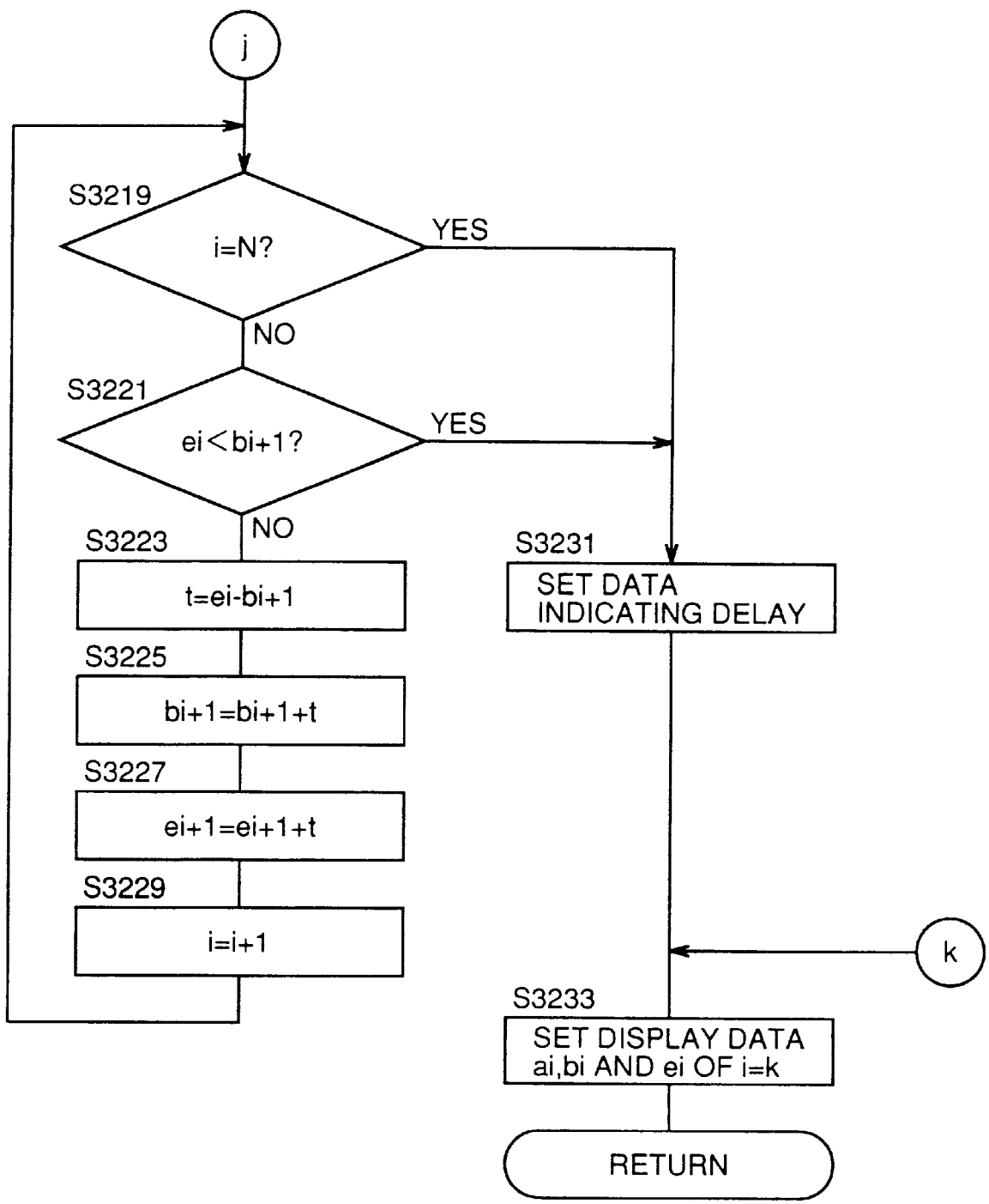
FIG. 49 is the remaining part of the flow chart showing the processing executed in the re-operation 1 (S1919, S725, S747 or S3659) shown in FIG. 34, 35, 47 or 60.

If the actual number M of originals is larger than the number of originals set by the user (YES at S1917), the required print time for the reserved copy is longer than the initially set required time, and hence the print start time for another already reserved copy to be printed after printing of this reserved copy must be delayed. Therefore, re-operation 1 is performed (S1919). FIGS. 48 and 49 show the re-operation 2.

When the start time etc. for each reserved copy are corrected in relation to the error of the number of originals for this reserved copy by the re-operation 1 (S1919) or the re-operation 2 (S1921), the memory table shown in FIG. 100 stores each corrected data (S1923), thereafter the original end processing flag is reset (S1925) and the process returns to the original end processing shown in FIG. 46. Thus, the display indicating the end of the original reading is made (S1803 and S1805) as described above, operation interruption is authorized (S1807), and the process returns to the original read control shown in FIG. 45, and further to the processing invoking the original read control.

3-4. Re-Operation 1 Processing

In the aforementioned re-operation 1 processing, the current time is first inputted from the clock IC and set as the variable TNW (S3201), as shown in FIG. 48. Then, the number i (shown in FIG. 100) for the reserved copy to be currently subjected to the print operation is set at "k" (S3203). Then, the print interruption mode flag PRIRMF is determined (S3205). In other words, a determination is made as to whether or not interruption by the print operation for the reserved copy is made (refer to S3643 and S3661 in FIG. 59).

If the print interruption mode flag PRIRMF is reset (NO at S3205), i.e., if this is not interruption printing of the reserved copy to be currently subjected to the print operation, "k" is set as an initial value of the reserved copy number i for re-operation (S3207). In this case, re-operation is made from the reserved copy to be currently subjected to the print operation.

If the print interruption mode flag PRIRMF is set at the step S3205 (YES at S3205), i.e., a print operation for the reserved copy to be currently subjected to the print operation is to be performed by interruption, on the other hand, "k+1" is set as the initial value for the reserved copy number i for re-operation (S3209). In this case, the re-operation is made from a reserved copy having a number next to that for the reserved copy to be currently subjected to the print operation.

At a step S3211, the difference between the current time TNW and a set start time $b_i$ for the reserved copy i to be subjected to re-operation is operated and set at "t". Then, a determination is made as to whether or not the value "t" is larger than a prescribed value "$H_k$", which is about 2 to 3 minutes, for example (S3213).

If t # $H_k$ at the step S3213 (NO at S3213), it is assumed that no re-operation is necessary since the delay of the print start time for the reserved copy is not much large, and the process advances to a step S3233 for setting data ($a_i$, $b_i$ and $e_i$) of reserved copies subjected to re-operation at the initial time for a display (S3233), and returns to the processing invoking the re-operation 1.

If t>$H_k$ at the step S3213 (YES at S3213), on the other hand, it is assumed that re-operation is necessary since the delay of the print start time for the reserved copy is large, and the process advances to processing following a step S3215. At the step S3215, the current time is set at the start time data $b_i$ for the reserved copy. Then, "$e_i$+t" is set at the changed set end time data $e_i$ of the reserved copy at a step S3217. Namely, the changed set end time data ei for the reserved copy is changed to a time later by the aforementioned delay time "t".

Then, the process advances to a step S3219. At the step S3219, a determination is made as to whether or not the reserved copy to be re-operated is the last one of the reserved copies stored in the memory table shown in FIG. 100. If the reserved copy has the last number N (YES at S3219), the re-operation may not be continued and hence the process advances to a step S3231 for setting the display data indicating the delay and thereafter setting the data ($a_i$, $b_i$ and $e_i$) of the reserved copies to be re-operated at the initial time at a step S3233, and returns to the processing invoking the re-operation 1.

If the reserved copy is not the last one in the determination at the step S3219 (NO at S3219), on the other hand, the changed set end time $e_i$ for the reserved copy is compared with a set start time $b_{i+1}$ for the reserved copy having the number next to that of the reserved copy. If the changed set end time $e_i$ for the reserved copy is earlier than the set start time $b_{i+1}$ for the reserved copy having the number next to that for the reserved copy (YES at S3221), the print time zones for these reserved copies do not overlap with each other and hence the re-operation may not be continued, whereby the process advances to a step S3231 for setting display data indicating the delay and thereafter setting the data ($a_i$, $b_i$ and $e_i$) for the reserved copies re-operated at the initial time at a step S3233, and returns to the processing invoking the re-operation 1.

If the changed set end time ei for the reserved copy is later than the set start time $b_{i+1}$ for the reserved copy having the number next to that for the reserved copy in the determination at the step S3221 (NO at S3221), the print time zones for the reserved copies overlap with each other and hence the re-operation must be continued. Therefore, the processing following the step S3233 is executed.

First, the time difference between the previously re-operated changed set end time $e_i$ for the reserved copy and the set start time $b_{i+1}$ for the reserved copy to be re-operated is operated and set at "t" (S3223). Then, "$b_{i+1}$+t" is set at the set start time $b_{i+1}$ for the reserved copy to be re-operated (S3225). Further, "$e_{i+1}$+t" is set at the changed set end time data $e_{i+1}$ (S3227). Namely, the set start time $b_{i+1}$ for the reserved copy to be re-operated and the changed set end time data $e_{i+1}$ are changed to times later by the aforementioned delay time "t". Thereafter the number i is incremented (S3229) and similar processing is repeated.

When the re-operation is completed up to the reserved copy having the last number (YES at S3219) or a case causing no overlapping of a print time zone for a certain reserved copy and that for a next reserved copy is retrieved (YES at S3221), the re-operation may not be continued and hence the process advances to a step S3231 for setting display data indicating the delay and thereafter setting the data ($a_i$, $b_i$ and $e_i$) for the reserved copies re-operated at the initial time at a step S3233, and returns to the processing invoking the re-operation 1.

3-5. Re-Operation 2 Processing

Figure 50:
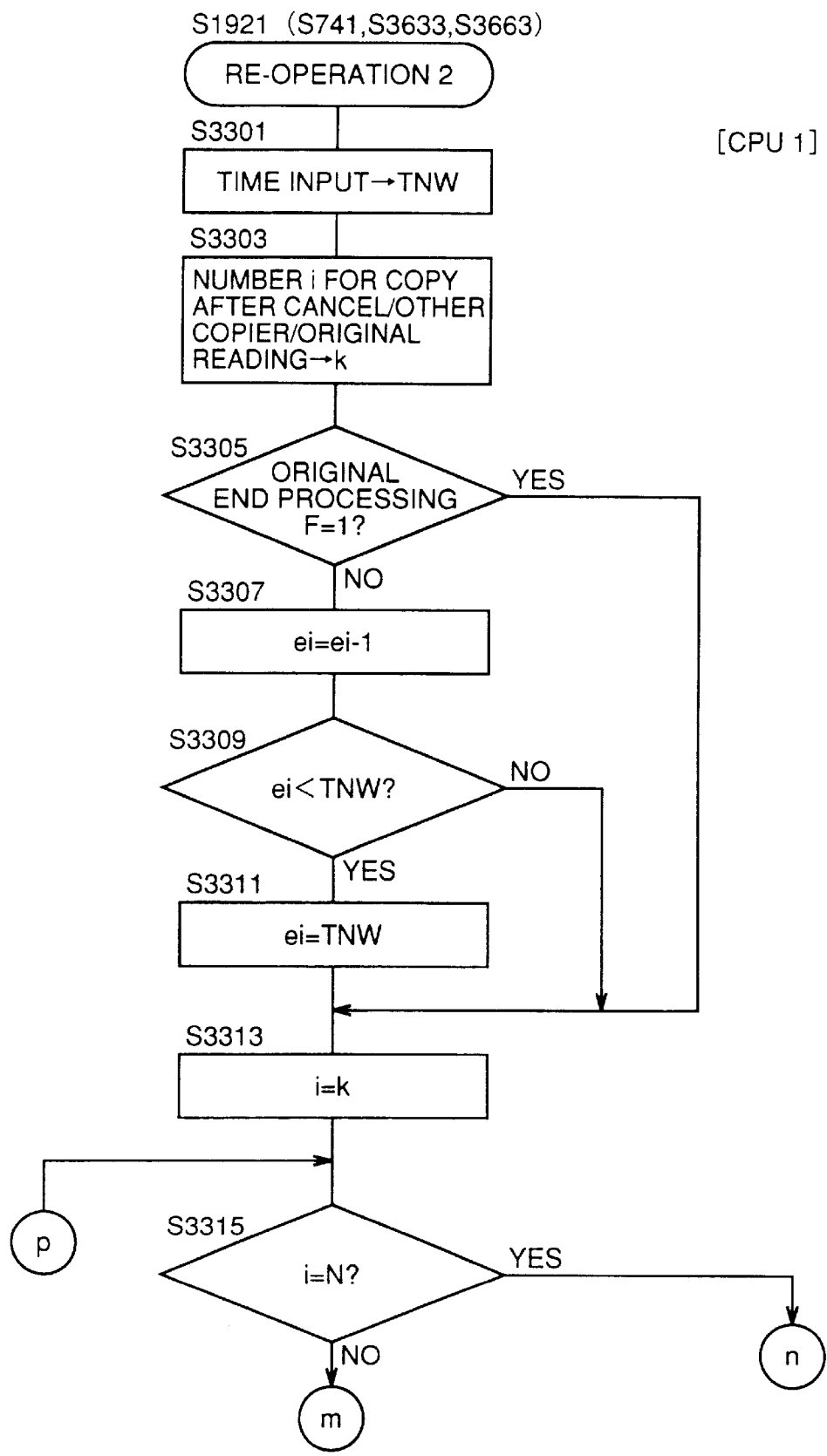
FIG. 50 is a part of a flow chart showing processing executed in re-operation 2 (S741, S1921, S3633 or S3663) shown in FIG. 35, 47, 59 or 60.
Figure 51:
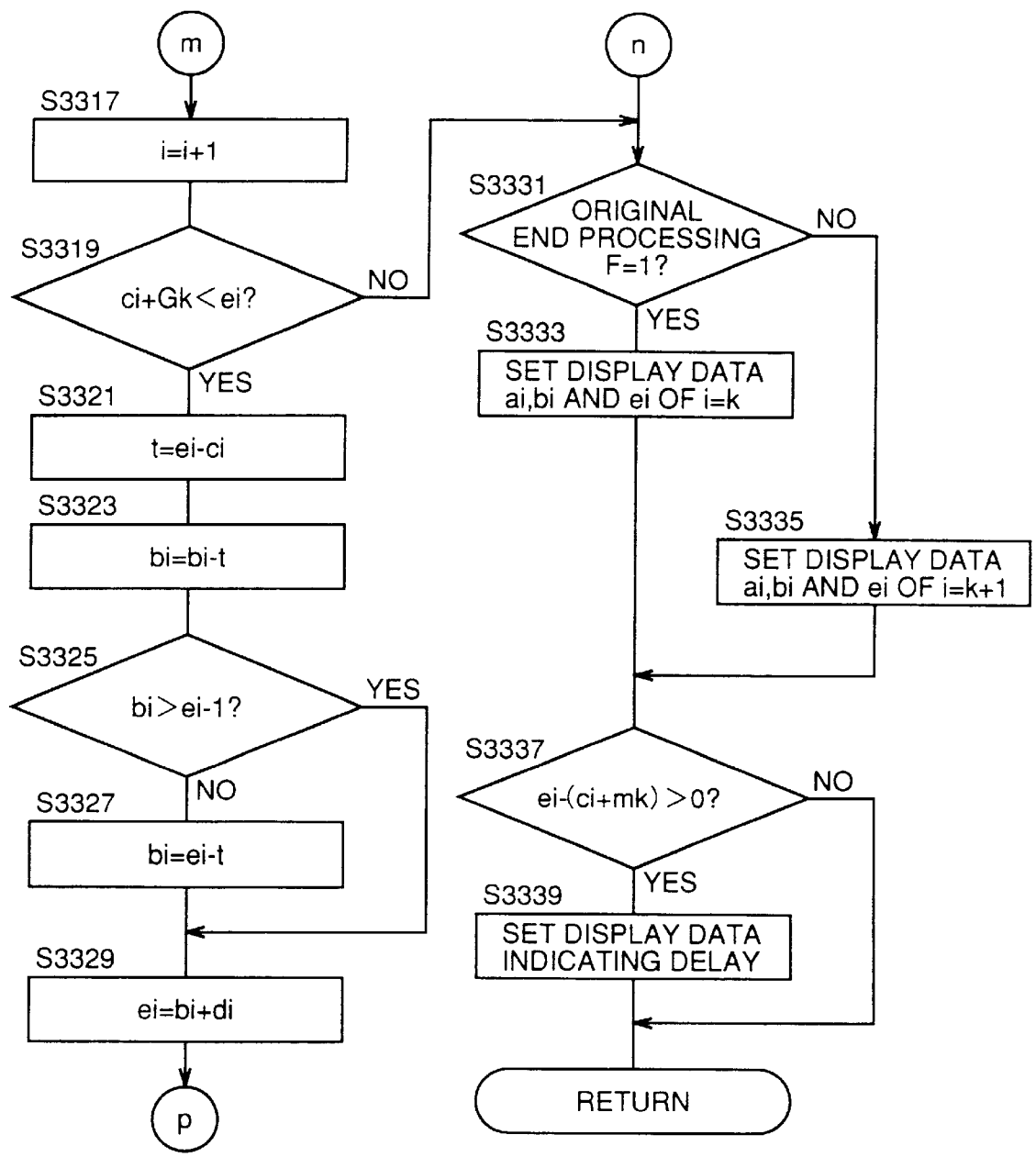
FIG. 51 is the remaining part of the flow chart showing the processing executed in the re-operation 2 (S741, S1921, S3633 or S3663) shown in FIG. 35, 47, 59 or 60.

In the aforementioned re-operation 2 processing, the current time is first inputted from the clock IC and set as the variable TNW (S3301), as shown in FIG. 50. Then, the number i (refer to FIG. 110) for the reserved copy next to that causing the re-operation 2, i.e., a reserved copy to be printed next to a canceled reserved copy, a reserved copy printed in the other copier, or a reserved copy having a read number of originals which is smaller than the number set by the user, is set at "k" (S3303).

Then, a determination is made as to whether or not the apparatus is in original end processing (S3305). In other words, a determination is made as to whether or not the read number of originals is smaller than the number set by the user. If the apparatus is in original end processing (YES at S3305), the process advances to a step S3313. If the apparatus is not in original end processing (NO at S3305), on the other hand, the process advances to a step S3307.

At the step S3307, "$e_{i-1}$" is set at the print end time $e_i$. Namely, a scheduled print end time for a canceled reserved copy or a reserved copy printed in the other copier is set.

Then, the current time TNW is compared with the scheduled print end time ei (S3309). If $e_i$<TNW (YES at S3309), the scheduled print end time $e_i$ is earlier than the current time TNW and hence the current time TNW is set at the scheduled print end time $e_i$ (S3311), and the process advances to a step S3313. If $e_i$ $ TNW (NO at S3309), on the other hand, the scheduled print end time $e_i$ is later than the current time TNW and hence no change is necessary, and the process immediately advances to the step S3313.

At the step S3313, "k" is set at "i" instructing the reserved copy to be re-operated. Then, a determination is made as to whether or not the reserved copy to be reoperated is the last one of the reserved copies stored in the memory table shown in FIG. 100 (S3315).

If "i" is not the last number N (NO at S3315), the process advances to a step S3317, for incrementing "i". Then, the process advances to a step S3319, for determining whether or not "$c_i+G_k$" is less than $e_i$. In other words, the value $c_i+G_k$ obtained by adding a prescribed value $G_k$ to the data $c_i$ for the scheduled end time TSP0 is compared with the data ei for the actual scheduled end time TSPO as to the reserved copy to be printed next. The prescribed value $G_k$ is about 2 to 3 minutes, for example.

If $c_i+G_k<e_i$ (YES at S3319), it is assumed that the process is later than the initial schedule and deviation "$e_i-c_i$" is set at "t" (S3321), and "$b_i-t$" is set at the scheduled print start time $b_i$ (S3323).

Then, the next start time $b_i$ is compared with the scheduled copy end time $e_{i-1}$ (S3325) so that $e_{i-1}$ is set at the start time $b_i$ (S3327) in case of $b_i<e_{i-1}$ (NO at S3325), i.e., if the next start time $b_i$ compensating for the delay time is earlier than the current time or the previous copy end time $e_{i-1}$ later than the current time, and then "$b_i+d_i$" is set at the end time $e_i$ (S3329). If $b_i>e_{i-1}$ at th step S3325 (YES at S3325), on the other hand, the process immediately advances to the step S3329, for making setting. Thereafter the process returns to the step S3315.

When the aforementioned processing is repeated and the reserved copy to be re-operated reaches the last number of the reserved copies stored in the memory table shown in FIG. 100 (YES at S3315), the process advances to a step S3331. If the determination at the step S3319 is of NO, the process advances to the step S3331 without executing the processing at the steps S3321 to S3329 since the set end time is substantially unchanged even if the correction of the re-operation 2 is made.

At the step S3331, the original end processing flag is determined. If the original end processing flag is set (YES at S3319), the re-operation is executed due to the difference between the actual number of originals and the number set by the user, and hence the display data $a_i$, $b_i$ and $e_i$ of i=k are set (S3333). If no original end processing flag is set (NO at S3331), on the other hand, the re-operation 2 is executed due to cancellation of the reserved copy or a copy in the other copier, and hence display data $a_i$, $b_i$ and $e_i$ of i=k+1 are set (S3333).

Then, the process advances to a step S3337, for determining whether or not "$e_i-(c_i+G_k)$" is greater than zero. If the determination is of YES, display data indicating a delay of print starting is set (S3339), and the process returns to the processing invoking the re-operation 2. If the determination at the step S3337 is of NO, on the other hand, the step S3339 is skipped and the process returns to the processing invoking the re-operation 2.

3-6. Processing Related to Trouble

Processing related to original reading not described in the above is now described with reference to FIGS. 69a to 74.

If inputted data include data indicating a trouble (YES at S4317) as shown in FIG. 69b, the ADF flag is reset (S4333), a variable MT is reset (S4335), and the trouble flag TBLF is set (S4337).

Figure 71:
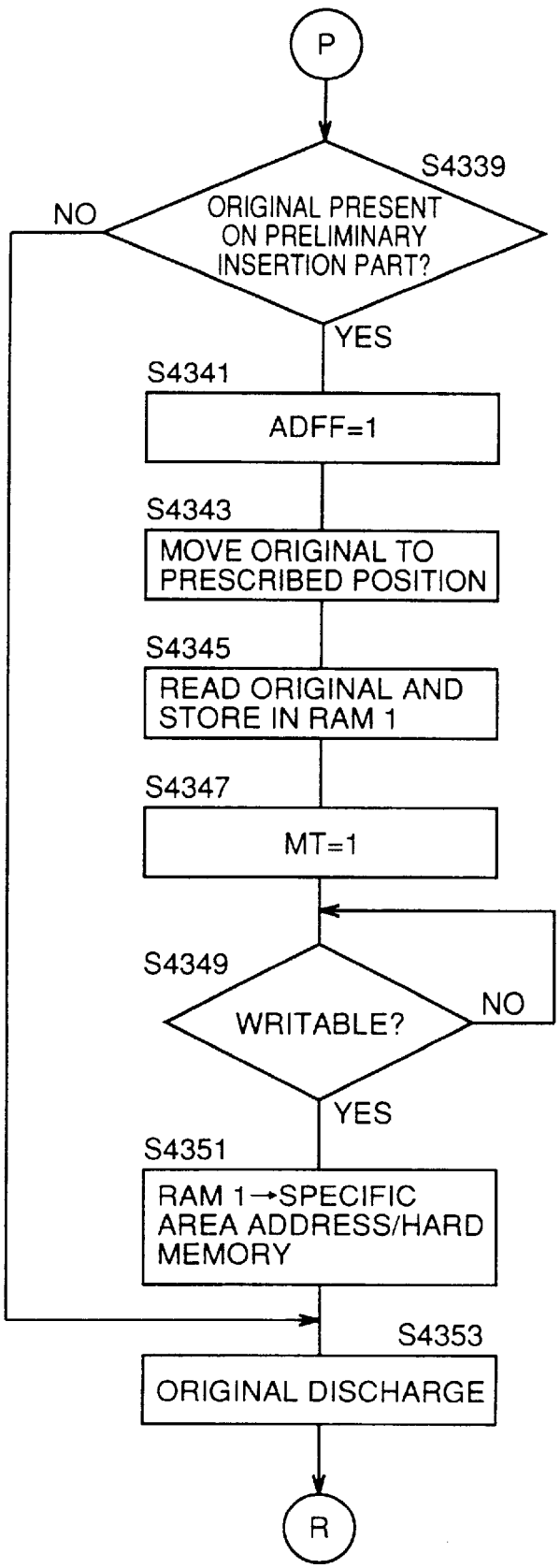
FIG. 71 is a further part of the flow chart showing the processing executed in power supply or original read communication interruption in the CPU3 of the copying apparatus according to the second embodiment.
Figure 72:
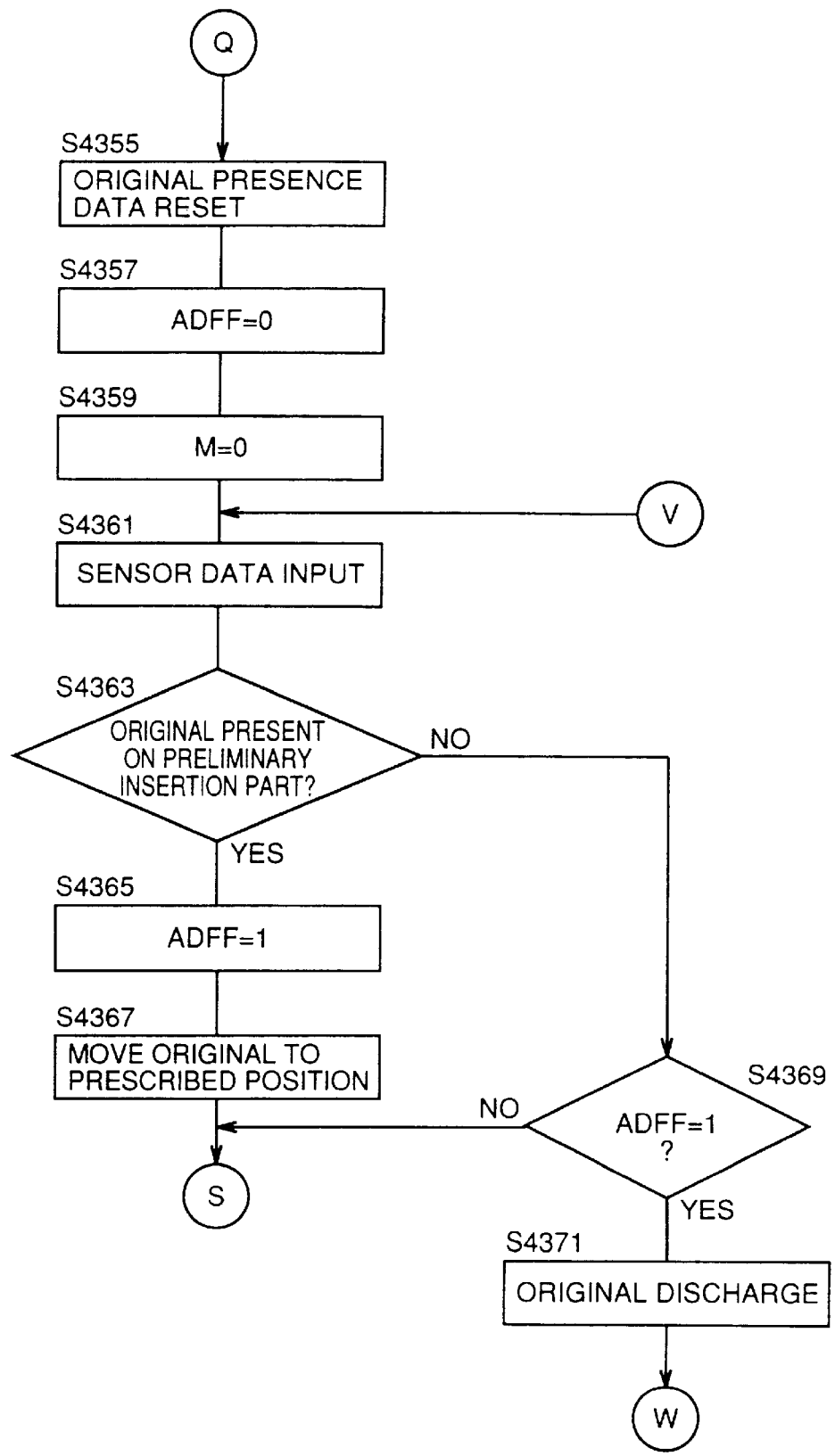
FIG. 72 is a further part of the flow chart showing the processing executed in power supply or original read communication interruption in the CPU3 of the copying apparatus according to the second embodiment.
Figure 73:
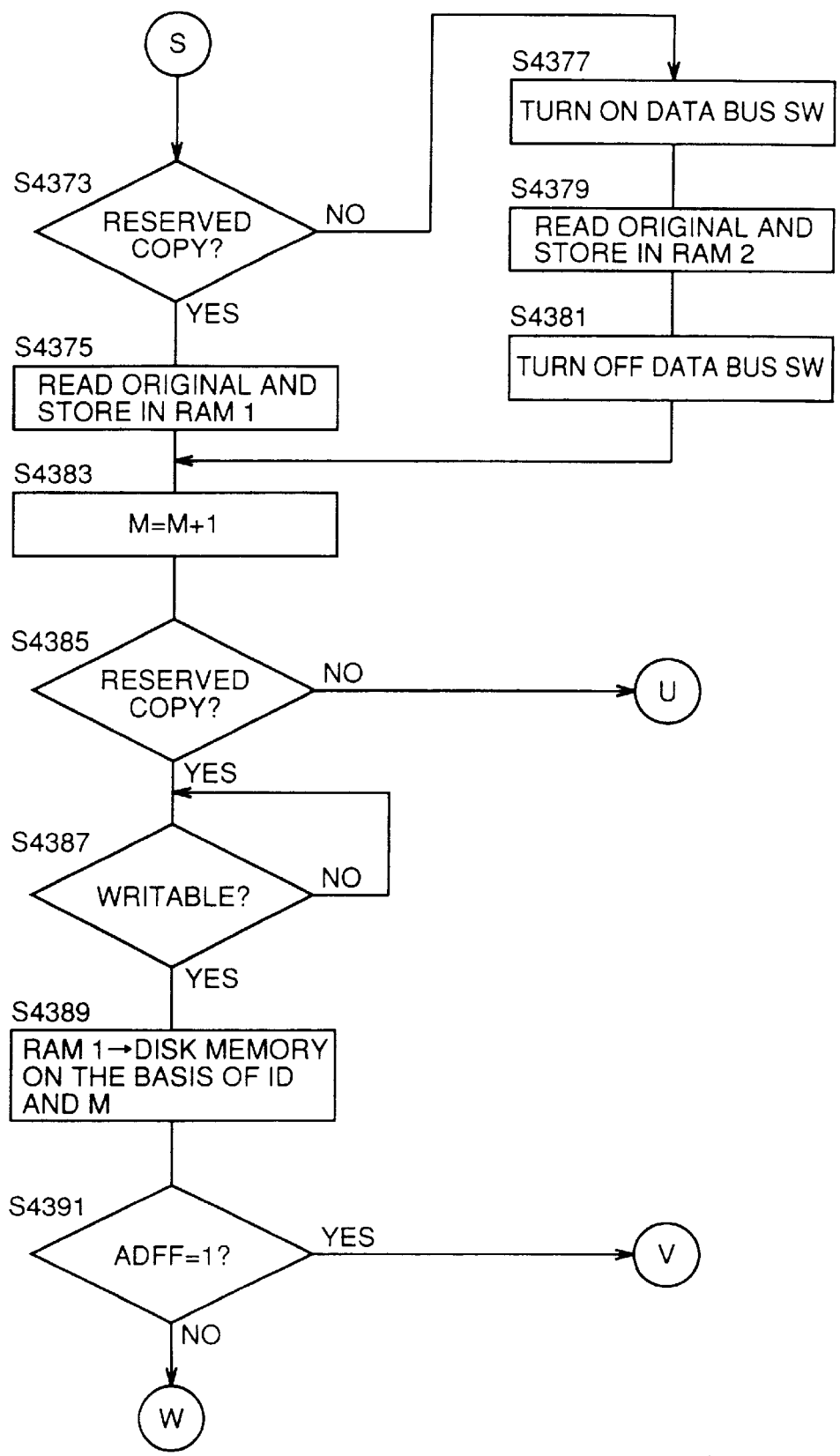
FIG. 73 is a further part of the flow chart showing the processing executed in power supply or original read communication interruption in the CPU3 of the copying apparatus according to the second embodiment.
Figure 74:
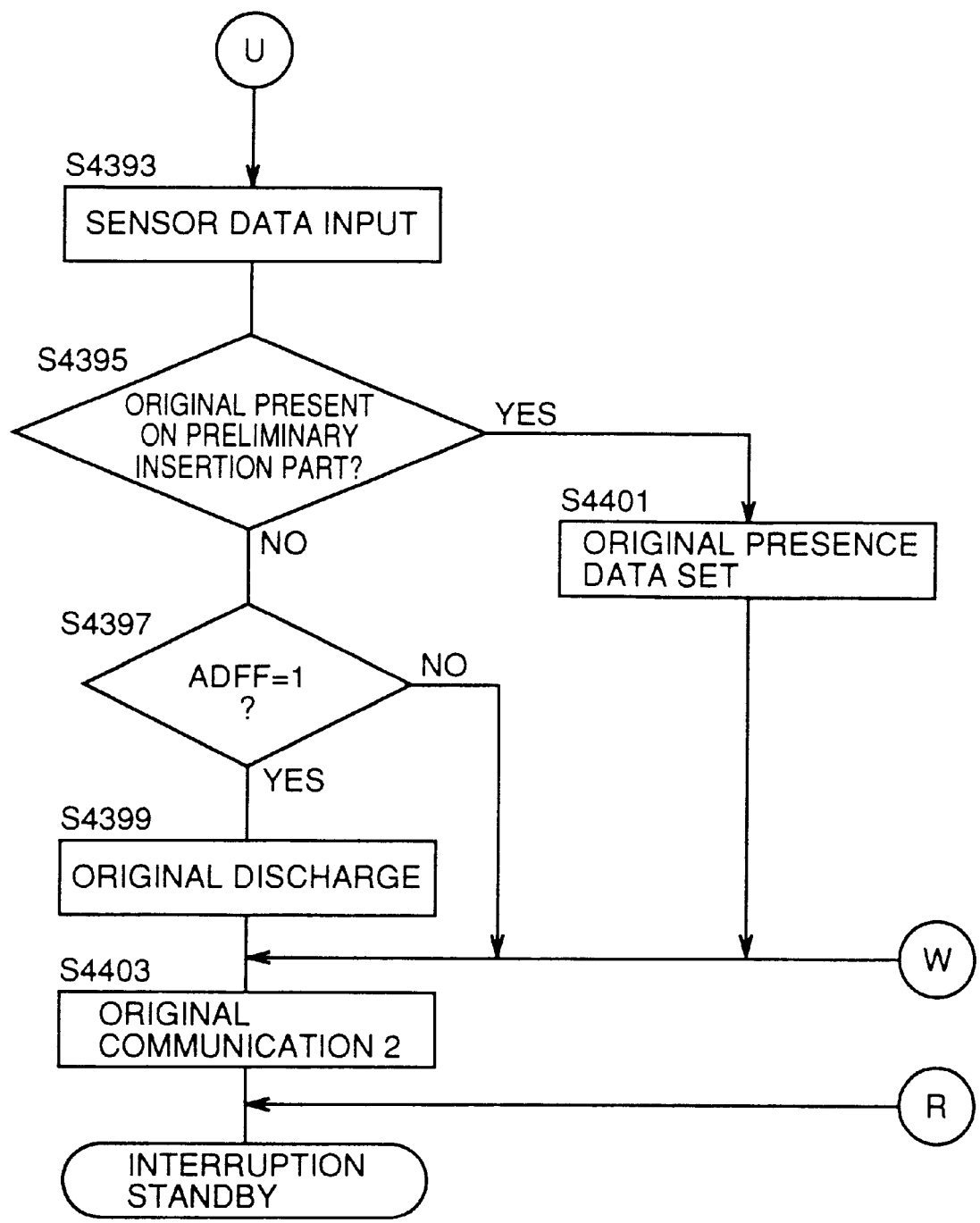
FIG. 74 is the remaining part of the flow chart showing the processing executed in power supply or original read communication interruption in the CPU3 of the copying apparatus according to the second embodiment.

At a step S4339 shown in FIG. 71, presence/absence of originals on the preliminary insertion part 103 is determined.

If no original is present on the preliminary insertion part 103, the originals on the platen 100 are discharged (S4353) and the process enters an interruption wait state.

If a determination is made that originals are present on the preliminary insertion part 103 at the step S4339 (YES at S4339), on the other hand, the ADF flag indicating this effect is set (S4341), the originals on the preliminary insertion part 103 are moved to a prescribed read position on the platen 100, and the originals are read so that the image data are stored in the RAM1 (S4345). Further, "1" is set at the variable MT indicating the number of originals read after the trouble (S4347).

The process waits until writing in the memory disk is enabled, and if writing is enabled (YES at S4349), the image data stored in the RAM1 are stored in an area for image data of the originals after the trouble in the memory disk (S4351). Thereafter the originals are discharged from the platen 100 (S4353), and the process enters an interruption wait state.

Thus, the originals present on the preliminary insertion part 103 are read in a trouble such as a jam, for making re-setting of the originals unnecessary.

Figure 70:
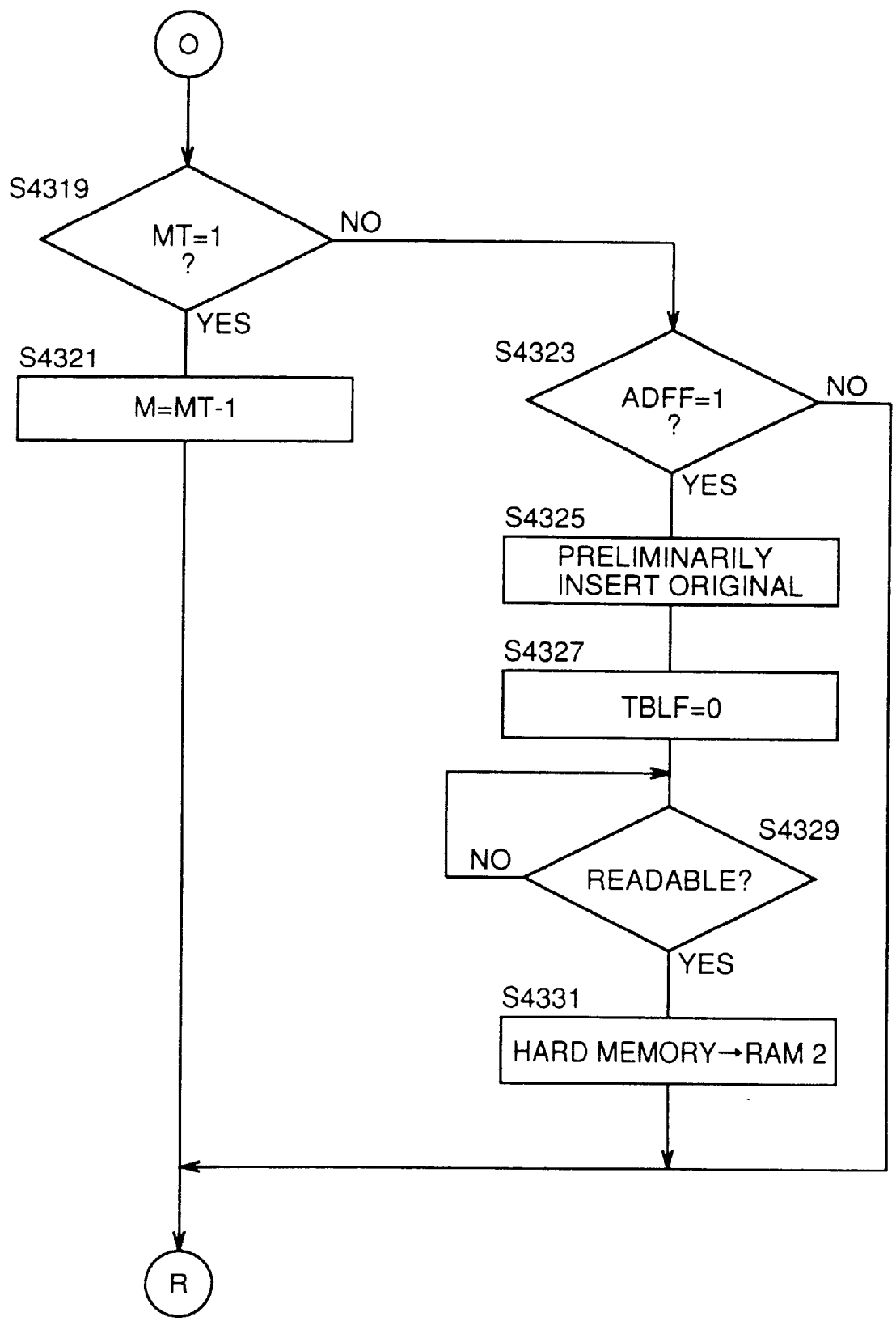
FIG. 70 is still another part of the flow chart showing the processing executed in power supply or original read communication interruption in the CPU3 of the copying apparatus according to the second embodiment.

When original read communication interruption is started next, the determination at the step S4315 becomes "YES" since the trouble flag TBLF is set at the step S4337 as described above, and the process advances to a step S4319 shown in FIG. 70 for determining the variable MT. If MT=1 (YES at S4319), the originals present on the preliminary insertion part 103 in the trouble are set on the platen 100, read and discharged after the reading, and hence "MT−1" is set at the number M of originals (S4321), and the process enters an interruption wait state.

If the variable MT is not "1" at the step S4319 (NO at S4319), on the other hand, the process advances to a step S4323 for determining the ADF flag. If the ADF flag is set (YES at S4323), the originals are preliminarily inserted (S4325), and the trouble flag TBLF is reset (S4327). When reading from the memory disk is enabled (YES at S4329), the image data are read from the memory disk to the RAM2. Thus, the images can be printed.

4. PRT Control

Description as to the control described in the remaining items is simplified or omitted.

4-1. In Case of Executing PRT Control

The PRT control is executed in the following cases:

(a) In General Copy Control (in Copy Operation)

In the general copy control for implementing a copy operation, the PRT control (S1109) is executed along with the original read control (S1105), as shown in FIG. 44. This general copy control is executed at the steps S135 (operation interruption), S163 (operation interruption) and S1207 (TBLM processing) shown in FIGS. 29, 30 and 56 respectively.

(b) Only PRT Control (in Print Operation)

When a print operation is executed separately from an original read operation, only the PRT control is independently executed. Such independent PRT control is executed at the steps S175 (operation interruption), S3711 (time PRT control) and S3657 (preserve confirm processing) shown in FIGS. 31, 57 and 60 respectively.

4-2. Process of PRT Control 4-2-1. Processing in CPU1

In the PRT control shown in FIG. 52, a display of "printing", setting of the print flag PRTF, setting of copy data, PRT communication 1, standby for resetting of the print flag PRTF, and a call of PRT end processing are performed.

4-2-2. Processing in CPU2

Due to the PRT communication 1 (S2109) shown in FIG. 52, the PRT communication 1 interruption (FIGS. 64 to 68) is started in the CPU2.

In case of a general copy operation (print operation accompanied by original read operation), print sequence processing (steps S653, S655 and S659) is performed for a set number of copies through steps S645 and S651 shown in FIG. 66, so that the data communication interruption (FIGS. 32 and 33) of the CPU1 is thereafter started by the PRT communication 2 (S687). Namely, the processing is so performed as to print image data read by the original read operation by the number NC, which is the set number of copies.

In case of an initial time after trouble recovery in a general copy operation (print operation accompanied by original read operation), print sequence processing of the set number of copies is performed through the steps S645 and S549 shown in FIG. 66, so that the data communication interruption (FIGS. 32 and 33) of the CPU1 is started by the PRT communication 2 (S687). Namely, processing is performed to print image data read by the original read operation by the number NCR (the number of remaining copies in occurrence of a trouble), which is the set number of copies.

In case of a print operation for a reserved copy, sequence processing of printing image data read from the memory disk by the set number NC of copies and the set number MD of originals is performed through the steps S633 and S635 shown in FIG. 65, and thereafter the data communication interruption (FIGS. 32 and 33) of the CPU1 is started by the PRT communcation 2 (S687).

After trouble recovery in a print operation for a reserved copy, sequence processing of printing image data read from the memory disk by the set number NC of copies (NCR in the initial time) and the set number MDR of originals is performed through the steps S639 and S635 shown in FIG. 65, thereafter processing of creating a management report is performed, and then the data communication interruption (FIGS. 32 and 33) of the CPU1 is started by the PRT communication 2 (S687).

Figure 68A:
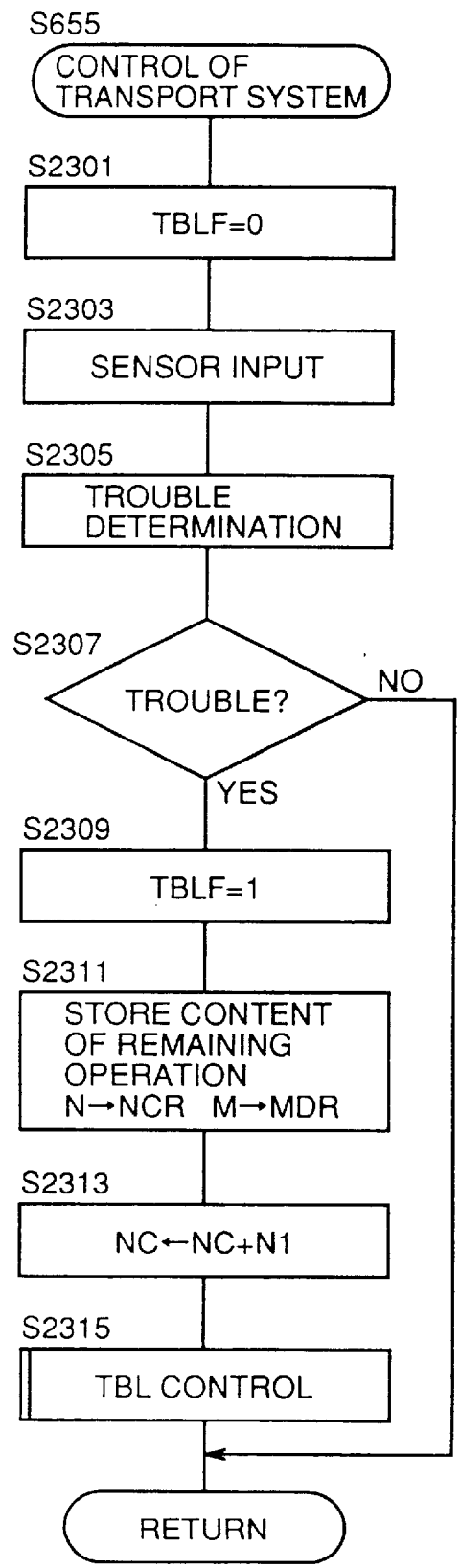
FIGS. 68a and 68b are flow charts showing processing executed in transport system control (S655) shown in FIG. 66 and TBL control (S2315 or S627) shown in FIG. 68a or 40 respectively.
Figure 68B:
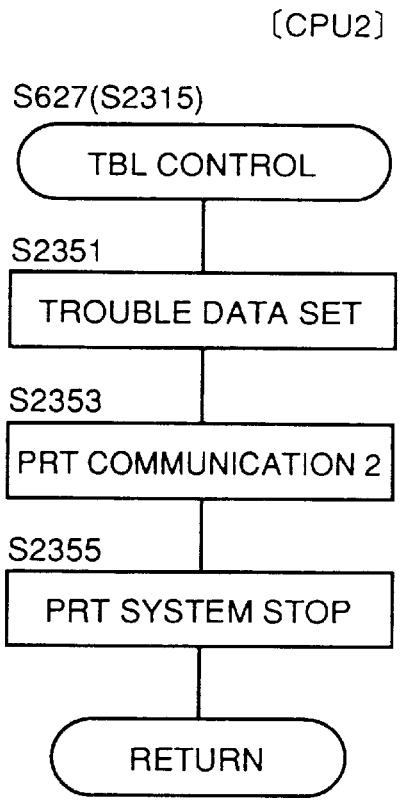

If a jam trouble in the transport system is detected (YES at S2303, S2305 and S2307) in the aforementioned print sequence as shown in FIG. 68a, the trouble flag TBLF is set (S2309), the current numbers N and M of copies and originals are set at the numbers NCR and MDR of remaining operations and originals respectively (S2311), "NC+N1" is set at the number NC (S2313), and trouble data is set by TBL control (S2315), so that the PRT communication 2 is performed. Thus, the data communication interruption (FIGS. 32 and 33) of the CPU1 is started. Thereafter the printer system is stopped (S2355).

4-2-3. Processing in CPU1

The CPU1 starting the data communication interruption executes processing in response to the cause for the interruption (print end/trouble).

In case of interruption resulting from the end of print processing in no reserve priority mode, the print flag PRTF is set (S535), operation interruption is authorized (S529) and the process returns to the address before the interruption. Thus, the process goes out of the wait state at the step S2111 shown in FIG. 52 for executing the PRT end processing (S2113), and thereafter returns to the processing invoking the PRT control.

In case of interruption resulting from the end of print processing in a reserve priority mode (YES at S537), the print flag PRTF is reset (S535), then the reserve priority mode flag and the wait flag WAITF are reset (S539 and S541), thereafter operation interruption is authorized (S529), and the process returns to the address before the interruption. Thus, the process goes out of the wait state at the step S2111 shown in FIG. 52 for executing the PRT end processing (S2113), and thereafter returns to the processing invoking the PRT control. If the original control flag is set (YES at S543), the PRT end processing (S545) is executed and thereafter the process returns to the address before the interruption.

In case of interruption resulting from occurrence of a trouble (YES at S533), the process advances to the processing following the step S547, for setting the trouble flag TBLF, turning off the display of "printing", and displaying "trouble". In the time PRT control (YES at S555), trouble data is set (S557) and the original read communication (S559) is performed. Thus, the original read communication interruption (FIGS. 69a to 74) is started in the CPU3. Thereafter the process returns to the address before the interruption, goes out of the wait state at the step S2111 shown in FIG. 52 for executing the PRT end processing (S2113), and thereafter returns to the processing invoking the PRT control.

In case of interruption resulting from trouble recovery (YES at S531), the process advances to processing following a step S563, for resetting the trouble flag TBLF, setting the trouble mode flag TBLMF, displaying the remaining operations, operating and displaying a scheduled end time, and turning off the trouble display. Thereafter the process returns to the address before the interruption, goes out of the wait state at the step S2111 shown in FIG. 52 for executing the PRT end processing (S2113), and thereafter returns to the processing invoking the PRT control.

5. Other Copier Control

In the CPU1, the time interruption shown in FIGS. 34 and 35 is started every prescribed time (e.g., 1 minute). This time interruption processing is adapted to investigate whether or not a print start time for a reserved copy is reached for starting the print operation for the reserved copy if the print start time is reached. If no print operation can be performed in the copier (hereinafter referred to as a copier A) to which the CPU1 belongs at the print start time, the time interruption processing is adapted to make the other copier (hereinafter referred to as a copier B) perform the print operation by other copier control (S729 or S743).

5-1. Time Interruption

First, the time interruption is described. When the time interruption is started, presence/absence of a reservation is first determined (S711), as shown in FIG. 34. This determination is made on the basis of the reserve flag RSVF. If no reservation is present, i.e., the reserve flag RSVF is reset (NO at S711), the process returns to the address before the interruption since no reserved copy to be printed is present.

When a determination is made at the step S711 that reservations are present (YES at S711), the current time is inputted from the clock IC and set at TNW (S713). Then, the set start times TSE for the reserved copies stored as shown in FIG. 100 are retrieved so that the reserved copy having the earliest set start time TSE is invoked and the set start time is set at TSEf (S715). Further, the required print time and the changed set end time for the earliest reserved copy are set at TAOf and TSPf respectively (S717).

Then, the current time TNW is compared with the set start time TSEf for the reserved copy invoked at the step S715 (S721). If the current time TNW is not yet the set start time TSEf, i.e., TNW>TSEf (NO at S719), a print operation for the reserved copy may not be started and hence the process returns to the address before the interruption.

If TNW #TSEf at the step S719, i.e., the current time TNW is at or later than the set start time TSEf (YES at S719), on the other hand, the print operation for the reserved copy must be started and hence the process advances to the step S721.

5-1-1. In Printing of Copier A

At the step S721, a determination is made as to whether or not a print operation is performed in the copier A to which the CPU1 executing the time interruption processing belongs through the print flag PRTF. If a print operation is performed (YES at S721), the print operation for the reserved copy cannot be performed in the printer part of the copier A, and hence the process advances to a step S743 shown in FIG. 35 for performing other copier control for making the other copier B perform this print operation. The other copier control is described later.

Figure 63:
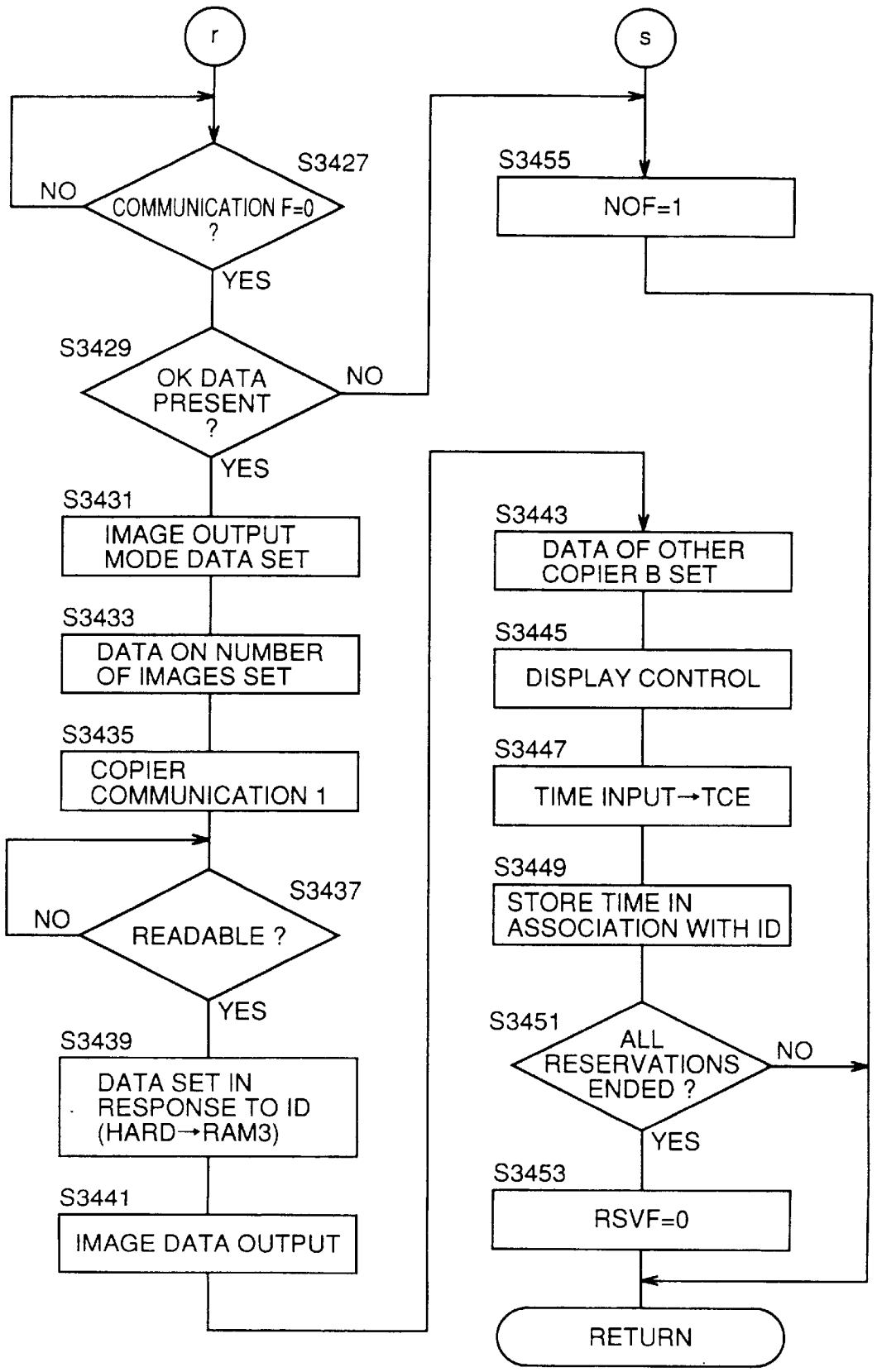
FIG. 63 is the remaining part of the flow chart showing the processing executed in other copier control (S729 or S743) shown in FIG. 35.

If it is clarified that the print operation cannot be performed in the other copier B as a result of communication in the other copier control (S743), a flag NOF indicating this effect is set (NO at S3429 in FIG. 63; refer to a step S3455). In this case, the determination at the step S745 becomes "YES", and hence the process advances to processing following a step S747.

At the step S747, re-operation 1 processing is executed. If the print operation for the aforementioned reserved copy cannot be performed in the other copier B, this print operation is performed in the copier A. However, the copier A currently performs a print operation as described above, and hence the print operation for the aforementioned reserved copy is executed after completion of the print operation now in execution. Thus, the re-operation 1 processing is executed at the step S747, for re-setting the start time etc. for the print operation for the aforementioned reserved copy. This delay also influences on start times etc. for the remaining unprinted already reserved copies recorded in the memory table shown in FIG. 100 as a matter of course, and hence the start times for the remaining unprinted already reserved copies are also re-set in the re-operation 1 processing (S747). Description of the re-operation processing 1, which has been described in the above item of "3. original read control" in detail, is omitted here.

When the re-operation 1 processing at the step S747 is ended, resulting print start and end times after the re-setting related to the aforementioned reserved copy etc. and the effect that the print operation is delayed are displayed for a constant time (S749) as shown in FIG. 94, for example. Thereafter the display is returned to a general one (S751) as shown in FIG. 95, for example, and the process returns to the address before the interruption.

If the determination at the step S745 is of NO, i.e., the print operation in the other copier B is possible, re-operation 2 processing is executed (S741). A free time is caused in the printer part of the copier A due to removal of the print operation for the aforementioned reserved copy from the copier A, and hence the re-operation 2 processing is adapted to make change through this if a changed set end time TSP1 for another unprinted already reserved copy can be approached to a desired end time (unchanged set end time TSPO) for this reserved copy. Description of the re-operation 2 processing, which has been described in the item of "3. original read control", is omitted here.

Thereafter the process advances to the address before the interruption.

5-1-2. In Case of Trouble in Copier A

If the trouble flag TBLF is set (YES at S723) although no print operation is performed at the step S721 (NO at S721), this means that a trouble takes place in the printer part of the copier A. Therefore, the print operation for the reserved copy invoked at the step S715 cannot be performed in the printer part of the copier A. Therefore, the process advances to a step S729 in FIG. 35 for performing the other copier control, in order to make the other copier B execute the print operation. When a trouble takes place in the printer part, the CPU2 transmits this effect to the CPU1 (refer to the steps S2351 and S2353 in FIG. 68b), whereby the data communication interruption is started in the CPU1 so that the trouble flag TBLF is set by the result of a determination on the cause for this interruption (NO at the steps S517, S521 and S531 and YES at the step S533 in FIG. 32; refer to the step S547 in FIG. 33).

If the print operation cannot be performed in the other copier B as a result of communication in the other copier control (S729) and the flag NOF indicating this effect is set, a determination of YES is made at a step S731 and the process advances to processing following a step S733.

Namely, data indicating the effect that the print operation for the reserved copy invoked at the step S715 cannot be executed (S733), and data indicating the content and the set end time for the reserved copy are set (S735). Then, communication is made with a personal computer indicated by the ID of this reserved copy, for transmitting the aforementioned data (S737). Thus, these data are displayed on the screen of the personal computer as shown in FIG. 83, for example. While FIG. 83 shows a display on the liquid crystal panel 291, this also applies to the screen of the personal computer. Further, the aforementioned data are displayed on the liquid crystal panel 291 of the copier A as shown in FIG. 83, for example (S739).

Thereafter the process returns to the address before the interruption.

If the determination at the step S731 is of NO, i.e., the print operation in the other copier B is possible, the re-operation 2 processing is executed (S741). The re-operation 2 processing at the step S741, which has been described above, is omitted here.

Thereafter the process returns to the address before the interruption.

5-1-3. If Printing in Copier A is Possible

When the copier A is not in a print operation at the step S721 (NO at S721) and no trouble flag TBLF is set (NO at S723), the print operation for the reserved copy invoked at the step S715 can be executed in the printer part of the copier A, and processing following a step S725 is executed.

First, re-operation 1 processing is executed at the step S725. The re-operation 1 processing is adapted to operate delays when the print start and end times for the reserved copy are late for set times due to interruption printing or a trouble, for re-setting. Description of the re-operation 1 processing, which has been described in the above item of "3. original read control", is omitted here.

Then, the process advances to a step S727, for performing time PRT control. FIG. 57 shows the time PRT control. First, the effect that the print operation for the reserved copy is started in the copier A is displayed as shown in FIG. 92, for example. Then, a time print control flag TPCF indicating the time PRT control is set (S3703).

Then, the trouble mode flag TBLMF is determined (S3705). In other words, a determination is made as to whether the reserved copy must be re-started after trouble recovery, or the reserved copy invoked at the step S715 in FIG. 34 must be started at the set start time TSE. In this case, the reserved copy invoked at the step S715 must be started and hence the trouble mode flag TBLMF is reset (NO at S3705), whereby copy start data is set (S3707).

Then, PRT control is performed at a step S3711. This control is adapted to start the PRT communication 1 interruption (FIGS. 64 to 69b) of the CPU2 by the PRT communication 1 (S210 in FIG. 52) for making the same execute a print operation by print sequence control (S653 to S671 in FIGS. 66 and 67) in the reserved copy mode (YES at S631 in FIG. 65), and end the control in response to PRT communication 2 (S687) executed after printing of the reserved copy and the management report. In the PRT end processing (S2113 in FIG. 52 6 FIG. 53) invoked during the PRT control in completion of the PRT control, a display (refer to the lower part of FIG. 95) indicating printing is turned off (S2203 and S2205).

When the print operation for the reserved copy by the PRT control (S3711) is ended, communication is made with the personal computer indicated by the ID for the reserved copy (S3713), for transmitting data indicating the effect that the print operation for the reserved copy is ended and the copier (copier A in this case) executing the print operation. Thus, these data are displayed on the screen of the personal computer.

Then, the current time is inputted from the clock IC and set at TCE (S3715), and stored in a column of the memory table shown in FIG. 100 corresponding to the ID for the reserved copy (S3717). Thereafter a determination is made as to whether or not print operations for all reserved copies are ended, with reference to the table shown in FIG. 100 (S3719). This determination can be made on the basis of presence/absence of the data TCE (not shown in FIG. 100). If the print operations for all reserved copies are ended (YES at S3719), the reserve flag RSVF indicating presence/absence of reserved copies is reset (S3721), the time print control flag TPCF indicating the time PRT control is reset (S3723), and the process returns. In this case, the process returns to the time interruption processing. Thereafter the process returns to the address before the interruption. If a determination on presence of an unprinted reserved copy is made at the step S3719, on the other hand, the process advances to the step S3723 without resetting the reserve flag RSVF, for thereafter performing the processing in a similar manner.

Thus, the print operation for the reserved copy is performed.

5-2. Communication Between Copiers A and B

Figure 62:
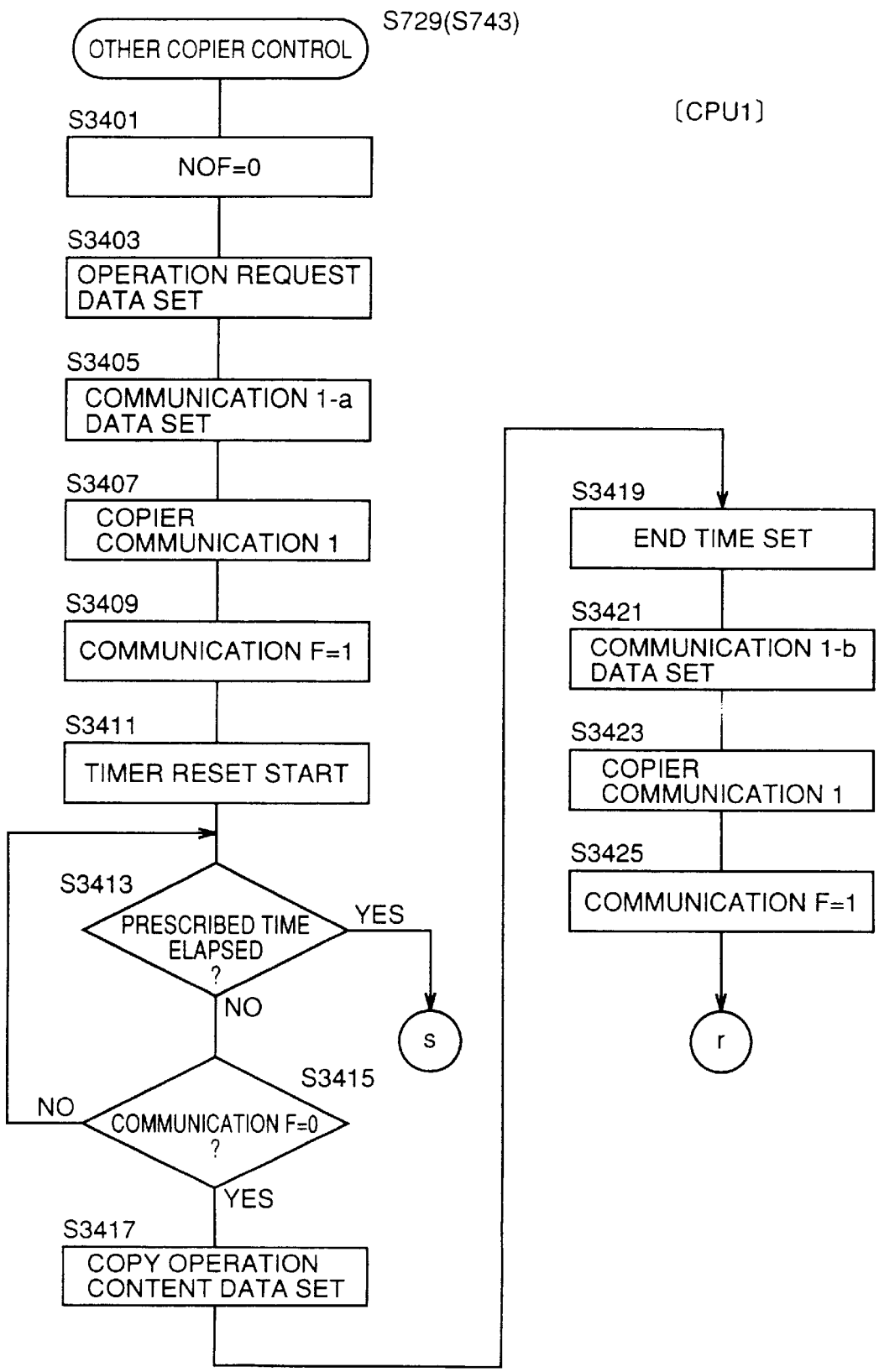
FIG. 62 is a part of a flow chart showing processing executed in other copier control (S729 or S743) shown in FIG. 35.

If the print operation for the reserved copy invoked at the step S715 cannot be executed in the copier A, the other copier control (S729 and S743) shown in FIGS. 62 and 63 is executed in the CPU1 of the copier A for making the copier B execute this print operation, as hereinabove described. Thus, the copier A transmits the print data for the reserved copy to the copier B, if the print operation is possible in the copier B.

First, the flag NOF indicating impossibility of the print operation in the copier B is reset in the CPU1 of the copier A (S3401), as shown in FIG. 62. Then, operation request data and communication 1-a data are set (S3403 and S3407), for making copier communication 1 (S3407). Thus, data communication interruption (FIGS. 32 and 33) is started in the CPU1 of the copier B. After the copier communication 1 (S3407), a communication flag indicating execution of the copier communication is set in the CPU1 of the copier A (S3409), to enter a wait state for whether or not the communication flag is reset within a prescribed time (S3411, S3413 and S3415).

Figure 54:
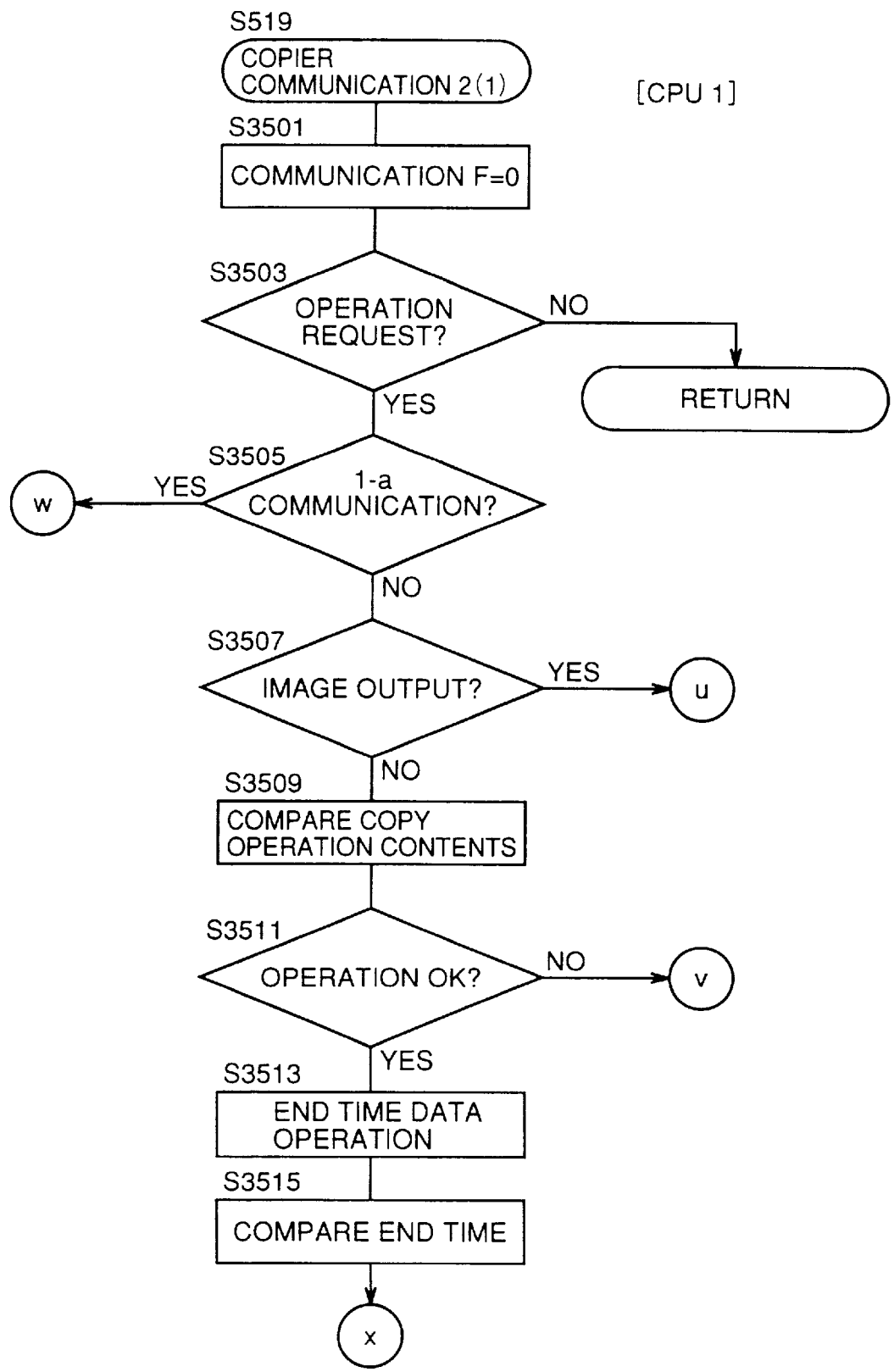
FIG. 54 is a part of a flow chart showing processing executed in copier communication 2(1) (S519) shown in FIG. 52.
Figure 55:
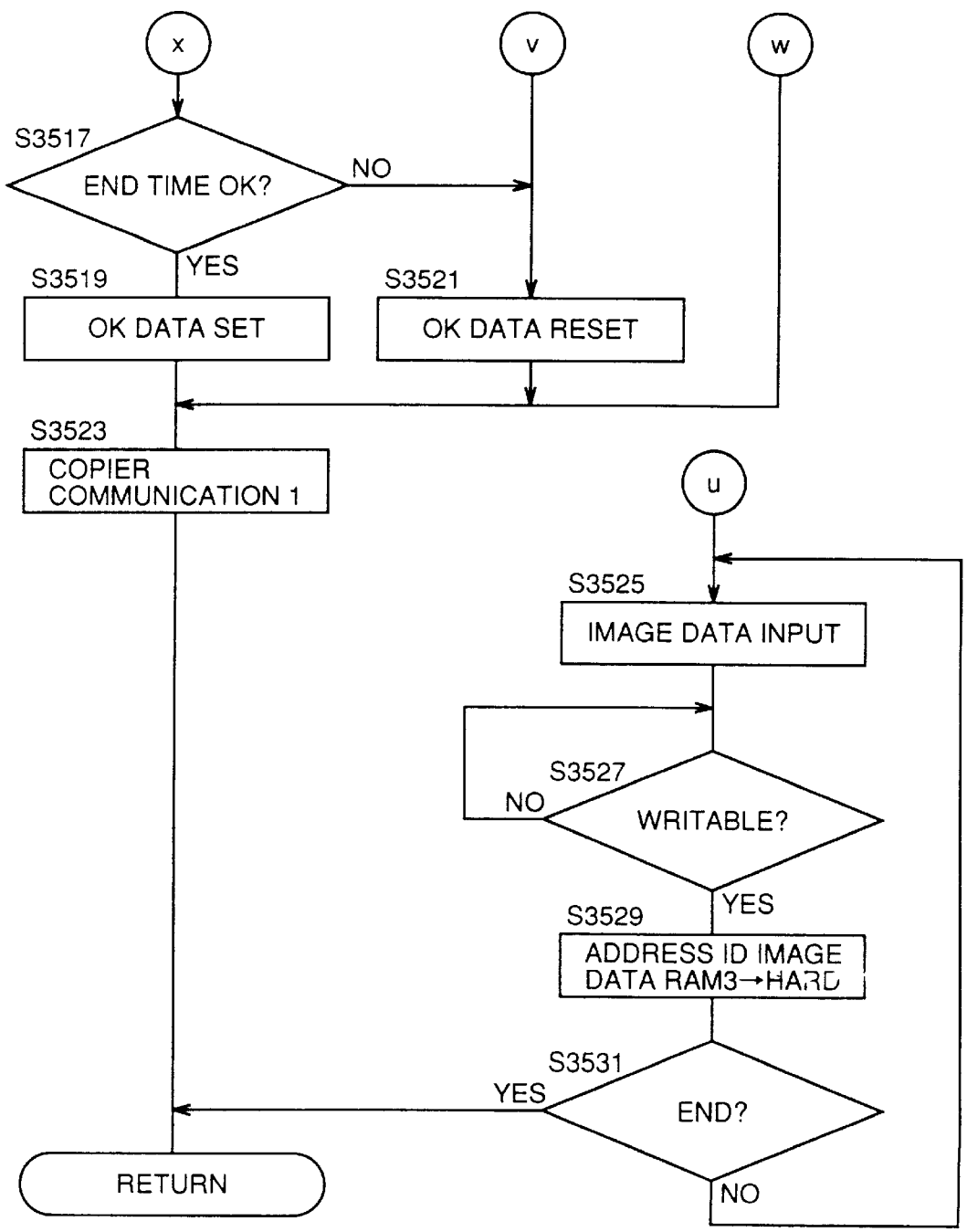
FIG. 55 is the remaining part of the flow chart showing the processing executed in the copier communication 2(1) (S519) shown in FIG. 52.

In the CPU1 of the copier B starting the data communication interruption, on the other hand, data transmitted from the CPU1 of the copier A through the control bus CODB is inputted (S513) so that the type of the interruption is determined on the basis of this data (S517), as shown in FIG. 32. The interruption results from the copier communication 1 (YES at S517) in this case, and hence copier communication 2 processing is performed (S519). FIGS. 54 and 55 show the copier communication 2 processing.

In the copier communication 2 processing, the communication flag is first reset (S3501) and then the types of the request and the communication are determined on the basis of the input data at the step S513. In this case, the operation request data is transmitted (YES at S3503; refer to S3403) and the type is the 1-a communication (YES at S3505; refer to S3405), and hence the process advances to a step S3523 for performing copier communication 1, and returns. Namely, the process returns to FIG. 32. Thus, operation interruption is authorized (S529), and the process in the CPU1 of the copier B returns to the address before the interruption.

In the CPU1 of the copier A, on the other hand, data communication interruption (FIGS. 32 and 33) is started by the copier communication 1 processing (S3523) in the CPU1 of the copier B. The determination at the step S517 becomes YES also in this data communication interruption processing, and hence the process advances to the step S519, for executing copier communication 2 processing.

Also in this copier communication 2 processing, the communication flag is first reset (S3501), and thereafter the request is determined. In this case, no operation request data is transmitted (NO at S3503), and hence the process returns. Namely, the process returns to FIG. 32. Thus, operation interruption is authorized (S529), and the process in the CPU1 of the copier A returns to the wait state at the steps S3413 and S3415 shown in FIG. 62, which is the address before the interruption.

Consequently, the communication flag is reset at the step S3501 as hereinabove described, whereby the determination at the step S3415 becomes "YES" and the process advances to processing following a step S3417. If the communication flag is not reset within the prescribed time (YES at S3413), no response is received from the CPU1 of the copier B within the prescribed time, and hence the flag NOF indicating impossibility of the print operation in the copier B is set (S3455) and the process returns to the step S729 of time interruption or the end of the step S743.

Following the step S3417, data of the contents (the copy size, the number of copies, the original size, the number of originals etc.) of the reserved copy to be printed in the copier B and data of the set end time for the reserved copy are set (S3417 and S3419), communication 1-b data is set (S3421), and copier communication 1 is performed (S3423). Thereafter the communication flag is set (S3425), and the process enters a wait state for resetting of the communication flag (S3427).

Due to the aforementioned copier communication 1 processing (S3423), data communication interruption (FIGS. 32 and 33) is started in the CPU1 of the copier B. The determination at the step S517 becomes YES also in this data communication interruption processing, and hence the process advances to the step S519 for executing copier communication 2 processing shown in FIG. 54.

Also in this copier communication 2 processing, the communication flag is first reset (S3501) and thereafter a request and data are determined (S3503, S3505 and S3507). In this case, data indicating the contents of the copy operation are inputted (YES at S3503; refer to S3417 to S3419) and not the communication 1-a data but the 1-b data is inputted (NO at S3505; refer to S3421), while no image data are inputted (NO at S3507), and hence the process advances to a step S3509.

At the step S3509, the operation contents (the copy size etc.) of the reserved copy transmitted from the CPU1 of the copier A through the copier communication 1 (S3423) are compared as to whether the same can be executed in the copier B. If the contents can be printed in the copier B (YES at S3511), then end time data is operated (S3513). In case of executing the print operation for the contents transmitted from the copier A in the copier B, the time scheduled for ending the print operation is operated in consideration of the ability of the copier B, the contents of copies reserved in the copier B (the memory table shown in FIG. 100 stores reserved copies also in the copier B) (S3513).

Then, the time data operated at the step S3513 is compared with the set end time data (refer to S3419) transmitted from the copier A (S3515). If the print operation in the copier B can be ended before the set end time transmitted from the copier A (YES at S3517), OK data is set (S3519). Even if the print operation in the copier B cannot be ended before the set end time transmitted from the copier A, OK data may be set if the delay is about 5 minutes, for example. When the OK data is set, copier communication 1 (S3523) is performed and the process returns to FIG. 32. Thus, operation interruption is authorized (S529), and the process in the CPU1 of the copier B returns to the address before the interruption.

Due to the above copier communication 1 processing (S3523), data communication interruption (FIGS. 32 and 33) is started in the CPU1 of the copier A. The determination at the step S517 becomes "YES" also in this data communication interruption processing, and hence the process advances to the step S519 for executing the copier communication 2 processing shown in FIG. 54.

Also in this copier communication 2 processing, the communication flag is first reset (S3501) and thereafter the data inputted at the step S513 is determined (S3503). In this case, the OK data is transmitted and inputted (refer to S3519) while the process returns to FIG. 32 since this is not an operation request (No at S3503). Thus, operation interruption is authorized in the CPU1 of the copier A (S529), and the process returns to the wait state at the step S3427 in FIG. 63, which is the address before the interruption.

Consequently, the communication flag is reset at the step S3501 as described above and hence the determination at the step S3427 becomes "YES" and the process advances to the step S3429. At the step S3429, presence/absence of the OK data is determined. In this case, the OK data is present (YES at S3429), and hence the process advances to processing following a step S3431.

Image output mode data is set at the step S3431, and data on the number of images is set at a step S3433. Thereafter copier communication 1 is performed at a step S3435. The process waits until the image data of the reserved copy to be printed in the copier B are readable from the memory disk (YES at S3437), for reading the image data from the memory disk, storing the same in the RAM3 (S3439), and outputting the same from the RAM3 to the RAM3 (not shown) of the copier B through the image data bus PXDB (S3441).

In the CPU1 of the copier B, on the other hand, data communication interruption (FIGS. 32 and 33) is started by the aforementioned copier communication 1 (S3435). The determination at the step S517 becomes "YES" also in this data communication interruption processing, and hence the process advances to the step S519, for executing the copier communication 2 processing in FIG. 54.

Also in this copier communication 2 processing, the communication flag is first reset (S3501) and thereafter the data inputted at the step S513 is determined (S3503). This is the case for an image output (YES at S3503, NO at S3505 and YES at S3507), and hence the process advances to a step S3525. At the step S3525, image data are inputted. Then, the process waits until writing in the memory disk (not shown) of the copier B is possible (YES at S3527), for recording the image data of the RAM3 in the memory disk of the copier B (S3529). When this processing is repeated and all image data transmitted from the copier A are completely stored in the memory disk (YES at S3531), the process returns to FIG. 32. Thus, operation interruption is authorized (S529), and the process in the CPU1 of the copier B returns to the address before the interruption. Thereafter the print operation for the reserved copy stored in the memory disk is started by time interruption (FIGS. 34 and 35) in the CPU1 of the copier B.

After the image data output (S3441 in FIG. 63), on the other hand, the process in the CPU1 of the copier A advances to a step S3443. At the steps S3443 and S3445, data related to the copier B for printing the reserved copy this time is displayed on the liquid crystal panel 291. Then, the current time is inputted from the clock IC and set at TCE at a step S3447, to be stored in the memory table shown in FIG. 100 in association with the ID for the reserved copy to be printed in the copier B (S3449). Referring to FIG. 100, illustration of TCE is omitted.

Then, a determination is made at a step S3451 as to whether or not all reserved copies are completely printed. This determination is made with reference to the memory table shown in FIG. 100. If all reserved copies are completely printed (YES at S3451), the reserve flag RSVF indicating presence of any reserved copy is reset (S3453), and thereafter the process returns to the processing in FIG. 35. If a determination is made at the step S3451 on presence of any unprinted reserved copy (NO at S3451), on the other hand, the process immediately returns to the processing in FIG. 35.

Thus, communication is made between the copiers A and B, for implementing the print operation for the reserved copy in the other copier B.

If a determination is made that the print operation for the contents transmitted from the copier A cannot be made in the copier B at the step S3511 in FIG. 54 (NO at S3511) or a determination is made that the copier B cannot end the print operation before the set end time (or in an allowable time after the set end time) transmitted from the copier A at the step S3517 in FIG. 55 (NO at S3517), on the other hand, the OK data is reset (S3521) and thereafter copier communication 1 (S3523) is executed.

In the CPU1 of the copier A, therefore, data communication 1 interruption (FIGS. 32 and 33) is started, the determination at the step S3429 in FIG. 63 executed after going out of the data communication interruption processing becomes "NO", the flag NOF indicating the effect that the print operation in the copier B is impossible is set (S3455), and thereafter the process returns to the processing in FIG. 35. Thus, the processing following the step S733 or S747 is performed.

This system operates in the aforementioned manner. While a plurality of copiers are connected with a plurality of personal computers in the above description, printers or image readers may be connected in place of the copiers, in order to form a similar system.

While the memory disks are employed as mass storage recording media in the aforementioned system, semiconductor memories or other well-known recording media may alternatively be employed.

While originals are read and printed in the aforementioned system, the system may be similarly formed also in case of printing originals inputted from personal computers or the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing unit having a reserve print function of storing original image data and print start time data for said original image data in storage means and reading said original image data being associated with a print start time from said storage means at said print start time for printing the same, said image processing unit comprising:

monitor means for monitoring and storing an operating situation of said image processing unit;

data input means for inputting original print data;

end time input means for inputting a desired original print end time;

required time operation means for operating a required time for an original print operation corresponding to said print data on the basis of said print data; and scheduling means for operating said print start time for each said original on the basis of said operating situation and said required and desired end times for each said original for avoiding overlapping of time zones for print operations for respective said originals.

2. The image processing unit in accordance with claim 1, wherein said monitor means operates an average required time of print operations being executed in said image processing unit not in accordance with said reserve print function in a unit period and an average required time being consumed for supplying recording papers in said image processing unit in a unit period, for storing the same as said operating situation.

3. The image processing unit in accordance with claim 1, wherein said scheduling means outputs the effect that an original which cannot be completely printed before said desired end time is present when this effect is proved as a result of said operation.

4. The image processing unit in accordance with claim 1, wherein said monitor means operates an average number of recording papers being consumed in a unit period in a print operation being executed in said image processing unit not in accordance with said reserve print function and stores the same as said operating situation, said image processing unit further comprising:

residual number detection means for detecting the number of remaining said recording papers, and warning means for adding the number of recording papers being predictably consumed through said reserve print function in said unit period with said average number being operated by said monitor means, comparing the result with the number of said remaining recording papers being detected by said residual number detection means, and making an output when the number of said remaining recording papers is smaller.

5. An image processing unit having a print function of storing image data in storage means and reading said image data from said storage means and printing the same at a set print start time for said image data, said image processing unit comprising:

start input means for instructing starting of a print operation;

determination means for determining presence/absence of a currently executed print operation when an operation input is received from said start input means;

interruption means for interrupting said currently executed print operation and preserving data at the time of said interruption when said determination means makes a determination on presence of said currently executed print operation; and control means for starting a print operation for a set original after said data preservation by said interruption means if said currently executed print operation is present when said operation input is received from said start input means and restarting interrupted said print operation on the basis of said data being preserved by said interruption means after completion of said print operation for said set original.

6. An image processing unit having a print function of storing image data in storage means and reading said image data from said storage means and printing the same at a set print start time for said image data, said image processing unit comprising:

start input means for instructing starting of a print operation;

invocation means for invoking arbitrary said image data being stored in said storage means;

determination means for determining presence/absence of a currently executed print operation when an operation input is received from said start input means;

interruption means for interrupting said currently executed print operation and preserving data at the time of said interruption when said determination means makes a determination on presence of said currently executed print operation; and control means for starting a print operation for said image data being invoked by said invocation means after said data preservation by said interruption means if said currently executed print operation is present when said operation input is received from said start input means and restarting interrupted said print operation on the basis of said data being preserved by said interruption means after completion of said print operation for said image data.

7. An image processing unit having a print function of storing image data in storage means and reading said image data from said storage means and printing the same at a set print start time for said image data, said image processing unit comprising:

data input means for inputting print data of a st original;

required time operation means for operating a required time for a print operation for said set original on the basis of said print data;

end time operation means for operating a print end time in case of starting said print operation for said set original from the current time on the basis of said required time and setting the same as an operated print end time;

determination means for determining whether or not said operated print end time is a time before an earliest set print start time for said image data being stored in said storage means;

start time set means for setting the current time as a set print start time for said set original when said operated print end time is at said time before said earliest set print start time, while setting said set print start time for said set original at a time after completion of a print operation for said image data having said earliest set print start time as a set print start time for said set original when said operated print end time is at a time after said earliest set print start time; and display means for displaying whether said print operation for said set original is started from the current time or after completion of said print operation for said image data being stored in said storage means in response to a result of said determination.

8. The image processing unit in accordance with claim 7, further comprising:

start input means for instructing starting of said print operation for said set original, and control means for executing said print operation for said set original from said set print start time for said original when an operation input is received from said input means.

9. The image processing unit in accordance with claim 7, wherein said display means displays a time when said print operation for said set original is started at said time after completion of said print operation for said image data being stored in said storage means.

10. An image processing unit having a print function of storing image data in storage means and reading said image data from said storage means and printing the same at a set print start time for said image data, said image processing unit comprising:

data input means for inputting print data of a set original;

required time operation means for operating a required time for a print operation for said set original on the basis of said print data;

end time operation means for operating a print end time in case of starting said print operation for said set original from the current time on the basis of said required time and setting the same as an operated print end time;

determination means for determining whether or not said operated print end time is at a time before an earliest set print start time for said image data being stored in said storage means;

priority mode input means for instructing setting of a priority mode for giving priority to a print operation for said image data being stored in said storage means;

start input means for instructing starting of said print operation for said set original; and control means for starting said print operation for said set original when an operation input is received from said start input means, while starting said print operation for said set original on condition that said determination means determines that said operated print end time is at said time before said earliest set print start time when said operation input is received from said start input means after an operation input from said priority mode input means.

11. An image processing unit having a print function of storing image data in storage means and reading said image data from said storage means and printing the same at a set print start time for said image data, said image processing unit comprising:

data input means for inputting print data for a set original;

required time operation means for operating a required time for a print operation for said set original on the basis of said print data;

end time input means for inputting a desired end time for said print operation for said set original;

start time operation means for operating a start time for said print operation for said set original on the basis of said required time and said desired end time and setting the same as an operated print start time;

determination means for comparing said desired print end time and said operated print start time for said set original with a set print end time for each said image data being stored in said storage means and said set print start time respectively for determining presence/absence of overlapping of a time zone for said print operation for said set original and each time zone for a print operation for each said image data being stored in said storage means; and time set means for operating a time before said desired print end time causing no occurrence of said overlapping and setting the same as a set print end time for said set original while operating a print start time corresponding to said set print end time and setting the same as said set print start time for said set original when said determination means makes a determination on presence of said overlapping.

12. The image processing unit in accordance with claim 11, further comprising:

display means for displaying said set print start time and said set print end time in association with said image data.

13. The image processing unit in accordance with claim 11, wherein said time set means sets an earliest time after said desired print end time causing no occurrence of said overlapping as said set print end time when said time before said desired print end time for said set original causing no occurrence of said overlapping is absent.

14. The image processing unit in accordance with claim 11, wherein said time set means operates and sets said set print end time and said set print start time in relation to each said image data being printed after certain image data in case of occurrence of a fluctuation factor for said set print start time for said image data being stored in said storage means.

15. An image processing system being formed by a first digital copying apparatus and a second digital copying apparatus to be capable of bidirectionally transferring image data, each said copying apparatus having a function of storing image data in storage means for reading and printing said image data from said storage means at a set print start time for said image data, and comprising:

required time operation means for operating a required time for a print operation for a target original to be copied on the basis of copy data of said target original;

end time operation means for operating a print end time in case of starting said print operation for said target original from the current time on the basis of said required time and setting the same as an operated print end time;

determination means for comparing said operated print end time for said target original with a set print end time and a set print start time for each said image data being stored in said storage means and determining presence/absence of overlapping of a time zone for said print operation for said target original and each time zone for a print operation for each said image data being stored in said storage means;

transmission management means for transmitting a print request for said target original and said copy data thereof to other said copying apparatus being connected therewith when said determination means makes a determination on presence of said overlapping and transmitting image data of said target original when print authorization data is received from said other copying apparatus;

receiving management means for supplying received copy data to said required time operation means when a print request and copy data are received from said other copying apparatus for making said end time operation means and said determination means execute processing, while transmitting print authorization data to said other copying apparatus and processing image data being received from said other copying apparatus as said image data of said target original when said determination means makes a determination on absence of said overlapping; and control means for executing said print operation for said target original when said determination makes said determination on absence of said overlapping.

16. The image processing system in accordance with claim 15, further comprising:

display means for displaying the effect that said print operation for said target original is executed in said other copying apparatus when said transmission management means receives said print authorization data, while displaying the effect that said printing for said target original cannot be executed when said transmission management means does not receive said print authorization data within a prescribed time.

17. An image processing apparatus having a reserve print function, comprising:

operation time setting means for setting an operation time of a print operation;

memory means for storing the operation times of a first print operation and a second print operation, said operation times being set by said operation time setting means; and control means for changing the operation time set by said operation time setting means so as to avoid overlapping of said first and second print operations based on said operation times stored in the memory means.

18. An image processing apparatus in accordance with claim 17, wherein said control means changes an end time of a print operation which was set latest.

19. An image processing apparatus in accordance with claim 17, further comprising input means for inputting a desired end time of the print operation, wherein said operation time setting means sets said operation time based on the desired end time.

20. An image processing apparatus having a print function, comprising:

a print start member for instructing the start of a print operation;

judging means for judging presence/absence of an executing print operation when said instruction is input by the start member;

print control means for interrupting said executing print operation and preserving data of the interrupted print operation when said judging means makes a judgment on presence of said executing print operation, and starting a next print operation.

21. An image processing apparatus in accordance with claim 20, wherein the image processing apparatus is an image reproduction apparatus.

22. An image processing apparatus in accordance with claim 21, including an original set tray on which original documents are set and an image reader that reads said original documents for acquiring image data, wherein said next print operation is performed based on said image data.

23. An image processing apparatus having a reserve print function, comprising;

operation time setting means for setting an operation time of a first print operation;

memory means for storing the operation time of the first print operation;

first control means for performing the first print operation at the operation time stored in said memory means;

print operation setting means for setting data related to a second print operation different from the first print operation;

required time operation means for operating required time for the second print operation; and second control means for performing the second print operation when an end time of the second operation, on the basis of said required time, is earlier than a start time of the first print operation on the basis of the operation time stored in said memory means.

24. An image processing apparatus having a reserve print function, comprising:

operation time setting means for setting an operation time of a print operation;

memory means for storing the operation time set by said operation time setting means;

operation time reset instruction means for instructing to reset the operation time stored in said memory means;

operation time reset means for re-operating the operation time in response to said instruction and resetting the re-operated operation time as the operation time of the print operation; and control means for performing the print operation at the operation time reset by said operation time reset means.

25. An image processing apparatus in accordance with claim 24, further comprising display means for displaying the operation time reset by said operation time reset means.

26. An image processing apparatus in accordance with claim 25, further comprising interruption print means for interrupting an executing print operation and performing a next print operation, wherein said operation time reset instruction means instructs to reset an end time of said interrupted print operation after the completion of said next print operation.

27. An image processing apparatus in accordance with claim 25, further comprising cancel means for canceling the print operation, wherein said operation time reset instruction means instructs to reset an end time of a next print operation that is different from said canceled print operation.

28. An image processing apparatus in accordance with claim 25, further comprising trouble recovery detection means for detecting a recovery of a trouble that occurs during the print operation, wherein said operation time reset instruction means instructs to reset an end time of the print operation that encountered the trouble.

29. An image processing apparatus having a reserve print function, comprising:

operation time setting means for setting an operation time of a print operation;

memory means for storing the operation time set by said operation time setting means;

operation time reset instruction means for instructing to reset the operation time stored in said memory means;

operation time reset means for re-operating the operation time in response to said instruction and resetting the re-operated operation time as the operation time of the print operation; and display means for displaying the operation time reset by said operation time reset means.

30. An image processing apparatus in accordance with claim 29, further comprising interruption prints means for interrupting an executing print operation and performing a next print operation, wherein said operation time reset instruction means instructs to reset an end time of said interrupted print operation after the completion of said next print operation.

31. An image processing apparatus in accordance with claim 29, further comprising cancel means for canceling the print operation, wherein said operation time reset instruction means instructs to reset an end time of a next print operation that is different form said cancelled print operation.

32. An image processing apparatus in accordance with claim 29, further comprising trouble recovery detection means for detecting a recovery of a trouble that occurs during the print operation, wherein said operation time reset instruction means instructs to reset an end time of the print operation that encountered the trouble.

33. An image processing system including a first image forming apparatus and a second image forming apparatus transferring data between the first and second image forming apparatus, wherein:

the first image forming apparatus comprises;

print operation setting means for setting data related to a print operation, memory means for storing data of plural print operations set by said print operation setting means, judging means for judging presence/absence of overlapping of the plural print operations on the bases of said data stored in the memory means, data output means for outputting data to said second image forming apparatus, and first control means for outputting data related to the print operation by said data output means when said judging means makes a judgment on presence of said overlapping; and the second image forming apparatus comprises;

data input means for inputting the data output from said first image forming apparatus, and second control means for performing the print operation based on the data input by said input means.

34. An image processing system in accordance with claim 33, wherein said data set by the print operation setting means includes a operation time of the print operation, and said judging means judges presence/absence of overlapping of a time zone for each of the plural print operations.

35. An image processing system including a first image forming apparatus and a second image forming apparatus transferring data between the first and second image forming apparatus, wherein:

the first image forming apparatus comprises;

print operation setting means for setting data related to a print operation, memory means for storing data of plural print operations set by said print operation setting means, data input/output means for inputting data transferred from said second image forming apparatus and outputting data to said second image forming apparatus, display means for displaying prescribed information based on the input data transferred from said second image forming apparatus, and first control means for outputting data related to the print operation through said data input/output means; and the second image forming apparatus comprises;

data input/output means for inputting data transferred from said first image forming apparatus and outputting data to said first image forming apparatus, determination means for determining whether or not performing the print operation is possible based on the input data related to the print operation, and second control means for transferring a result of the determination by said determination means to said first image forming apparatus through said data input/output means.

36. An image processing system in according with claim 35, wherein said display means displays a state of the print operation in the second image forming apparatus based on the result of the determination transferred from the second image forming apparatus.

37. An image processing system in accordance with claim 36, wherein said display means displays the contents of said data set by the print operation setting means.

38. An image processing system in accordance with claim 36, wherein said display means displays the information which indicates the second image forming apparatus.

* * * * *